United States Patent
Tsukuba et al.

(10) Patent No.: US 10,129,548 B2
(45) Date of Patent: Nov. 13, 2018

(54) ARITHMETIC DECODING DEVICE, IMAGE DECODING DEVICE, AND ARITHMETIC CODING DEVICE

(71) Applicant: Sharp Kabushiki Kaisha, Osaka-shi, Osaka (JP)

(72) Inventors: Takeshi Tsukuba, Osaka (JP); Tomohiro Ikai, Osaka (JP); Tomoyuki Yamamoto, Osaka (JP); Yukinobu Yasugi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 49 days.

(21) Appl. No.: 14/368,377

(22) PCT Filed: Dec. 26, 2012

(86) PCT No.: PCT/JP2012/083555
§ 371 (c)(1),
(2) Date: Jun. 24, 2014

(87) PCT Pub. No.: WO2013/099892
PCT Pub. Date: Jul. 4, 2013

(65) Prior Publication Data
US 2014/0348247 A1    Nov. 27, 2014

(30) Foreign Application Priority Data

Dec. 28, 2011  (JP) ................................. 2011-289938
Jan. 23, 2012  (JP) ................................. 2012-011555
(Continued)

(51) Int. Cl.
*H04N 19/48*     (2014.01)
*H04N 19/176*    (2014.01)
(Continued)

(52) U.S. Cl.
CPC ........... *H04N 19/176* (2014.11); *H04N 19/11* (2014.11); *H04N 19/129* (2014.11); *H04N 19/46* (2014.11);
(Continued)

(58) Field of Classification Search
CPC ...... H04N 19/91; H04N 19/176; H04N 19/11; H04N 19/96; H04N 19/129
See application file for complete search history.

(56) References Cited

U.S. PATENT DOCUMENTS

2005/0052294 A1    3/2005  Liang et al.
2005/0123207 A1*   6/2005  Marpe .................. H04N 19/196
                                                382/239
(Continued)

OTHER PUBLICATIONS

Official Communication issued in International Patent Application No. PCT/JP2012/083555, dated Mar. 19, 2013.
(Continued)

*Primary Examiner* — Dave Czekaj
*Assistant Examiner* — Berteau Joisil
(74) *Attorney, Agent, or Firm* — Keating & Bennett, LLP

(57) ABSTRACT

To reduce the amount of processing related to coding and decoding of transform coefficients, a sub-block coefficient presence/absence flag indicating whether or not at least one non-zero transform coefficient is included is decoded for each of two or more sub-blocks obtained by dividing a unit region, and a context index of a target sub-block is derived on the basis of transform coefficient presence/absence flags each indicating whether or not a transform coefficient is 0. In accordance with the sub-block coefficient presence/absence flags of adjacent sub-blocks that are adjacent to the target sub-block, the context index of the target sub-block is derived.

5 Claims, 101 Drawing Sheets

US 10,129,548 B2
Page 2

(30) Foreign Application Priority Data

Feb. 15, 2012 (JP) .................................. 2012-031118
Apr. 12, 2012 (JP) .................................. 2012-091444

(51) Int. Cl.
*H04N 19/46* (2014.01)
*H04N 19/129* (2014.01)
*H04N 19/60* (2014.01)
*H04N 19/96* (2014.01)
*H04N 19/11* (2014.01)
*H04N 19/91* (2014.01)

(52) U.S. Cl.
CPC ............. *H04N 19/60* (2014.11); *H04N 19/91* (2014.11); *H04N 19/96* (2014.11)

(56) References Cited

U.S. PATENT DOCUMENTS

| | | | | |
|---|---|---|---|---|
| 2012/0163469 A1* | 6/2012 | Kim | ..................... | H04N 19/176 375/240.18 |
| 2013/0188684 A1* | 7/2013 | Terada | ................... | H04N 19/70 375/240.02 |

OTHER PUBLICATIONS

Bross et al., "High Efficiency Video Coding (HEVC) text specification draft 6 (JCTVC-H1003)", Joint Collaborative Team on Video Coding (JCT-VC) of ITU-T SG16 WP3 and ISO/IEC JTC1/SC29/WG11 8th Meeting, San Jose, CA, Feb. 1-10, 2012, 259 pages.
Nguyen et al., "Multi-level significance maps for Large Transform Units (JCTVC-G644)", Joint Collaborative Team on Video Coding (JCT-VC) of ITU-T SG16 WP3 and ISO/IEC JTC1/SC29/WG11 7th Meeting, Geneva, Nov. 21-30, 2011, pp. 1-11.
Sole et al., "CE11: Scanning of Residual Data in HE (JCTVC-G320)", Joint Collaborative Team on Video Coding (JCT-VC) of ITU-T SG16 WP3 and ISO/IEC JTC1/SC29/WG11 7th Meeting, Geneva, CH, Nov. 21-30, 2011, pp. 1-3.
Sole et al., "JCT-VC break-out report: Harmonization of NSQT with residual coding (JCTVC-G1038)", Joint Collaborative Team on Video Coding (JCT-VC) of ITU-T SG16 WP3 and ISO/IEC JTC1/SC29/WG11 7th Meeting, Geneva, CH, Nov. 21-30, 2011, 1 page.
Auyeung et al., "A combined proposal from JCTVC-G366, JCTVC-G657, and JCTVC-G768 on context reduction of significance map coding with CABAC (JCTVC-G1015)", Joint Collaborative Team on Video Coding (JCT-VC) of ITU-T SG16 WP3 and ISO/IEC JTC1/SC29/WG11 7th Meeting, Geneva, CH, Nov. 21-30, 2011, pp. 1-5.
Bross et al., "WD4: Working Draft 4 of High-Efficiency Video Coding (JCTVC-F803_d2)", Joint Collaborative Team on Video Coding (JCT-VC) of ITU-T SG16 WP3 and ISO/IEC JTC1/SC29/WG11 6th Meeting, Torino, IT, Jul. 14-22, 2011, 226 pages.
Official Communication issued in corresponding European Patent Application No. 12863083.7, dated May 4, 2015.
Qin, X. et al., "A Memory and Speed Efficient Cavlc Decoder", Visual Communications and Image Processing, Proc. of SPIE, vol. 5960, Jul. 12-15, 2005, pp. 1418-1426.
Auyeung, C. et al., "Context Reduction of the Last Transform Position in JCTVC-D262 for CE11.1", Joint Collaborative Team on Video Coding of ITU-T SG16 WP3 and ISO/IEC JTC1/SC29/WG11, 5th Meeting, Document: JCTVC-E344, Mar. 16-23, 2011, pp. 1-6.
Sole, J. et al., "Unified Scans for the Significance Map and Coefficient Level Coding in High Coding Efficiency", Joint Collaborative Team on Video Coding of ITU-T SG16 WP3 and ISO/IEC JTC1/SC29/WG11, 5th Meeting, Document: JCTVC-E335, Mar. 16-23, 2011, pp. 1-4.
Piao et al., "Reduced contexts for significance map coding of large transform in CABAC", Joint Collaborative Team on Video Coding (JCT-VC) of ITU-T SG16 WP3 and ISO/IEC JTC1/SC29/WG11, JCTVC-G768, Nov. 21-30, 2011, pp. 1-5.
Yu et al., "Adaptive Scan for Large Blocks for HEVC", Joint Collaborative Team on Video Coding (JCT-VC) of ITU-T SG16 WP3 and ISO/IEC JTC1/SC29/WG11, JCTVC-F569_r2, Jul. 14-22, 2011, 7 pages.
Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d0, 8 pages.
Official Communication issued in Japanese Patent Application No. 2017-085594, dated Jun. 5, 2018.
Okubo, S. et al.; "H.264/AVC Textbook"' 3rd Edition; Impress R&D; Jan. 1, 2009; 6 pages.
Korodi et al., "Encoding and decoding significant coefficient flags for small Transform Units using partition sets", Joint Collaborative Team on Video Coding (JCT-VC) of ITU-T SG16 WP3 and ISO/IEC JTC1/SC29/WG11, JCTVC-G657, Nov. 21-30, 2011, pp. 1-14.

* cited by examiner

FIG. 2
(a)
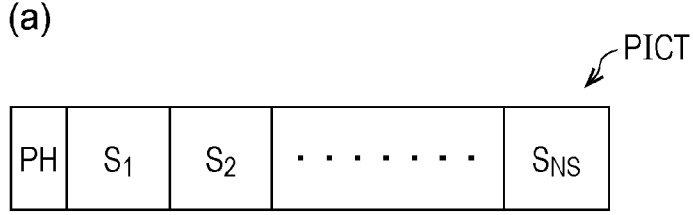
(b)
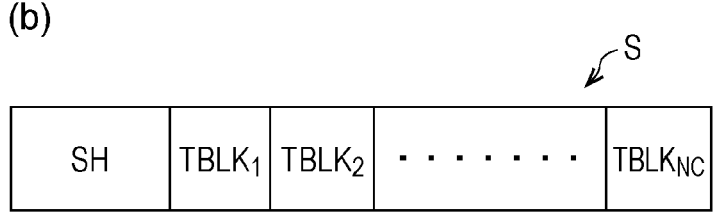
(c)
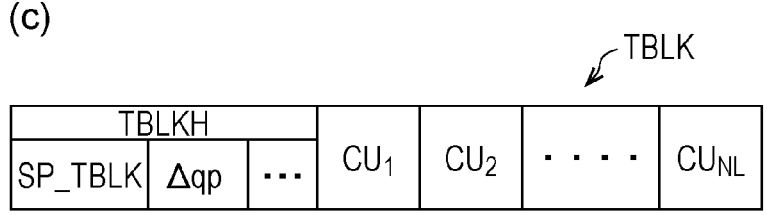
(d)
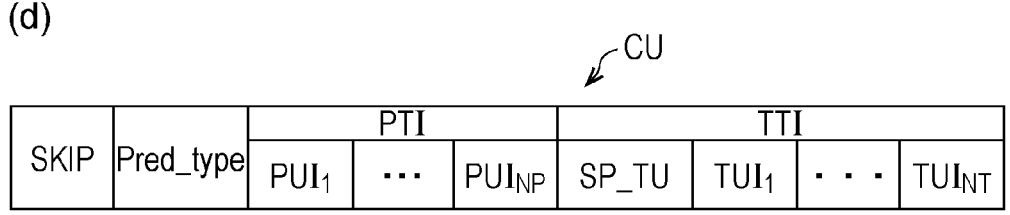

FIG. 3
(a) 2Nx2N 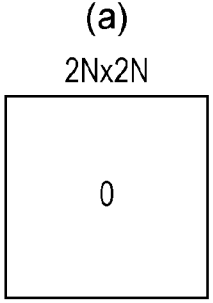
(b) 2NxN 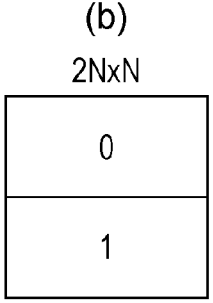
(c) 2NxnU 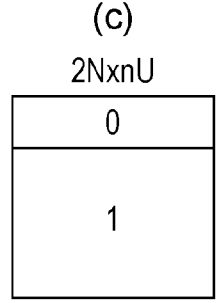
(d) 2NxnD 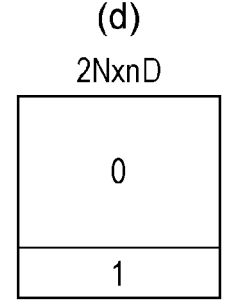
(e) Nx2N 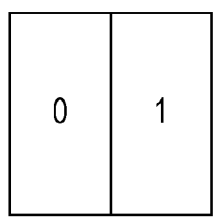
(f) nLx2N 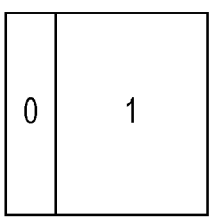
(g) nRx2N 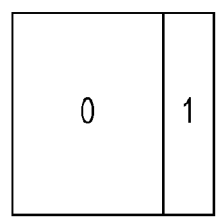
(h) NxN 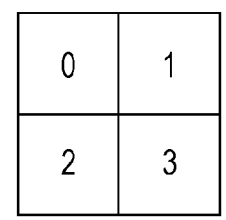
(i) 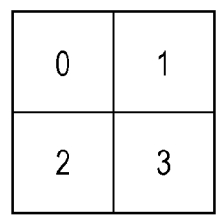
(j) 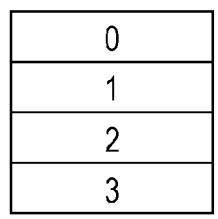
(k) 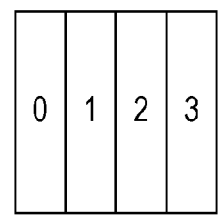
(l) 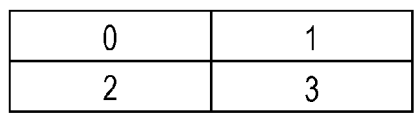
(n) 
(o) 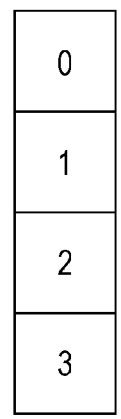
(m) 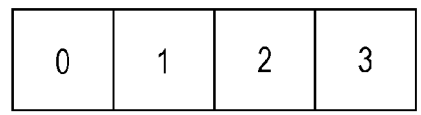

FIG. 4

| | Descriptor |
|---|---|
| residual_coding_cabac( x0, y0, log2TrafoSize, trafoDepth, scanIdx, cIdx ) { | |
| last_significant_coeff_x | ae(v) |
| last_significant_coeff_y | ae(v) |
| numCoeff = 0 | |
| xC = ScanOrder[ log2TrafoSize − 2 ][ log2TrafoSize − 2 ][ scanIdx ][ numCoeff ][ 0 ] | |
| yC = ScanOrder[ log2TrafoSize − 2 ][ log2TrafoSize − 2 ][ scanIdx ][ numCoeff ][ 1 ] | |
| if( log2TrafoSize>3){ | |
|    log2CoeffGroupSize = log2TrafoSize − 2 | |
|    numCoeffGroup = 0 | |
|    for( xCG=0; xCG<4; xCG++) | |
|      for( yCG=0; yCG<4; yCG++) | |
|        numNonZeroCG[xCG][yCG] = 0 | |
| } | |
| while( ( xC != last_significant_coeff_x ) || ( yC != last_significant_coeff_y ) ) { | |
|   numCoeff++ | |
|   xC = ScanOrder[ log2TrafoSize − 2 ][ log2TrafoSize − 2 ][ scanIdx ][ numCoeff ][ 0 ] | |
|   yC = ScanOrder[ log2TrafoSize − 2 ][ log2TrafoSize − 2 ][ scanIdx ][ numCoeff ][ 1 ] | |
|   if( log2TrafoSize>3){ | |
|     if( xC%(1<<log2CoeffGroupSize)==0 && (yC%(1<<log2CoeffGroupSize)==0) ){ | |
|       numCoeffGroup++ | |
|     } | |
|   } | |
| } | |
| if( log2TrafoSize>3 ){ | |
|   xCGLast = last_significant_coeff_x / ( 1<<log2CoeffgroupSize) | |
|   yCGLast = last_significant_coeff_y / ( 1<<log2CoeffgroupSize) | |
|   significant_coeffgroup_flag[xCGLast][yCGLast]=1 | |
|   significant_coeffgroup_flag[ 0 ][ 0 ] = 1 | |
|   for( n= numCoeffGroup; n>0; n--){ | |
|     xCG = ScanOrder[ 0 ][ 0 ][ scanIdx ][ n ][ 0 ] | |
|     yCG = ScanOrder [0 ][ 0 ][ scanIdx ][n] [ 1 ] | |
|     if ( significant_coeffgroup_flag[xCG+1][yCG]>0 && significant_coeffgroup_flag[xCG][yCG+1]>0){ | |
|       siginificant_coeffgroup_flag[xCG][yCG] = 1; | |
|     } else if( !(xCG==xCGLast) && !(yCG==yCGLast) ){ | |
|       significant_coeffgroup_flag[xCG][yCG] | ae(v) |
|     } | |
|   } | |

FIG. 5

| ... | Descriptor |
|---|---|
| numLastSubset = numCoeff >> 4 | |
| for( i = numLastSubset − 1; i >= 0; i− − ) { | |
|   offset = i << 4 | |
|   for( n=15; n>=0; n--){ | |
|     xC = ScanOrder[ log2TrafoSize − 2 ][ log2TrafoSize − 2 ][ scanIdx ][ n ][ 0 ] | |
|     yC = ScanOrder[ log2TrafoSize − 2 ][ log2TrafoSize − 2 ][ scanIdx ][ n ][ 1 ] | |
|     if( log2TrafoSize>3){ | |
|       xCG = xC>>(log2CoeffGroupSize) | |
|       yCG = yC>>(log2CoeffGroupSize ) | |
|       if( significant_coeffgroup_flag[xCG][yCG]>0 ){ | |
|         if ( xC != last_significant_coeff_x ) || ( yC != last_significant_coeff_y ){ | |
|           significant_coeff_flag[ xC ][ yC ] | ae(v) |
|         } | |
|       } | |
|     } else{ | |
|       if ( xC != last_significant_coeff_x ) | ( yC != last_significant_coeff_y ){ | |
|         significant_coeff_flag[ xC ][ yC ] | ae(v) |
|       } | |
|     } | |
|   for( n = 15; n >= 0; n − − ) { | |
|     xC = ScanOrder[ log2TrafoSize − 2 ][ log2TrafoSize − 2 ][ 0 ][ n − offset ][ 0 ] | |
|     yC = ScanOrder[ log2TrafoSize − 2 ][ log2TrafoSize − 2 ][ 0 ][ n − offset' ][ 1 ] | |
|     if( significant_coeff_flag[ xC ][ yC ] ) | |
|       coeff_abs_level_greater1_flag[ n ] | ae(v) |
|   } | |
|   for( n = 15; n >= 0; n− − ) { | |
|     if( coeff_abs_level_greater1_flag[ n ] ) | |
|       coeff_abs_level_greater2_flag[ n ] | ae(v) |
|   } | |
|   for( n = 15; n >= 0; n− − ) { | |
|     xC = ScanOrder[ log2TrafoSize − 2 ][ log2TrafoSize − 2 ][ 0 ][ n + offset ][ 0 ] | |
|     yC = ScanOrder[ log2TrafoSize − 2 ][ log2TrafoSize − 2 ][ 0 ][ n + offset' ][ 1 ] | |
|     if( significant_coeff_flag[ xC ][ yC ] ) { | |
|       coeff_sign_flag[ n ] | ae(v) |
|     } | |
|   } | |
|   for( n = 15; n >= 0; n− − ) { | |
|     if( coeff_abs_level_greater2_flag[ n ] ) | |
|       coeff_abs_level_minus3[ n ] | ae(v) |
|     xC = ScanOrder[ log2TrafoSize − 2 ][ log2TrafoSize − 2 ][ 0 ][ n + offset ][ 0 ] | |
|     yC = ScanOrder[ log2TrafoSize − 2 ][ log2TrafoSize − 2 ][ 0 ][ n + offset' ][ 1 ] | |
|     if( significant_coeff_flag[ xC ][ yC ] ) { | |
|       transCoeffLevel[ x0 ][ y0 ][ trafoDepth ][ cIdx ][ n + offset ] = | |
|         ( coeff_abs_level_minus3[ n ] + 3 ) * ( 1 − 2 * coeff_sign_flag[ n ] ) | |
|     } else | |
|       transCoeffLevel[ x0 ][ y0 ][ trafoDepth ][ cIdx ][ n + offset ] = 0 | |
|   } | |
| } | |

| Intra prediction mode | Associated names |
|---|---|
| 0 | Intra_Planar |
| 1 | Intra_Vertical |
| 2 | Intra_Horizontal |
| 3 | Intra_DC |
| Otherwise (4..34) | Intra_Angular |
| 35 | Intra_FromLuma (used only for chroma) |

FIG. 13

| log2TrafoSize | intraPredModeNum |
|---|---|
| 2 | 18 |
| 3 | 35 |
| 4 | 35 |
| 5 | 35 |
| 6 | 35 |

FIG. 14

| IntraPredMode | log2TrafoSize-2 | |
|---|---|---|
| | 0 | 1 |
| 0 | 0 | 0 |
| 1 | 1 | 1 |
| 2 | 2 | 2 |
| 3 | 0 | 0 |
| 4 | 0 | 0 |
| 5 | 1 | 1 |
| 6 | 1 | 1 |
| 7 | 0 | 0 |
| 8 | 2 | 2 |
| 9 | 2 | 2 |
| 10 | 0 | 0 |
| 11 | 0 | 0 |
| 12 | 1 | 1 |
| 13 | 1 | 1 |
| 14 | 0 | 0 |
| 15 | 0 | 0 |
| 16 | 2 | 2 |
| 17 | 2 | 2 |
| 18 | 0 | 0 |
| 19 | 0 | 0 |
| 20 | 0 | 0 |
| 21 | 1 | 1 |
| 22 | 1 | 1 |
| 23 | 1 | 1 |
| 24 | 1 | 1 |
| 25 | 0 | 0 |
| 26 | 0 | 0 |
| 27 | 0 | 0 |
| 28 | 0 | 0 |
| 29 | 2 | 2 |
| 30 | 2 | 2 |
| 31 | 2 | 2 |
| 32 | 2 | 2 |
| 33 | 0 | 0 |
| 34 | 0 | 0 |
| 35 | 0 | 0 |

FIG. 15
(a)
| scanIndex | ScanType |
|---|---|
| 0 | Up-right diagonal scan |
| 1 | horizontal fast scan |
| 2 | vertical fast scan |
(b)
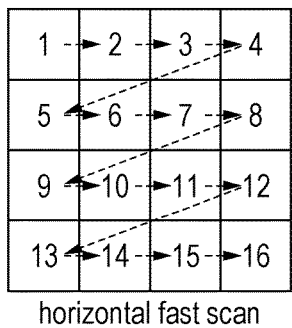
horizontal fast scan
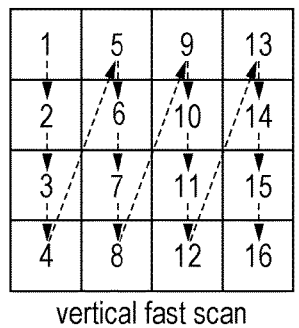
vertical fast scan
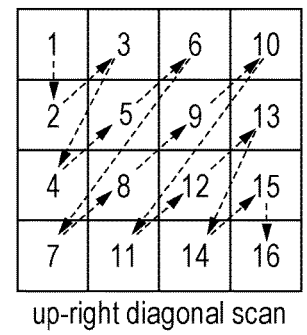
up-right diagonal scan

FIG. 16

| IntraPredMode | log2TrafoSize-2 | | | | |
|---|---|---|---|---|---|
| | 0 | 1 | 2 | 3 | 4 |
| 0 | NA | NA | 0 | 0 | 0 |
| 1 | NA | NA | 1 | 1 | 1 |
| 2 | NA | NA | 2 | 2 | 2 |
| 3 | NA | NA | 0 | 0 | 0 |
| 4 | NA | NA | 0 | 0 | 0 |
| 5 | NA | NA | 0 | 0 | 0 |
| 6 | NA | NA | 0 | 0 | 0 |
| 7 | NA | NA | 0 | 0 | 0 |
| 8 | NA | NA | 0 | 0 | 0 |
| 9 | NA | NA | 0 | 0 | 0 |
| 10 | NA | NA | 0 | 0 | 0 |
| 11 | NA | NA | 0 | 0 | 0 |
| 12 | NA | NA | 0 | 0 | 0 |
| 13 | NA | NA | 0 | 0 | 0 |
| 14 | NA | NA | 0 | 0 | 0 |
| 15 | NA | NA | 0 | 0 | 0 |
| 16 | NA | NA | 0 | 0 | 0 |
| 17 | NA | NA | 0 | 0 | 0 |
| 18 | NA | NA | 0 | 0 | 0 |
| 19 | NA | NA | 0 | 0 | 0 |
| 20 | NA | NA | 0 | 0 | 0 |
| 21 | NA | NA | 0 | 0 | 0 |
| 22 | NA | NA | 0 | 0 | 0 |
| 23 | NA | NA | 0 | 0 | 0 |
| 24 | NA | NA | 0 | 0 | 0 |
| 25 | NA | NA | 0 | 0 | 0 |
| 26 | NA | NA | 0 | 0 | 0 |
| 27 | NA | NA | 0 | 0 | 0 |
| 28 | NA | NA | 0 | 0 | 0 |
| 29 | NA | NA | 0 | 0 | 0 |
| 30 | NA | NA | 0 | 0 | 0 |
| 31 | NA | NA | 0 | 0 | 0 |
| 32 | NA | NA | 0 | 0 | 0 |
| 33 | NA | NA | 0 | 0 | 0 |
| 34 | NA | NA | 0 | 0 | 0 |
| 35 | NA | NA | 0 | 0 | 0 |

FIG. 17
(a)
| scanIndex | ScanType |
|---|---|
| 0 | Up-right diagonal scan |
| 1 | horizontal fast scan |
| 2 | vertical fast scan |
(b)
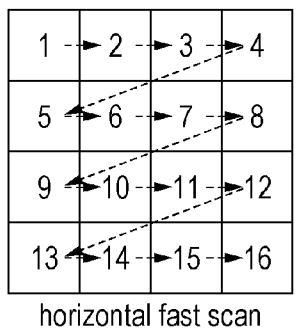
horizontal fast scan
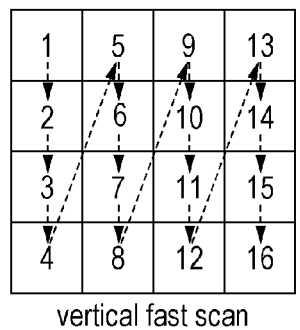
vertical fast scan
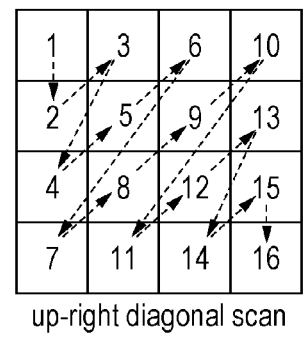
up-right diagonal scan

FIG. 18

| IntraPredMode | log2TrafoSize-2 | | | | |
|---|---|---|---|---|---|
| | 0 | 1 | 2 | 3 | 4 |
| 0 | NA | NA | 0 | 0 | 0 |
| 1 | NA | NA | 1 | 1 | 1 |
| 2 | NA | NA | 2 | 2 | 2 |
| 3 | NA | NA | 0 | 0 | 0 |
| 4 | NA | NA | 0 | 0 | 0 |
| 5 | NA | NA | 1 | 1 | 1 |
| 6 | NA | NA | 1 | 1 | 1 |
| 7 | NA | NA | 0 | 0 | 0 |
| 8 | NA | NA | 2 | 2 | 2 |
| 9 | NA | NA | 2 | 2 | 2 |
| 10 | NA | NA | 0 | 0 | 0 |
| 11 | NA | NA | 0 | 0 | 0 |
| 12 | NA | NA | 1 | 1 | 1 |
| 13 | NA | NA | 1 | 1 | 1 |
| 14 | NA | NA | 0 | 0 | 0 |
| 15 | NA | NA | 0 | 0 | 0 |
| 16 | NA | NA | 2 | 2 | 2 |
| 17 | NA | NA | 2 | 2 | 2 |
| 18 | NA | NA | 0 | 0 | 0 |
| 19 | NA | NA | 0 | 0 | 0 |
| 20 | NA | NA | 0 | 0 | 0 |
| 21 | NA | NA | 1 | 1 | 1 |
| 22 | NA | NA | 1 | 1 | 1 |
| 23 | NA | NA | 1 | 1 | 1 |
| 24 | NA | NA | 1 | 1 | 1 |
| 25 | NA | NA | 0 | 0 | 0 |
| 26 | NA | NA | 0 | 0 | 0 |
| 27 | NA | NA | 0 | 0 | 0 |
| 28 | NA | NA | 0 | 0 | 0 |
| 29 | NA | NA | 2 | 2 | 2 |
| 30 | NA | NA | 2 | 2 | 2 |
| 31 | NA | NA | 2 | 2 | 2 |
| 32 | NA | NA | 2 | 2 | 2 |
| 33 | NA | NA | 0 | 0 | 0 |
| 34 | NA | NA | 0 | 0 | 0 |
| 35 | NA | NA | 0 | 0 | 0 |

FIG. 20
(a)
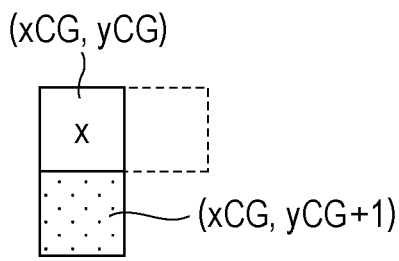
(b)
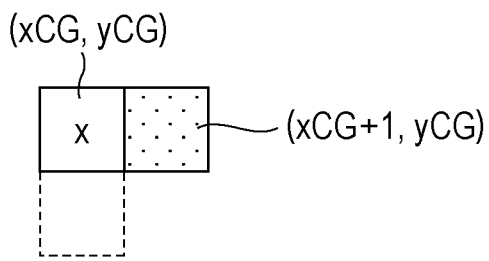
(c)
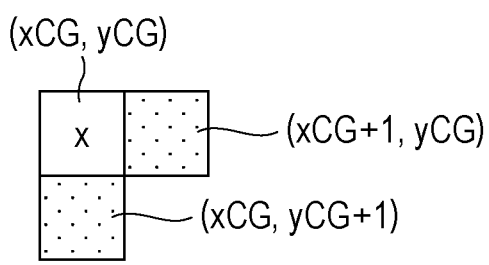

LAST COEFFICIENT

| 5 | 0 | 0 | 0 | 1 | 0 | 0 | 0 | 1 | 0 | 0 | 0 | 0 | 0 | ① | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 2 | 0 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

(b)

| 1 | 1 | 1 | ① | SUB-BLOCK INCLUDING LAST COEFFICIENT |
|---|---|---|---|---|
| 0 | 0 | 0 | 0 | |
| 0 | 0 | 0 | 0 | |
| 0 | 0 | 0 | 0 | |

LAST COEFFICIENT

| 5 | 0 | 0 | 0 | 1 | 0 | 0 | 0 | 1 | 0 | 0 | 0 | 0 | 0 | ① | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 2 | 0 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

(b)

| 1 | 1 | 1 | ① | — SUB-BLOCK INCLUDING LAST COEFFICIENT |
|---|---|---|---|---|
| 0 | 0 | 0 | 0 | |
| 0 | 0 | 0 | 0 | |
| 0 | 0 | 0 | 0 | |

FIG. 26
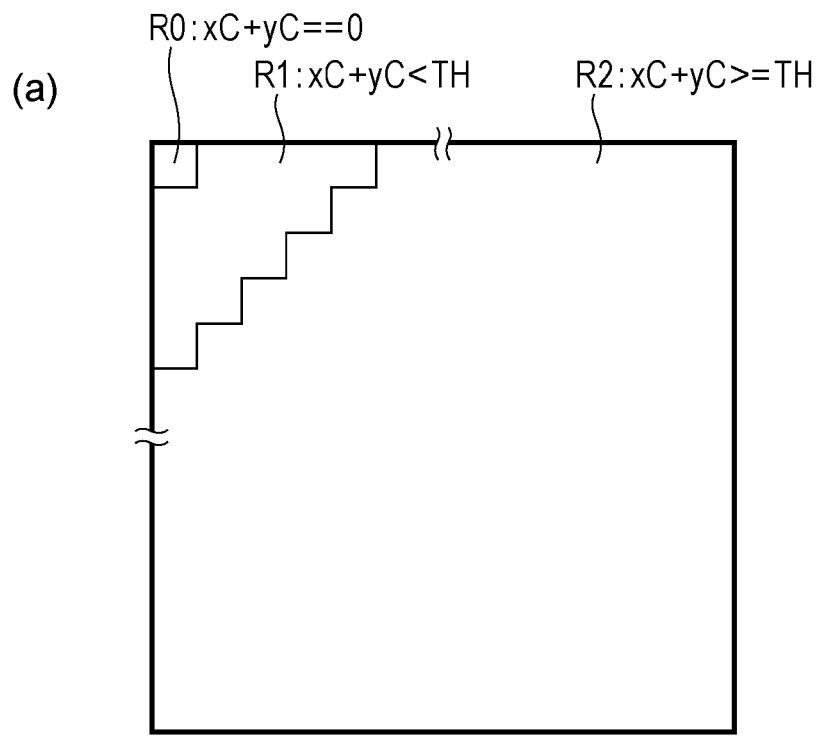
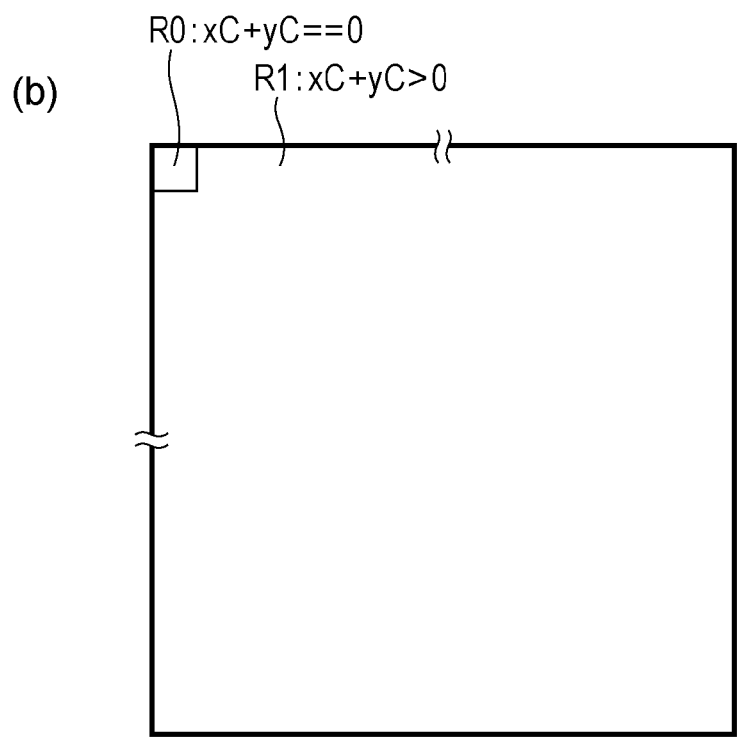

FIG. 27

```
input:
  xC,yC  // coefficient position (xC,yC)    xC=0,..., width-1, yC=0,..., height-1
  cIdx;  //0 :luminance (Y), 1:chrominance (U, V)
  width , height // size of TU (width, height)

output:
  ctxIdx;// context index of significant_coeff_flag context index derivation process for luminance
{
    sigCtxOffsetR0 = 31;  // the number of context indices of 4x4 to 8x8
    sigCtxOffsetR1 = sigCtxOffsetR0 + 1;
    sigCtxOffsetR2 = sigCtxOffsetR1 + 3;

if( xC+yC==0 ){ // context derivation in region R0
        sigCtx = sigCtxOffsetR0;
    }
    else if( xC+yC<  Max(width, height)>>2  ){ // context derivation in region R1 (low-frequency region)
        if (xC%4==0 && yC%4==0){// in a case where coefficient position is first in forward
        scan order in sub-block
            cnt = (c1!=0) + (c2!=0) + (c4!=0) + (c5!=0);
        } else{
            cnt= (c1!=0) + (c2!=0) + (c3!=0) + (c4!=0) + (c5!=0);
        }
        ctxCnt = (cnt+ 1)>>1;
        sigCtx = sigCtxOffsetR1  +  Min(2, ctxCnt);
    }
    else if ( xC+yC >= Max (width, height)>>2   ){ // context derivation in region R2 (high-frequency region)
        if (xC%4==0 && yC%4==0){// in a case where coefficient position is first in forward
        scan order in sub-block
            cnt = (c1!=0) + (c2!=0) + (c4!=0) + (c5!=0);
        } else{
            cnt= (c1!=0) + (c2!=0) + (c3!=0) + (c4!=0) + (c5!=0);
        }
        ctxCnt = (cnt+ 1)>>1;
        sigCtx = sigCtxOffsetR2 + Min(2, ctxCnt);
    } ctxIdx = sigCtx;
}
```

FIG. 28

```
input:
  xC,yC // coefficient position (xC,yC)    xC=0,..., width-1, yC=0,..., height-1
  cIdx;    //0 :luminance (Y), 1: chrominance (U, V)
  width , height // size of TU (width, height)

output:
  ctxIdx;// context index of significant_coeff_flag context index derivation process for chrominance
{
    sigCtxOffsetR0 = 31; // the number of context indices of 4x4 to 8x8
    sigCtxOffsetR1 = sigCtxOffsetR0 + 1;
    //sigCtxOffsetR2 = sigCtxOffsetR1 + 3;

if( xC+yC==0 ){ // context derivation in region R0
       sigCtx = sigCtxOffsetR0;
    }
    else if ( xC+yC > 0 ){ // context derivation in region R1
       if (xC%4==0 && yC%4==0){// in a case where coefficient position is first in forward
       scan order in sub-block
            cnt = (c1!=0) + (c2!=0) + (c4!=0) + (c5!=0);
       } else{
            cnt= (c1!=0) + (c2!=0) + (c3!=0) + (c4!=0) + (c5!=0);
       }
       ctxCnt = (cnt+ 1)>>1:

sigCtx = sigCtxOffsetR1 + Min(2, ctxCnt);
    } ctxIdx = sigCtx + NumOfSigCtxLuma;
    // NumOfSigCtxLuma is the number of context indices of signifincant_coeff_flag for luminance
}
```

FIG. 29
(a)
4x4 TRANSFORM BLOCK
CONTEXT FOR LUMINANCE/CHROMINANCE
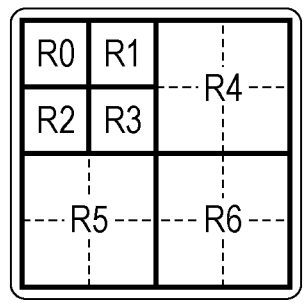
(b)
8x8 TRANSFORM BLOCK
CONTEXT FOR LUMINANCE/CHROMINANCE
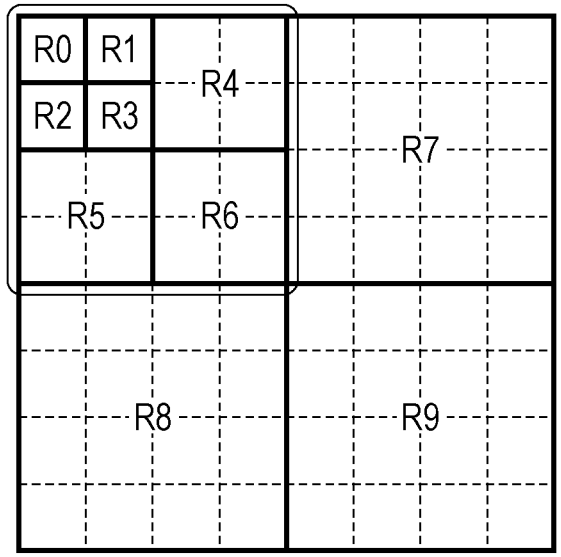

FIG. 30
(a) 4x4 TRANSFORM BLOCK CONTEXT FOR LUMINANCE
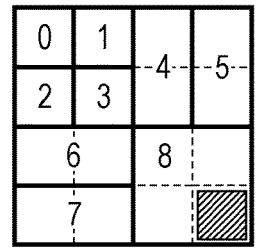
(b) 4x4 TRANSFORM BLOCK CONTEXT FOR CHROMINANCE
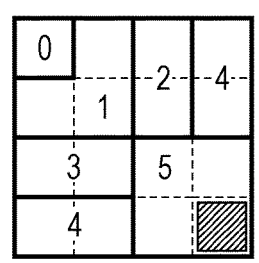
(c) 8x8 TRANSFORM BLOCK CONTEXT FOR LUMINANCE/CHROMINANCE
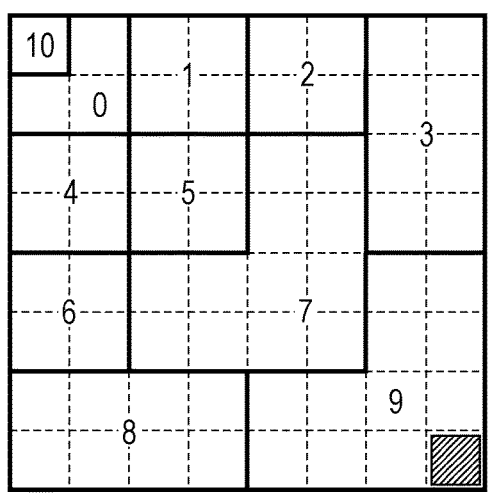

FIG. 31

```
input:
xC,yC  // coefficient position (xC,yC)  xC=0,..., width-1, yC=0,..., height-1
cIdx;  //0 :luminance (Y), 1:chrominance (U, V)
log2TrafoSize; // TU size output:
ctxIdx:// context index of significant_coeff_flag context index derivation process for luminance/chrominance  //pseudo code
{
 If(log2TrafoSize<=3){ // in the case of 4x4, 8x8
  if ( xC<2 && yC<2){ // low-frequency region of 4x4, 8x8
   index = (yC<<1 ) + xC;
   sigCtx = CTX_IND_MAP_4x4to8x8[index]
  }
  else{ // high-frequency region of 4x4, 8x8
   index = ( (yC>>1)<<2 ) + (xC>>1) - 1 +4;
   sigCtx = CTX_IND_MAP_4x4to8x8 [index ];
  }
 } if ( ctxIdx==0 ){// context index for luminance
  ctxIdx = sigCtx;
 }
 else{ // context index for chrominance
  ctxIdx = sigCtx + SigCtxOffsetLuma ;    // NumOfSigCtxLuma is offset for identifying context of signifincant_coeff_flag for luminance
```

| | Index | | | | | | | | | | | | | | | | | | |
|---|---|---|---|---|---|---|---|---|---|---|---|---|---|---|---|---|---|---|---|
| | 0 | 1 | 2 | 3 | | | | | | | | | | | | | | | |
| CTX_IND_MAP_ 4x4to8x8 | 0 | 1 | 2 | 3 | | | | | | | | | | | | | | | |
| | 4 | 5 | 6 | 7 | 8 | 9 | 10 | 11 | 12 | 13 | 14 | 15 | 16 | 17 | 18 | | | | |
| CTX_IND_MAP_ 4x4to8x8 | 4 | 7 | 7 | 5 | 6 | 7 | 7 | 8 | 8 | 9 | 9 | 8 | 8 | 9 | 9 | | | | |

(b)

FIG. 33
(a) 4x4 TRANSFORM BLOCK
CONTEXT FOR LUMINANCE/CHROMINANCE
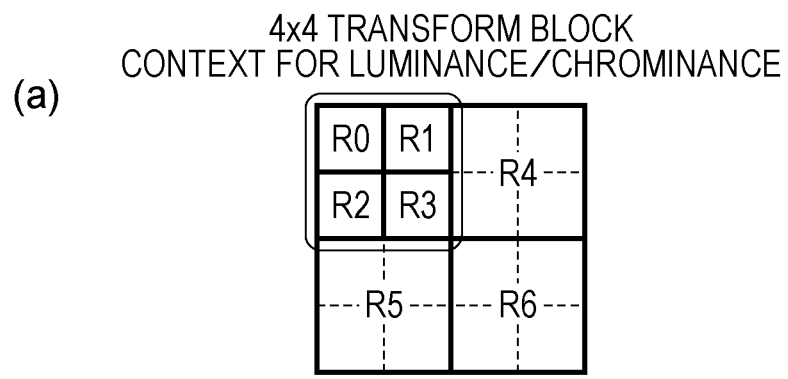
(b) 8x8 TRANSFORM BLOCK
CONTEXT FOR LUMINANCE/CHROMINANCE
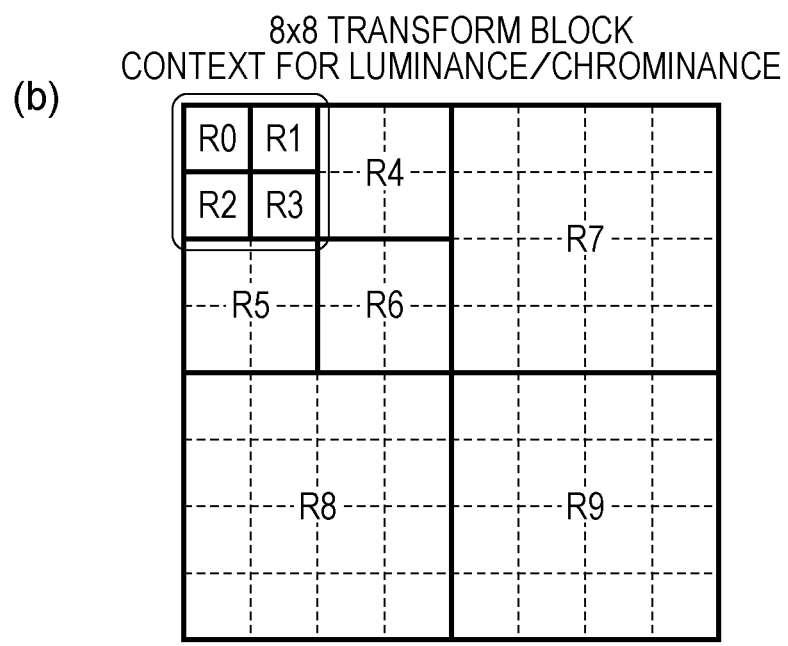

FIG. 34

```
input:
xC,yC  // coefficient position (xC,yC)   xC=0,..., width-1, yC=0,..., height-1
cIdx;  // 0 :luminance (Y), 1:chrominance (U, V)
log2TrafoSize; // TU size output:
ctxIdx;// context index of significant_coeff_flag context index derivation process for luminance/chrominance  //pseudo code
{
If(log2TrafoSize<=3){ // in the case of 4x4, 8x8
   if ( xC<2 && yC<2){ // low-frequency region of 4x4, 8x8 (2x2),  ctxIdx = 0-3
      index = (yC<<1 ) + xC;
      sigCtx = CTX_IND_MAP_4x4to8x8[index];
   }
   else{ // high-frequency region of 4x4, 8x8   ctxIdx = 4-6···R4,R5,R6 of 4x4,   ctxIdx=7-12···R4,R5,R6,R7,R8,R9 of 8x8
      offset = log2TrafoSize==2 ? 0 : 4; // offset for separating context of high-frequency of 4x4 and context of high-frequency of 8x8;
      index = ( (yC>>1)<<2 ) + (xC>>1) – 1 + 4;
      sigCtx = CTX_IND_MAP_4x4to8x8 [ index ] + offset;
   }
}
if ( ctxIdx==0 ){// context index for luminance
   ctxIdx = sigCtx;
}
else{ // context index for chrominance
   ctxIdx = sigCtx + SigCtxOffsetLuma ;     // SigCtxOffsetLuma is offset for identifying context of signifincant_coeff_flag for luminance
}
}
```

FIG. 35
(a)
| | Index | | | | | | | | | | | | | | | | | | |
|---|---|---|---|---|---|---|---|---|---|---|---|---|---|---|---|---|---|---|---|
| | 0 | 1 | 2 | 3 | | | | | | | | | | | | | | | |
| CTX_IND_MAP_4x4to8x8 | 0 | 1 | 2 | 3 | | | | | | | | | | | | | | | |
| | 4 | 5 | 6 | 7 | 8 | 9 | 10 | 11 | 12 | 13 | 14 | 15 | 16 | 17 | 18 | | | | |
| CTX_IND_MAP_4x4to8x8 | 4 | 7 | 7 | 5 | 6 | 7 | 7 | 8 | 8 | 9 | 9 | 8 | 8 | 9 | 9 | | | | |
(b) 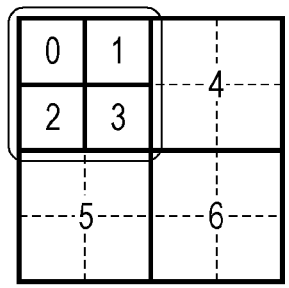
(c) 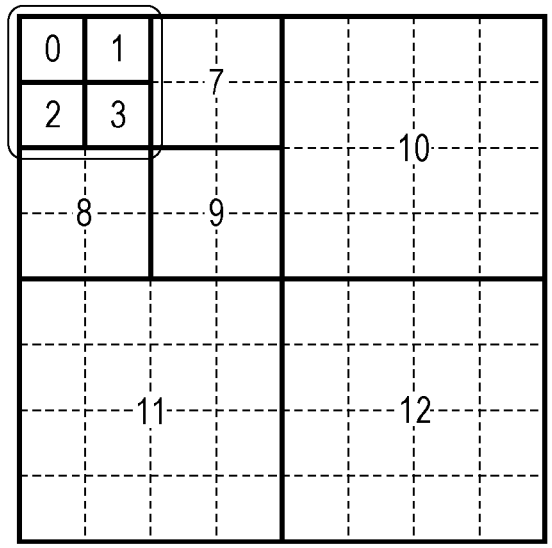

FIG. 36

```
input:
xC,yC   // coefficient position (xC,yC)   xC=0,..., width-1, yC=0,..., height-1
cIdx;   //0 :luminance (Y), 1:chrominance (U, V)
log2TrafoSize; // TU size output:
ctxIdx;// context index of significant_coeff_flag context index derivation process for luminance/chrominance  //pseudo code
{
 If(log2TrafoSize<=3){ // in the case of 4x4, 8x8
    Index = (yC<<3) + xC;
    sigCtx = ctxIdx==0 ? CTX_IND_MAP_4x4to8x8_L[ index ] : CTX_IND_MAP_4x4to8x8_C [ index ] ;
 }
 if ( ctxIdx==0 ){// context index for luminance
    ctxIdx = sigCtx;
 }
 else{ // context index for chrominance
    ctxIdx = sigCtx + SigCtOffsetLuma ;    // SigCtxOffsetLuma is offset for identifying context of signifincant_coeff_flag for luminance
 }
}
```

(a)

| | Index | | | | | | | |
|---|---|---|---|---|---|---|---|---|
| | 0 | 1 | 2 | 3 | 4 | 5 | 6 | 7 |
| CTX_IND_MAP_4x4to8x8_L | 0 | 1 | 4 | 5 | 9 | 9 | 12 | 12 |
| | 8 | 9 | 10 | 11 | 12 | 13 | 14 | 15 |
| CTX_IND_MAP_4x4to8x8_L | 2 | 3 | 4 | 5 | 9 | 9 | 12 | 12 |
| | 16 | 17 | 18 | 19 | 20 | 21 | 22 | 23 |
| CTX_IND_MAP_4x4to8x8_L | 6 | 6 | 8 | 8 | 11 | 11 | 12 | 12 |
| | 24 | 25 | 26 | 27 | 28 | 29 | 30 | 31 |
| CTX_IND_MAP_4x4to8x8_L | 6 | 6 | 8 | 8 | 11 | 11 | 12 | 12 |
| | 32 | 33 | 34 | 35 | 36 | 37 | 38 | 39 |
| CTX_IND_MAP_4x4to8x8_L | 10 | 10 | 11 | 11 | 11 | 11 | 14 | 14 |
| | 40 | 41 | 42 | 43 | 44 | 45 | 46 | 47 |
| CTX_IND_MAP_4x4to8x8_L | 10 | 10 | 11 | 11 | 11 | 11 | 14 | 14 |
| | 48 | 49 | 50 | 51 | 52 | 53 | 54 | 55 |
| CTX_IND_MAP_4x4to8x8_L | 13 | 13 | 13 | 13 | 14 | 14 | 14 | 14 |
| | 48 | 49 | 50 | 51 | 52 | 53 | 54 | 55 |
| CTX_IND_MAP_4x4to8x8_L | 13 | 13 | 13 | 13 | 14 | 14 | 14 | 14 |

(b)

CONTEXT FOR LUMINANCE (a)

| | Index | | | | | | | |
|---|---|---|---|---|---|---|---|---|
| | 0 | 1 | 2 | 3 | 4 | 5 | 6 | 7 |
| CTX_IND_MAP_4x4to8x8_C | 0 | 1 | 2 | 3 | 7 | 7 | 10 | 10 |
| | 8 | 9 | 10 | 11 | 12 | 13 | 14 | 15 |
| CTX_IND_MAP_4x4to8x8_C | 1 | 1 | 2 | 3 | 7 | 7 | 10 | 10 |
| | 16 | 17 | 18 | 19 | 20 | 21 | 22 | 23 |
| CTX_IND_MAP_4x4to8x8_C | 4 | 4 | 6 | 6 | 9 | 9 | 10 | 10 |
| | 24 | 25 | 26 | 27 | 28 | 29 | 30 | 31 |
| CTX_IND_MAP_4x4to8x8_C | 5 | 5 | 6 | 6 | 9 | 9 | 10 | 10 |
| | 32 | 33 | 34 | 35 | 36 | 37 | 38 | 39 |
| CTX_IND_MAP_4x4to8x8_C | 8 | 8 | 9 | 9 | 9 | 9 | 12 | 12 |
| | 40 | 41 | 42 | 43 | 44 | 45 | 46 | 47 |
| CTX_IND_MAP_4x4to8x8_C | 8 | 8 | 9 | 9 | 9 | 9 | 12 | 12 |
| | 48 | 49 | 50 | 51 | 52 | 53 | 54 | 55 |
| CTX_IND_MAP_4x4to8x8_C | 11 | 11 | 11 | 11 | 12 | 12 | 12 | 12 |
| | 48 | 49 | 50 | 51 | 52 | 53 | 54 | 55 |
| CTX_IND_MAP_4x4to8x8_C | 11 | 11 | 11 | 11 | 12 | 12 | 12 | 12 |

(b)

CONTEXT FOR CHROMINANCE

FIG. 41

```
input:
    xC,yC  // coefficient position (xC,yC)    xC=0,..., width-1, yC=0,..., height-1
    xCG,yCG //sub-block position (xCG,yCG)
    cIdx;  //0 :luminance (Y), 1:chrominance (U, V)
    width , height // size of TU (width, height)
    significant_coeffgroup_flag //sub-block coefficient presence/absence flag output:
    ctxIdx;// context index of significant_coeff_flag context index derivation process for luminance
{
    sigCtxOffsetR0 = NumOfSigCtx4x4to8x8;  // the number of context indices for luminance
    of 4x4 to 8x8
    sigCtxOffsetR1 = sigCtxOffsetR0 + 1;
    sigCtxOffsetR2 = sigCtxOffsetR1 + 3;

if( xC+yC==0 ){ // context derivation in region R0
        sigCtx = sigCtxOffsetR0;
    }
    else if( xC+yC< Max(width, height)>>2 ){ // context derivation in region R1 (low-frequency region)
        cnt = (significant_coeffgroup_flag[xCG+1][yCG]!=0)
            + (significant_coeffgroup_flag[xCG][yCG+1]!=0);
        sigCtx = sigCtxOffsetR1  + cnt;
    }
    else if ( xC+yC >= Max (width, height)>>2  ){ // context derivation in region R2 (high-frequency region)
        cnt = (significant_coeffgroup_flag[xCG+1][yCG]!=0)
            + (significant_coeffgroup_flag[xCG][yCG+1]!=0);
        sigCtx = sigCtxOffsetR2  + cnt;
    }
    // context index for luminance
    ctxIdx = sigCtx;

```
input:
 xC,yC  // coefficient position (xC,yC)     xC=0,..., width-1, yC=0,..., height-1
 xCG,yCG //sub-block position (xCG,yCG)
 cIdx;   //0 :luminance (Y), 1:chrominance (U, V)
 width , height // size of TU (width, height)
 significant_coeffgroup_flag //sub-block coefficient presence/absence flag output:
 ctxIdx;// context index of significant_coeff_flag context index derivation process for chrominance
{
    sigCtxOffsetR0  = NumOfSigCtx4x4to8x8;  // the number of context indices for chrominance
    of 4x4 to 8x8;
    sigCtxOffsetR1 = sigCtxOffsetR0 + 1;

if( xC+yC==0 ){ // context derivation in region R0
      sigCtx = sigCtxOffsetR0;
   }
   else { // context derivation in region R1 (coefficients other than DC)
       cnt = (significant_coeffgroup_flag[xCG+1][yCG]!=0)
           + (significant_coeffgroup_flag[xCG][yCG+1]!=0);
       sigCtx = sigCtxOffsetR1 + cnt;
   }

// context index for chrominance
   ctxIdx = sigCtx + SigCtxOffsetLuma ;
   // SigCtxOffsetLuma is offset for identifying context of signifincant_coeff_flag for luminance
}
```

FIG. 44

```
select scanIdx;  // select scan table in accordance with TU size and prediction mode // decode position of last non-zero coefficient in scan order
coeff[xC][yC][pos] = 0  // coeff[xC][yC] is memory for storing coefficient value of position (xC, yC)
decode last_significant_coeff_x
decode last_significant_coeff_y
coeff[last_siginificant_coeff_x][last_significant_coeff_y]=1  // set non-zero coefficient presence/absence flag of last coefficient to 1
pos_last = last_pos_tbl[scanIdx][last_significant_coeff_x][last_significant_coeff_y]
blk_last = blk_pos_tbl[scanIdx][last_significant_coeff_x][last_signiificant_coeff_y]

// decode values in units of groups every 16 values
for (blk = blk_last; blk >= 0; blk--)
{
    // offset calculation in scan order
    offset= blk<<4;

// decode presence/absence of non-zero coefficient in reverse scan order
    for (pos = 15; pos>=0; pos--) {
    {
        // obtain coefficient position (xC, yC)
        xC=ScanOrderX[scanIdx][pos + offset], yC=ScanOrderY[scanIdx][pos + offset]
        if( xC!=last_significant_coeff_x || yC!=last_signiciant_coeff_y ){
            decode significant_coeff_flag
                coeff[xC][yC] = significant_coeff_flag
        }
    }
    // decode data indicating whether or not absolute value of non-zero coefficient is larger than 1
    for (pos = 15;  pos>= 0; pos--)
        xC=ScanOrderX[scanIdx][pos + offset], yC=ScanOrderY[scanIdx][pos + offset] // obtain coefficient position (xC, yC)
        if (coeff[xC][yC] > 0) {
          decode coeff_abs_level_greater1_flag
          coeff[xC][yC] =coeff_abs_level_greater1_flag
        }
    }
    // decode data indicating whether or not absolute value of coefficient whose absolute value is larger than 1 is larger than 2
    for (pos = 15;  pos>= 0; pos--)
        xC=ScanOrderX[scanIdx][pos + offset], yC=ScanOrderY[scanIdx][pos + offset] // obtain coefficient position (xC, yC)
        if (coeff[xC][yC] > 1) {
          decode coeff_abs_level_greater2_flag
          coeff[xC][yC] += coeff_abs_level_greater2_flag
        }
    // decode sign of non-zero coefficient
    for (pos = 15;  pos>= 0; pos--)
        xC=ScanOrderX[scanIdx][pos + offset], yC=ScanOrderY[scanIdx][pos + offset] // obtain coefficient position (xC, yC)
        if (coeff[xC][yC] > 0) {
            decode coeff_sign_flag
          coeff[xC][yC] *=coeff_sign_flag ? 1 : -1
    }
    // decode value of absolute value -3 for coefficient whose absolute value is larger than 2
    for (pos = 15;  pos>= 0; pos--)
        xC=ScanOrderX[scanIdx][pos + offset], yC=ScanOrderY[scanIdx][pos + offset] // obtain coefficient position (xC, yC)
        if (abs(coeff[xC][yC]) > 2) {
          decode coeff_abs_level_minus3
            coeff[xC][yC] = coeff[xC][yC] > 0 ? (coeff_abs_level_minus3+3) :-(coeff_abs_level_minus3+3) ;
        }
    }
}
```

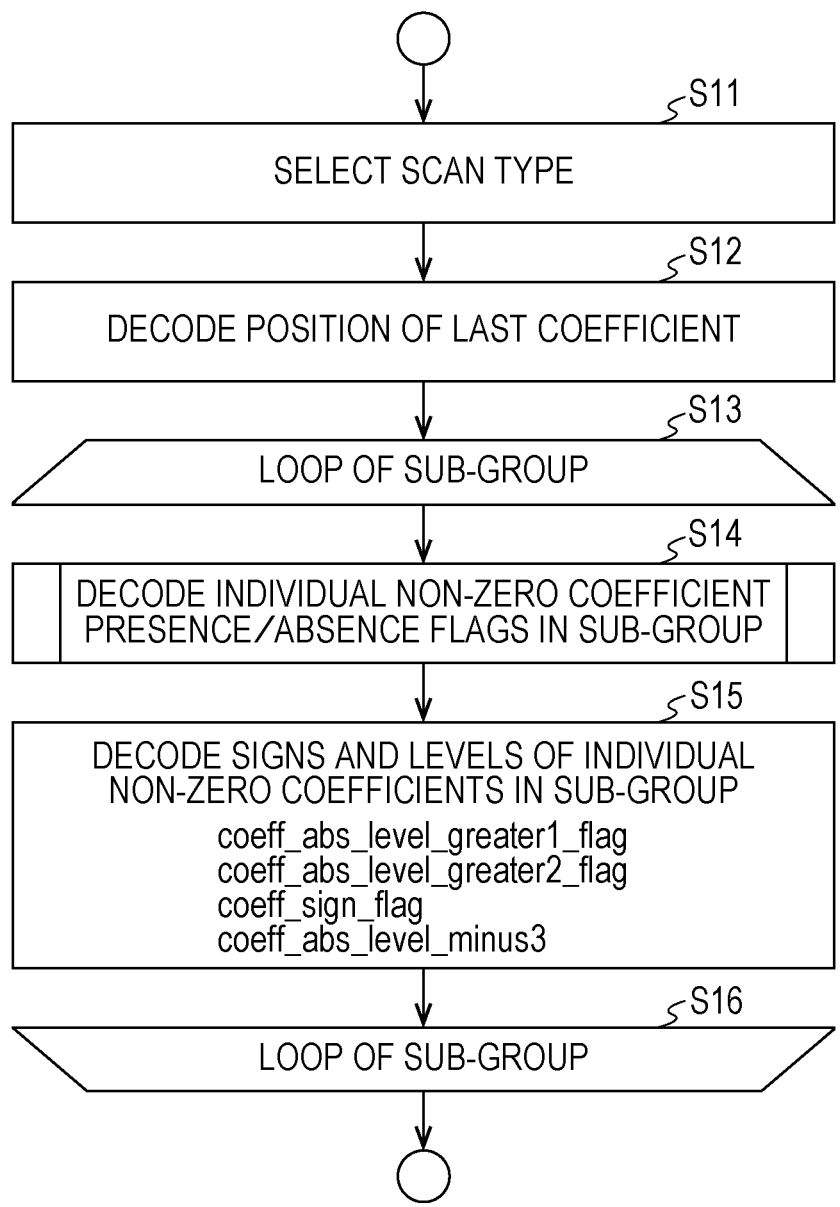

FIG. 48

```
select scanIdx;   // select scan table in accordance with TU size and prediction mode // decode position of last non-zero coefficient in scan order
coeff[xC][yC] = 0   // coeff[xC][yC] is memory for storing coefficient value of position (xC, yC)
decode last_significant_coeff_x
decode last_significant_coeff_y // decode sub-block coefficient presence/absence flags in reverse scan order of sub-blocks
log2CoeffGroupSize = log2TrafoSize-2  // log2(total number of sub-blocks)
Set numCoeffGroup  // the number of sub-blocks from sub-block including DC coefficient to sub-block including
                   // last coefficient in sub-block scan order // obtain position of sub-block including last coefficient
xCGLast = last_siginicant_coeff_x / ( 1<<log2CoeffGroupSize )
yCGLast = last_siginicant_coeff_y / ( 1<<log2CoeffGroupSize )

// set sub-block coefficient presence/absence flags of sub-block including
// DC coefficient and sub-block including last coefficient to 1 (in the two sub-blocks, sub-block coefficient presence/absence flags are not coded)
significant_coeffgroup_flag[xCGLast][yCGLast] = 1
siginifant_coeffgroup_flag[0][0] = 1
// decode sub-block coefficient presence/absence flags in reverse scan order except sub-block including DC coefficient and
// sub-block including last coefficient
for( n=numCoeffGroup; n>0; n--) {
    // obtain sub-block position (xCG, yCG)
    xCG = scanOrderX[scanIdx][n], yCG=scanOrderY[scanIdx][n]
    // in a case where non-zero coefficient exists in adjacent sub-block (xCG+1, yCG), (xCG, yCG+1), it is estimated that non-zero coefficient
    exists in target sub-block (xCG, yCG)
    if ( significant_coeffgroup_flag[xCG+1][yCG]>0 && significant_coeffgroup_flag[xCG][yCG+1]>0 ) {
        significant_coeffgroup_flag[xCG][yCG] = 1;
    }
    else if ( !(xCG==xCGLast) && !(yCG==xCGLast) ) {
       decode significant_coeffgroup_flag[xCG][yCG]
    }
} blk_last = blk_pos_tbl[last_significant_coeff_x][last_significant_coeff_y]
// decode values in units of groups every 16 values
for (blk = blk_last; blk >= 0; blk--) {
    // offset calculation in scan order
    offset= blk<<4;

// decode presence/absence of non-zero coefficient in reverse scan order
    for (pos = 15; pos>=0; pos--) {
        // obtain coefficient position (xC, yC)
        xC=ScanOrderX[scanIdx][pos + offset], yC=ScanOrderY[scanIdx][pos + offset]

// obtain sub-block position
        xCG = xC >>(log2CoeffGroupSize), yCG = yC >>(log2CoeffGroupSize)

// in a case where sub-block coefficient presence/absence flag = 1, decode coefficient presence/absence flag
        if( siginificant_coeffgroup_flag[xCG][yCG]>0 ) {
            // if not last coefficient, decode coefficient presence/absence flag
            if( xC!=last_significant_coeff_x || yC!=last_signicant_coeff_y ) {
                decode significant_coeff_flag
                    coeff[xC][yC] = significant_coeff_flag
            }
        }
    }
    // process of decoding value and sign of non-zero coefficient is the same as 4x4 and 8x8
    ...
}
```

FIG. 57
(a)
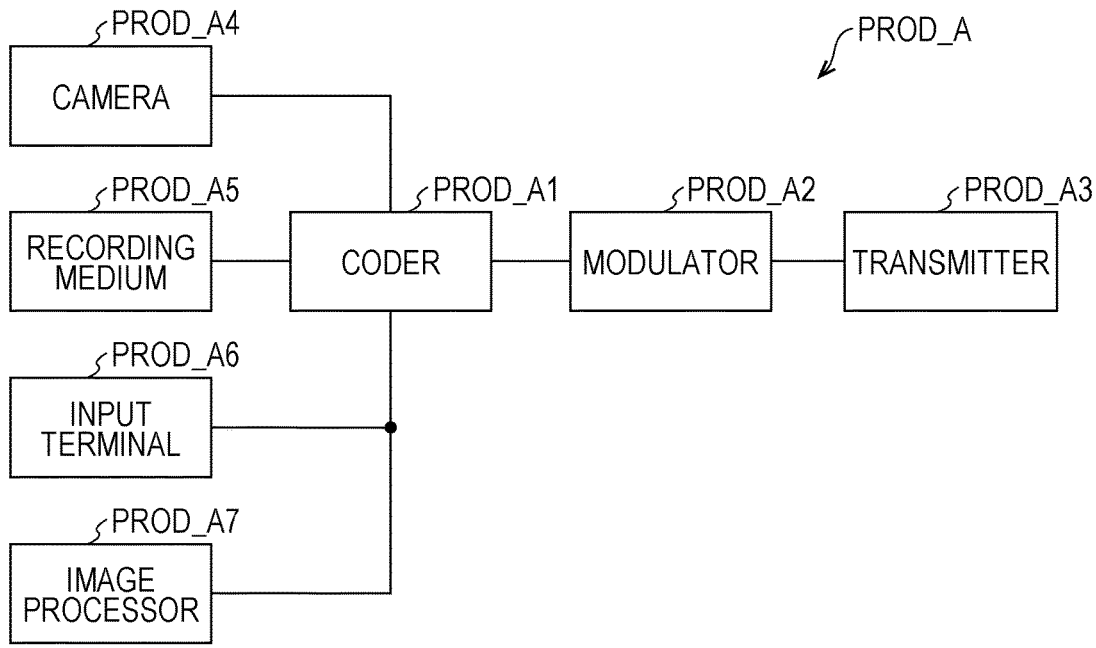
(b)
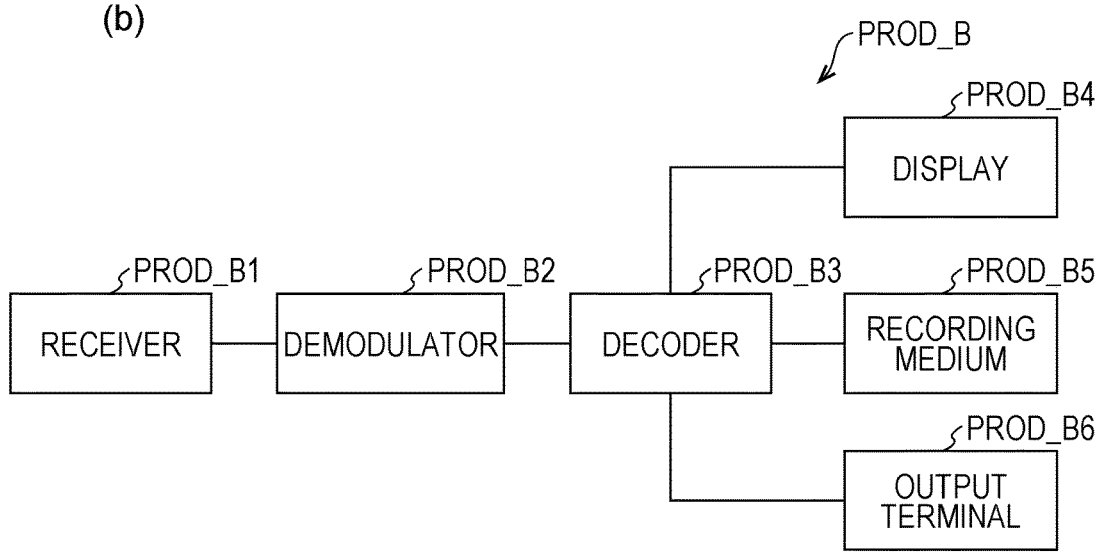

FIG. 58
(a)
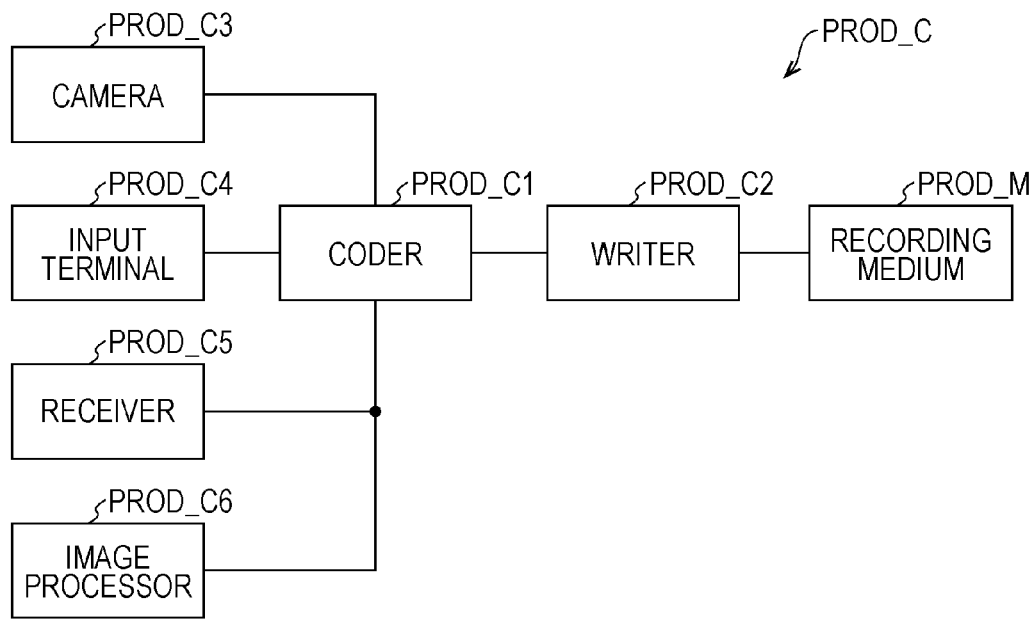
(b)
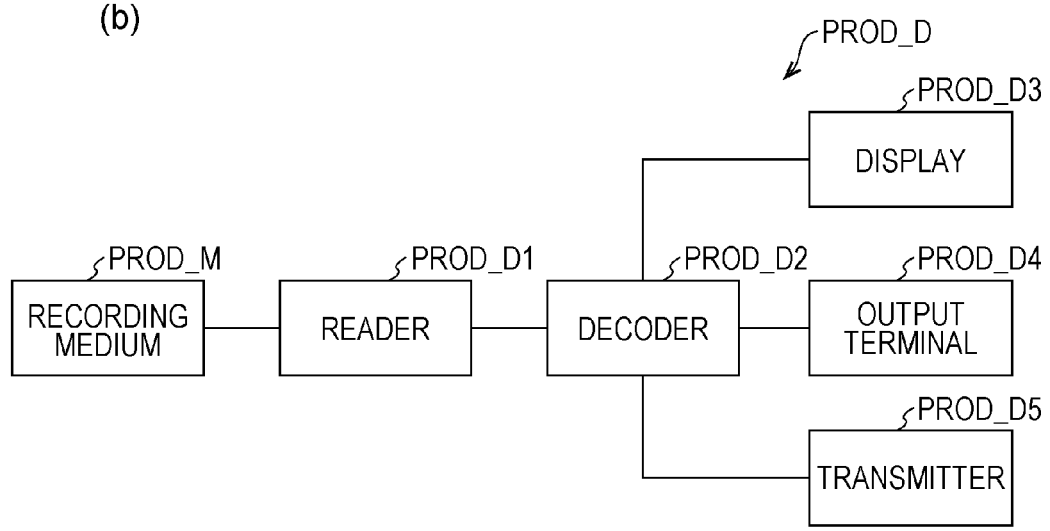

FIG. 59

| IntraPredMode | log2TrafoSize-2 | | | | |
|---|---|---|---|---|---|
| | 0 | 1 | 2 | 3 | 4 |
| 0 | NA | NA | 0 | 0 | 0 |
| 1 | NA | NA | 1 | 1 | 1 |
| 2 | NA | NA | 2 | 2 | 2 |
| 3 | NA | NA | 0 | 0 | 0 |
| 4 | NA | NA | 0 | 0 | 0 |
| 5 | NA | NA | 0 | 0 | 0 |
| 6 | NA | NA | 0 | 0 | 0 |
| 7 | NA | NA | 0 | 0 | 0 |
| 8 | NA | NA | 0 | 0 | 0 |
| 9 | NA | NA | 0 | 0 | 0 |
| 10 | NA | NA | 0 | 0 | 0 |
| 11 | NA | NA | 0 | 0 | 0 |
| 12 | NA | NA | 0 | 0 | 0 |
| 13 | NA | NA | 0 | 0 | 0 |
| 14 | NA | NA | 0 | 0 | 0 |
| 15 | NA | NA | 0 | 0 | 0 |
| 16 | NA | NA | 0 | 0 | 0 |
| 17 | NA | NA | 0 | 0 | 0 |
| 18 | NA | NA | 0 | 0 | 0 |
| 19 | NA | NA | 0 | 0 | 0 |
| 20 | NA | NA | 0 | 0 | 0 |
| 21 | NA | NA | 0 | 0 | 0 |
| 22 | NA | NA | 1 | 1 | 1 |
| 23 | NA | NA | 1 | 1 | 1 |
| 24 | NA | NA | 0 | 0 | 0 |
| 25 | NA | NA | 0 | 0 | 0 |
| 26 | NA | NA | 0 | 0 | 0 |
| 27 | NA | NA | 0 | 0 | 0 |
| 28 | NA | NA | 0 | 0 | 0 |
| 29 | NA | NA | 0 | 0 | 0 |
| 30 | NA | NA | 2 | 2 | 2 |
| 31 | NA | NA | 2 | 2 | 2 |
| 32 | NA | NA | 0 | 0 | 0 |
| 33 | NA | NA | 0 | 0 | 0 |
| 34 | NA | NA | 0 | 0 | 0 |
| 35 | NA | NA | 0 | 0 | 0 |

FIG. 60
(a) 4x4 TRANSFORM BLOCK FREQUENCY CLASSIFICATION FOR LUMINANCE/CHROMINANCE
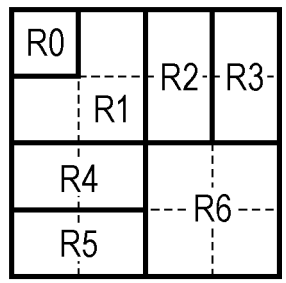
(b) 8x8 TRANSFORM BLOCK FREQUENCY CLASSIFICATION FOR LUMINANCE/CHROMINANCE
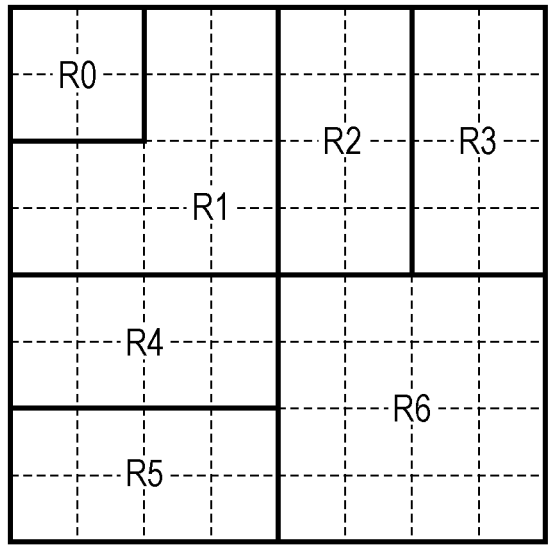

FIG. 61

```
input:
xC,yC  // coefficient position (xC,yC)   xC=0,..., width-1, yC=0,..., height-1
cIdx;   //0 :luminance (Y), 1:chrominance (U, V)
log2TrafoSize// size of TU output:
ctxIdx;// context index of significant_coeff_flag context index derivation process for luminance/chrominance of 4x4, 8x8
{
  X = log2TrafoSize == 2 ? xC : xC>>1;
  Y = log2TrafoSize == 2 ? yC : yC>>1;
  sigCtxOffset = log2TrafoSize == 2 ? 0 : offset; // offset for identifying context of 4x4 components and 8x8 components;

index = (Y<<2)+X;
  sigCtx =CTX_IND_MAP[ index ] + sigCtxOffset;

if ( ctxIdx==0 ){// context index for luminance
    ctxIdx = sigCtx;
  }
  else{ // context index for chrominance
    ctxIdx = sigCtx + SigCtxOffsetLuma ;
    // SigCtxOffsetLuma is offset for identifying context of signifincant_coeff_flag for luminance
  }
}
```

FIG. 62
(a)
|  | Index | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| CTX_IND_MAP | 0 | 1 | 2 | 3 | 1 | 1 | 2 | 3 | 4 | 4 | 6 | 6 | 5 | 5 | 6 | 6 |
(b) 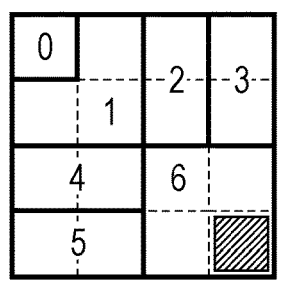
(c) 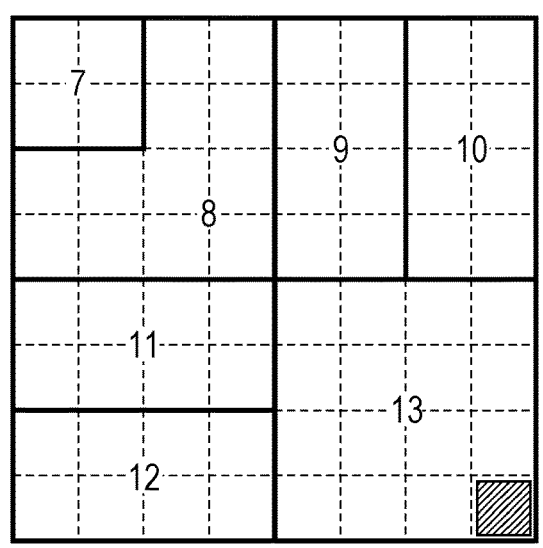

FIG. 63
(a) 4x4 TRANSFORM BLOCK CONTEXT FOR CHROMINANCE
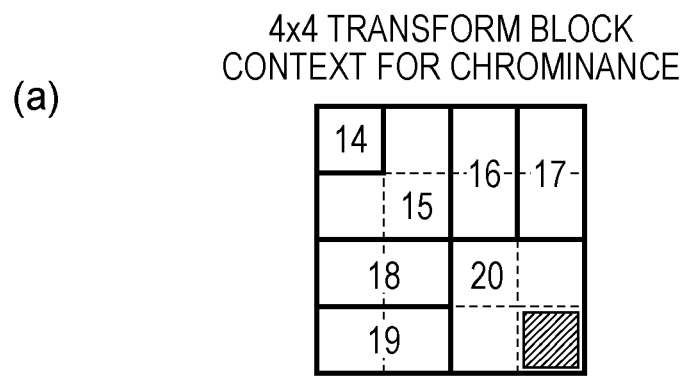
(b) 8x8 TRANSFORM BLOCK CONTEXT FOR CHROMINANCE
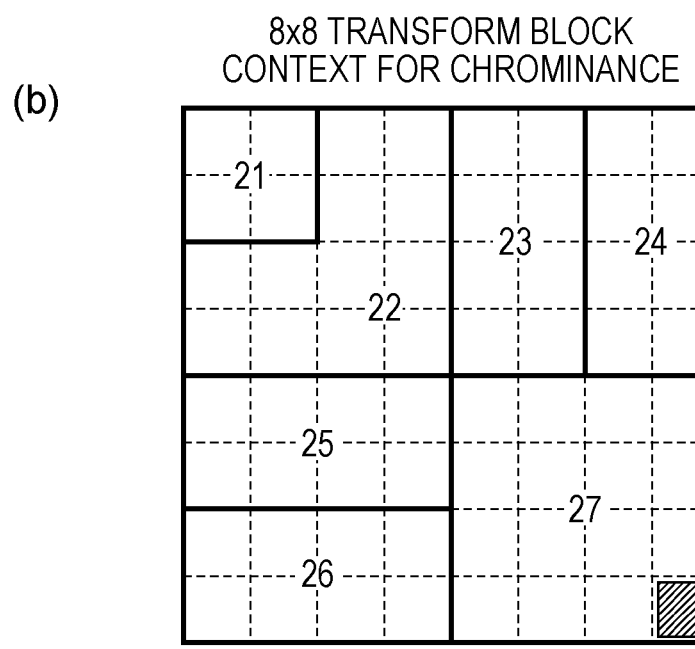

FIG. 64
(a)
|  | Index | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| CTX_IND_MAP | 0 | 1 | 2 | 3 | 1 | 1 | 2 | 3 | 4 | 4 | 5 | 5 | 3 | 3 | 5 | 5 |
(b) 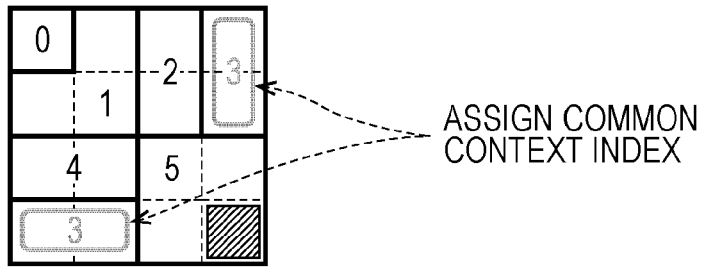
(c) 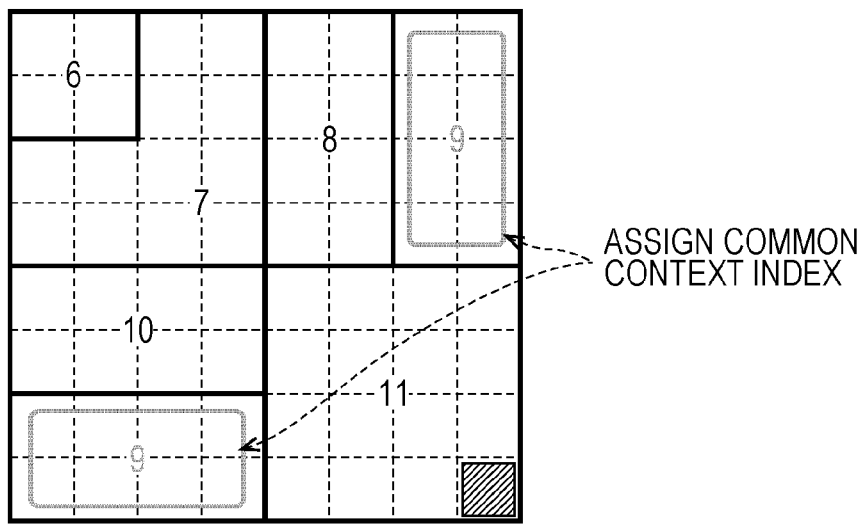

FIG. 66

```
input:
xC,yC  // coefficient position (xC,yC)   xC=0,..., width-1, yC=0,..., height-1
cIdx;   //0 :luminance (Y), 1:chrominance (U, V)
log2TrafoSize// size of TU output:
ctxIdx;// context index of significant_coeff_flag context index derivation process for luminance/chrominance of 4x4, 8x8
{
   X = log2TrafoSize == 2 ? xC : xC>>1;
   Y = log2TrafoSize == 2 ? yC : yC>>1;
   Index = (Y<<2) + X;

if ( cIdx==0 ){// context index for luminance
      sigCtxOffset = log2TrafoSize == 2 ? 0 : 7; // offset for identifying context of 4x4 components and 8x8 components;
      sigCtx =CTX_IND_MAP_L[ index ] + sigCtxOffset;
      ctxIdx = sigCtx;
   }
   else{ // context index for chrominance
      sigCtxOffset = log2TrafoSize == 2 ? 0 : 6; // offset for identifying context of 4x4 components and 8x8 components;
      sigCtx =CTX_IND_MAP_C[ index ] + sigCtxOffset;
      ctxIdx = sigCtx + SigCtxOffsetLuma ;
      // SigCtxOffsetLuma is offset for identifying context of signifincant_coeff_flag for luminance
   }
}
```

|  | Index | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| CTX_IND_MAP_L | 0 | 1 | 2 | 3 | 1 | 1 | 2 | 3 | 4 | 4 | 6 | 6 | 5 | 5 | 6 | 6 |

(b)

|  | Index | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| CTX_IND_MAP_C | 0 | 1 | 2 | 3 | 1 | 1 | 2 | 3 | 4 | 4 | 5 | 5 | 3 | 3 | 5 | 5 |

FIG. 68
(a) 4x4 TRANSFORM BLOCK CONTEXT FOR LUMINANCE
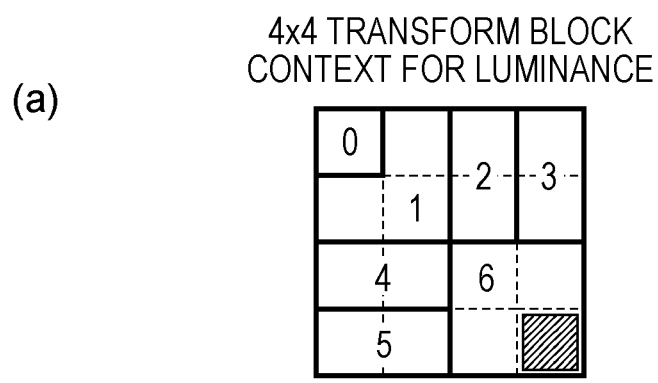
(b) 8x8 TRANSFORM BLOCK CONTEXT FOR LUMINANCE
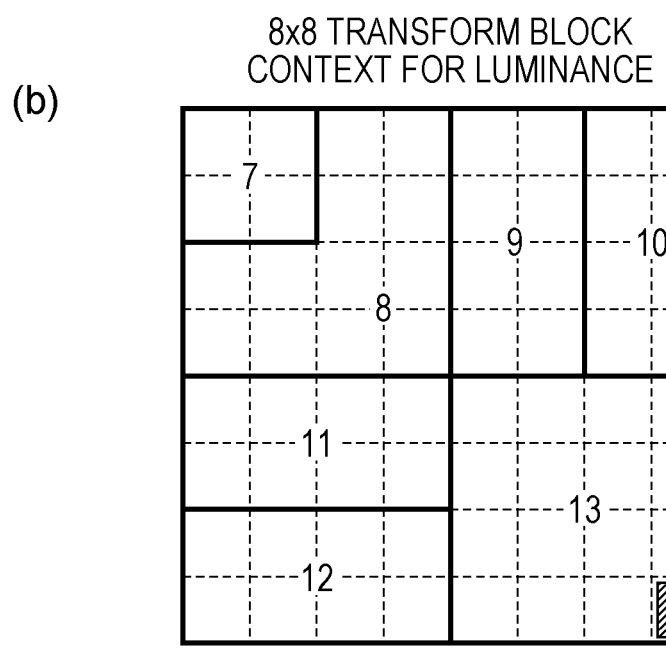

FIG. 69
(a) 4x4 TRANSFORM BLOCK CONTEXT FOR CHROMINANCE
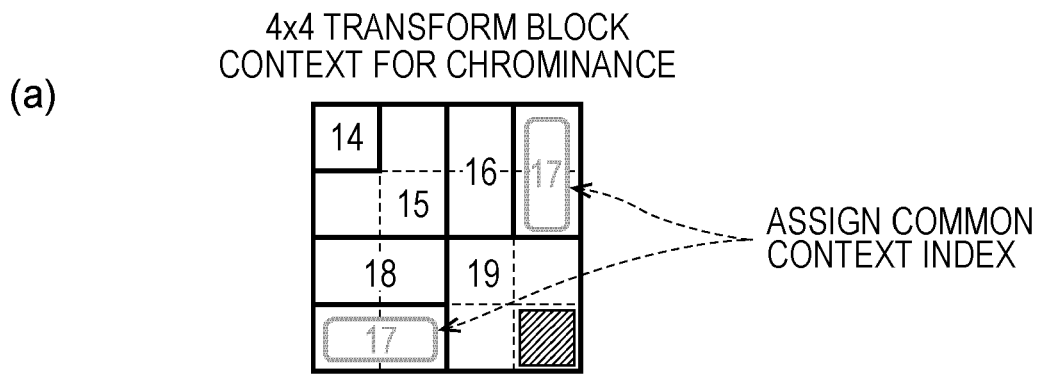
(b) 8x8 TRANSFORM BLOCK CONTEXT FOR CHROMINANCE
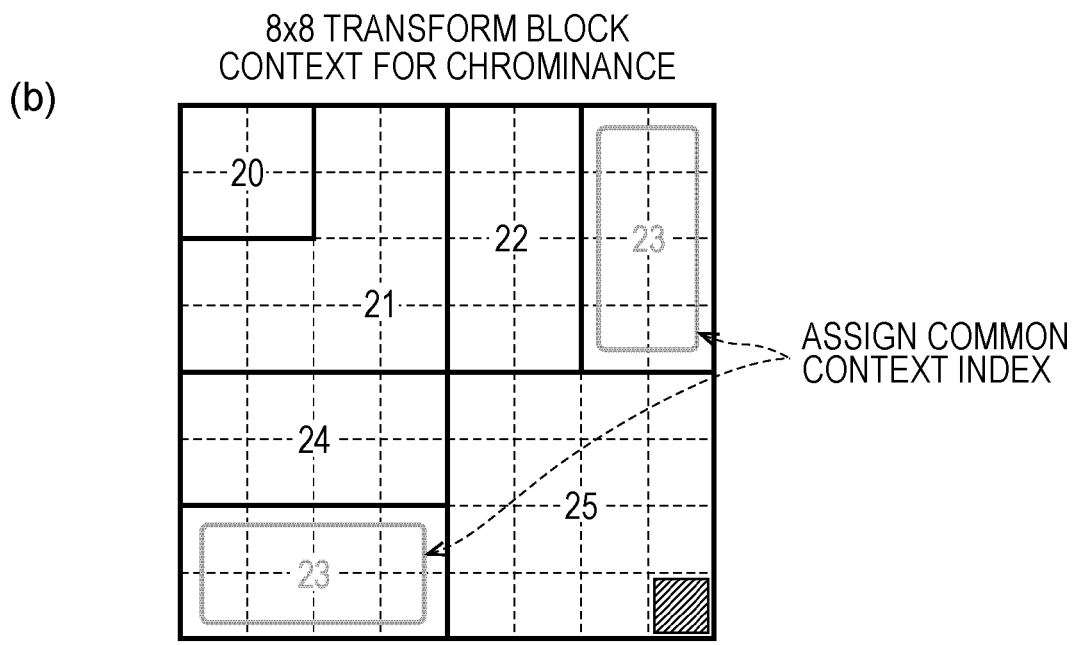

FIG. 70
(a) 4x4 TRANSFORM BLOCK
FREQUENCY CLASSIFICATION
FOR LUMINANCE/CHROMINANCE
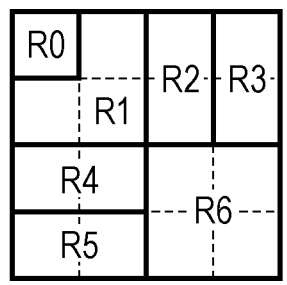
(b) 8x8 TRANSFORM BLOCK
FREQUENCY CLASSIFICATION
FOR LUMINANCE/CHROMINANCE
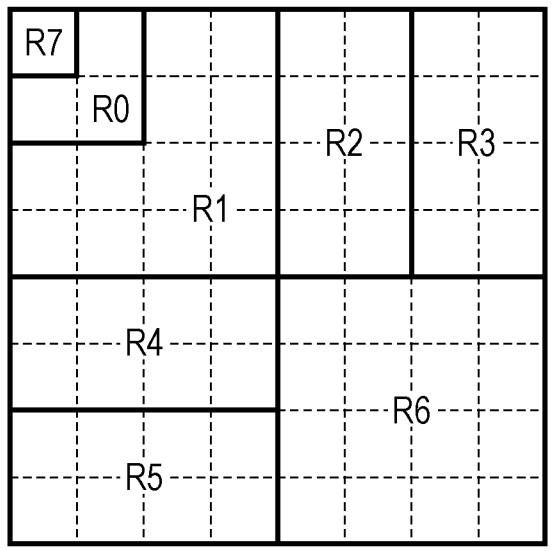

FIG. 71
(a) 4x4 TRANSFORM BLOCK FREQUENCY CLASSIFICATION FOR LUMINANCE/CHROMINANCE
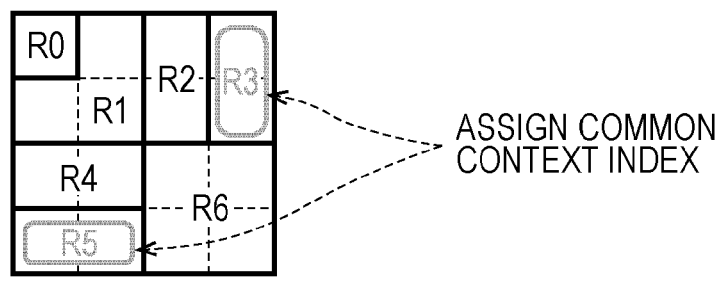
ASSIGN COMMON CONTEXT INDEX
(b) 8x8 TRANSFORM BLOCK FREQUENCY CLASSIFICATION FOR LUMINANCE/CHROMINANCE
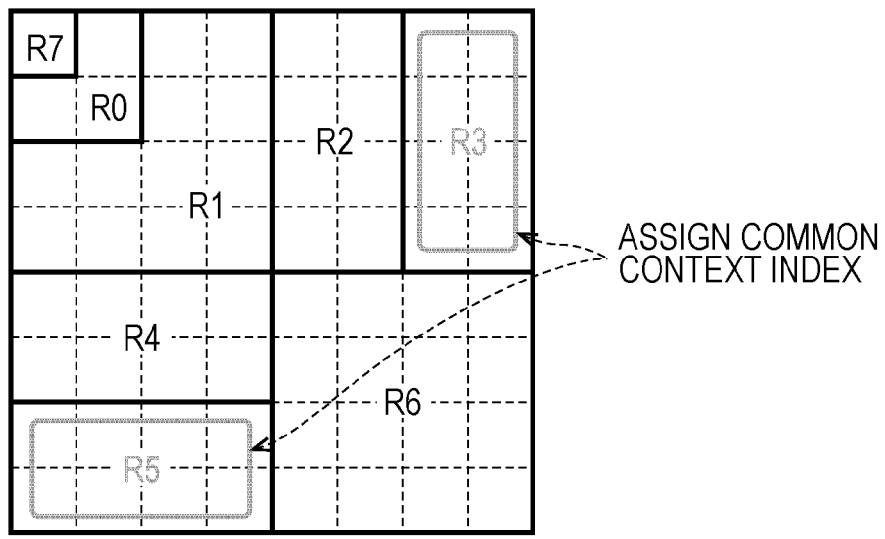
ASSIGN COMMON CONTEXT INDEX

FIG. 72
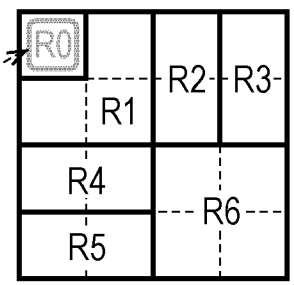
(a) 4x4 TRANSFORM BLOCK FREQUENCY CLASSIFICATION FOR LUMINANCE/CHROMINANCE
ASSIGN COMMON CONTEXT INDEX
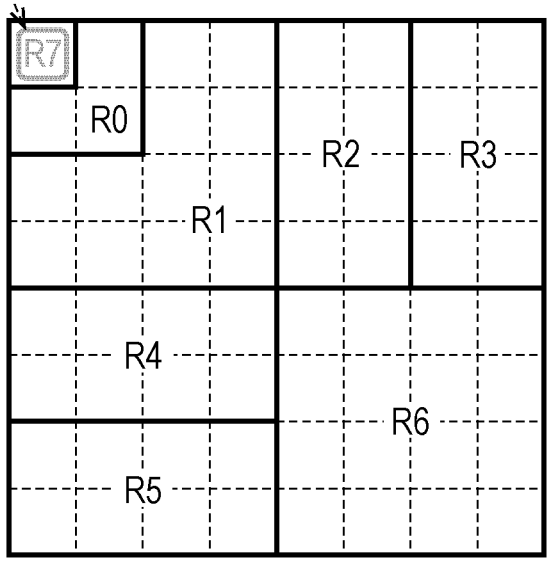
(b) 8x8 TRANSFORM BLOCK FREQUENCY CLASSIFICATION FOR LUMINANCE/CHROMINANCE

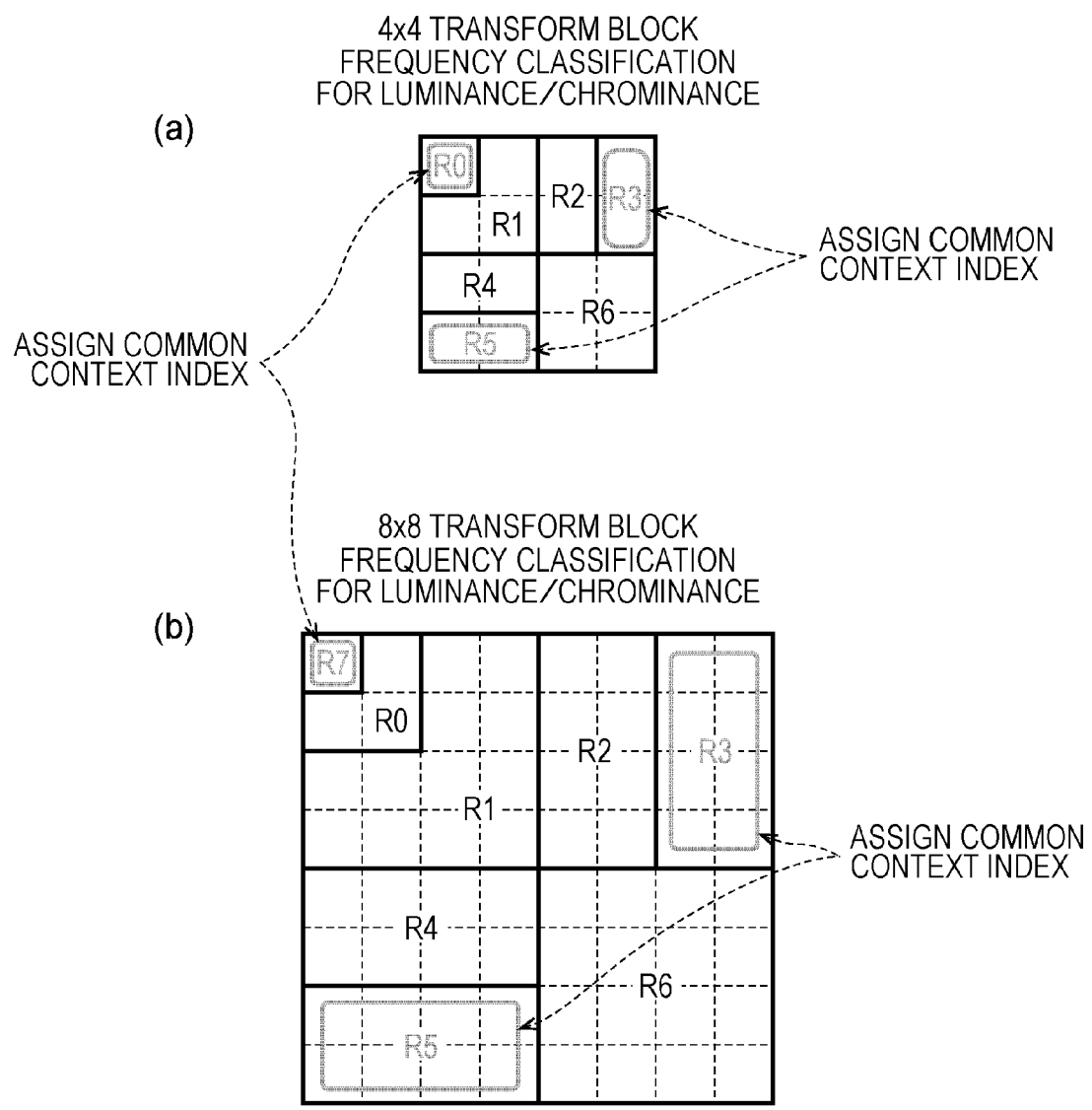

FIG. 74

```
input:
 xC,yC // coefficient position (xC,yC)    xC=0,..., width-1, yC=0,..., height-1
 xCG,yCG //sub-block position (xCG,yCG)
 cIdx;   //0 :luminance (Y), 1:chrominance (U, V)
 width , height // size of TU (width, height)
 significant_coeffgroup_flag //sub-block coefficient presence/absence flag output:
 ctxIdx;// context index of significant_coeff_flag context index derivation process for luminance
{
    sigCtxOffsetR0 = NumOfSigCtx4x4to8x8;  // the number of context indices for luminance
    of 4x4 to 8x8
    sigCtxOffsetR1 = sigCtxOffsetR0 + 1;
    sigCtxOffsetR2 = sigCtxOffsetR1 + 3;

if( xC+yC==0 ){ // context derivation in region R0
        sigCtx = sigCtxOffsetR0;
    }
    else if( xCG+yCG< THA ){ // context derivation in region R1 (low-frequency region)
        cnt = (significant_coeffgroup_flag[xCG+1][yCG]!=0)
            + (significant_coeffgroup_flag[xCG][yCG+1]!=0);
        sigCtx = sigCtxOffsetR1 + cnt;
    }
    else if ( xCG+yCG >= THA ){ // context derivation in region R2 (high-frequency region)
        cnt = (significant_coeffgroup_flag[xCG+1][yCG]!=0)
            + (significant_coeffgroup_flag[xCG][yCG+1]!=0);
        sigCtx = sigCtxOffsetR2 + cnt;
    }
    // context index for luminance
    ctxIdx = sigCtx;

}
```

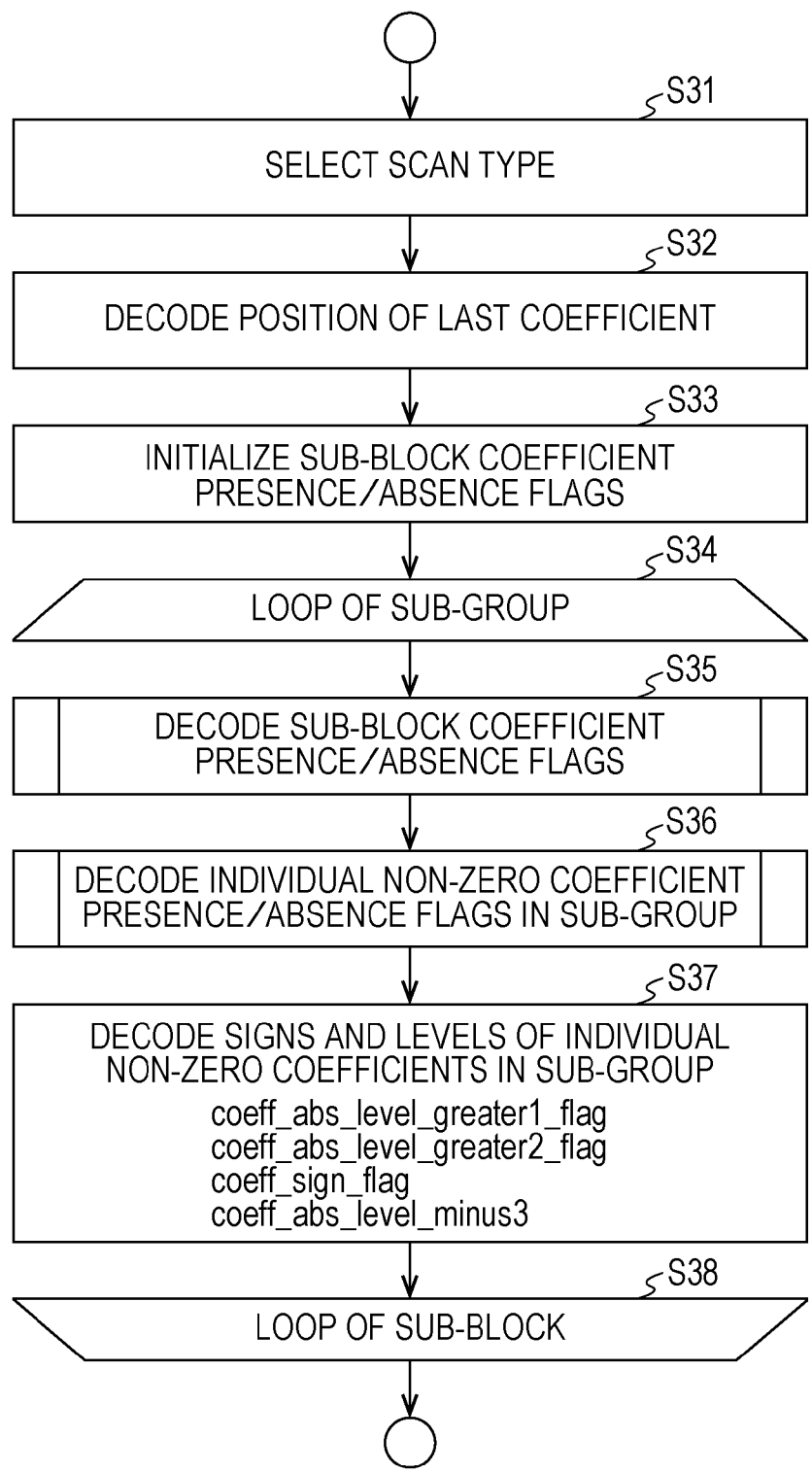

FIG. 78
(a) 16x4 TRANSFORM BLOCK FREQUENCY CLASSIFICATION FOR LUMINANCE/CHROMINANCE
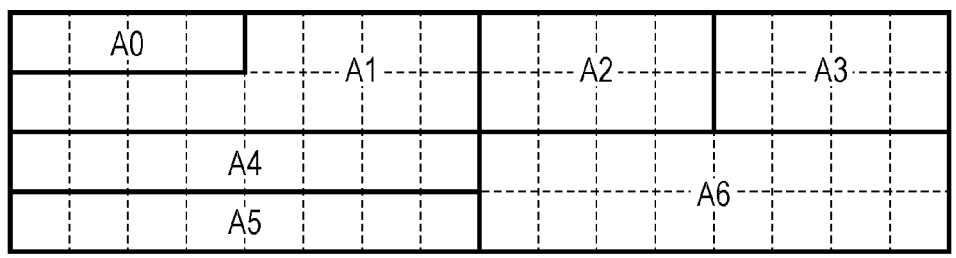
(b) 4x16 TRANSFORM BLOCK FREQUENCY CLASSIFICATION FOR LUMINANCE/CHROMINANCE
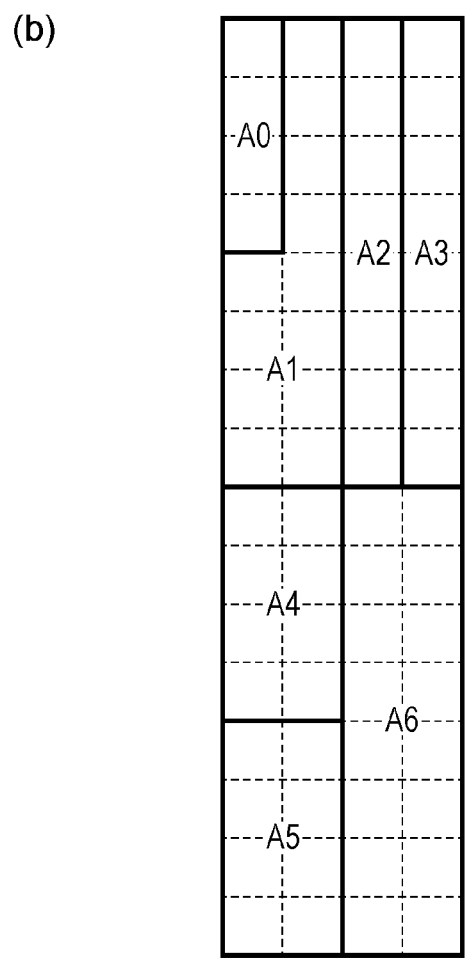

FIG. 80

```
input:
  xC,yC  // coefficient position (xC,yC)   xC=0,..., width-1, yC=0,..., height-1
  cIdx;   //0 :luminance (Y), 1:chrominance (U, V)
  log2TrafoSize;// size of TU
  log2TrafoWidth;  // horizontal width of TU
  log2TrafoHeight: //vertical width of TU output:
  ctxIdx;// context index of significant_coeff_flag context index derivation process for luminance/chrominance of 4x4, 8x8, 16x4, 4x16
{
    if( log2TrafoWidth==log2TrafoHeight && logTrafoWidth<=3 ) { //
        X = log2TrafoWidth == 2 ? xC : xC>>1;
        Y = log2TrafoWidth == 2 ? yC : yC>>1;
        index = (Y<<2)+X;

if ( cIdx==0 ){// context index for luminance
           sigCtxOffset = log2TrafoWidth == 2 ? 0 : 7;
           // sigCtxOffset is offset for identifying context of 4x4 components and 8x8 components;

sigCtx =CTX_IND_MAP [ index ] + sigCtxOffset;
           ctxIdx = sigCtx;
        }
        else{ // context index for chrominance
           sigCtxOffset = log2TrafoWidth == 2 ? 0 : 7;
           // sigCtxOffset is offset for identifying context of 4x4 components and 8x8 components;

sigCtx =CTX_IND_MAP [ index ] + sigCtxOffset;
           ctxIdx = sigCtx + SigCtxOffsetLuma ;
           // SigCtxOffsetLuma is offset for identifying context of signifincant_coeff_flag for luminance
        }
    } else if ( log2TrafoWidth+log2TrafoHeight ==6){ // 16x4 components, 4x16 components
        X = log2TrafoWidth == 2 ? xC : xC>>2;
        Y = log2TrafoHeight==2 ? yC : yC>>2;
        index = log2TrafoWidth==2 ? (Y<<2) + X : (X<<2) + Y;

if( cIdx==0 ){ // context index for luminance
           sigCtxOffset = 7; // offset for commonalizing with context index of 8x8 components;
           sigCtx = CTX_IND_MAP [ index ] + sigCtxOffset;
           ctxIdx = sigCtx;
        }
        else{ // context index for chrominance
           sigCtxOffset = 7; // offset for commonalizing with context index of 8x8 components;
           sigCtx =CTX_IND_MAP [ index ] + sigCtxOffset;
           ctxIdx = sigCtx + SigCtxOffsetLuma ;
           // SigCtxOffsetLuma is offset for identifying context of signifincant_coeff_flag for luminance
        }
    }
}
```

FIG. 81
(a) 16x4 TRANSFORM BLOCK CONTEXT FOR LUMINANCE
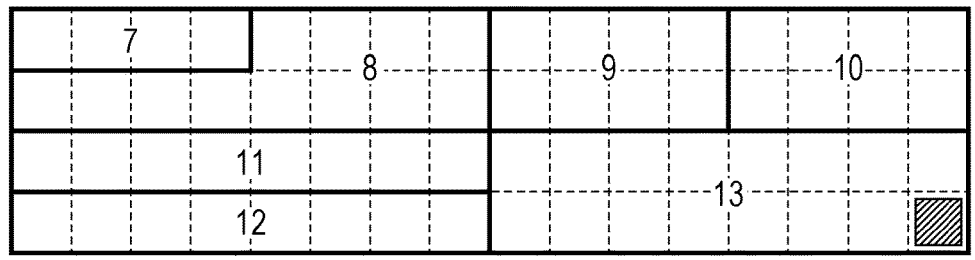
(b) 4x16 TRANSFORM BLOCK CONTEXT FOR LUMINANCE
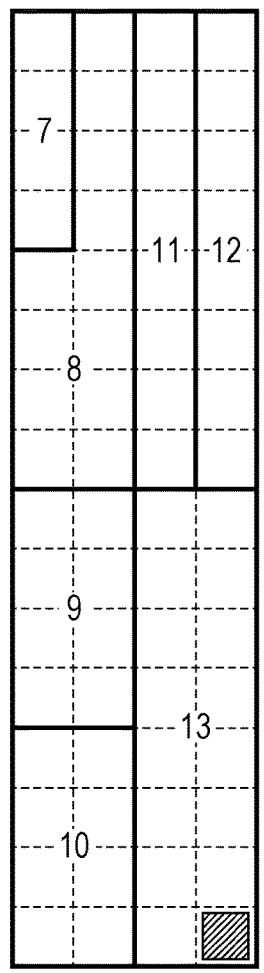

FIG. 82
(a) 16x4 TRANSFORM BLOCK CONTEXT FOR CHROMINANCE
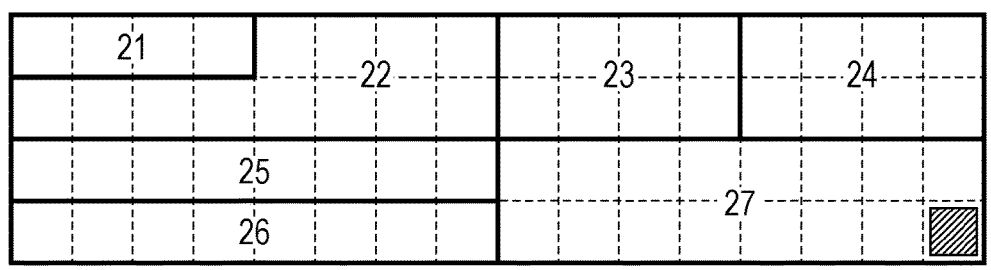
(b) 4x16 TRANSFORM BLOCK CONTEXT FOR CHROMINANCE

FIG. 83

```
input:
  xC,yC  // coefficient position (xC,yC)    xC=0,..., width-1, yC=0,..., height-1
  cldx;   //0 :luminance (Y), 1:chrominance (U, V)
  log2TrafoSize;// size of TU
  log2TrafoWidth;  // horizontal width of TU
  log2TrafoHeight; //vertical width of TU output:
  ctxIdx;// context index of significant_coeff_flag context index derivation process for luminance/chrominance of 4x4, 8x8, 16x4, 4x16
{
    if( log2TrafoWidth==log2TrafoHeight && logTrafoWidth<=3 ) { //
        X = log2TrafoWidth == 2 ? xC : xC>>1;
        Y = log2TrafoWidth == 2 ? yC : yC>>1;
        index = (Y<<2)+X;

if ( cldx==0 ){// context index for luminance
            sigCtxOffset = log2TrafoWidth == 2 ? 0 : 7;
            // sigCtxOffset is offset for identifying context of 4x4 components and 8x8 components;

sigCtx =CTX_IND_MAP_L [ index ] + sigCtxOffset;
            ctxIdx = sigCtx;
        }
        else{ // context index for chrominance
            sigCtxOffset = log2TrafoWidth == 2 ? 0 : 6;
            // sigCtxOffset is offset for identifying context of 4x4 components and 8x8 components;

sigCtx =CTX_IND_MAP_C [ index ] + sigCtxOffset;
            ctxIdx = sigCtx + SigCtxOffsetLuma ;
            // SigCtxOffsetLuma is offset for identifying context of signifincant_coeff_flag for luminance
        }
    } else if ( log2TrafoWidth+log2TrafoHeight ==6){ // 16x4 components, 4x16 components
        X = log2TrafoWidth == 2 ? xC : xC>>2;
        Y = log2TrafoHeight==2 ? yC : yC>>2;
        index = log2TrafoWidth==2 ? (Y<<2) + X : (X<<2) + Y;

if( cldx==0 ){ // context index for luminance
            sigCtxOffset = 7; // offset for commonalizing with context index of 8x8 components;
            sigCtx = CTX_IND_MAP_L [ index ] + sigCtxOffset;
            ctxIdx = sigCtx;
        }
        else{ // context index for chrominance
            sigCtxOffset = 6; // offset for commonalizing with context index of 8x8 components;
            sigCtx =CTX_IND_MAP_C [ index ] + sigCtxOffset;
            ctxIdx = sigCtx + SigCtxOffsetLuma ;
            // SigCtxOffsetLuma is offset for identifying context of signifincant_coeff_flag for luminance
        }
    }
}
```

FIG. 84
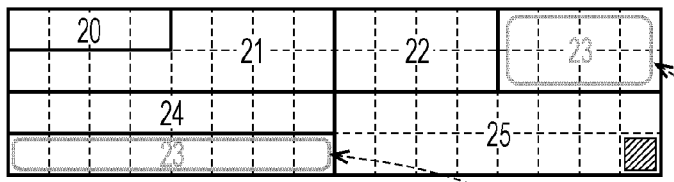
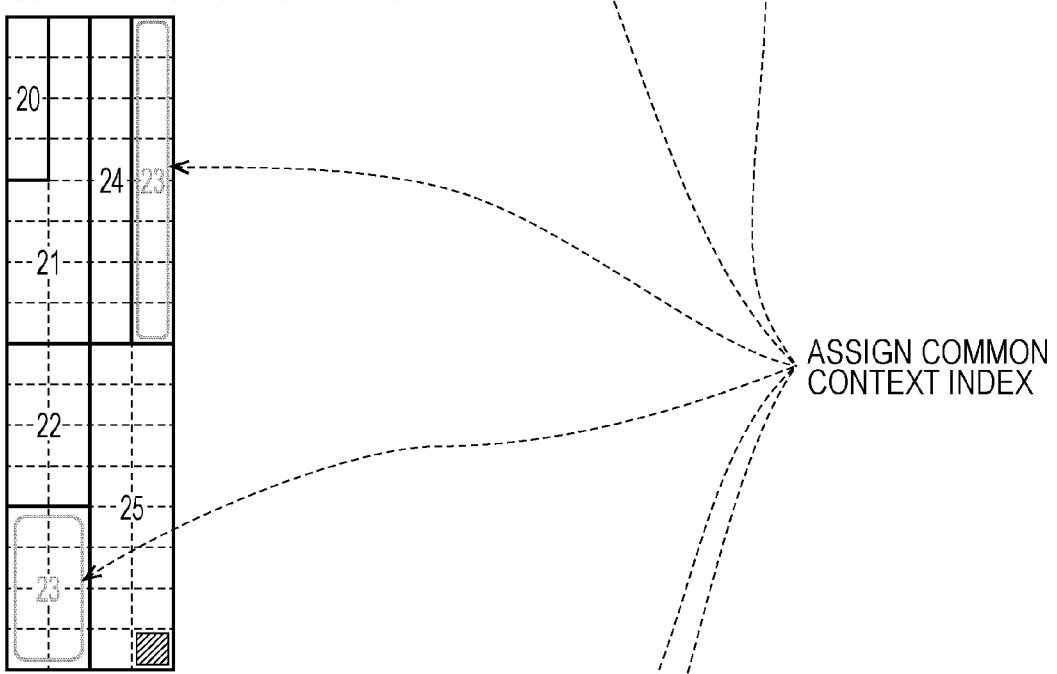
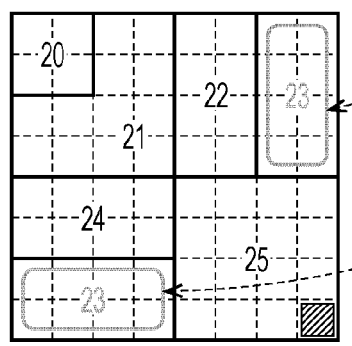

FIG. 85
(a)
4x4 TRANSFORM BLOCK
FREQUENCY CLASSIFICATION
FOR LUMINANCE/CHROMINANCE
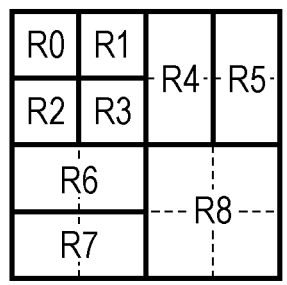
(b)
8x8 TRANSFORM BLOCK
FREQUENCY CLASSIFICATION
FOR LUMINANCE/CHROMINANCE
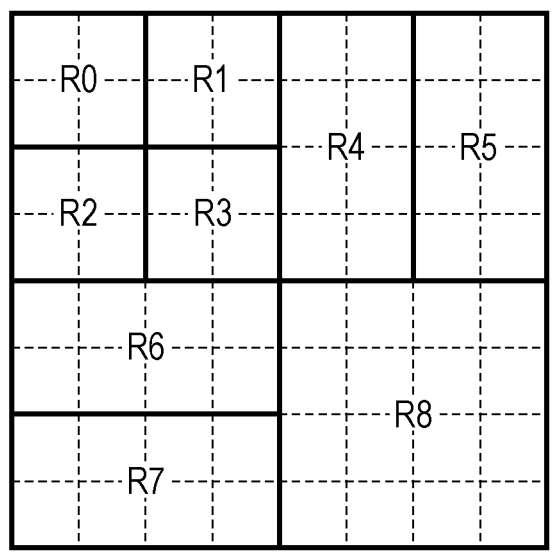

FIG. 86
(a)
4x4 TRANSFORM BLOCK
CONTEXT FOR LUMINANCE
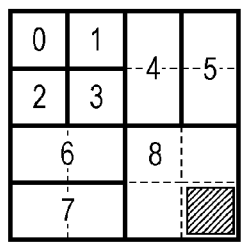
(b)
8x8 TRANSFORM BLOCK
CONTEXT FOR LUMINANCE
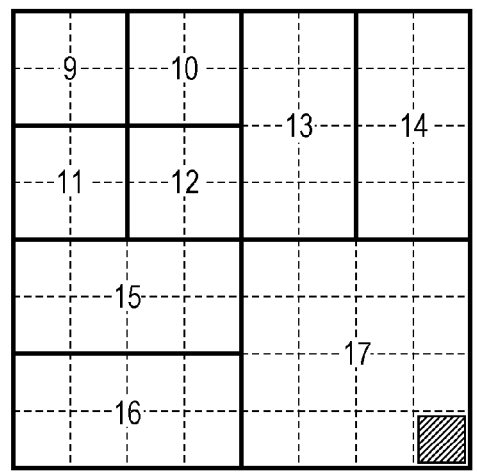
(c)
4x4 TRANSFORM BLOCK
CONTEXT FOR CHROMINANCE
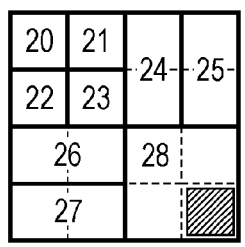
(d)
8x8 TRANSFORM BLOCK
CONTEXT FOR CHROMINANCE
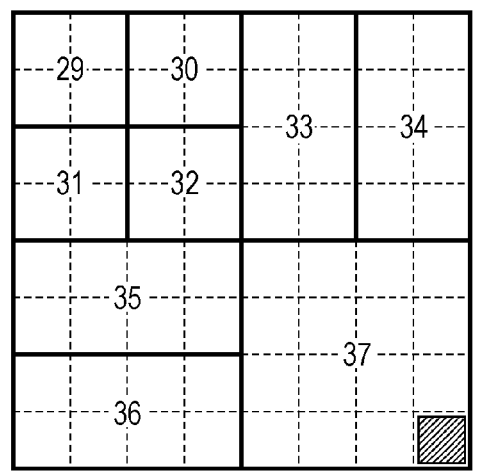

```
input:
  xC,yC  // coefficient position (xC,yC)    xC=0,..., width-1, yC=0,..., height-1
  cIdx;   //0 :luminance (Y), 1:chrominance (U, V)
  log2TrafoWidth;  // horizontal width of TU
  log2TrafoHeight: //vertical width of TU output:
  ctxIdx;// context index of significant_coeff_flag context index derivation process for luminance/chrominance of 4x4, 8x8
{
    if( log2TrafoWidth==log2TrafoHeight && logTrafoWidth<=3 ) { //
        X = log2TrafoWidth == 2 ? xC : xC>>1;
        Y = log2TrafoHeight == 2 ? yC : yC>>1;
        index = (Y<<2)+X;

offsetBlk = log2TrafoWidth == 2 ? 0 : 9;
        // offsetBlk is offset for identifying context of 4x4 components and 8x8 components;

index = (Y<<2)+X;
        sigCtx =CTX_IND_MAP[ index ] + offsetBlk;

if ( cIdx==0 ){// context index for luminance
            ctxIdx = sigCtx;
        }
        else{ // context index for chrominance
            ctxIdx = sigCtx + offsetClr ;
            // offsetClr is offset for identifying context of signifincant_coeff_flag for luminance and
            chrominance
        }
    }
}
```

(b)

| | Index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| CTX_IND_MAP | 0 | 1 | 4 | 5 | 2 | 3 | 4 | 5 | 6 | 6 | 8 | 8 | 7 | 7 | 8 | 8 |

FIG. 88
(a)
4x4 TRANSFORM BLOCK
CONTEXT FOR LUMINANCE
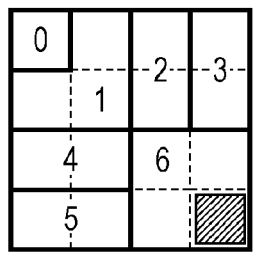
(b)
8x8 TRANSFORM BLOCK
CONTEXT FOR LUMINANCE
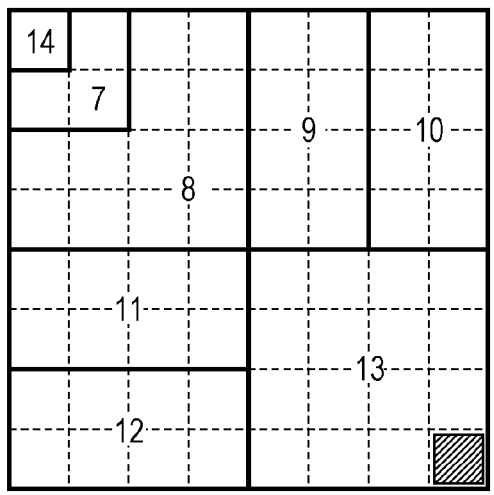
(c)
4x4 TRANSFORM BLOCK
CONTEXT FOR CHROMINANCE
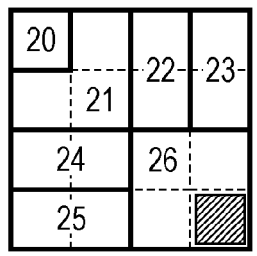
(d)
8x8 TRANSFORM BLOCK
CONTEXT FOR CHROMINANCE
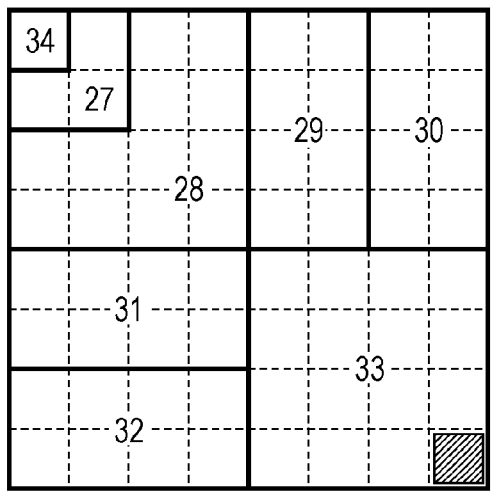

```
input:
  xC,yC  // coefficient position (xC,yC)      xC=0,..., width-1, yC=0,..., height-1
  cIdx;  //0 :luminance (Y), 1:chrominance (U, V)
  log2TrafoWidth;  // horizontal width of TU
  log2TrafoHeight: //vertical width of TU output:
  ctxIdx;// context index of significant_coeff_flag context index derivation process for luminance/chrominance of 4x4, 8x8
{
    if( log2TrafoWidth==log2TrafoHeight && logTrafoWidth==2 ) { //in the case of 4x4
        X = xC;  Y = yC;
        index = (Y<<2) + X;
        ctxIdx = CTX_IND_MAP[ index ]
    }
    else if(log2TrafoWidth==log2TrafoHeight && logTrafoWidth==3){ //in the case of 8x8
        X = xC>>1; Y = yC>>1;
        index = (xC+yC==0) ? 16 : (Y<<2) + X;
        ctxIdx = CTX_IND_MAP[ index ] + offsetBlk;
        // offsetBlk is offset for identifying context indices of 4x4
        // and 8x8
    } if ( cIdx == 0 ){ // in the case of luminance
        ctxIdx = ctxIdx;
    } else{ //in the case of chrominance
        ctxIdx = ctxIdx + offsetClr;
        // offsetClr is offset for identifying context indices for luminance and
        // chrominance
    }
}
```

(b)

|             | Index |   |   |   |   |   |   |   |   |   |    |    |    |    |    |    |    |
|-------------|-------|---|---|---|---|---|---|---|---|---|----|----|----|----|----|----|----|
|             | 0     | 1 | 2 | 3 | 4 | 5 | 6 | 7 | 8 | 9 | 10 | 11 | 12 | 13 | 14 | 15 | 16 |
| CTX_IND_MAP | 0     | 1 | 4 | 5 | 2 | 3 | 4 | 5 | 6 | 6 | 8  | 8  | 7  | 7  | 8  | 8  | 14 |

```
input:
  xC,yC  // coefficient position (xC,yC)    xC=0,..., width-1, yC=0,..., height-1
  cIdx;   //0 :luminance (Y), 1:chrominance (U, V)
  log2TrafoWidth;  // horizontal width of TU
  log2TrafoHeight: //vertical width of TU output:
  ctxIdx;// context index of significant_coeff_flag context index derivation process for luminance/chrominance of 4x4
{
    if( log2TrafoWidth==log2TrafoHeight && logTrafoWidth==2 ) { //in the case of 4x4
        index = (yC<<2) + xC;
        ctxIdx = CTX_IND_MAP[ index ]
    }
    if ( cIdx == 0 ){ // in the case of luminance
        ctxIdx = ctxIdx;
    } else{ //in the case of chrominance
        ctxIdx = ctxIdx + offsetClr;
        // offsetClr is offset for identifying context indices for luminance and
        // chrominance
    }
}
```

(b)

|  | Index | | | | | | | | | | | | | | |
|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 |
| CTX_IND_MAP | 0 | 1 | 2 | 3 | 1 | 1 | 2 | 3 | 4 | 4 | 6 | 6 | 5 | 5 | 6 |

(c)

|  | Index | | | | | | | | | | | | | | |
|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 |
| CTX_IND_MAP | 0 | 1 | 4 | 5 | 2 | 3 | 4 | 5 | 6 | 6 | 8 | 8 | 7 | 7 | 8 |

```
input:
  xC,yC  // coefficient position (xC,yC)    xC=0,..., width-1, yC=0,..., height-1
  cIdx;  //0 :luminance (Y), 1:chrominance (U, V)
  log2TrafoWidth;  // horizontal width of TU
  log2TrafoHeight: //vertical width of TU output:
  ctxIdx;// context index of significant_coeff_flag context index derivation process for luminance/chrominance of 4x4
{
    if( log2TrafoWidth==log2TrafoHeight && logTrafoWidth==2 ) { //in the case of 4x4
        index = (yC<<2) + xC;
        offset = cIdx==0 ? 0 : 14
        ctxIdx = CTX_IND_MAP4x4[ index + offset ]
    }
    if ( cIdx == 0 ){ // in the case of luminance
        ctxIdx = ctxIdx;
    } else{ //in the case of chrominance
        ctxIdx = ctxIdx + offsetClr;
        // offsetClr is offset for identifying context indices for luminance and
        // chrominance
    }
}
```

(b)

|  | Index | | | | | | | | | | | | | | |
|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 |
| CTX_IND_MAP4x4 | 0 | 1 | 4 | 5 | 2 | 3 | 4 | 5 | 6 | 6 | 8 | 8 | 7 | 7 | 8 |
|  | 15 | 16 | 17 | 18 | 19 | 20 | 21 | 22 | 23 | 24 | 25 | 26 | 27 | 29 | 30 |
| CTX_IND_MAP4x4 | 0 | 1 | 2 | 4 | 1 | 1 | 2 | 4 | 3 | 3 | 5 | 5 | 4 | 4 | 5 |

FIG. 92
(a) 
(b) 
(c) 
(d) 

FIG. 93
(a) 
(b) 
(c) 
(d) 
(e) 
(f) 

FIG. 94
(a) 
(b) 
(c) 
(d) 

FIG. 95
(a) 
(b) 
(c) 
(d) 

FIG. 98
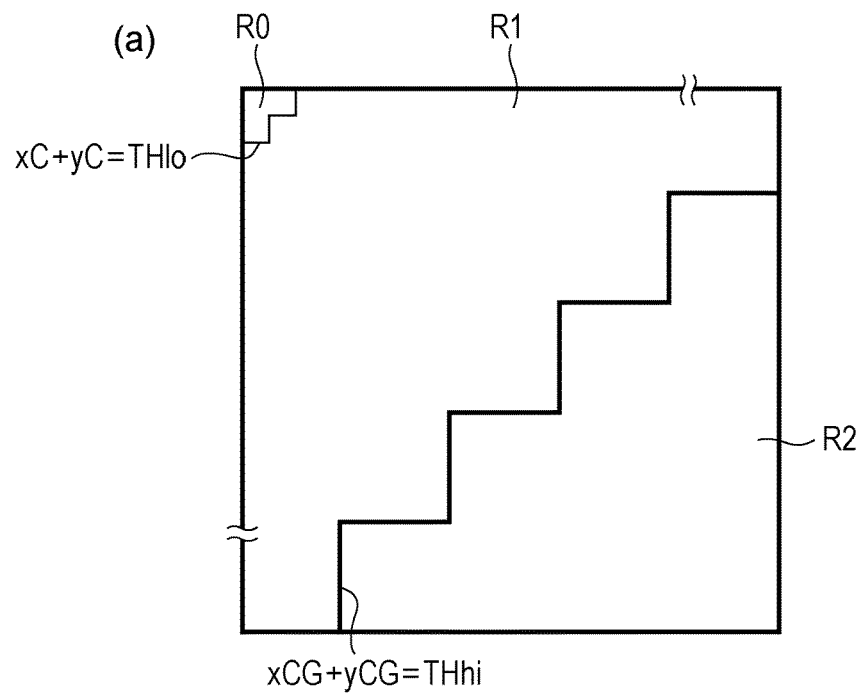
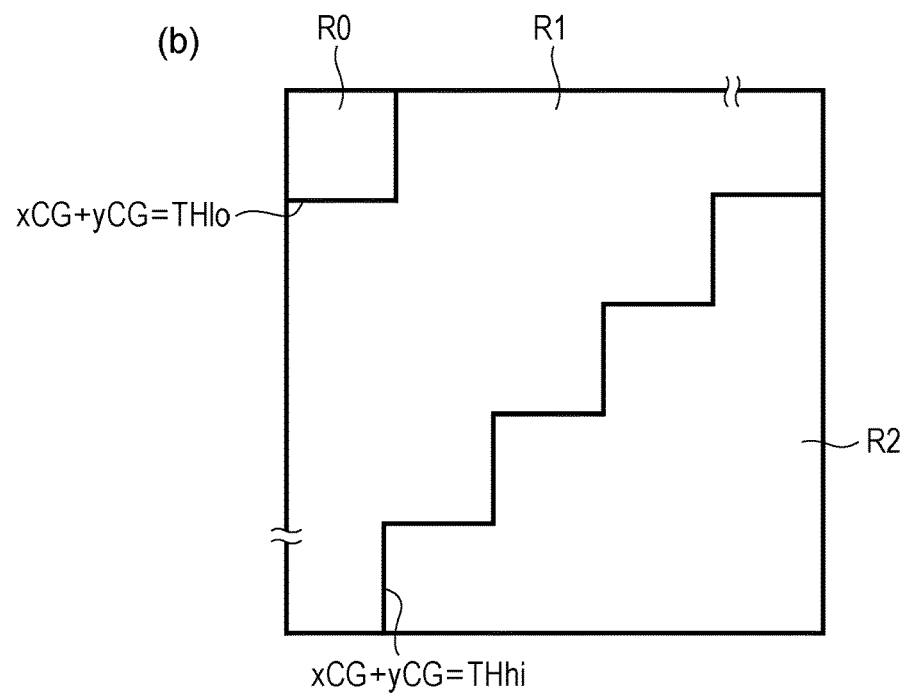

FIG. 100

(a)
CORRESPONDENCE TABLE OF COEFFICIENT POSITIONS
AND CONTEXT GROUPS OF 4x4 TU AND 8x8 TU
CTX_GRP_TBL [X] [Y]
(IN THE CASE OF 8x8 TU, INTERPRETED AS 2x2 SUB-BLOCK POSITION)

|  |  | COEFFICIENT POSITION X IN HORIZONTAL DIRECTION | | | |
|---|---|---|---|---|---|
|  |  | 0 | 1 | 2 | 3 |
| COEFFICIENT POSITION Y IN VERTICAL DIRECTION | 0 | 0 | 1 | 2 | 3 |
|  | 1 | 1 | 1 | 2 | 3 |
|  | 2 | 4 | 4 | 6 | 6 |
|  | 3 | 5 | 5 | 6 | 6 |

(b)
BIT EXPRESSION OF CORRESPONDENCE TABLE OF COEFFICIENT POSITIONS
AND CONTEXT GROUPS IN (a)

|  |  | COEFFICIENT POSITION X IN HORIZONTAL DIRECTION | | | |
|---|---|---|---|---|---|
|  |  | 0  0 | 0  1 | 1  0 | 1  1 |
| COEFFICIENT POSITION Y IN VERTICAL DIRECTION | 0  0 | 0  0  0 | 0  0  1 | 0  1  0 | 0  1  1 |
|  | 0  1 | 0  0  1 | 0  0  1 | 0  1  0 | 0  1  1 |
|  | 1  0 | 1  0  0 | 1  0  0 | 1  1  0 | 1  1  0 |
|  | 1  1 | 1  0  1 | 1  0  1 | 1  1  0 | 1  1  0 |

· VALUE OF FIRST HIGH-ORDER BIT OF CONTEXT GROUP CAN BE EXPRESSED
  BY VALUE OF FIRST HIGH-ORDER BIT OF Y
· VALUE OF SECOND HIGH-ORDER BIT OF CONTEXT GROUP CAN BE EXPRESSED
  BY VALUE OF FIRST HIGH-ORDER BIT OF X (c)
BIT EXPRESSION OF CORRESPONDENCE TABLE OF COEFFICIENT POSITIONS
AND CONTEXT GROUPS IN (a)
(ONE LOW-ORDER BIT OF CONTEXT GROUP)

|  |  | COEFFICIENT POSITION X IN HORIZONTAL DIRECTION | | | |
|---|---|---|---|---|---|
|  |  | 0  0 | 0  1 | 1  0 | 1  1 |
| COEFFICIENT POSITION Y IN VERTICAL DIRECTION | 0  0 | 0 | 1 | 0 | 1 |
|  | 0  1 | 1 | 1 | 0 | 1 |
|  | 1  0 | 0 | 0 | 0 | 0 |
|  | 1  1 | 1 | 1 | 0 | 0 |

· WHEN INDIVIDUAL BITS OF X AND Y ARE EXPRESSED AS FOLLOWS
  x0 = (X & 1)         · · · ONE LOW-ORDER BIT OF X
  x1 = (X & 2) >> 1    · · · ONE HIGH-ORDER BIT OF X
  y0 = (Y & 1)         · · · ONE LOW-ORDER BIT OF Y
  y1 = (Y & 2) >> 1    · · · ONE HIGH-ORDER BIT OF Y,
  ONE LOW-ORDER BIT (bit0) OF CONTEXT GROUP IS EXPRESSED BY
  THE FOLLOWING BIT CALCULATION
  bit0 = (!x1 & y0) | x0 & !y1)

FIG. 101

EXAMPLE COMBINATION OF SETTING OF
CONTEXT GROUPS BY x0, x1, y0, AND y1

|  | SETTING OF CONTEXT GROUPS ctxGrpIdx | | |
| --- | --- | --- | --- |
|  | ctxGrpIdx2 (FIRST HIGH-ORDER BIT) | ctxGrpIdx1 (SECOND HIGH-ORDER BIT) | ctxGrpIdx0 (THIRD HIGH-ORDER BIT) |
| PATTERN 0 | y1 | x1 | z |
| PATTERN 1 | y1 | z | x1 |
| PATTERN 2 | x1 | y1 | z |
| PATTERN 3 | x1 | z | y1 |
| PATTERN 4 | z | y1 | x1 |
| PATTERN 5 | z | x1 | y1 | z IS, FOR EXAMPLE, z = ( !x1 & y0 ) | ( x0 & !y1 )

|  |  | COEFFICIENT POSITION X IN HORIZONTAL DIRECTION | | | |
|---|---|---|---|---|---|
|  |  | 0 | 1 | 2 | 3 |
| COEFFICIENT POSITION Y IN VERTICAL DIRECTION | 0 | 0 | 1 | 3 | 2 |
|  | 1 | 1 | 1 | 3 | 2 |
|  | 2 | 5 | 5 | 6 | 6 |
|  | 3 | 4 | 4 | 6 | 6 |

(b)

|  |  | COEFFICIENT POSITION X IN HORIZONTAL DIRECTION | | | |
|---|---|---|---|---|---|
|  |  | 0 | 1 | 2 | 3 |
| COEFFICIENT POSITION Y IN VERTICAL DIRECTION | 0 | 1 | 0 | 2 | 3 |
|  | 1 | 0 | 0 | 2 | 3 |
|  | 2 | 4 | 4 | 6 | 6 |
|  | 3 | 5 | 5 | 6 | 6 |

(c)

|  |  | COEFFICIENT POSITION X IN HORIZONTAL DIRECTION | | | |
|---|---|---|---|---|---|
|  |  | 0 | 1 | 2 | 3 |
| COEFFICIENT POSITION Y IN VERTICAL DIRECTION | 0 | 1 | 0 | 3 | 2 |
|  | 1 | 0 | 0 | 3 | 2 |
|  | 2 | 5 | 5 | 6 | 6 |
|  | 3 | 4 | 4 | 6 | 6 |

ARITHMETIC DECODING DEVICE, IMAGE DECODING DEVICE, AND ARITHMETIC CODING DEVICE

TECHNICAL FIELD

The present invention relates to an arithmetic decoding device that decodes arithmetically coded data, and an image decoding device including such an arithmetic decoding device. The present invention also relates to an arithmetic coding device that generates arithmetically coded data.

BACKGROUND ART

To efficiently transmit or record video, a video coding device (image coding device) that generates coded data by coding video, and a video decoding device (image decoding device) that generates a decoded image by decoding the coded data are used.

Specific examples of a video coding scheme include H.264/MPEG-4.AVC, a scheme adopted for KTA software, which is a codec for joint development in VCEG (Video Coding Expert Group), a scheme adopted for TMuC (Test Model under Consideration) software, and a scheme suggested in HEVC (High-Efficiency Video Coding), which is a succeeding codec of the foregoing schemes (NPL 1).

In these video coding schemes, images (pictures) that form video are managed using a hierarchical structure, which is made up of slices obtained by dividing an image, coding units obtained by dividing a slice, and blocks and partitions obtained by dividing a coding unit, and are generally coded/decoded in units of blocks.

In these coding schemes, in usual cases, a prediction image is generated on the basis of a locally decoded image obtained by coding and decoding an input image, transform coefficients are obtained by performing frequency transform, such as DCT (Discrete Cosine Transform), on a difference image (also referred to as a "residual image" or "prediction residual") representing a difference between the prediction image and the input image in units of blocks, and the transform coefficients are coded.

As specific examples of a scheme of coding transform coefficients, context-based adaptive variable length coding (CAVLC) and context-based adaptive binary arithmetic coding (CABAC) are known.

In CALVC, individual transform coefficients are sequentially scanned to generate one-dimensional vectors, and then syntax elements representing the values of the individual transform coefficients, a syntax element representing the length of consecutive zeros (also referred to as a "run length"), and so forth are coded.

In CABAC, a binarization process is performed on various syntax elements representing transform coefficients, and binary data obtained through the binarization process is arithmetically coded. Here, the various syntax elements include a flag indicating whether or not a transform coefficient is equal to 0, that is, a flag significant_coeff_flag indicating the presence/absence of a non-zero transform coefficient (also referred to as a transform coefficient presence/absence flag), and syntax elements last_significant_coeff_x and last_significant_coeff_y indicating the position of the last non-zero transform coefficient in processing order.

In CABAC, in the case of coding one symbol (1 bit of binary data, also referred to as Bin), a context index assigned to a target frequency component to be processed is referred to, and arithmetic coding is performed in accordance with the probability of occurrence indicated by a probability state index included in the context variable designated by the context index. Also, the probability of occurrence designated by the probability state index is updated every time a symbol is coded.

NPL 1 describes, for example, a technique of (1) dividing a frequency region related to a target block to be processed into a plurality of partial regions, (2) assigning, to frequency components included in a partial region on a low-frequency side, context indices (also referred to as position contexts) that are determined in accordance with the positions of the frequency components in the frequency region, and (3) assigning, to frequency components included in a partial region on a high-frequency side, context indices (also referred to as neighbor reference contexts) that are determined in accordance with the number of non-zero transform coefficients in frequency components around each of the frequency components.

NPLs 2 and 3 suggest reduction of the number of context indices.

NPL 4 suggests an improvement for scan order of various syntax elements.

NPL 5 suggests division of a frequency region related to a target block to be processed into a plurality of sub-blocks, and decoding of a flag indicating whether or not each sub-block includes a non-zero transform coefficient.

NPL 6 describes a technique of, for example, in a case where the size of a target block to be processed is a certain size or larger, performing the following steps (1) to (5) to derive context indices that are to be referred to when a transform coefficient presence/absence flag (significant_coeff_flag) is decoded (coded).

(1) Divide a frequency region of a target block to be processed into a plurality of partial regions. Also, perform the following steps (2) to (4) in accordance with whether each of the plurality of partial regions obtained through division is on any of a low-frequency side to a high-frequency side.

(2) For frequency components included in a partial region on the low-frequency side, derive context indices (also referred to as position contexts) that are determined in accordance with the positions of the frequency components in the frequency region.

(3) For frequency components included in a partial region in an intermediate-frequency region, derive context indices (also referred to as neighbor reference contexts) that are determined in accordance with the number of non-zero coefficients in frequency components around each of the frequency components.

(4) For frequency components included in a partial region on the high-frequency side, derive fixed context indices.

(5) In a case where the size of a target block to be processed is a certain size or smaller, derive context indices (also referred to as position contexts) that are determined in accordance with the positions of the frequency components in the frequency region.

CITATION List

Non Patent Literature

NPL 1: "WD4: Working Draft 4 of High-Efficiency Video Coding (JCTVC-F803_d2)", Joint Collaborative Team on Video Coding (JCT-VC) of ITU-T SG16 WP3 and ISO/IEC JTC1/SC29/WG11 6th Meeting: Torino, IT, 14-22 Jul. 2011 (published on Oct. 8, 2011)

NPL 2: "A combined proposal from JCTVC-G366, JCTVC-G657, and JCTVC-G768 on context reduction of significance map coding with CABAC (JCTVC-G1015)", Joint Collaborative Team on Video Coding (JCT-VC) of ITU-T SG16 WP3 and ISO/IEC JTC1/SC29/WG117th Meeting: Geneva, CH, 21-30 Nov. 2011 (published on Nov. 25, 2011)

NPL 3: "JCT-VC break-out report: Harmonization of NSQT with residual coding (JCTVC-G1038)", Joint Collaborative Team on Video Coding (JCT-VC) of ITU-T SG16 WP3 and ISO/IEC JTC1/SC29/WG117th Meeting: Geneva, CH, 21-30 Nov. 2011 (Published on Nov. 28, 2011)

NPL 4: "CE11: Scanning Passes of Residual Data in HE (JCTVC-G320)", Joint Collaborative Team on Video Coding (JCT-VC) of ITU-T SG16 WP3 and ISO/IEC JTC1/SC29/WG117th Meeting: Geneva, CH, 21-30 Nov. 2011 (Published on Nov. 9, 2011)

NPL 5: "Multi level significance maps for Large Transform Units (JCTVC-G644)", Joint Collaborative Team on Video Coding (JCT-VC) of ITU-T SG16 WP3 and ISO/IEC JTC1/SC29/WG117th Meeting: Geneva, 21-30 Nov. 2011 (Published on Nov. 9, 2011)

NPL 6: "High Efficiency Video Coding (HEVC) text specification draft 6 (JCTVC-H1003 dk)", Joint Collaborative Team on Video Coding (JCT-VC) of ITU-T SG16 WP3 and ISO/IEC JTC1/SC29 WG11 6th Meeting: San Jose, US, 1-10 Feb. 2012 (Published on Feb. 17, 2012)

SUMMARY OF INVENTION

Technical Problem

However, according to the above-described related art, there is a problem that the amount of processing related to coding and decoding of transform coefficients is not sufficiently reduced.

The present invention has been made in view of the above-described problem, and an object of the invention is to provide an arithmetic decoding device and an arithmetic coding device that are capable of reducing the amount of processing related to coding and decoding of transform coefficients, compared to a configuration according to the related art.

Solution to Problem

To solve the above-described problem, an image decoding device according to an embodiment of the present invention includes, in an arithmetic decoding device that decodes coded data for each of unit regions of a target image, sub-block coefficient presence/absence flag decoding means for decoding, for each of two or more sub-blocks obtained by dividing the unit region, a sub-block coefficient presence/absence flag indicating whether or not at least one non-zero transform coefficient is included, and context index deriving means for deriving a context index of a target sub-block on the basis of transform coefficient presence/absence flags each indicating whether or not a transform coefficient is equal to 0. The context index deriving means derives the context index of the target sub-block in accordance with the sub-block coefficient presence/absence flags of adjacent sub-blocks that are adjacent to the target sub-block.

To solve the above-described problem, an image decoding device according to an embodiment of the present invention includes the above-described arithmetic decoding device, inverse frequency transform means for performing inverse frequency transform on the transform coefficient decoded by the arithmetic decoding device, so as to generate a residual image, and decoded image generating means for adding the residual image and a prediction image predicted from a decoded image that has been generated, so as to generate a decoded image.

To solve the above-described problem, an arithmetic coding device according to an embodiment of the present invention includes, in an arithmetic coding device that generates coded data for each of unit regions of a target image, sub-block coefficient presence/absence flag coding means for coding, for each of two or more sub-blocks obtained by dividing the unit region, a sub-block coefficient presence/absence flag indicating whether or not at least one non-zero transform coefficient is included, and context index deriving means for deriving a context index of a target sub-block on the basis of transform coefficient presence/absence flags each indicating whether or not a transform coefficient is equal to 0. The context index deriving means derives the context index in accordance with the sub-block coefficient presence/absence flags of adjacent sub-blocks that are adjacent to the target sub-block.

To solve the above-described problem, an arithmetic decoding device according to an embodiment of the present invention includes, in an arithmetic decoding device that decodes coded data for each of unit regions of a target image, context index deriving means for deriving context indices of the unit regions on the basis of transform coefficient presence/absence flags each indicating whether or not a transform coefficient is equal to 0, and syntax decoding means for arithmetically decoding the transform coefficient presence/absence flags on the basis of a probability state designated by the derived context indices. The context index deriving means derives a common context index for the transform coefficient presence/absence flags that belong to a low-frequency side of at least two unit regions having different sizes among the unit regions.

To solve the above-described problem, an image decoding device according to an embodiment of the present invention includes the above-described arithmetic decoding device, inverse frequency transform means for performing inverse frequency transform on the transform coefficient decoded by the arithmetic decoding device, so as to generate a residual image, and decoded image generating means for adding the residual image and a prediction image predicted from a decoded image that has been generated, so as to generate a decoded image.

To solve the above-described problem, an image coding device according to an embodiment of the present invention includes, in an arithmetic coding device that generates coded data for each of unit regions of a target image, context index deriving means for deriving context indices of the unit regions on the basis of transform coefficient presence/absence flags each indicating whether or not a transform coefficient is equal to 0, and syntax coding means for arithmetically coding the transform coefficient presence/absence flags on the basis of a probability state designated by the derived context indices. The context index deriving means derives a common context index for the transform coefficient presence/absence flags that belong to a low-frequency side of at least two unit regions having different sizes among the unit regions.

Advantageous Effects of Invention

According to the arithmetic decoding device having the above-described configuration, the amount of codes of target sub-block coefficient presence/absence flags to be decoded can be reduced, and the amount of processing related to decoding of transform coefficients is reduced.

BRIEF DESCRIPTION OF DRAWINGS

FIG. 2 includes diagrams illustrating data structure of coded data that is generated by a video coding device according to an embodiment of the present invention and is decoded by the video decoding device, and parts (a) to (d) are diagrams illustrating a picture layer, a slice layer, a tree block layer, and a CU layer, respectively.

FIG. 3 Parts (a) to (h) are diagrams illustrating the patterns of a PU split type, respectively illustrating partition shapes in cases where the PU split types are 2N×2N, 2N×N, 2N×nU, 2N×nD, N×2N, nL×2N, nR×2N, and N×N. Parts (i) to (o) are diagrams illustrating split schemes for quadtree partitioning of partitioning a square node into squares or non-squares. (i) illustrates partitioning into squares, (j) illustrates partitioning into a horizontally long rectangles, (k) illustrates partitioning into a vertically long rectangles, (l) illustrates partitioning of a horizontally long node into horizontally long rectangles, (m) illustrates partitioning of a horizontally long node into squares, (n) illustrates partitioning of a vertically long node into vertically long rectangles, and (o) illustrates partitioning of a vertically long node into squares.

FIG. 4 is a diagram illustrating the first half portion of a syntax table showing syntax elements included in the quantized residual information of coded data according to the embodiment.

FIG. 5 is a diagram illustrating the last half portion of the syntax table showing syntax elements included in the quantized residual information of coded data according to the embodiment.

FIG. 13 is a diagram illustrating the relationship between logarithm values (log 2TrafoSize) of sizes of target blocks and the numbers of prediction modes (intraPredModeNum).

FIG. 14 is a table showing examples of scan indices scanIndex that are indicated by intra prediction mode indices IntraPredMode and individual values of log 2TrafoSize−2.

FIG. 15 includes diagrams describing scan indices, in which part (a) illustrates scan types ScanType indicated by individual values of scan indices scanIndex, and part (b) illustrates scan orders of horizontal-direction priority scan (horizontal fast scan), vertical-direction priority scan (vertical fast scan), and diagonal-direction scan (Up-right diagonal scan) in a case where the block size corresponds to 4×4 components.

FIG. 16 is a table illustrating an example of sub-block scan indices scanIndex that are designated by intra prediction mode indices IntraPredMode and individual values of log 2TrafoSize−2.

FIG. 17 includes diagrams describing sub-block scan indices, in which part (a) illustrates sub-block scan types ScanType indicated by individual values of sub-block scan indices scanIndex, and part (b) illustrates scan orders of horizontal-direction priority scan (horizontal fast scan), vertical-direction priority scan (vertical fact scan), and diagonal-direction scan (Up-right diagonal scan) in a case where the block size corresponds to 4×4 components.

FIG. 18 is a table illustrating another example of sub-block scan indices scanIndex that are designated by intra prediction mode indices IntraPredMode and individual values of log 2TrafoSize−2.

FIG. 20 includes diagrams describing a decoding process performed by the sub-block coefficient presence/absence flag decoder according to the embodiment, in which part (a) illustrates a target sub-block (xCG, yCG) and an adjacent sub-block (xCG, yCG+1) that is adjacent to the target sub-block on a lower side, part (b) illustrates the target sub-block (xCG, yCG) and an adjacent sub-block (xCG+1, yCG) that is adjacent to the target sub-block on a right side, and part (c) illustrates the target sub-block (xCG, yCG), the adjacent sub-block (xCG, yCG+1) that is adjacent to the target sub-block on a lower side, and the adjacent sub-block (xCG+1, yCG) that is adjacent to the target sub-block on a right side.

FIG. 21 includes diagrams describing a coding and decoding process of sub-block coefficient presence/absence flags according to a comparative example, in which part (a) illustrates transform coefficients that exist in a frequency region of 16×16 components, and part (b) illustrates sub-block coefficient presence/absence flags assigned to individual sub-blocks.

FIG. 22 includes diagrams describing a coding and decoding process of sub-block coefficient presence/absence flags according to the embodiment, in which part (a) illustrates transform coefficients that exist in a frequency region of 16×16 components, and part (b) illustrates sub-block coefficient presence/absence flags assigned to individual sub-blocks.

FIG. 26 includes diagrams describing a classification process performed by a frequency classifying unit included in the coefficient presence/absence flag decoder according to the embodiment, in which part (a) illustrates division into partial regions that is preferably applied to decode transform coefficients related to a luminance value, and part (b) illustrates division into partial regions that is preferably applied to decode transform coefficients related to a chrominance value.

FIG. 27 is a diagram describing a context index derivation process performed by the coefficient presence/absence flag decoder according to the embodiment, and illustrates pseudo code showing a derivation process of deriving context indices to be assigned to a frequency region included in the partial regions R0 to R2 illustrated in part (a) of FIG. 26.

FIG. 28 is a diagram describing a context index derivation process performed by the coefficient presence/absence flag decoder according to the embodiment, and illustrates pseudo code showing a derivation process of deriving context indices to be assigned to a frequency region included in the partial regions R0 and R1 illustrated in part (b) of FIG. 26.

FIG. 29 includes diagrams describing a context index derivation process performed by a position context deriving unit included in the coefficient presence/absence flag decoder according to the embodiment, in which part (a) illustrates regions R0 to R6 that form a frequency region having a size of 4×4 components, and part (b) illustrates regions R0 to R9 that form a frequency region having a size of 8×8 components.

FIG. 30 includes diagrams describing a context index derivation process according to a comparative example, in which part (a) illustrates context indices that have been derived for individual frequency components included in a frequency region having a size of 4×4 components and that are referred to when significant_coeff_flag related to luminance Y is decoded, part (b) illustrates context indices that have been derived for individual frequency components included in a frequency region having a size of 4×4 components through a context index derivation process according to a comparative example and that are referred to when significant_coeff_flag related to chrominance U and V is decoded, and part (c) illustrates context indices that have been derived for individual frequency components included in a frequency region having a size of 8×8 components through a context index derivation process according to the comparative example and that are referred to when significant_coeff_flag related to luminance Y and chrominance U and V is decoded.

FIG. 31 illustrates pseudo code showing a context index derivation process performed by the position context deriving unit included in the coefficient presence/absence flag decoder according to the embodiment.

FIG. 32 includes diagrams describing a context index derivation process performed by the position context deriving unit included in the coefficient presence/absence flag decoder according to the embodiment, in which part (a) illustrates an example of CTX_IND_MAP_4×4to8×8[index] in the pseudo code illustrated in FIG. 31, and part (b) illustrates the values of individual context indices that are obtained in the case of using CTX_IND_MAP_4×4to8×8 [index] in part (a) for the pseudo code illustrated in FIG. 31.

FIG. 33 includes diagrams describing another example of the context index derivation process performed by the position context deriving unit included in the coefficient presence/absence flag decoder according to the embodiment, in which part (a) illustrates regions R0 to R6 that form a frequency region having a size of 4×4 components, and part (b) illustrates regions R0 to R9 that form a frequency region having a size of 8×8 components.

FIG. 34 illustrates pseudo code showing another example of the context index derivation process performed by the position context deriving unit included in the coefficient presence/absence flag decoder according to the embodiment.

FIG. 35 includes diagrams describing another example of the context index derivation process performed by the position context deriving unit included in the coefficient presence/absence flag decoder according to the embodiment, in which part (a) illustrates an example of CTX_IND_MAP_4×4to8×8[index] in the pseudo code illustrated in FIG. 34, and part (b) illustrates the values of individual context indices that are obtained in the case of using CTX_IND_MAP_4×4to8×8[index] in part (a) for the pseudo code illustrated in FIG. 34.

FIG. 36 illustrates pseudo code showing another example of the context index derivation process performed by the position context deriving unit included in the coefficient presence/absence flag decoder according to the embodiment.

FIG. 41 illustrates pseudo code showing a context index derivation process performed by the sub-block neighbor reference context deriving unit included in the coefficient presence/absence flag decoder according to the first modification example, which is pseudo code showing a process of deriving context indices that are referred to in the case of decoding significant_coeff_flag related to luminance Y.

FIG. 42 illustrates pseudo code showing a context index derivation process performed by the sub-block neighbor reference context deriving unit included in the coefficient presence/absence flag decoder according to the first modification example, which is pseudo code showing a process of deriving context indices that are referred to in the case of decoding significant_coeff_flag related to chrominance U and V.

FIG. 44 illustrates pseudo code showing a transform coefficient decoding process performed by a transform coefficient decoder according to the embodiment in a case where the size of a frequency region is a certain size or smaller (for example, 4×4 components or 8×8 components).

FIG. 45 is a flowchart illustrating a flow of a transform coefficient decoding process performed by the transform coefficient decoder according to the embodiment in a case where the size of a frequency region is the certain size or smaller.

FIG. 48 illustrates pseudo code showing a transform coefficient decoding process performed by the transform coefficient decoder according to the embodiment in a case where the size of a frequency region is larger than the certain size (for example, 16×16 components or 32×32 components).

FIG. 57 includes diagrams illustrating the configurations of a transmission device including the above-described video coding device and a reception device including the above-described video decoding device. Part (a) illustrates the transmission device including the video coding device, and part (b) illustrates the reception device including the video decoding device.

FIG. 58 includes diagrams illustrating the configurations of a recording device including the above-described video coding device and a playback device including the above-described video decoding device. Part (a) illustrates the recording device including the video coding device, and part (b) illustrates the playback device including the video decoding device.

FIG. 59 is a table showing another example of sub-block scan indices scanIndex indicated by intra prediction mode indices IntraPredMode and individual values of log 2TrafoSize−2.

FIG. 60 includes diagrams describing another example of the context index derivation process performed by the position context deriving unit included in the coefficient presence/absence flag decoder according to the embodiment, in which part (a) illustrates regions R0 to R6 that form a frequency region having a size of 4×4 components, and part (b) illustrates regions R0 to R6 that form a frequency region having a size of 8×8 components.

FIG. 61 illustrates pseudo code showing another example of the context index derivation process performed by the position context deriving unit included in the coefficient presence/absence flag decoder according to the embodiment.

FIG. 62 includes diagrams describing another example of the context index derivation process performed by the position context deriving unit included in the coefficient presence/absence flag decoder according to the embodiment, in which part (a) illustrates an example of CTX_IND_MAP[index] in the pseudo code illustrated in FIG. 61, part (b) illustrates the values of individual context indices related to luminance of 4×4 components, which are obtained in the case of using CTX_IND_MAP[index] in part (a) for the pseudo code illustrated in FIG. 61, and part (c) illustrates the values of individual context indices related to luminance of 8×8 components, which are obtained in the case of using CTX_IND_MAP[index] in part (a) for the pseudo code illustrated in FIG. 61.

FIG. 63 includes diagrams describing another example of the context index derivation process performed by the position context deriving unit included in the coefficient presence/absence flag decoder according to the embodiment, in which part (a) illustrates the values of individual context indices related to chrominance of 4×4 components, which are obtained in the case of using CTX_IND_MAP[index] in part (a) of FIG. 62 for the pseudo code illustrated in FIG. 61, and part (b) illustrates the values of individual context indices related to chrominance of 8×8 components, which are obtained in the case of using CTX_IND_MAP[index] in part (a) of FIG. 62 for the pseudo code illustrated in FIG. 61.

FIG. 64 includes diagrams describing another example of the context index derivation process performed by the position context deriving unit included in the coefficient presence/absence flag decoder according to the embodiment, in which part (a) illustrates another example of CTX_IND_MAP[index] in the pseudo code illustrated in FIG. 61, part (b) illustrates the values of individual context indices related to luminance of 4×4 components, which are obtained in the case of using CTX_IND_MAP[index] in part (a) for the pseudo code illustrated in FIG. 61, and part (c) illustrates the values of individual context indices related to luminance of 8×8 components, which are obtained in the case of using CTX_IND_MAP[index] in part (a) for the pseudo code illustrated in FIG. 61.

FIG. 66 illustrates pseudo code showing another example of the context index derivation process performed by the position context deriving unit included in the coefficient presence/absence flag decoder according to the embodiment.

FIG. 67 includes diagrams describing another example of the context index derivation process performed by the position context deriving unit included in the coefficient presence/absence flag decoder according to the embodiment, in which part (a) illustrates an example of CTX_IND_MAP_L[index] in the pseudo code illustrated in FIG. 66, and part (b) illustrates an example of CTX_IND_MAP_C[index] in the pseudo code illustrated in FIG. 66.

FIG. 68 includes diagrams describing another example of the context index derivation process performed by the position context deriving unit included in the coefficient presence/absence flag decoder according to the embodiment, in which part (a) illustrates the values of individual context indices related to luminance of 4×4 components, which are obtained in the case of using CTX_IND_MAP_L[index] in part (a) of FIG. 67 for the pseudo code illustrated in FIG. 66, and part (b) illustrates the values of individual context indices related to luminance of 8×8 components, which are obtained in the case of using CTX_IND_MAP_L[index] in part (a) of FIG. 67 for the pseudo code illustrated in FIG. 66.

FIG. 69 includes diagrams describing another example of the context index derivation process performed by the position context deriving unit included in the coefficient presence/absence flag decoder according to the embodiment, in which part (a) illustrates the values of individual context indices related to chrominance of 4×4 components, which are obtained in the case of using CTX_IND_MAP_C[index] in part (b) of FIG. 67 for the pseudo code illustrated in FIG. 66, and part (b) illustrates the values of individual context indices related to chrominance of 8×8 components, which are obtained in the case of using CTX_IND_MAP_C[index] in part (b) of FIG. 67 for the pseudo code illustrated in FIG. 66.

FIG. 70 includes diagrams describing another example of the context index derivation process performed by the position context deriving unit included in the coefficient presence/absence flag decoder according to the embodiment, in which part (a) illustrates regions R0 to R6 that form a frequency region having a size of 4×4 components, and part (b) illustrates regions R0 to R7 that form a frequency region having a size of 8×8 components.

FIG. 71 includes diagrams describing another example of the context index derivation process performed by the position context deriving unit included in the coefficient presence/absence flag decoder according to the embodiment, in which part (a) illustrates regions R0 to R6 that form a frequency region having a size of 4×4 components, and part (b) illustrates regions R0 to R7 that form a frequency region having a size of 8×8 components. Also, part (a) illustrates an example in which a common context index is assigned to the regions R3 and R5 in the 4×4 components, and part (b) illustrates an example in which a common context index is assigned to the regions R3 and R5 in the 8×8 components.

FIG. 72 includes diagrams describing another example of the context index derivation process performed by the position context deriving unit included in the coefficient presence/absence flag decoder according to the embodiment, in which part (a) illustrates regions R0 to R6 that form a frequency region having a size of 4×4 components, and part (b) illustrates regions R0 to R7 that form a frequency region having a size of 8×8 components. Also, an example is illustrated in which a common context index is assigned to the region R0 (DC component) in the 4×4 components in part (a) and the region R7 (DC component) in the 8×8 components in part (b).

FIG. 73 includes diagrams describing another example of the context index derivation process performed by the position context deriving unit included in the coefficient presence/absence flag decoder according to the embodiment, in which part (a) illustrates regions R0 to R6 that form a frequency region having a size of 4×4 components, and part (b) illustrates regions R0 to R7 that form a frequency region having a size of 8×8 components. Also, an example is illustrated in which a common context index is assigned to the region R0 (DC component) in the 4×4 components in part (a) and the region R7 (DC component) in the 8×8 components in part (b). Also, part (a) illustrates an example in which a common context index is assigned to the regions R3 and R5 in the 4×4 components, and part (b) illustrates an example in which a common context index is assigned to the regions R3 and R5 in the 8×8 components.

FIG. 74 illustrates pseudo code showing a context index derivation process performed by the sub-block neighbor reference context deriving unit included in the coefficient presence/absence flag decoder according to the first modification example, which is pseudo code showing a process of deriving context indices that are referred to in the case of decoding significant_coeff_flag related to luminance Y.

FIG. 75 is a flowchart illustrating another example of the transform coefficient decoding process performed by the transform coefficient decoder according to the embodiment in a case where the size of a frequency region is larger than a certain size, and illustrates an example in which decoding of sub-block coefficient presence/absence flags and decoding of signs and levels of non-zero coefficient presence/absence flags and individual non-zero coefficients are performed in the same loop.

FIG. 78 includes diagrams describing another example of the context index derivation process performed by the position context deriving unit included in the coefficient presence/absence flag decoder according to the embodiment, in which part (a) illustrates regions A0 to A6 that form a frequency region having a size of 16×4 components, and part (b) illustrates regions A0 to A6 that form a frequency component having a size of 4×16 components.

FIG. 80 illustrates pseudo code showing a transform coefficient decoding process performed by the transform coefficient decoder according to the embodiment in a case where the size of a frequency region is a certain size or smaller (for example, 4×4 components, 8×8 components, 16×4 components, or 4×16 components).

FIG. 81 includes diagrams describing another example of the context index derivation process performed by the position context deriving unit included in the coefficient presence/absence flag decoder according to the embodiment, in which part (a) illustrates the values of individual context indices related to luminance of 16×4 components, which are obtained in the case of using CTX_IND_MAP[index] in part (a) of FIG. 62 for the pseudo code illustrated in FIG. 80, and part (b) illustrates the values of individual context indices related to luminance of 4×16 components, which are obtained in the case of using CTX_IND_MAP[index] in part (a) of FIG. 62 for the pseudo code illustrated in FIG. 80.

FIG. 82 includes diagrams describing another example of the context index derivation process performed by the position context deriving unit included in the coefficient presence/absence flag decoder according to the embodiment, in which part (a) illustrates the values of individual context indices related to chrominance of 16×4 components, which are obtained in the case of using CTX_IND_MAP[index] in part (a) of FIG. 62 for the pseudo code illustrated in FIG. 80, and part (b) illustrates the values of individual context indices related to chrominance of 4×16 components, which are obtained in the case of using CTX_IND_MAP[index] in part (a) of FIG. 62 for the pseudo code illustrated in FIG. 80.

FIG. 83 illustrates pseudo code showing another example of the transform coefficient decoding process performed by the transform coefficient decoder according to the embodiment in a case where the size of a frequency region is a certain size or smaller (for example, 4×4 components, 8×8 components, 16×4 components, or 4×16 components).

FIG. 84 includes diagrams describing another example of the context index derivation process performed by the position context deriving unit included in the coefficient presence/absence flag decoder according to the embodiment, in which part (a) illustrates the values of individual context indices related to chrominance of 16×4 components, which are obtained in the case of using CTX_IND_MAP_C[index] in part (b) of FIG. 67 for the pseudo code illustrated in FIG. 80, part (b) illustrates the values of individual context indices related to chrominance of 4×16 components, which are obtained in the case of using CTX_IND_MAP_C[index] in part (b) of FIG. 67 for the pseudo code illustrated in FIG. 80, and part (c) illustrates the values of individual context indices related to chrominance of 8×8 components, which are obtained in the case of using CTX_IND_MAP_C[index] in part (b) of FIG. 67 for the pseudo code illustrated in FIG. 80.

FIG. 85 includes diagrams describing another example of the context index derivation process performed by the position context deriving unit included in the coefficient presence/absence flag decoder according to the embodiment, in which part (a) illustrates regions R0 to R8 that form a frequency region having a size of 4×4 components, and part (b) illustrates regions R0 to R8 that form a frequency region having a size of 8×8 components.

FIG. 86 includes diagrams describing another example of the context index derivation process performed by the position context deriving unit included in the coefficient presence/absence flag decoder according to the embodiment, in which part (a) illustrates the values of individual context indices related to luminance of 4×4 components, which are obtained in the case of using CTX_IND_MAP[index] in part (b) of FIG. 87 for the pseudo code illustrated in part (a) of FIG. 87, part (b) illustrates the values of individual context indices related to luminance of 8×8 components, which are obtained in the case of using CTX_IND_MAP[index] in part (b) of FIG. 87 for the pseudo code illustrated in part (a) of FIG. 87, part (c) illustrates the values of individual context indices related to chrominance of 4×4 components, which are obtained in the case of using CTX_IND_MAP[index] in part (b) of FIG. 87 for the pseudo code illustrated in part (a) of FIG. 87, and part (d) illustrates the values of individual context indices related to chrominance of 8×8 components, which are obtained in the case of using CTX_IND_MAP[index] in part (b) of FIG. 87 for the pseudo code illustrated in part (a) of FIG. 87.

FIG. 87 includes diagrams describing another example of the context index derivation process performed by the position context deriving unit included in the coefficient presence/absence flag decoder according to the embodiment, in which part (a) illustrates pseudo code showing another example of the context index derivation process performed by the position context deriving unit included in the coefficient presence/absence flag decoder according to the embodiment, and part (b) illustrates an example of CTX_IND_MAP[index] in the pseudo code.

FIG. 88 includes diagrams describing another example of the context index derivation process performed by the position context deriving unit included in the coefficient presence/absence flag decoder according to the embodiment, in which part (a) illustrates the values of individual context indices related to luminance of 4×4 components, which are obtained in the case of using CTX_IND_MAP[index] in part (b) of FIG. 89 for the pseudo code illustrated in part (a) of FIG. 89, part (b) illustrates the values of individual context indices related to luminance of 8×8 components, which are obtained in the case of using CTX_IND_MAP[index] in part (b) of FIG. 89 for the pseudo code illustrated in part (a) of FIG. 89, part (c) illustrates the values of individual context indices related to chrominance of 4×4 components, which are obtained in the case of using CTX_IND_MAP[index] in part (b) of FIG. 89 for the pseudo code illustrated in part (a) of FIG. 89, and part (d) illustrates the values of individual context indices related to chrominance of 8×8 components, which are obtained in the case of using CTX_IND_MAP[index] in part (b) of FIG. 89 for the pseudo code illustrated in part (a) of FIG. 89.

FIG. 89 includes diagrams describing another example of the context index derivation process performed by the position context deriving unit included in the coefficient presence/absence flag decoder according to the embodiment, in which part (a) illustrates pseudo code showing another example of the context index derivation process performed by the position context deriving unit included in the coefficient presence/absence flag decoder according to the embodiment, and part (b) illustrates an example of CTX_IND_MAP[index] in the pseudo code.

FIG. 90 includes diagrams describing another example of the context index derivation process performed by the position context deriving unit included in the coefficient presence/absence flag decoder according to the embodiment, in which part (a) illustrates pseudo code showing another example of the context index derivation process performed by the position context deriving unit included in the coefficient presence/absence flag decoder according to the embodiment, part (b) illustrates an example of CTX_IND_MAP[index] in the pseudo code, and part (c) illustrates another example of CTX_IND_MAP[index] in the pseudo code.

FIG. 91 includes diagrams describing an example of a context index derivation process related to luminance/chrominance of 4×4 components performed by the position context deriving unit included in the coefficient presence/absence flag decoder according to the related art, in which part (a) illustrates pseudo code showing an example of the context index derivation process performed by the position context deriving unit included in the coefficient presence/absence flag decoder according to the related art, and part (b) illustrates an example of CTX_IND_MAP4×4[index] in the pseudo code.

FIG. 92 includes diagrams describing another example of the context index derivation process performed by the position context deriving unit included in the coefficient presence/absence flag decoder according to the embodiment, in which part (a) illustrates the values of individual context indices related to luminance of 4×4 components, which are obtained in the case of using equation (eq. e1) in the description, part (b) illustrates the values of individual context indices related to luminance of 4×4 components, which are obtained in a case where a=1 and b=1 in equation (eq. e2) in the description, part (c) illustrates the values of individual context indices related to luminance of 4×4 components, which are obtained in a case where a=0 and b=1 in equation (eq. e2) in the description, and part (d) illustrates the values of individual context indices related to luminance of 4×4 components, which are obtained in a case where th=3 and b=4 in equation (eq. e3) in the description.

FIG. 93 includes diagrams describing another example of the context index derivation process performed by the position context deriving unit included in the coefficient presence/absence flag decoder according to the embodiment, in which part (a) illustrates the values of individual context indices related to luminance of 4×4 components, which are obtained in the case of using equation (eq. f1) in the description, part (b) illustrates the values of individual context indices related to luminance of 4×4 components, which are obtained in a case where th=3 and a=4 in equation (eq. f2) in the description, part (c) illustrates the values of individual context indices related to luminance of 4×4 components, which are obtained in a case where th=4 and a=4 in equation (eq. f2) in the description, part (d) illustrates the values of individual context indices related to luminance of 4×4 components, which are obtained in a case where th=1 and a=4 in equation (eq. f3) in the description, part (e) illustrates the values of individual context indices related to luminance of 4×4 components, which are obtained in a case where th=1, a=6, b=2, and height=4 in equation (eq. f4) in the description, and part (f) illustrates the values of individual context indices related to luminance of 4×4 components, which are obtained in a case where th=1, a=6, and b=2 in equation (eq. f5) in the description.

FIG. 94 includes diagrams describing another example of the context index derivation process performed by the position context deriving unit included in the coefficient presence/absence flag decoder according to the embodiment, in which part (a) illustrates the values of individual context indices related to luminance of 4×4 components, which are obtained in a case where a=1, b=1, and c=3 in equation (eq. g1) in the description, part (b) illustrates the values of individual context indices related to luminance of 4×4 components, which are obtained in a case where th=3, a=1, b=1, c=3, and d=3 in equation (eq. g2) in the description, part (c) illustrates the values of individual context indices related to luminance of 4×4 components, which are obtained in a case where th=4, a=1, b=1, c=3, and d=3 in equation (eq. g2) in the description, and part (d) illustrates the values of individual context indices related to luminance of 4×4 components, which are obtained in the case of applying equation (eq. g3) in the description.

FIG. 95 includes diagrams describing another example of the context index derivation process performed by the position context deriving unit included in the coefficient presence/absence flag decoder according to the embodiment, in which part (a) illustrates the values of individual context indices related to luminance of 4×4 components, which are obtained in a case where a=1, b=1, and c=3 in equation (eq. h1) in the description, part (b) illustrates the values of individual context indices related to luminance of 4×4 components, which are obtained in a case where th=3, a=1, b=1, c=3, and d=3 in equation (eq. h2) in the description, part (c) illustrates the values of individual context indices related to luminance of 4×4 components, which are obtained in a case where th=4, a=1, b=1, c=3, and d=3 in equation (eq. h2) in the description, and part (d) illustrates the values of individual context indices related to luminance of 4×4 components, which are obtained in the case of using equation (eq. h3) in the description.

FIG. 98 includes diagrams describing a classification process performed by a derivation method controller included in the third modification example of the coefficient presence/absence flag decoder according to the embodiment, in which part (a) illustrates division into partial regions that are preferably applied in the case of determining a partial region R0 (low-frequency component) by using a coefficient position (xC, yC) when transform coefficients related to luminance and chrominance are decoded, and part (b) illustrates division into partial regions that are preferably applied in the case of determining the partial region R0 (low-frequency component) by using a sub-block position (xCG, yCG) when transform coefficients related to luminance and chrominance are decoded.

FIG. 100 includes diagrams describing a context index derivation process performed by the position context deriving unit included in the third modification example of the coefficient presence/absence flag decoder according to the embodiment, in which part (a) illustrates a correspondence table CTX_GRP_TBL[X][Y] of individual coefficient positions (X, Y) of 4×4 TU and 8×8 TU and context groups, part (b) illustrates bit expression of individual values of the correspondence table in part (a), and part (c) illustrates the values of one low-order bit of the context groups of correspondence in part (a).

FIG. 101 is a diagram describing a context index derivation process performed by the position context deriving unit included in the third modification example of the coefficient presence/absence flag decoder according to the embodiment, and illustrates an example of a combination of settings of context groups by individual bits x0, x1, y0, and y1 of a coefficient position (X, Y).

FIG. 102 includes diagrams describing another example of the correspondence table CTX_GRP_TBL[X][Y] of individual coefficient positions (X, Y) of 4×4 TU and 8×8 TU and context groups, in which part (a) illustrates individual values of context groups obtained in the case of applying logical calculation expressed by equation (eq. A2-10) to pattern 0 in FIG. 101, part (b) illustrates individual values of context groups obtained in the case of applying logical calculation expressed by equation (eq. A2-11) to pattern 0 in FIG. 101, and part (c) illustrates individual values of context groups obtained in the case of applying logical calculation expressed by equation (eq. A2-12) to pattern 0 in FIG. 101.

DESCRIPTION OF EMBODIMENTS

Figure 1:
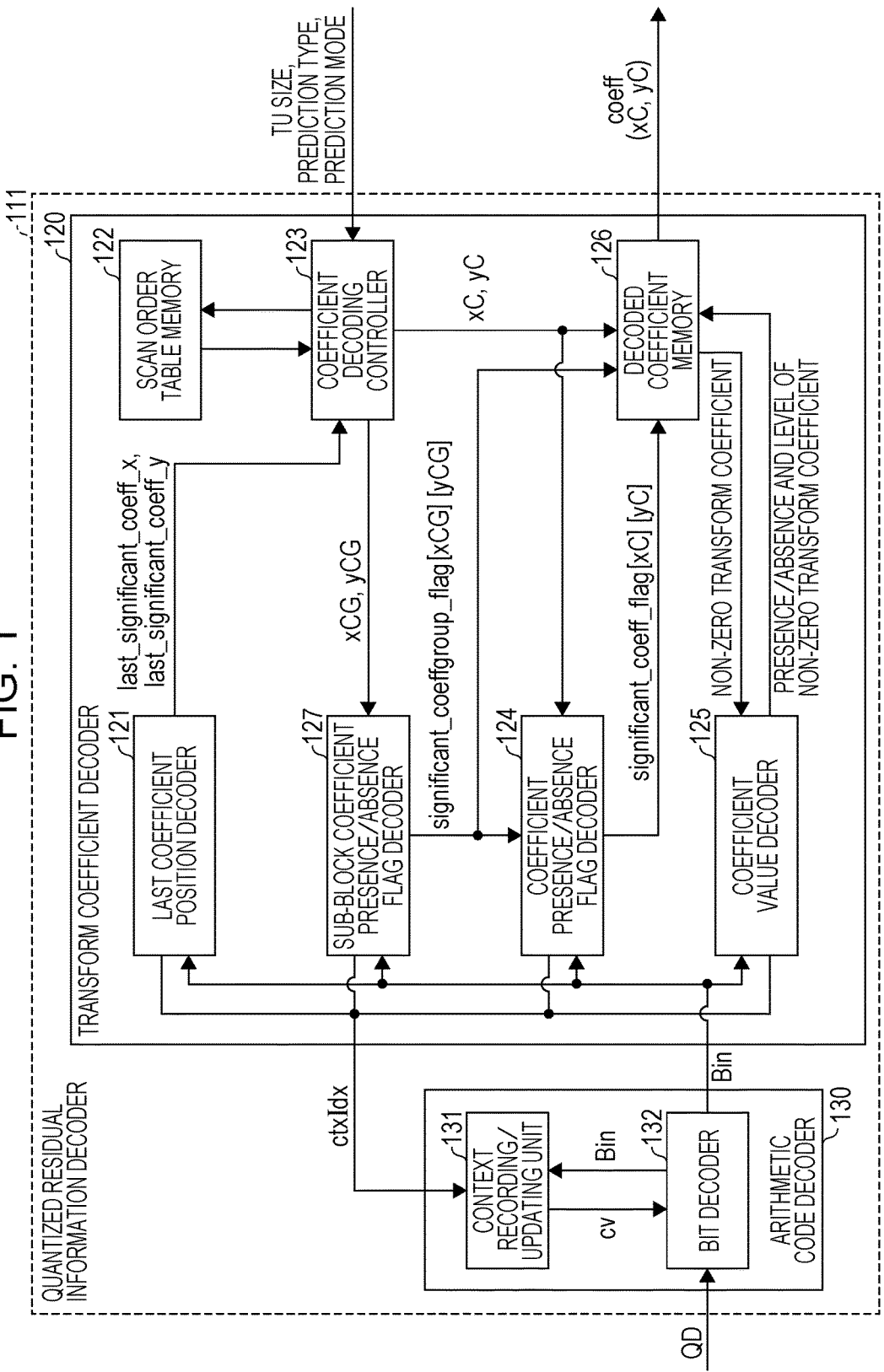
FIG. 1 is a block diagram illustrating the configuration of a quantized residual information decoder included in a video decoding device according to an embodiment of the present invention.

An embodiment of a decoding device and a coding device according to the present invention will be described below with reference to the drawings. The decoding device according to this embodiment decodes coded data to generate video. Thus, the decoding device is hereinafter referred to as a "video decoding device". The coding device according to this embodiment codes video to generate coded data. Thus, the coding device is hereinafter referred to as a "video coding device".

However, the application range of the present invention is not limited thereto. That is, as is clear from the following description, the feature of the present invention is realized without the assumption of a plurality of frames. That is, the present invention is applicable to general decoding devices and general coding devices regardless of whether a target image is video or a still image.

(Configuration of Coded Data #1)

With reference to FIG. 2, a description will be given of an example configuration of coded data #1 that is generated by a video coding device 2 and is decoded by a video decoding device 1. The coded data #1 includes, for example, a sequence and a plurality of pictures that form the sequence.

In a sequence layer, a set of data which the video decoding device 1 refers to is specified to decode a target sequence to be processed. The sequence layer includes a sequence parameter set SPS, a picture parameter set PPS, and a picture PICT.

The structure of a picture layer and the lower layers in the coded data #1 is illustrated in FIG. 2. Parts (a) to (d) of FIG. 2 are diagrams illustrating a picture layer specifying a picture PICT, a slice layer specifying a slice S, a tree block layer specifying a tree block TBLK, and a CU layer specifying a coding unit (CU) included in the tree block TBLK, respectively.

(Picture Layer)

In a picture layer, a set of data which the video decoding device 1 refers to in order to decode a target picture PICT to be processed (hereinafter also referred to as a target picture) is specified. As illustrated in part (a) of FIG. 2, the picture PICT includes a picture header PH and slices $S_1$ to $S_{NS}$ (NS represents the total number of slices included in the picture PICT).

In a case where it is not necessary to distinguish the slices $S_1$ to $S_{NS}$ from one another, the subscripts of reference symbols may be omitted. The same applies to data that is included in the coded data #1 described below and that is described with a subscript.

The picture header PH includes a coding parameter group which the video decoding device 1 refers to in order to determine a method for decoding a target picture. For example, coding mode information (entropy_coding_mode_flag) representing the mode of variable length coding which has been used by the video coding device 2 to perform coding is an example of coding parameters included in the picture header PH.

In a case where entropy_coding_mode_flag is 0, the picture PICT has been coded using CAVLC (Context-based Adaptive Variable Length Coding). In a case where entropy_coding_mode_flag is 1, the picture PICT has been coded using CABAC (Context-based Adaptive Binary Arithmetic Coding).

(Slice Layer)

In a slice layer, a set of data which the video decoding device 1 refers to in order to decode a target slice S to be processed (hereinafter also refers to as a target slice) is specified. As illustrated in part (b) of FIG. 2, the slice S includes a slice header SH and tree blocks $TBLK_1$ to $TBLK_{NC}$ (NC represents the total number of tree blocks included in the slice S).

The slice header SH includes a coding parameter group which the moving image decoding device 1 refers to in order to determine a method for decoding a target slice. Slice type designation information (slice_type) designating a slice type is an example of coding parameters included in the slice header SH.

The slice types that can be designated by slice type designation information include (1) I slice that uses only intra prediction for coding, (2) P slice that uses unidirectional prediction or intra prediction for coding, and (3) B slice that uses unidirectional prediction, bidirectional prediction, or intra prediction for coding.

Also, the slice header SH includes a filter parameter FP that is referred to by a loop filter included in the video decoding device 1. The filter parameter FP includes a filter coefficient group. The filter coefficient group includes (1) number-of-taps designation information designating the number of taps of a filter, (2) filter coefficients a0 to aNT−1 (NT represents the total number of filter coefficients included in the filter coefficient group), and (3) an offset.

(Tree Block Layer)

In a tree block layer, a set of data which the video decoding device 1 refers to in order to decode a target tree block TBLK to be processed (hereinafter also refers to as a target tree block) is specified.

The tree block TBLK includes a tree block header TBLKH and pieces of coding unit information $CU_1$ to $CU_{NL}$ (NL represents the total number of pieces of coding unit information included in the tree block TBLK). Now, the relationship between the tree block TBLK and the coding unit information CU will be described below.

The tree block TBLK is divided into units for specifying a block size for individual processes of intra prediction or inter prediction, and transform.

The unit of the tree block TBLK is divided using recursive quadtree partitioning. The tree structure obtained though the recursive quadtree partitioning is hereinafter referred to as a coding tree.

Hereinafter, a unit corresponding to a leaf, which is an end node of the coding tree, is referred to as a coding node. The coding node serves as a basic unit of a coding process, and thus the coding node is also referred to as a coding unit (CU) hereinafter.

That is, the pieces of coding unit information $CU_1$ to $CU_{NL}$ are pieces of information corresponding to individual coding nodes (coding units) that are obtained by dividing the tree block TBLK using recursive quadtree partitioning.

The root of a coding three is associated with the tree block TBLK. In other words, the tree block TBLK is associated with the top node of the tree structure of quadtree partitioning that recursively includes a plurality of coding nodes.

The size of each coding node is half the size of a coding node to which the coding node directly belongs (that is, the unit of the node that is higher by one layer than the coding node) in the horizontal and vertical directions.

A possible size of each coding node depends on the size designation information and maximum hierarchical depth of the coding node, which are included in the sequence parameter set SPS of the coded data #1. For example, in a case where the size of the tree block TBLK corresponds to 64×64 pixels and the maximum hierarchical depth is 3, a coding node in a layer lower than the tree block TBLK may have any one of four sizes: 64×64 pixels, 32×32 pixels, 16×16 pixels, and 8×8 pixels.

(Tree Block Header)

The tree block header TBLKH includes coding parameters which the video decoding device 1 refers to in order to determine a method for decoding a target tree block. Specifically, as illustrated in part (c) of FIG. 2, the tree block header TBLKH includes tree block split information SP_TBLK that designates the split pattern of dividing a target tree block into individual CUs, and a quantization parameter difference Δqp (qp_delta) that designates the magnitude of a quantization step.

The tree block split information SP_TBLK is information representing a coding tree for dividing a tree block, and is specifically information designating the shapes and sizes of individual CUs included in the target tree block and the positions of the CUs in the target tree block.

The tree block split information SP_TBLK is not necessarily include the shapes and sizes of CUs in an explicit manner. For example, the tree block split information SP_TBLK may be a set of flags (split_coding_unit_flag) indicating whether or not the entire target tree block or a partial region of the tree block is to be divided into four regions. In that case, the shape and size of the tree block may also be used to specify the shapes and sizes of individual CUs.

The quantization parameter difference Δqp is a difference qp−qp' between a quantization parameter qp in a target tree block and a quantization parameter qp' in a tree block that has been coded immediately before the target tree block.

(CU Layer)

In a CU layer, a set of data which the video decoding device 1 refers to in order to decode a target CU to be processed (hereinafter also referred to as a target CU) is specified.

Before describing the details of data included in coding unit information CU, the tree structure of data included in a CU is described. A coding node serves as a node of a root of a prediction tree (PT) and a transform tree (TT). The prediction tree and transform tree will be described below.

In the prediction tree, a coding node is divided into one or plural prediction blocks, and the positions and sizes of the individual prediction blocks are specified. In another expression, prediction blocks are one or plural regions that form a coding node and that do not overlap with one another. The prediction tree includes one or plural prediction blocks obtained through the foregoing division.

A prediction process is performed on each prediction block. Hereinafter, a prediction block, which also serves as a unit of prediction, is also referred to as a prediction unit (PU).

There are roughly two types of division in a prediction tree, that is, the case of intra prediction and the case of inter prediction. In the case of intra prediction, a division method of 2N×2N (the same size as a coding node) or N×N may be used. In the case of inter prediction, a division method of 2N×2N (the same size as a coding node), 2N×N, N×2N, or N×N may be used.

In the transform tree, a coding node is divided into one or plural transform blocks, and the positions and sizes of the individual transform blocks are specified. In another expression, transform blocks are one or plural regions that form a coding node and that do not overlap with one another. The transform tree includes one or plural transform blocks obtained through the foregoing division.

A transform process is performed for each transform block. Hereinafter, a transform block, which is the unit of transform, is also referred to as a transform unit (TU).

(Data Structure of Coding Unit Information)

Next, the details of data included in coding unit information CU will be described with reference to part (d) of FIG. 2. As illustrated in part (d) of FIG. 2, the coding unit information CU specifically includes a skip mode flag SKIP, CU prediction type information Pred_type, PT information PTI, and TT information TTI.

[Skip Flag]

A skip flag SKIP is a flag indicating whether or not a skip mode is applied to a target CU. In a case where the value of the skip flag SKIP is equal to 1, that is, in a case where the skip mode is applied to the target CU, the PT information PTI in the coding unit information CU is omitted. Note that the skip flag SKIP is omitted in an I slice.

[CU Prediction Type Information]

CU prediction type information Pred_type includes CU prediction scheme information PredMode and PU partition type information Part Mode. The CU prediction type information may be simply referred to as prediction type information.

The CU prediction scheme information PredMode designates either of intra prediction (intra CU) and inter prediction (inter CU) to be used as a prediction image generation method for each PU included in a target CU. Hereinafter, classification of skip, intra prediction, and inter prediction in a target CU is referred to as a CU prediction mode.

The PU partition type information Part Mode designates a PU partition type, which is a pattern of dividing a target coding unit (CU) into individual PUs. Hereinafter, division of a target coding unit (CU) into individual PUs in accordance with a PU partition type is referred to as PU partition.

The PU partition type information Part Mode may be, for example, an index indicating the type of PU partition pattern, and the shapes and sizes of the individual PUs included in the target prediction tree and the positions of the individual PUs in the target prediction tree may be designated.

A selectable PU partition type varies in accordance with a CU prediction scheme and a CU size. Furthermore, a selectable PU partition type varies in each case of inter prediction and intra prediction. The details of PU partition types will be described in detail below.

In the case of a slice other than an I slice, the value of PU partition type information Part Mode may be specified by an index (cu_split_pred_part_mode) that designates a combination of methods for partition of a tree block, a prediction scheme, and split of a CU.

[PT Information]

PT information PTI is information regarding a PT included in a target CU. In other words, PT information PTI is a set of pieces of information regarding one or plural PUs included in a PT. As described above, a prediction image is generated in units of PUs, and thus the PT information PTI is referred to when a predictive image is generated by the video decoding device 1. As illustrated in part (d) of FIG. 2, the PT information PTI includes pieces of PU information $PUI_1$ to $PUI_{NP}$ (NP represents the total number of PUs included in a target PT) including prediction information and so forth in each PU.

Prediction information PUI includes, in accordance with the prediction method designated by prediction type information Pred_mode, an intra prediction parameter PP_Intra or an inter prediction parameter PP_Inter. Hereinafter, a PU to which intra prediction is applied is also referred to as an intra PU, and a PU to which inter prediction is applied is also referred to as an inter PU.

The inter prediction parameter PP_Inter includes coding parameters which the video decoding device 1 refers to when generating an inter prediction image by performing inter prediction.

The inter prediction parameter PP_Inter includes, for example, a merge flag (merge_flag), a merge index (merge_idx), an estimated motion vector index (mvp_idx), a reference image index (ref_idx), an inter prediction flag (inter_pred_flag), and a motion vector residual (mvd).

The intra prediction parameter PP_Intra includes coding parameters which the video decoding device 1 refers to when generating an intra prediction image by performing intra prediction.

The intra prediction parameter PP_Intra includes, for example, an estimated prediction mode flag, an estimated prediction mode index, and a residual prediction mode index.

The intra prediction parameter may include a PCM mode flag indicating whether or not the PCM mode is to be used. In a case where the PCM mode flag is coded and the PCM mode flag indicates that the PCM mode is to be used, a prediction process (intra), a transform process, and entropy coding are omitted.

[TT Information]

TT information TTI is information regarding a TT included in a CU. In other words, TT information TTI is a set of pieces of information regarding one or plural TUs included in a TT, and is referred to when the video decoding device 1 decodes residual data. Hereinafter, a TU may be referred to as a block.

As illustrated in part (d) of FIG. 2, TT information TTI includes TT split information SP_TU designating a pattern of splitting a target CU into individual transform blocks, and pieces of TU information $TUI_1$ to $TUI_{NT}$ (NT represents the total number of blocks included in the target CU).

Specifically, the TT split information SP_TU is information for determining the shapes and sizes of individual TUs included in the target CU and the positions of the individual TUs in the target CU. For example, the TT_split information SP_TU may be made up of information indicating whether or not a target node is to be split (split_transform_flag) and information representing the depth of split (trafo Depth).

For example, in a case where the size of a CU is 64×64, each TU obtained through split may have a size of 32×32 pixels to 4×4 pixels.

The pieces of TU information $TUI_1$ to $TUI_{NT}$ are individual pieces of information regarding one or plural TUs included in a TT. For example, the TU information TUI includes a quantized prediction residual (also referred to as a quantized residual).

Each quantized prediction residual is coded data that is generated by performing, with the video coding device 2, the following processes 1 to 3 on the target block to be processed.

Process 1: Perform frequency transform (for example, DCT (Discrete Cosine transform)) on a prediction residual obtained by subtracting a prediction image from a target image to be coded;

Process 2: Quantize a transform coefficient obtained in process 1; and

Process 3: Perform variable length coding on the transform coefficient quantized in process 2, in which the above-described quantization parameter qp represents the magnitude of the quantization step QP that is used when the video coding device 2 quantizes a transform coefficient (QP=2qp/6).

(PU Split Type)

The PU split type has the following eight patterns, in a case where the size of a target CU corresponds to 2N×2N pixels: four patterns of symmetric splitting including 2N×2N pixels, 2N×N pixels, N×2N pixels, and N×N pixels, and four patterns of asymmetric splitting including 2N×nU pixels, 2N×nD pixels, nL×2N pixels, and nR×2N pixels. Note that N=2m (m is a certain integer of 1 or more). Hereinafter, regions obtained by splitting a target CU are also referred to as partitions.

Parts (a) to (h) of FIG. 3 specifically illustrate the position of a boundary of PU split in a CU for individual split types.

Part (a) of FIG. 3 illustrates the PU split type of 2N×2N, in which the CU is not split. Parts (b), (c), and (d) of FIG. 3 illustrate the shapes of partitions in cases where the PU split types are 2N×N, 2N×nU, and 2N×nD, respectively. Parts (e), (f), and (g) of FIG. 3 illustrate the shapes of partitions in cases where the PU split types are N×2N, nL×2N, and nR×2N, respectively. Part (h) of FIG. 3 illustrates the shapes of partitions in a case where the PU split type is N×N.

The PU split types illustrated in parts (a) and (h) of FIG. 3 are also referred to as square split, on the basis of the shapes of the partitions. The PU split types illustrated in parts (b) to (g) of FIG. 3 are also referred to as non-square split.

In parts (a) to (h) of FIG. 3, the numbers given in the individual regions represent the identification numbers of the regions. A process is performed on the regions in the order indicated by the identification numbers. That is, the identification numbers represent the scan order of the regions.

[Split Type in Inter Prediction]

In an inter PU, seven split types among the above-described eight types (except N×N (part (h) of FIG. 3)) are defined. The above-described six types of asymmetric splitting may be referred to as AMP (Asymmetric Motion Partition).

A specific value of N is specified by the size of the CU to which the PU belongs, and specific values of nU, nD, nL, and nR are determined in accordance with the value of N. For example, an inter CU of 128×128 pixels can be split into inter PUs of 128×128 pixels, 128×64 pixels, 64×128 pixels, 64×64 pixels, 128×32 pixels, 128×96 pixels, 32×128 pixels, and 96×128 pixels.

[Split Type in Intra Prediction]

In an intra PU, the following two types of split patterns are defined: a split pattern 2N×2N in which a target CU is not split, that is, a target CU is regarded as a single PU; and a pattern N×N in which a target CU is symmetrically split into four PUs. Thus, in an intra PU, in the example illustrated in FIG. 3, split patterns illustrated in parts (a) and (h) can be used. For example, an intra CU of 128×128 pixels can be split into intra PUs of 128×128 pixels and 64×64 pixels.

(TU Split Type)

Next, TU split types will be described with reference to parts (i) to (o) of FIG. 3. The pattern of TU split is determined by the size of a CU, the depth of split (trafoDepth), and the PU split type of a target PU.

The patterns of TU split include square quadtree partitioning and non-square quadtree partitioning.

Parts (i) to (k) of FIG. 3 illustrate partitioning schemes for performing square quadtree partitioning or non-square quadtree partitioning on a square node. More specifically, part (i) of FIG. 3 illustrates a partitioning scheme for performing quadtree partitioning on a square node to form squares. Part (j) of FIG. 3 illustrates a partitioning scheme for performing quadtree partitioning on a square node to form horizontally long rectangles. Part (k) of FIG. 3 illustrates a partitioning scheme for performing quadtree partitioning on a square node to form vertically long rectangles.

Parts (l) to (o) of FIG. 3 illustrate partitioning schemes for performing quadtree partitioning on a non-square node to form squares or non-squares. More specifically, part (l) of FIG. 3 illustrates a partitioning scheme for performing quadtree partitioning on a horizontally long rectangular node to form horizontally long rectangles. Part (m) of FIG. 3 illustrates a partitioning scheme for performing quadtree partitioning on a horizontally long rectangular node to form squares. Part (n) of FIG. 3 illustrates a partitioning scheme for performing quadtree partitioning on a vertically long rectangular node to form vertically long rectangles. Part (o) of FIG. 3 illustrates a partitioning scheme for performing quadtree partitioning on a vertically long rectangular node to form squares.

(Configuration of Quantized Residual Information QD)

FIGS. 4 and 5 illustrate individual syntax elements included in the quantized residual information QD (illustrated as residual_coding_cabac( ) in FIG. 4).

FIG. 4 is a diagram illustrating the first half portion of a syntax table showing syntax elements included in the quantized residual information QD. FIG. 5 is a diagram illustrating the last half portion of the syntax table showing syntax elements included in the quantized residual information QD.

As illustrated in FIGS. 4 and 5, the quantized residual information QD includes syntax elements last_significant_coeff_x, last_significant_coeff_y, significant_coeffgroup_flag, significant_coeff_flag, coeff_abs_level_greater1_flag, coeff_abs_level_greater2_flag, coeff_sign_flag, and coef-f_abs_level_minus3.

The individual syntax elements included in the quantized residual information QD have been coded using context-based adaptive binary arithmetic coding (CABAC).

(Decoding Process in a Case where Block Size is Certain Size or Smaller)

Hereinafter, a description will be given of a procedure of decoding individual syntax elements in a case where the block size is a certain size or smaller with reference to FIGS. 4 to 6. Here, it is assumed that the block size corresponds to 8×8 pixels. The block size that is the certain size or smaller means, for example, 8×8 pixels or 4×4 pixels, but this does not limit the embodiment (the same applies to the following description).

Figure 6:
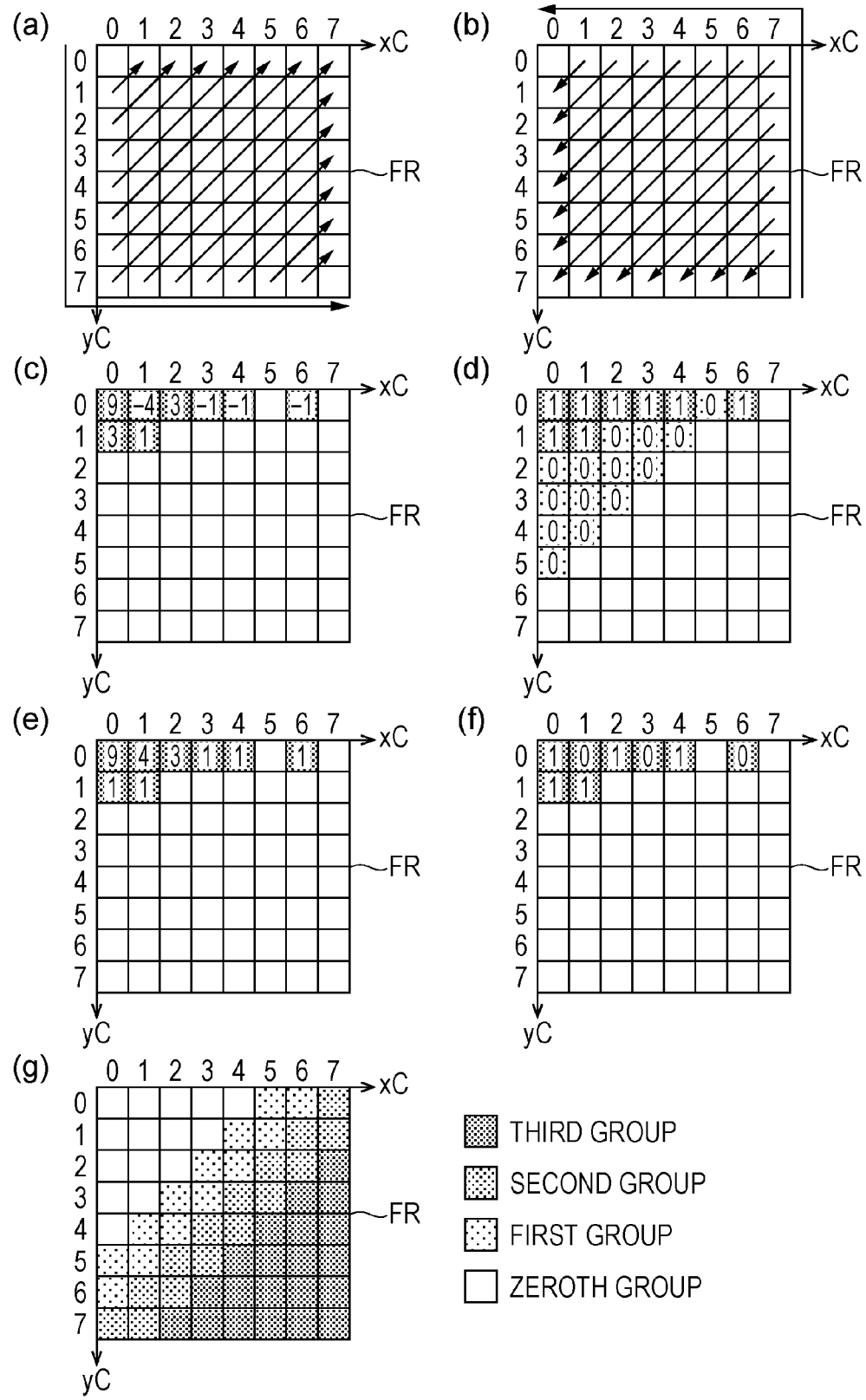
FIG. 6 includes diagrams describing the operation of the quantized residual information decoder according to the embodiment, in which part (a) illustrates processing order in the case of forward scan, part (b) illustrates processing order in the case of reverse scan, part (c) illustrates non-zero transform coefficients in a frequency region to be processed, part (d) illustrates the values of syntax elements significant_coeff_flag in the target frequency region, part (e) illustrates the values obtained by decoding syntax elements coeff_abs_level_greater1_flag, coeff_abs_level_greater2_flag, and coeff_abs_level_minus3 in the target frequency region, and part (f) illustrates the values of syntax elements coeff_sign_flag in the target frequency region.

In parts (a) to (g) of FIG. 6, the horizontal axis represents a horizontal-direction frequency xC ($0 \le xC \le 7$), and the vertical axis represents a vertical-direction frequency yC ($0 \le yC \le 7$). In the following description, among partial regions included in a frequency region, a partial region designated by the horizontal-direction frequency xC and the vertical-direction frequency yC is also referred to as a frequency component (xC, yC). A transform coefficient for the frequency component (xC, yC) is also referred to as Coeff(xC, yC). A transform coefficient Coeff(0, 0) represents a DC component, and the other transform coefficients represent the components other than the DC component. In this description, (xC, yC) may be referred to as (u, v).

Parts (a) and (b) are diagrams illustrating examples of scan order in a frequency region FR made up of 8×8 frequency components.

In the example illustrated in part (a) of FIG. 6, scan is sequentially performed from the low-frequency side (upper left in part (a) of FIG. 6) toward the high-frequency side (lower right in part (a) of FIG. 6). In the example illustrated in part (a) of FIG. 6, scan is performed along the arrows shown in the frequency region FR. The scan order illustrated in part (a) of FIG. 6 may be referred to as forward scan.

On the other hand, in the example illustrated in part (b) of FIG. 6, scan is sequentially performed from the high-frequency side (lower right in part (b) of FIG. 6) toward the low-frequency side (upper left in part (b) of FIG. 6). In the example illustrated in part (b) of FIG. 6, scan is performed along the arrows shown in the frequency region FR. The scan order illustrated in part (b) of FIG. 6 may be referred to as reverse scan.

Part (c) of FIG. 6 is a diagram illustrating an example of transform coefficients that are not zero (non-zero transform coefficients) in a frequency region made up of 8×8 frequency components.

The syntax elements last_significant_coeff_x and last_significant_coeff_y are syntax elements indicating the position of the last non-zero transform coefficient along the forward scan direction. In the example illustrated in part (c) of FIG. 6, last_significant_coeff_x=6, and last_significant_coeff_y=0.

The syntax element significant_coeff_flag is a syntax element that indicates, for each frequency component along the reverse scan direction with a non-zero transform coefficient being the origin, the presence/absence of a non-zero transform coefficient. Part (d) of FIG. 6 illustrates the values of the syntax element significant_coeff_flag in a case where the transform coefficients to be decoded are those illustrated in part (c) of FIG. 6. As illustrated in part (d) of FIG. 6, the syntax element significant_coeff_flag is a flag that indicates, for each xC and yC, 0 if the transform coefficient is equal to 0 and 1 if the transform coefficient is not equal to 0. The syntax element significant_coeff_flag is also referred to as a transform coefficient presence/absence flag.

The syntax element coeff_abs_level_greater1_flag is a flag that indicates whether or not the absolute value of the transform coefficient exceeds 1, and is coded for a frequency component in which the value of the syntax element significant_coeff_flag is equal to 1. In a case where the absolute value of the transform coefficient exceeds 1, the value of coeff_abs_level_greater1_flag is equal to 1, and otherwise the value of coeff_abs_level_greater1_flag is equal to 0.

The syntax element coeff_abs_level_greater2_flag is a flag that indicates whether or not the absolute value of the transform coefficient exceeds 2, and is coded when the value of coeff_abs_level_greater1_flag is equal to 1. In a case where the absolute value of the transform coefficient exceeds 2, the value of coeff_abs_level_greater2_flag is equal to 1, and otherwise the value of coeff_abs_level_greater2_flag is equal to 0.

The syntax element coeff_abs_level_minus3 is a syntax element for, in a case where the absolute value of the transform coefficient is equal to or greater than 3, designating the absolute value of the transform coefficient, and is coded when the value of coeff_abs_level_greater2_flag is equal to 1. The value of the syntax element coeff_abs_level_minus3 is equal to the value obtained by subtracting 3 from the absolute value of the transform coefficient. For example, coeff_abs_level_minus3=1 indicates that the absolute value of the transform coefficient is equal to 4.

Part (e) of FIG. 6 illustrates the absolute values of individual transform coefficients that have been obtained by decoding the syntax elements coeff_abs_level_greater1_flag, coeff_abs_level_greater2_flag, and coeff_abs_level_minus3.

The syntax element coeff_sign_flag is a flag that indicates the sign of the transform coefficient (positive or negative), and is coded for a frequency component in which the value of the syntax element significant_coeff_flag is equal to 1.

Part (f) of FIG. 6 is a diagram illustrating the syntax element coeff_sign_flag in a case where the transform coefficients to be decoded are those illustrated in part (c) of FIG. 6. As illustrated in part (f) of FIG. 6, the syntax element coeff_sign_flag is a flag that indicates 1 in a case where the sign of the transform coefficient is positive and indicates 0 in a case where the sign of the transform coefficient is negative.

A variable length code decoder 11 included in the video decoding device 1 decodes the syntax elements last_significant_coeff_x, last_significant_coeff_y, significant_coeff_flag, coeff_abs_level_greater1_flag, coeff_abs_level_greater2_flag, coeff_sign_flag, and coeff_abs_level_minus3, and is thereby capable of generating transform coefficients Coeff(xC, yC) for individual frequency components.

A set of non-zero transform coefficients in a specific region (for example, TU) may be referred to as "significance map".

Preferably, decoding of the syntax elements coeff_abs_level_greater1_flag, coeff_abs_level_greater2_flag, coeff_sign_flag, and coeff_abs_level_minus3 is sequentially performed, after frequency components in a frequency region have been divided into one or plural partial regions or sub-groups (sub-regions), from a partial region or sub-group on the high-frequency side regardless of the block size. Part (g) of FIG. 6 illustrates an example in which a frequency region made up of 8×8 frequency components is divided into partial regions. In the example illustrated in part (g) of FIG. 6, decoding is performed on the individual partial regions in the order of a third group, a second group, a first group, and a zeroth group.

(Decoding Process in a Case where Block Size is Larger than Certain Size)

In a case where the block size of a target block to be processed is larger than a certain size, the variable length code decoder 11 included in the video decoding device 1 divides the frequency region into a plurality of sub-blocks, and decodes significant_coeff_flag, with each of the sub-blocks being the unit of a process. The quantized residual information QD includes, in units of sub-blocks, a flag indicating whether or not at least one non-zero transform coefficient exists in the sub-block (a sub-block coefficient presence/absence flag significant_coeffgroup_flag). A block size larger than the certain size means, for example, 16×16 pixels, 32×32 pixels, 4×16 pixels, 16×4 pixels, 8×32 pixels, and 32×8 pixels, but this embodiment is not limited thereto (the same applies to the following description).

Hereinafter, a description will be given of a decoding process in a case where the block size is larger than the certain size, with reference to FIGS. 7 and 8.

Figure 7:
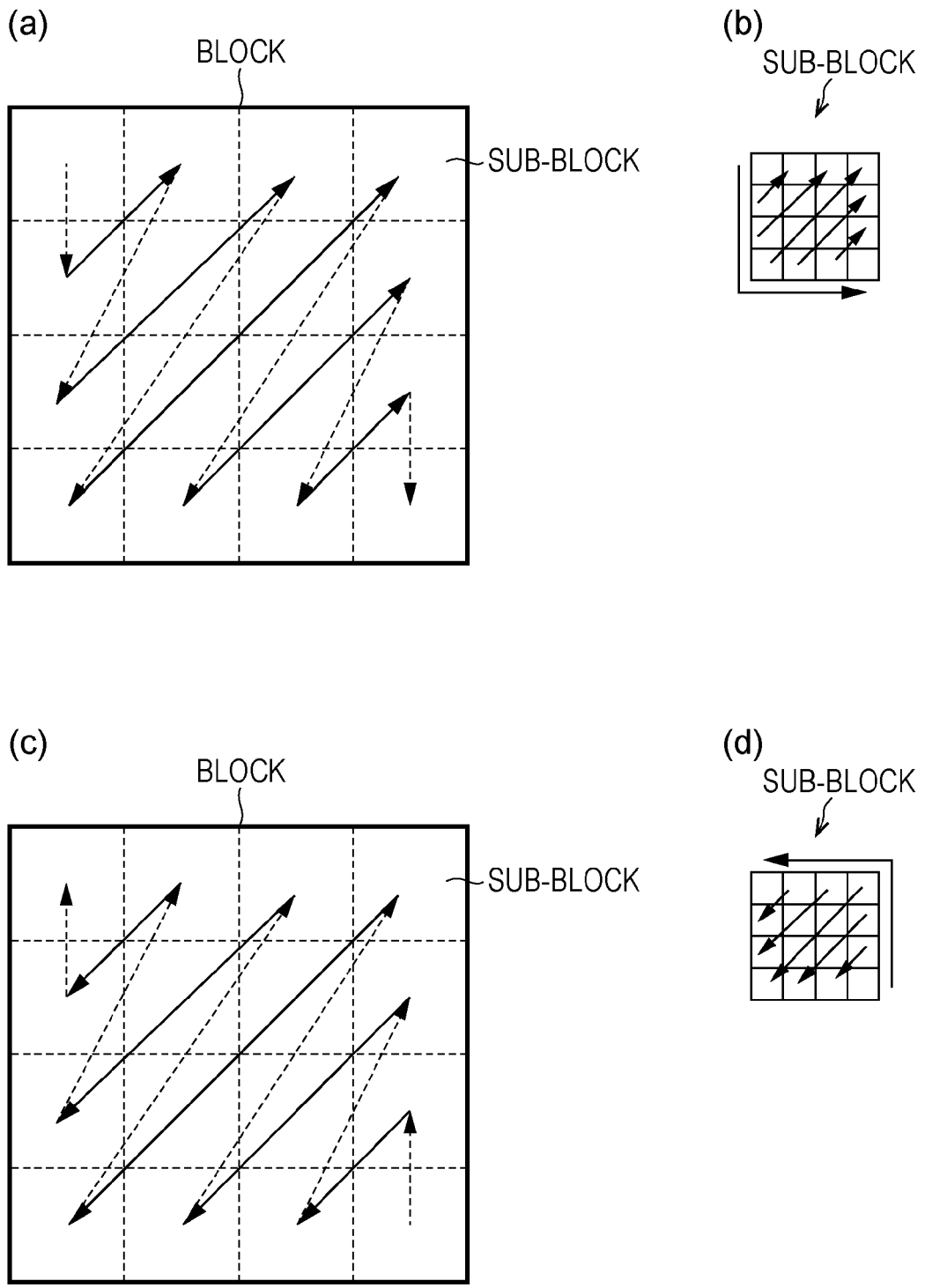
FIG. 7 includes diagrams describing scan order of a decoding process and a coding process according to the embodiment, in which part (a) illustrates a case where sub-block scan is forward scan, (b) illustrates a case where scan in a sub-block is forward scan, (c) illustrates a case where sub-block scan is reverse scan, and (d) illustrates a case where scan in a sub-block is reverse scan.

Part (a) of FIG. 7 is a diagram illustrating the scan order for a plurality of (4×4=16 in part (a) of FIG. 7) sub-blocks that are obtained by dividing a block. Hereinafter, scan that is performed in units of sub-blocks is also referred to as sub-block scan. In a case where scan is performed on sub-blocks as illustrated in part (a) of FIG. 7, scan is performed on the individual frequency regions in the sub-blocks in the scan order illustrated in part (b) of FIG. 7. The scan order illustrated in parts (a) and (b) of FIG. 7 is also referred to as "forward scan".

Part (c) of FIG. 7 is a diagram illustrating the scan order for a plurality of (4×4=16 in part (c) of FIG. 7) sub-blocks obtained by dividing a block. In a case where scan is performed on sub-blocks in the manner illustrated in part (c) of FIG. 7, scan is performed on the individual frequency regions in the sub-blocks in the scan order illustrated in part (d) of FIG. 7. The scan order illustrated in parts (c) and (d) of FIG. 7 is also referred to as "reverse scan".

Figure 8:
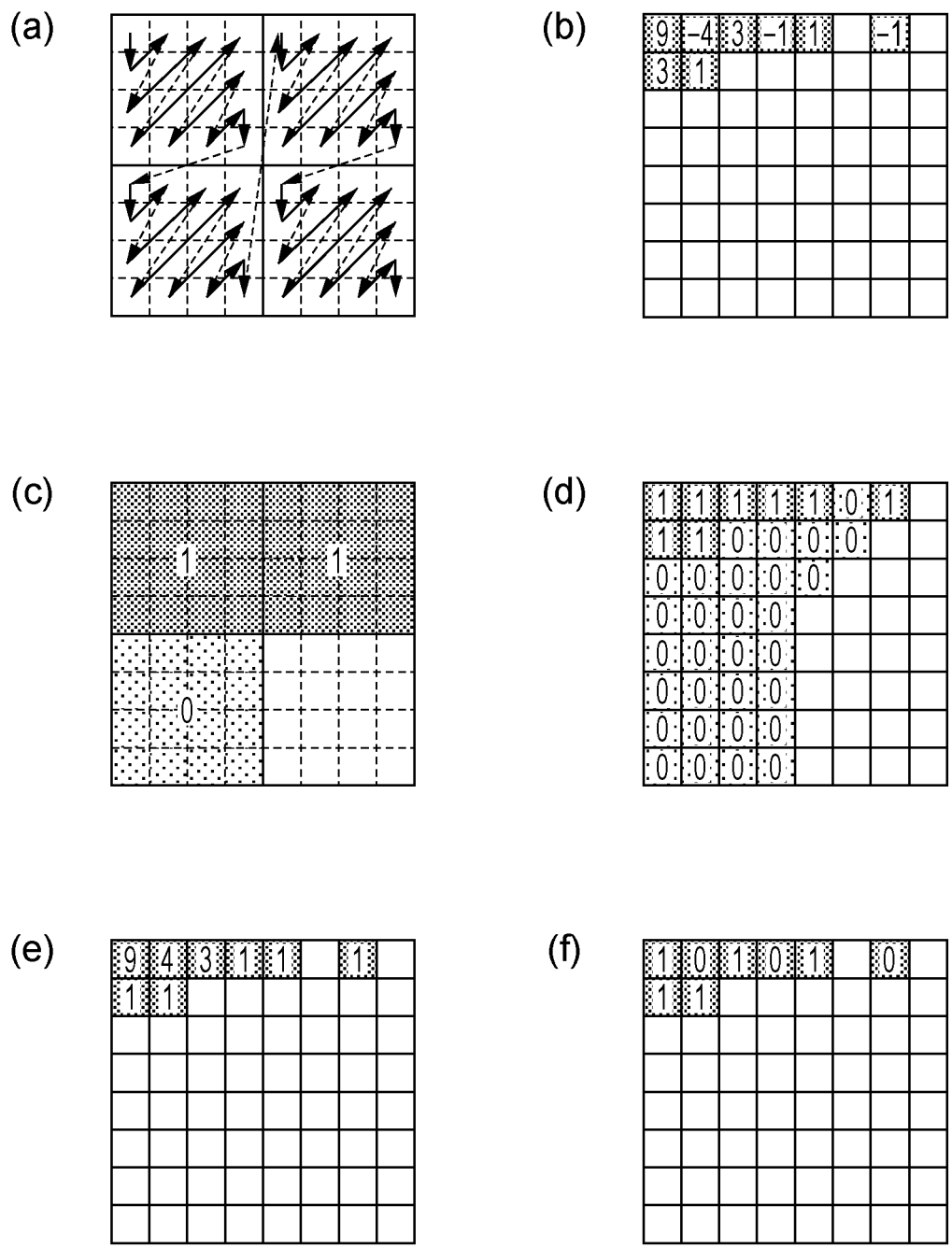
FIG. 8 includes diagrams describing a decoding process of non-zero transform coefficients in the embodiment, in which part (a) illustrates scan order in a case where individual frequency components are scanned by forward scan in a case where a block having a size of 8×8 is divided into sub-blocks each having a size of 4×4, part (b) illustrates transform coefficients that are not zero (non-zero transform coefficients) in a frequency region made up of 8×8 frequency components, part (c) illustrates the individual values of sub-block coefficient presence/absence flags significant_coeffgroup_flag that have been decoded for individual sub-blocks in a case where the target transform coefficients to be decoded are those illustrated in part (b), part (d) illustrates the individual values of syntax elements significant_coeff_flag indicating presence/absence of a non-zero transform coefficient in a case where the target transform coefficients to be decoded are those illustrated in part (b) of FIG. 8, part (e) illustrates the absolute values of individual transform coefficients obtained by decoding syntax elements coeff_abs_level_greater1_flag, coeff_abs_level_greater2_flag, and coeff_abs_level_minus3 in a case where the target transform coefficients to be decoded are those illustrated in part (b), and part (f) illustrates syntax elements coeff_sign_flag in a case where the target transform coefficients to be decoded are those illustrated in part (b).

Part (a) of FIG. 8 is a diagram illustrating the scan order in a case where a block having a size of 8×8 is divided into sub-blocks each having a size of 4×4, and individual frequency components are scanned by forward scan. Parts (a) to (f) of FIG. 8 are diagrams describing a decoding process in a case where a block size is larger than a certain size. For convenience of description, blocks having a size of 8×8 are illustrated as an example.

Part (b) of FIG. 8 is a diagram illustrating an example of transform coefficients that are not zero (non-zero transform coefficients) in a frequency region made up of 8×8 frequency components. In the example illustrated in part (b) of FIG. 8, last_significant_coeff_x=6, and last_significant_coeff_y=0.

Part (c) of FIG. 8 is a diagram illustrating the individual values of sub-block coefficient presence/absence flags significant_coeffgroup_flag that have been decoded for the individual sub-blocks in a case where target transform coefficients to be decoded are those illustrated in part (b) of FIG. 8. The value of significant_coeffgroup_flag for a sub-block including at least one non-zero transform coefficient is equal to 1, whereas the value of significant_coeffgroup_flag for a sub-block including no non-zero transform coefficients is equal to 0.

Part (d) of FIG. 8 is a diagram illustrating the individual values of syntax elements significant_coeff_flag indicating the presence/absence of a non-zero transform coefficient in a case where target transform coefficients to be decoded are those illustrated in part (b) of FIG. 8. For a sub-block in which significant_coeffgroup_flag=1, significant_coeff_flag is decoded in the reverse scan order. For a sub-block in which significant_coeffgroup_flag=0, significant_coeff_flag for the sub-block is not decoded, and significant_coeff_flag for all the frequency components included in the sub-block is set to 0 (the lower left sub-block in part (d) of FIG. 8).

Part (e) of FIG. 8 illustrates the absolute values of individual transform coefficients that have been obtained by decoding the syntax elements coeff_abs_level_greater1_flag, coeff_abs_level_greater2_flag, and coeff_abs_level_minus3 in a case where target transform coefficients to be decoded are those illustrated in part (b) of FIG. 8.

Part (f) of FIG. 8 is a diagram illustrating the syntax elements coeff_sign_flag in a case where target transform coefficients to be decoded are those illustrated in part (b) of FIG. 8.

The details of a process of decoding various syntax elements will be described below. Now, the configuration of the video decoding device 1 will be described.

(Video Decoding Device 1)

Hereinafter, the video decoding device 1 according to this embodiment will be described with reference to FIGS. 1 and 9 to 51. The video decoding device 1 is a decoding device that is compatible with a technology adopted for the standard of H.264/MPEG-4 AVC, a technology adopted for KTA software, which is a codec for joint development in VCEG (Video Coding Expert Group), a technology adopted for TMuC (Test Model under Consideration) software, and a technology suggested by HEVC (High-Efficiency Video Coding), which is a succeeding codec of the foregoing technologies.

Figure 9:
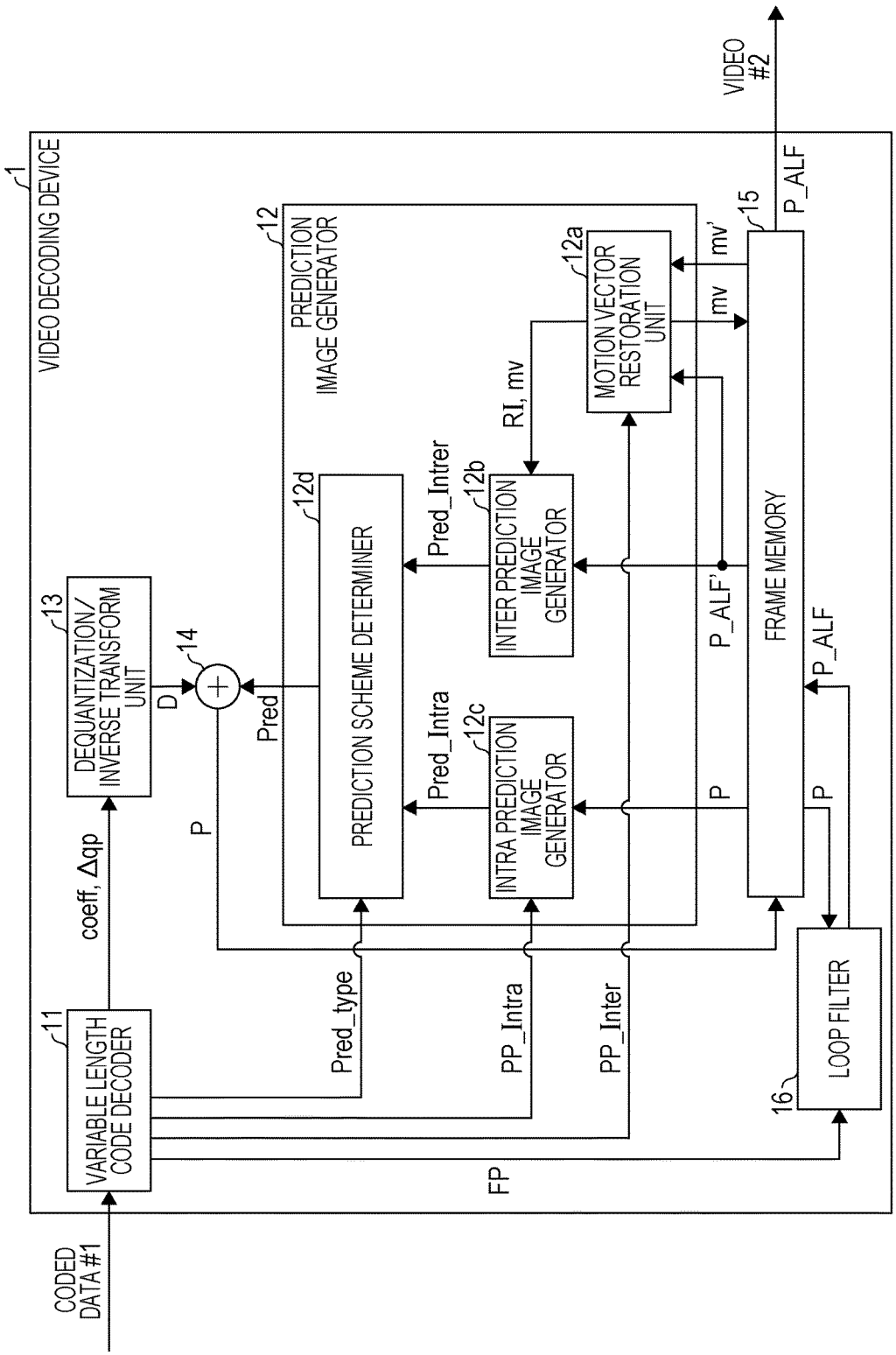
FIG. 9 is a block diagram illustrating the configuration of the video decoding device according to the embodiment.

FIG. 9 is a block diagram illustrating the configuration of the video decoding device 1. As illustrated in FIG. 9, the video decoding device 1 includes a variable length code decoder 11, a prediction image generator 12, a dequantization/inverse transform unit 13, an adder 14, a frame memory 15, and a loop filter 16. Also, as illustrated in FIG. 9, the prediction image generator 12 includes a motion vector restoration unit 12a, an inter prediction image generator 12b, an intra prediction image generator 12c, and a prediction scheme determiner 12d. The video decoding device 1 is a device for decoding coded data #1 to generate video #2.

(Variable Length Code Decoder 11)

Figure 10:
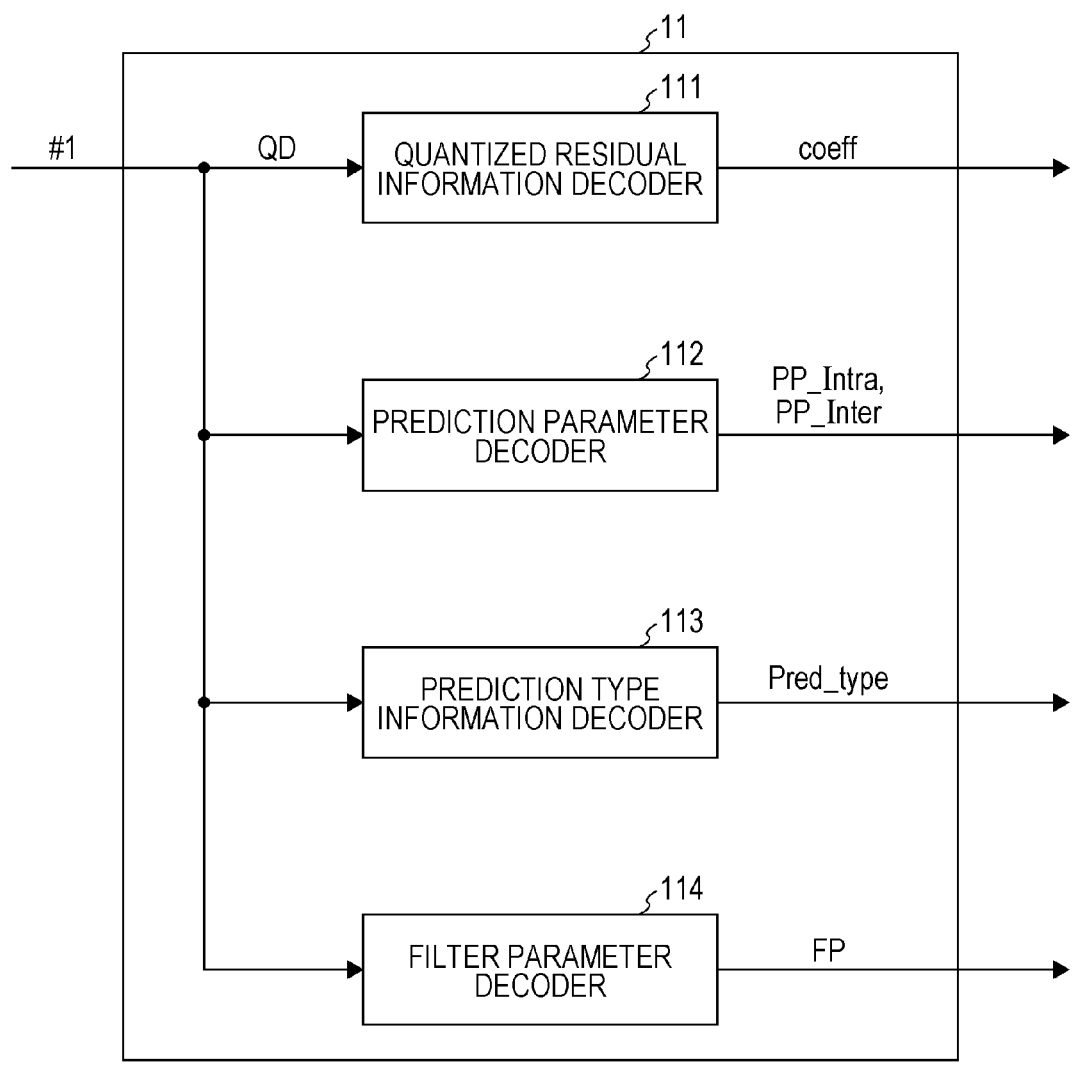
FIG. 10 is a block diagram illustrating the configuration of a variable length code decoder included in the video decoding device according to the embodiment.

FIG. 10 is a block diagram illustrating the configuration of the main part of the variable length code decoder 11. As illustrated in FIG. 10, the variable length code decoder 11 includes a quantized residual information decoder 111, a prediction parameter decoder 112, a prediction type information decoder 113, and a filter parameter decoder 114.

The variable length code decoder 11 decodes, in the prediction parameter decoder 112, the coded data #1 to obtain prediction parameters PP related to individual partitions, and supplies them to the prediction image generator 12. Specifically, the prediction parameter decoder 112 decodes, regarding an inter prediction partition, the coded data #1 to obtain an inter prediction parameter PP_Inter including a reference image index, an estimated motion vector index, and a motion vector residual, and supplies them to the motion vector restoration unit 12a. On the other hand, regarding an intra prediction partition, the prediction parameter decoder 112 decodes the coded data #1 to obtain an intra prediction parameter PP_Intra including an estimated prediction mode flag, an estimated prediction mode index, and a residual prediction mode index, and supplies them to the intra prediction image generator 12c.

The variable length code decoder 11 decodes, in the prediction type information decoder 113, the coded data #1 to obtain prediction type information Pred_type regarding each partition, and supplies it to the prediction scheme determiner 12d. Further, the variable length code decoder 11 decodes, in the quantized residual information decoder 111, the coded data #1 to obtain quantized residual information QD related to a block, and a quantized parameter difference Δqp related to a TU including the block, and supplies them to the dequantization/inverse transform unit 13. Also, the variable length code decoder 11 decodes, in the filter parameter decoder 114, the coded data #1 to obtain a filter parameter FP, and supplied it to the loop filter 16. The specific configuration of the quantized residual information decoder 111 will be described below, and thus the description thereof is omitted here.

(Prediction Image Generator 12)

The prediction image generator 12 identifies, on the basis of the prediction type information Pred_type regarding each partition, whether the partition is an inter prediction partition on which inter prediction is to be performed or an intra prediction partition on which intra prediction is to be performed. In the former case, the prediction image generator 12 generates an inter prediction image Pred_Inter, and supplies the generated inter prediction image Pred_Inter, which is a prediction image Pred, to the adder 14. In the latter case, the prediction image generator 12 generates an intra prediction image Pred_Intra, and supplies the generated intra prediction image Pred_Intra to the adder 14. In a case where a skip mode is applied to the target PU to be processed, the prediction image generator 12 omits decoding of the other parameters belonging to the PU.

(Motion Vector Restoration Unit 12a)

The motion vector restoration unit 12a restores a motion vector my related to each inter prediction partition by using the motion vector residual related to the partition and the restored motion vectors mv' related to the other partitions. Specifically, the motion vector restoration unit 12a obtains the motion vector my by (1) deriving an estimated motion vector from restored motion vectors mv' in accordance with the estimation method indicated by an estimated motion vector index, and (2) adding the derived estimated motion vector and the motion vector residual. The restored motion vectors mv' related to the other partitions can be read from the frame memory 15. The motion vector restoration unit 12a supplies the restored motion vector my to the inter prediction image generator 12b together with the corresponding reference image index RI.

(Inter Prediction Image Generator 12b)

The inter prediction image generator 12b generates a motion compensation image mc related to each inter prediction partition, by using inter prediction. Specifically, the inter prediction image generator 12b generates a motion compensation image mc from an adaptive filtered decoded image P_ALF' indicated by a reference image index RI supplied from the motion vector restoration unit 12a, by using the motion vector my supplied from the motion vector restoration unit 12a. Here, the adaptive filtered decoded image P_ALF' is an image obtained by performing a filter process by the loop filter 16 on a decoded image on which decoding over the entire frame has been completed. The inter prediction image generator 12b can read out pixel values of individual pixels constituting the adaptive filtered decoded image P_ALF' from the frame memory 15. The motion compensation image mc generated by the inter prediction image generator 12b is supplied as an inter prediction image Pred_Inter to the prediction scheme determiner 12d.

(Intra Prediction Image Generator 12c)

The intra prediction image generator 12c generates a prediction image Pred_Intra related to each intra prediction partition. Specifically, the intra prediction image generator 12c first specifies a prediction mode on the basis of the intra prediction parameter PP_Intra supplied from the variable length decoder 11, and assigns the specified prediction mode to target partitions, for example, in raster scan order.

Here, specification of a prediction mode based on the intra prediction parameter PP_Intra can be performed in the following manner. (1) An estimated prediction mode flag is decoded. In a case where the estimated prediction mode flag indicates that the prediction mode for the target partition to be processed is the same as the prediction mode assigned to a partition around the target partition, the prediction mode assigned to the partition around the target partition is assigned to the target partition. (2) On the other hand, in a case where the estimated prediction mode flag indicates that the prediction mode for the target partition to be processed is not the same as the prediction mode assigned to the partition around the target partition, the residual prediction mode index is decoded, and the prediction mode indicated by the residual prediction mode index is assigned to the target partition.

The intra prediction image generator 12c generates a prediction image Pred_Intra from a (locally) decoded image P using intra prediction in accordance with the prediction method indicated by the prediction mode assigned to the target partition. The intra prediction image Pred_Intra generated by the intra prediction image generator 12c is supplied to the prediction scheme determiner 12d. The intra prediction image generator 12c may be configured to generate a prediction image Pred_Intra from an adaptive filtered decoded image P_ALF by using intra prediction.

Figures 11, 12:
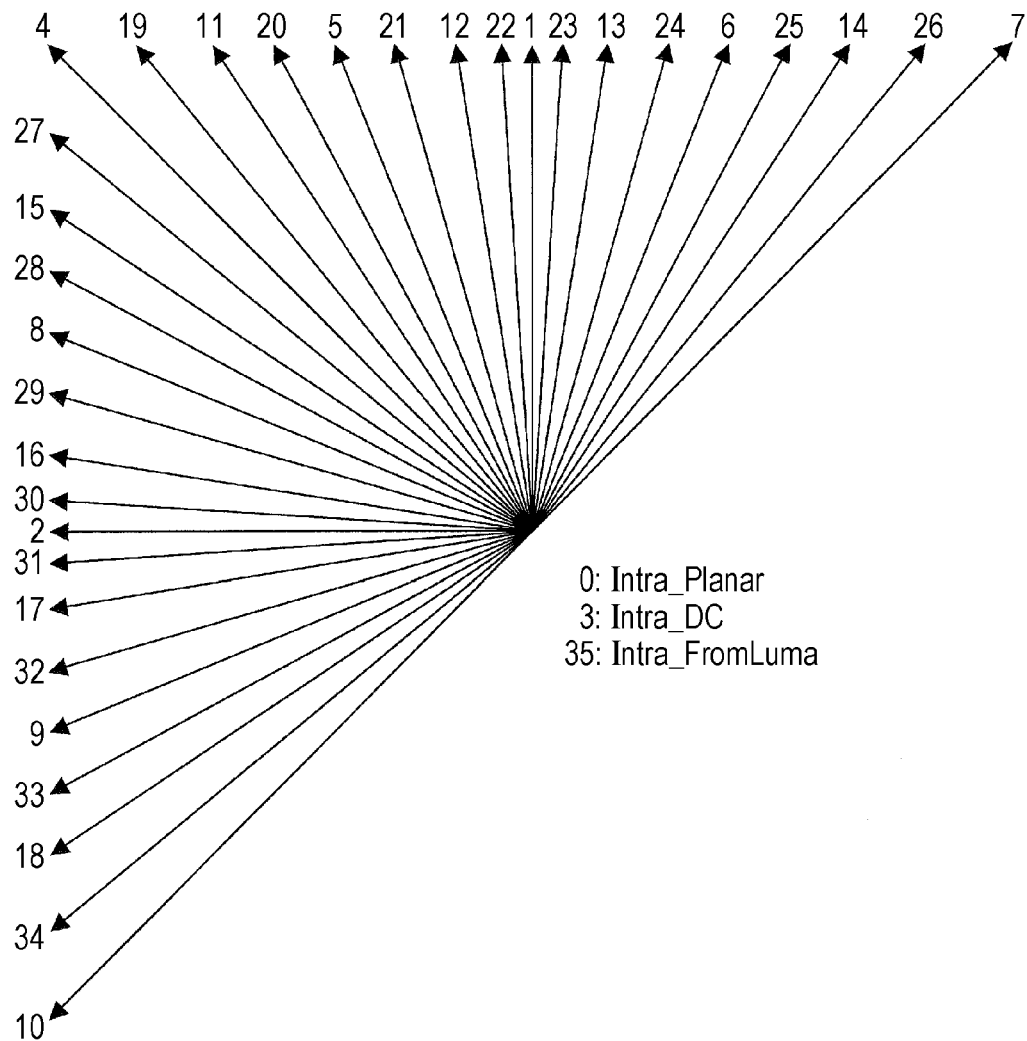
FIG. 11 is a diagram illustrating directions of intra prediction that can be used in the video decoding device according to the embodiment.
FIG. 12 is a diagram illustrating intra prediction modes and the names associated with the intra prediction modes.

The definition of prediction modes will be described with reference to FIG. 11. FIG. 11 illustrates the definition of prediction modes. As illustrated in FIG. 11, 36 types of prediction modes are defined, and the individual prediction modes are specified by the numbers "0" to "35" (intra prediction mode index). Also, as illustrated in FIG. 12, the following names are assigned to the individual prediction modes. That is, "0" corresponds to "Intra_Planar (planar prediction mode)", "1" corresponds to "Intra Vertical (intra vertical prediction mode)", "2" corresponds to "Intra Horizontal (intra horizontal prediction mode)", "3" corresponds to "Intra DC (Intra DC prediction mode)", "4" to "34" correspond to "Intra Angular (direction prediction)", and "35" corresponds to "Intra From Luma". "35" is specific to a chrominance prediction mode, and is a mode for predicting chrominance on the basis of prediction of luminance. In other words, the chrominance prediction mode "35" is a prediction mode in which the correlation between a luminance pixel value and a chrominance pixel value is utilized. The chrominance prediction mode "35" is also referred to as an LM mode.

The number of prediction modes is specified depending on the size of a target block. FIG. 13 illustrates the relationship between logarithm values of the size of a target block (log 2TrafoSize) and prediction mode numbers (intraPredModeNum).

As illustrated in FIG. 13, in a case where log 2TrafoSize is "2", intraPredModeNum is "18". In cases where log 2TrafoSize is "3", "4", "5", and "6", intraPredModeNum is "35".

(Prediction Scheme Determiner 12d)

The prediction scheme determiner 12d determines, on the basis of prediction type information Pred_type regarding a PU to which each partition belongs, whether each partition is an inter prediction partition on which inter prediction is to be performed or an intra prediction partition on which intra prediction is to be performed. In the former case, the prediction scheme determiner 12d supplies the inter prediction image Pred_Inter generated by the inter prediction image generator 12b as a prediction image Pred to the adder 14. In the latter case, the prediction scheme determiner 12d supplies the intra prediction image Pred_Intra generated by the intra prediction image generator 12c as a prediction image Pred to the adder 14.

(Dequantization/Inverse Transform Unit 13)

The dequantization/inverse transform unit 13 (1) dequantizes a transform coefficient Coeff that has been obtained by decoding the quantized residual information QD of the coded data #1, (2) performs inverse frequency transform, such as inverse DCT (Discrete Cosine Transform) on a transform coefficient Coeff IQ obtained through dequantization, and (3) supplies a prediction residual D obtained through inverse frequency transform to the adder 14. In the case of dequantizing the transform coefficient Coeff that has been obtained by decoding the quantized residual information QD, the dequantization/inverse transform unit 13 derives a quantization step QP from the quantization parameter difference Δqp supplied from the variable length code decoder 11. A quantization parameter qp can be derived by adding the quantization parameter difference Δqp to a quantization parameter qp' related to the TU on which dequantization and inverse frequency transform have been performed immediately previously, and the quantization step QP can be derived from the quantization parameter qp by using, for example, QP=2qp/6. Generation of a prediction residual D by the dequantization/inverse transform unit 13 is performed in units of TUs or in units of blocks obtained by dividing a TU.

In a case where the size of a target block corresponds to 8×8 pixels, for example, inverse DCT performed by the dequantization/inverse transform unit 13 is given by, for example, the following equation (1), when it is assumed that the position of a pixel in the target block is (i, j) (0≤i≤7, 0≤j≤7), the value of the prediction residual D at the position (i, j) is represented by D(i, j), and a dequantized transform coefficient in a frequency component (u, v) (0≤u≤7, 0≤v≤7) is represented by Coeff_IQ (u, v).

[Math. 1]

$$D(i,\ j) = \frac{1}{4}\sum_{u=0}^{7}\sum_{v=0}^{7}C(u)C(v)\text{Coeff\_IQ}(u,\ v)\cos\left\{\frac{(2i+1)u\pi}{16}\right\}\cos\left\{\frac{(2j+1)v\pi}{16}\right\} \quad (1)$$

Here, (u, v) is a variable corresponding to the above-described (xC, yC). C(u) and C(v) are given as follows.

$C(u)=1/\sqrt{2}(u=0)$ $C(u)=1(u\neq 0)$ $C(v)=1/\sqrt{2}(v=0)$ $C(v)=1(v\neq 0)$ (Adder 14)

The adder 14 adds the prediction image Pred supplied from the prediction image generator 12 and the prediction residual D supplied from the dequantization/inverse transform unit 13, and thereby generates a decoded image P. The generated decoded image P is stored in the frame memory 15.

(Loop Filter 16)

The loop filter 16 has (1) a function as a deblocking filter (DF) that performs smoothing (deblocking process) on an image near a block boundary or partition boundary in a decoded image P and (2) a function as an adaptive loop filter (ALF) that performs an adaptive filter process using a filter parameter FP on an image processed by using the deblocking filter.

(Quantized Residual Information Decoder 111)

The quantized residual information decoder 111 is configured to decode the quantized residual information QD included in the coded data #1 to obtain a quantized transform coefficient Coeff(xC, yC) for each frequency component (xC, yC). Here, xC and yC are indices indicating the position of each frequency component in a frequency region, and are indices corresponding to the above-described horizontal-direction frequency u and vertical-direction frequency v, respectively. The various syntax elements included in the quantized residual information QD have been coded using context-based adaptive binary arithmetic coding (CABAC). Hereinafter, a quantized transform coefficient Coeff may be simply referred to as a transform coefficient Coeff.

FIG. 1 is a block diagram illustrating the configuration of the quantized residual information decoder 111. As illustrated in FIG. 1, the quantized residual information decoder 111 includes a transform coefficient decoder 120 and an arithmetic code decoder 130.

(Arithmetic Code Decoder 130)

The arithmetic code decoder 130 is configured to decode each bit included in the quantized residual information QD by referring to a context, and includes a context recording/updating unit 131 and a bit decoder 132, as illustrated in FIG. 1.

(Context Recording/Updating Unit 131)

The context recording/updating unit 131 is configured to record and update a context variable CV managed by each context index ctxIdx. Here, the context variable CV includes (1) a most probable symbol (MPS) having a high probability of occurrence and (2) a probability state index pStateIdx indicating the probability of occurrence of the most probable symbol MPS.

The context recording/updating unit 131 updates the context variable CV by referring to the context index ctxIdx supplied from each unit of the transform coefficient decoder 120 and the value of Bin decoded by the bit decoder 132, and records the updated context variable CV until it is updated next time. The most probable symbol MPS is 0 or 1. The most probable symbol MPS and the probability state index pStateIdx are updated every time the bit decoder 132 decodes one Bin.

The context index ctxIdx may directly indicate the context for each frequency component, or may be an incrementation value from an offset of the context index that is set for each target TU to be processed (the same applies to the following description).

(Bit Decoder 132)

The bit decoder 132 refers to the context variable CV that is recorded by the context recording/updating unit 131, and decodes each bit (also referred to as Bin) included in the quantized residual information QD. Also, the bit decoder 132 supplies the value of Bin obtained through decoding to each unit included in the transform coefficient decoder 120. The value of Bin obtained through decoding is also supplied to the context recording/updating unit 131, and is referred to for updating the context variable CV.

(Transform Coefficient Decoder 120)

As illustrated in FIG. 1, the transform coefficient decoder 120 includes a last coefficient position decoder 121, a scan order table memory 122, a coefficient decoding controller 123, a coefficient presence/absence flag decoder, a coefficient value decoder 125, a decoded coefficient memory 126, and a sub-block coefficient presence/absence flag decoder 127.

(Last Coefficient Position Decoder 121)

The last coefficient position decoder 121 interprets a decoded bit (Bin) supplied from the bit decoder 132 and decodes syntax elements last_significant_coeff_x and last_significant_coeff_y. The decoded syntax elements last_significant_coeff_x and last_significant_coeff_y are supplied to the coefficient decoding controller 123. Also, the last coefficient position decoder 121 calculates a context index ctxIdx for determining a context that is to be used for decoding Bin of the syntax elements last_significant_coeff_x and last_significant_coeff_y in the arithmetic code decoder 130. The calculated context index ctxIdx is supplied to the context recording/updating unit 131.

(Scan Order Table Memory 122)

The scan order table memory 122 stores a table that gives the position of the target frequency component to be processed in a frequency region, with the size of the target TU (block) to be processed, a scan index representing the type of scan direction, and a frequency component identification index given along scan order being arguments.

An example of such a scan order table is ScanOrder illustrated in FIGS. 4 and 5. In ScanOrder illustrated in FIGS. 4 and 5, log 2TrafoSize−2 represents the size of the target TU to be processed, scanIdx represents a scan index, and n represents a frequency component identification index given along scan order. In FIGS. 4 and 5, xC and yC represent the position of the target frequency component to be processed in the frequency region.

The table stored in the scan order table memory 122 is indicated by a scan index scanIndex associated with the size of the target TU (block) to be processed and the prediction mode index of the intra prediction mode. In a case where the prediction method used for the target TU to be processed is intra prediction, the coefficient decoding controller 123 determines the scan order of frequency components by referring to the table indicated by the scan index scanIndex associated with the size of the TU and the prediction mode of the TU.

FIG. 14 illustrates an example of scan indices scanIndex designated by the intra prediction mode index IntraPred-Mode and individual values of the syntax element log 2TrafoSize−2 that designates a block size. In FIG. 14, log 2TrafoSize−2=0 indicates that the block size corresponds to 4×4 components (4×4 pixels), whereas log 2TrafoSize−2=1 indicates that the block size corresponds to 8×8 components (8×8 pixels). As illustrated in FIG. 14, for example, in a case where the block size corresponds to 4×4 components and the intra prediction mode index is 1, the scan index=1 is used, and in a case where the block size corresponds to 4×4 components and the intra prediction mode index is 2, the scan index=2 is used.

Part (a) of FIG. 15 illustrates the scan types ScanType indicated by individual values of the scan index scanIndex. As illustrated in part (a) of FIG. 15, in a case where the scan index is equal to 0, diagonal-direction scan (Up-right diagonal scan) is designated, in a case where the scan index is equal to 1, horizontal-direction priority scan (horizontal fast scan) is designated, and in a case where the scan index is equal to 2, vertical-direction priority scan (vertical fact scan) is designated.

Part (b) of FIG. 15 illustrates the scan orders of horizontal-direction priority scan (horizontal fast scan), vertical-direction priority scan (vertical fact scan), and diagonal-direction scan (Up-right diagonal scan) in a case where the block size corresponds to 4×4 components. In part (b) of FIG. 15, the numbers assigned to the individual frequency components represent the order in which the frequency components are scanned. The individual examples illustrated in part (b) of FIG. 15 show forward scan directions.

(Sub-Block Scan Order Table)

The scan order table memory 122 stores a sub-block scan order table for designating the scan order of sub-blocks. The sub-block scan order table is designated by a scan index scanIndex associated with the size of the target TU (block) to be processed and the prediction mode index (prediction direction) of the intra prediction mode. In a case where the prediction method used for the target TU to be processed is intra prediction, the coefficient decoding controller 123 determines the scan order of sub-blocks by referring to the table indicated by the scan index scanIndex associated with the size of the TU and the prediction mode of the TU.

FIG. 16 illustrates an example of sub-block scan indices scanIndex that are designated by the intra prediction mode index IntraPredMode and individual values of the syntax element log 2TrafoSize−2 that designates a block size. In FIG. 16, log 2TrafoSize−2=2 indicates that the block size corresponds to 16×16 components (16×16 pixels), log 2TrafoSize−2=3 indicates that the block size corresponds to 32×32 components (32×32 pixels), and log 2TrafoSize−2=4 indicates that the block size corresponds to 64×64 components (64×64 pixels). As illustrated in FIG. 16, for example, in a case where the block size corresponds to 16×16 components and the intra prediction mode index is equal to 1, the sub-block scan index=1 is used, and in a case where the block size corresponds to 32×32 components and the intra prediction mode index is equal to 2, the sub-block scan index=2 is used.

In a case where the block size corresponds to 4×16 components or 16×4 components, the sub-block scan index that is designated in a case where the block size corresponds to 16×16 components may be used. In a case where the block size corresponds to 8×32 components or 32×8 components, the sub-block scan index that is designated in a case where the block size corresponds to 32×32 components may be used (the same applies to the following description).

Part (a) of FIG. 17 illustrates the sub-block scan types ScanType that are indicated by the individual values of sub-block scan indices scanIndex. As illustrated in part (a) of FIG. 17, in a case where the sub-block scan index is equal to 0, diagonal-direction scan (Up-right diagonal scan) is designated, in a case where the sub-block scan index is equal to 1, horizontal-direction priority scan (horizontal fast scan) is designated, and in a case where the sub-block scan index is equal to 2, vertical-direction priority scan (vertical fast scan) is designated.

Part (b) of FIG. 17 illustrates the scan orders of horizontal-direction priority scan (horizontal fast scan), vertical-direction priority scan (vertical fact scan), and diagonal-direction scan (Up-right diagonal scan) for individual sub-blocks of 4×4 components in a case where the block size corresponds to 16×16 components. In part (b) of FIG. 17, the numbers assigned to the individual sub-blocks represent the order in which the sub-blocks are scanned. The individual examples illustrated in part (b) of FIG. 17 show forward scan directions.

An example of scan order indices for designating the scan order of sub-blocks is not limited to that illustrated in FIG. 16. For example, the scan order indices illustrated in FIG. 18 or FIG. 59 may be used. The scan types indicated by the individual values of the scan order indices illustrated in FIG. 18 or FIG. 59 are the same as those illustrated in parts (a) and (b) of FIG. 17.

In the examples illustrated in FIGS. 16, 18, and 59, the same scan index is designated for a case where the block size corresponds to 16×16 components, a case where the block size corresponds to 32×32 components, and a case where the block size corresponds to 64×64 components. This does not limit this embodiment. Even if the intra prediction mode is the same, different scan indices may be designated in accordance with a block size.

(Coefficient Decoding Controller 123)

The coefficient decoding controller 123 is configured to control the order of a decoding process in each unit included in the quantized residual information decoder 111.

(In a Case where Block Size is Certain Size or Smaller)

In a case where the block size is a certain size or smaller, the coefficient decoding controller 123 refers to the syntax elements last_significant_coeff_x and last_significant_coeff_y supplied from the last coefficient position decoder 121, specifies the position of the last non-zero transform coefficient along forward scan, and supplies the positions (xC, yC) of individual frequency components to the coefficient presence/absence flag decoder 124 and the decoding coefficient memory 126 in the reverse order of the scan order in which the specified position of the last non-zero transform coefficient is the origin and which is given by the scan order table stored in the scan order table memory 122.

Also, the coefficient decoding controller 123 supplies sz, which is a parameter indicating the size of the target TU to be processed, that is, the size of a target frequency region, to each unit included in the transform coefficient decoder 120 (not illustrated). Here, sz is specifically a parameter representing the number of pixels along one side of the target TU to be processed, that is, the number of frequency components along one side of the target frequency region.

The coefficient decoding controller 123 may be configured to supply the positions (xC, yC) of individual frequency components to the coefficient presence/absence flag decoder in the forward scan order of the scan order given by the scan order table stored in the scan order table memory 122.

(In a Case where Block Size is Larger than Certain Size)

In a case where the block size is larger than the certain size, the coefficient decoding controller 123 refers to the syntax elements last_significant_coeff_x and last_significant_coeff_y supplied from the last coefficient position decoder 121, specifies the position of the last non-zero transform coefficient along forward scan, and supplies the positions (xCG, yCG) of individual sub-blocks to the sub-block coefficient presence/absence flag decoder 127 in the reverse scan order of the scan order in which the position of the sub-block including the specified last non-zero transform coefficient is the origin and which is given by the sub-block scan order table stored in the scan order table memory 122.

Also, the coefficient decoding controller 123 supplies, regarding the target sub-block to be processed, the positions (xC, yC) of individual frequency components included in the target sub-block to be processed to the coefficient presence/absence flag decoder 124 and the decoding coefficient memory 126 in the reverse scan order of the scan order given by the scan order table stored in the scan order table memory 122. Here, as the scan order of the individual frequency components included in the target sub-block to be processed, diagonal-direction scan (Up-right diagonal scan) may be specifically used.

In this way, the coefficient decoding controller 123 is configured to, in a case where the prediction scheme applied to the target unit region to be processed (block, TU) is intra prediction, set sub-block scan order in accordance with the prediction direction of the intra prediction.

In general, there is a correlation between an intra prediction mode and bias of transform coefficients. Thus, sub-block scan that is suitable for bias of sub-block coefficient presence/absence flags can be performed by switching the scan order in accordance with an intra prediction mode. Accordingly, the amount of codes of sub-block coefficient presence/absence flags to be coded and decoded can be reduced, and thus the amount of processing is reduced and the coding efficiency is increased.

(Sub-Block Coefficient Presence/Absence Flag Decoder 127)

The sub-block coefficient presence/absence flag decoder 127 interprets each Bin supplied from the bit decoder 132, and decodes a syntax element significant_coeffgroup_flag [xCG][yCG] designated by each sub-block position (xCG, yCG). Also, the sub-block coefficient presence/absence flag decoder 127 calculates a context index ctxIdx for determining a context that is to be used by the arithmetic code decoder 130 to decode Bin of the syntax element significant_coeffgroup_flag[xCG][yCG]. The calculated context index ctxIdx is supplied to the context recording/updating unit 131. Here, the syntax element significant_coeffgroup_flag[xCG][yCG] is a syntax element that takes 1 in a case where the sub-block designated by the sub-block position (xCG, yCG) includes at least one non-zero transform coefficient, and that takes 0 in a case where the sub-block designated by the sub-block position (xCG, yCG) includes no non-zero transform coefficients. The value of the decoded syntax element significant_coeffgroup_flag[xCG][yCG] is stored in the decoded coefficient memory 126.

The more specific configuration of the sub-block coefficient presence/absence flag decoder 127 will be described below.

(Coefficient Presence/Absence Flag Decoder 124)

The coefficient presence/absence flag decoder 124 according to this embodiment decodes a syntax element significant_coeff_flag[xC][yC] designated by each coefficient position (xC, yC). The value of the decoded syntax element significant_coeff_flag[xC][yC] is stored in the decoding coefficient memory 126. Also, the coefficient presence/absence flag decoder 124 calculates a context index ctxIdx for determining a context that is to be used by the arithmetic code decoder 130 to decode Bin of the syntax element significant_coeff_flag[xC][yC]. The calculated context index ctxIdx is supplied to the context recording/updating unit 131. The specific configuration of the coefficient presence/absence flag decoder 124 will be described below.

(Coefficient Value Decoder 125)

The coefficient value decoder 125 interprets each Bin supplied from the bit decoder 132, decodes the syntax elements coeff_abs_level_greater1_flag, coeff_abs_level_greater2_flag, coeff_sign_flag, and coeff_abs_level_minus3, and derives the value of a transform coefficient (more specifically, non-zero transform coefficient) in the target frequency component to be processed, on the basis of the result of decoding these syntax elements. The context index ctxIdx used to decode various syntax elements is supplied to the context recording/updating unit 131. The derived value of the transform coefficient is stored in the decoded coefficient memory 126.

(Decoded Coefficient Memory 126)

The decoded coefficient memory 126 is configured to store individual values of transform coefficients decoded by the coefficient value decoder 125. Also, the decoded coefficient memory 126 stores individual values of syntax elements significant_coeff_flag decoded by the coefficient presence/absence flag decoder 124. The individual values of transform coefficients stored by the decoded coefficient memory 126 are supplied to the dequantization/inverse transform unit 13.

(Example Configuration of Sub-Block Coefficient Presence/Absence Flag Decoder 127)

Hereinafter, a specific example configuration of the sub-block coefficient presence/absence flag decoder 127 will be described with reference to FIG. 19.

Figure 19:
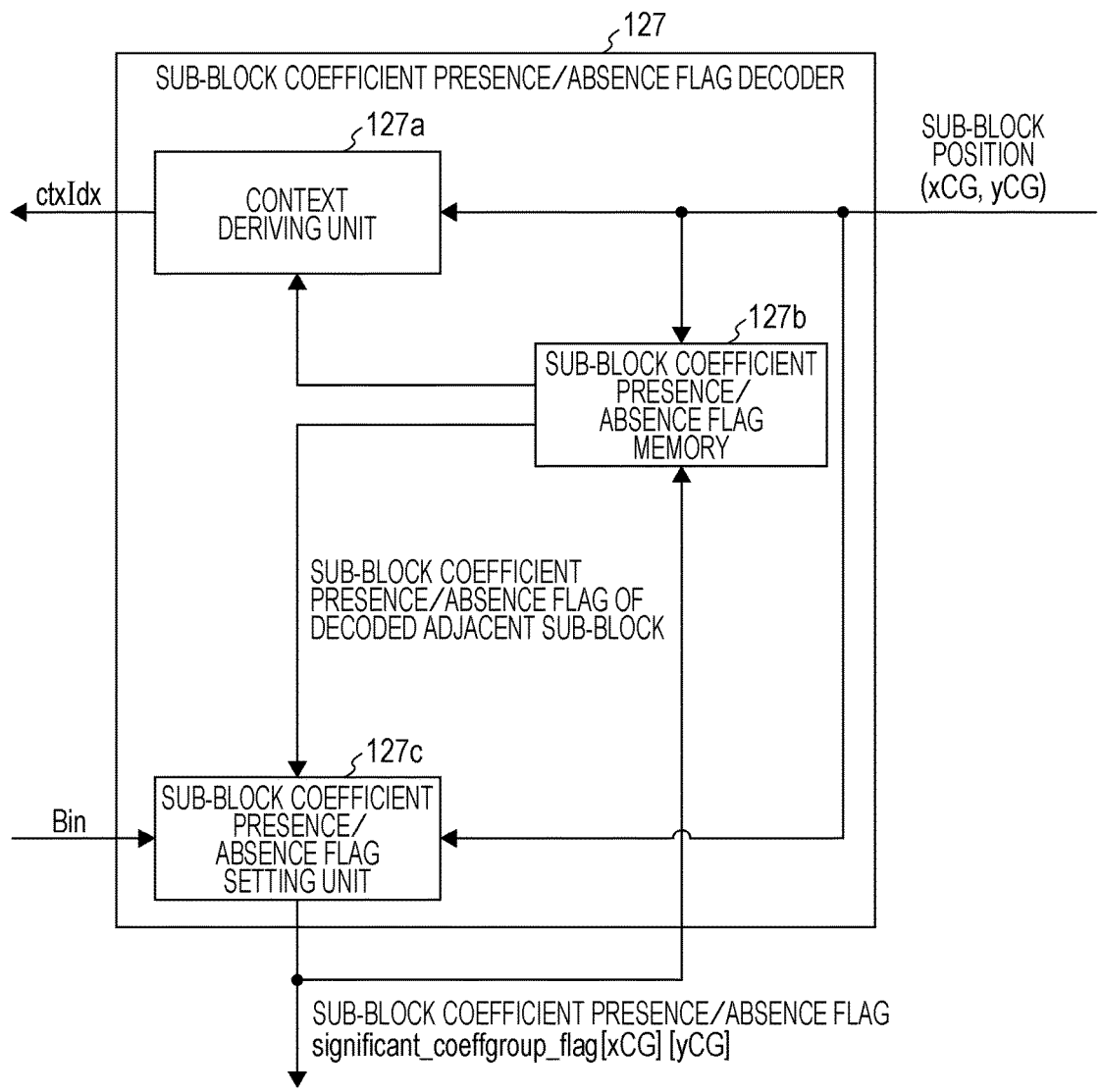
FIG. 19 is a block diagram illustrating the configuration of a sub-block coefficient presence/absence flag decoder according to the embodiment.

FIG. 19 is a block diagram illustrating an example configuration of the sub-block coefficient presence/absence flag decoder 127. As illustrated in FIG. 19, the sub-block coefficient presence/absence flag decoder 127 includes a context deriving unit 127a, a sub-block coefficient presence/absence flag memory 127b, and a sub-block coefficient presence/absence flag setting unit 127c.

Hereinafter, a description will be given of a case where sub-block positions (xCG, yCG) are supplied in reverse scan order from the coefficient decoding controller 123 to the sub-block coefficient presence/absence flag decoder 127. In this case, in the configuration on the coding device side corresponding to the sub-block coefficient presence/absence flag decoder 127, the sub-block positions (xCG, yCG) are supplied in the forward scan order.

(Context Deriving Unit 127a)

The context deriving unit 127a included in the sub-block coefficient presence/absence flag decoder 127 derives context indices that are to be assigned to the sub-blocks designated by individual sub-block positions (xCG, yCG). A context index assigned to a sub-block is used to decode Bin that indicates the syntax element significant_coeffgroup_flag for the sub-block. In the case of deriving a context index, the value of a decoded sub-block coefficient presence/absence flag stored in the sub-block coefficient presence/absence flag memory 127b is referred to. The context deriving unit 127a supplies the derived context indices to the context recording/updating unit 131.

Specifically, a context index to be assigned to a sub-block is derived in the following manner by using the sub-block position (xCG, yCG) and the value of the decoded sub-block coefficient presence/absence flag stored in the sub-block coefficient presence/absence flag memory 127b.

(1) In a case where xCG==3, and yCG==3

To the context index, a certain initial value (ctxIdxOffset) that is determined by cIdx representing a color space and log 2TrafoSize representing a TU size is set.

ctxIdx=ctxIdxOffset (2) In a case where xCG<3, and yCG==3

A context index is set in the following manner with reference to the value of the decoded sub-block coefficient presence/absence flag significant_coeffgroup_flag[xCG+1][yCG+1] located on the right of the sub-block position (xCG, yCG).

ctxIdx=ctxIdxOffset+significant_coeffgroup_flag
[xCG+1][yCG]

(3) In a case where xCG==3, and yCG<3

A context index is set in the following manner with reference to the value of the decoded sub-block coefficient presence/absence flag significant_coeffgroup_flag[xCG][yCG+1] located below the sub-block position (xCG, yCG).

ctxIdx=ctxIdxOffset+significant_coeffgroup_flag
[xCG][yCG+1]

(4) In a case where xCG<3, and yCG<3

A context index is set in the following manner with reference to the value of the decoded sub-block coefficient presence/absence flag significant_coeffgroup_flag[xCG+1][yCG] located on the right of the sub-block position (xCG, yCG), and the value of the decoded sub-block coefficient presence/absence flag significant_coeffgroup_flag[xCG][yCG+1] located below the sub-block position (xCG, yCG).

ctxIdx=ctxIdxOffset+Max(significant_coeffgroup_
flag[xCG+1][yCG],significant_coeffgroup_flag
[xCG][yCG+1])

The initial value ctxIdxOffset is set in the following manner in accordance with cIdx representing a color space and log 2TrafoSize representing a TU size.

ctxIdxOffset=cIdx==0?((5−log 2TrafoSize)*16)+44:
((4−log 2TrafoSize)*16)+44+64

(Sub-Block Coefficient Presence/Absence Flag Memory 127b)

The sub-block coefficient presence/absence flag memory 127b stores the individual values of syntax elements significant_coeffgroup_flag that are decoded or set by the sub-block coefficient presence/absence flag setting unit 127c. The sub-block coefficient presence/absence flag setting unit 127c is capable of reading out the syntax element significant_coeffgroup_flag that has been assigned to an adjacent sub-block from the sub-block coefficient presence/absence flag memory 127b.

(Sub-Block Coefficient Presence/Absence Flag Setting Unit 127c)

The sub-block coefficient presence/absence flag setting unit 127c interprets each Bin supplied from the bit decoder 132, and decodes or set a syntax element significant_coeffgroup_flag[xCG][yCG]. More specifically, the sub-block coefficient presence/absence flag setting unit 127c refers to the sub-block position (xCG, yCG), and the syntax element significant_coeffgroup_flag assigned to a sub-block adjacent to the sub-block designated by the sub-block position (xCG, yCG) (also referred to as an adjacent sub-block), and decodes or sets the syntax element significant_coeffgroup_flag[xCG][yCG]. The value of the decoded or set syntax element significant_coeffgroup_flag[xCG][yCG] is supplied to the coefficient presence/absence flag decoder 124.

(In a Case where Scan Type is Vertical-Direction Priority Scan)

In a case where the scan type designating sub-block scan order is vertical-direction priority scan, the sub-block coefficient presence/absence flag setting unit 127c refers to the value of the sub-block coefficient presence/absence flag significant_coeffgroup_flag[xCG][yCG+1] assigned to the sub-block (xCG, yCG+1) adjacent to the sub-block (xCG, yCG), as illustrated in part (a) of FIG. 20. In a case where significant_coeffgroup_flag[xCG][yCG+1]=1, the sub-block coefficient presence/absence flag setting unit 127c sets significant_coeffgroup_flag[xCG][yCG]=1. In this case, a process of decoding significant_coeffgroup_flag[xCG][yCG] can be omitted. Setting of the value of the sub-block coefficient presence/absence flag assigned to an adjacent sub-block to the value of the sub-block coefficient presence/absence flag assigned to the sub-block may be expressed as "estimation of a sub-block coefficient presence/absence flag". For an estimated sub-block coefficient presence/absence flag, coding and decoding processes can be omitted.

(In a Case where Scan Type is Horizontal-Direction Priority Scan)

In a case where the scan type designating sub-block scan order is horizontal-direction priority scan, the sub-block coefficient presence/absence flag setting unit 127c refers to the value of the sub-block coefficient presence/absence flag significant_coeffgroup_flag[xCG+1][yCG] assigned to the sub-block (xCG+1, yCG) adjacent to the sub-block (xCG, yCG), as illustrated in part (b) of FIG. 20. In a case where significant_coeffgroup_flag[xCG+1][yCG]=1, the sub-block coefficient presence/absence flag setting unit 127c sets significant_coeffgroup_flag[xCG][yCG]=1. In this case, a process of decoding significant_coeffgroup_flag[xCG][yCG] can be omitted.

(In a Case where Scan Type is Diagonal-Direction Scan)

In a case where the scan type designating sub-block scan order is diagonal-direction scan, the sub-block coefficient presence/absence flag setting unit 127c refers to the value of the sub-block coefficient presence/absence flag significant_coeffgroup_flag[xCG+1][yCG] assigned to the sub-block (xCG+1, yCG) adjacent to the sub-block (xCG, yCG), and the value of the sub-block coefficient presence/absence flag significant_coeffgroup_flag[xCG][yCG+1] assigned to the sub-block (xCG, yCG+1) adjacent to the sub-block (xCG, yCG), as illustrated in part (c) of FIG. 20.

In a case where significant_coeffgroup_flag[xCG+1][yCG]=1 and significant_coeffgroup_flag[xCG][yCG+1]=1, the sub-block coefficient presence/absence flag setting unit 127c sets significant_coeffgroup_flag[xCG][yCG]=1. In this case, a process of decoding significant_coeffgroup_flag[xCG][yCG] can be omitted.

As described above, the sub-block coefficient presence/absence flag setting unit 127c is configured to switch the adjacent sub-block to refer to, in accordance with bias of sub-block coefficient presence/absence flags. Accordingly, the amount of codes of sub-block coefficient presence/absence flags to be coded and decoded can be reduced.

The effect of reducing the amount of codes of sub-block coefficient presence/absence flags that is obtained by using the sub-block coefficient presence/absence flag setting unit 127c and the corresponding configuration on the coding device side will be described in detail below with reference to parts (a) and (b) of FIG. 21.

(Process of Coding and Decoding Sub-Block Coefficient Presence/Absence Flag According to Comparative Example)

In a process of coding and decoding a sub-block coefficient presence/absence flag according to a comparative example, diagonal-direction scan is selected regardless of bias of transform coefficients. Regarding a sub-block including a DC component and a sub-block including a last coefficient, significant_coeffgroup_flag is set (estimated) to 1, and is not coded.

For example, it is assumed that transform coefficients exist in a frequency region of 16×16 components as illustrated in part (a) of FIG. 21. In this case, the sub-block coefficient presence/absence flags significant_coeffgroup_flag illustrated in part (b) of FIG. 21 are assigned to the individual sub-blocks made up of 4×4 components. In this case, a one-dimensional sequence of scan of target sub-block coefficient presence/absence flags significant_coeffgroup_flag to be processed in the forward scan direction is "1010010001". In the sub-block coefficient presence/absence flag decoding process according to the comparative example, "01001000", which is obtained by removing significant_coeffgroup_flag for a sub-block including a DC component and a sub-block including a last coefficient from the one-dimensional sequence is coded and decoded. In parts (a) and (b) of FIG. 21, the transform coefficients and sub-blocks expressed with a light color are not coded and decoded.

(Sub-Block Coefficient Presence/Absence Flag Coding Process According to this Embodiment)

On the other hand, in the sub-block coefficient presence/absence flag coding process according to this embodiment, the scan direction is determined in accordance with the intra prediction mode, and thus scan order suitable for the form of bias of transform coefficients is selected. Regarding a sub-block including a DC component and a sub-block including a last coefficient, significant_coeffgroup_flag is set (estimated) to 1 and is not coded.

As in part (a) of FIG. 21, in a case where transform coefficients exist in a frequency region of 16×16 components as illustrated in part (a) of FIG. 22, there is a high probability that the vertical direction will be selected as an intra prediction direction. Thus, there is a high probability that horizontal-direction priority scan will be selected as sub-block scan order. In this case, the transform coefficients to be coded and decoded are the transform coefficients illustrated in part (a) of FIG. 22 except those expressed with a light color, and the number thereof is clearly smaller than that in part (a) of FIG. 21.

The sub-block coefficient presence/absence flags significant_coeffgroup_flag that are assigned to the individual sub-blocks made up of 4×4 components are illustrated in part (b) of FIG. 22. In this case, a one-dimensional sequence of scan of the target sub-block coefficient presence/absence flags significant_coeffgroup_flag to be processed in the forward scan direction is "1111". However, with the above-described "estimation of sub-block coefficient presence/absence flags", the number of sub-block coefficient presence/absence flags that are actually coded and decoded is 0.

As described above, with the sub-block coefficient presence/absence flag setting unit 127c and the corresponding configuration on the coding device side according to this embodiment, the amount of codes of sub-block coefficient presence/absence flags is reduced.

(Example Configuration of Coefficient Presence/Absence Flag Decoder 124)

Hereinafter, a specific example configuration of the coefficient presence/absence flag decoder 124 will be described with reference to FIG. 23.

Figure 23:
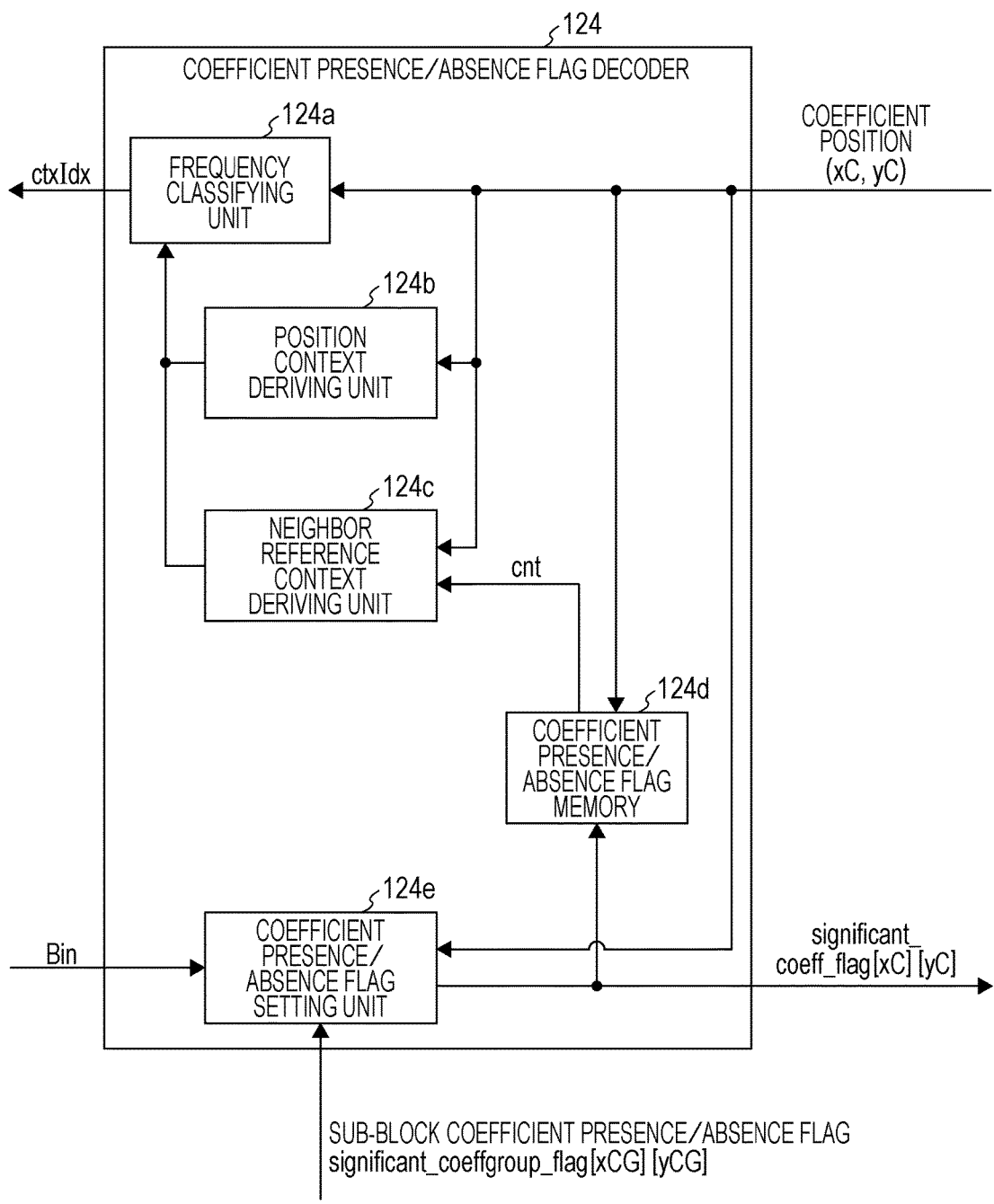
FIG. 23 is a block diagram illustrating the configuration of a coefficient presence/absence flag decoder according to the embodiment.

FIG. 23 is a block diagram illustrating an example configuration of the coefficient presence/absence flag decoder 124. As illustrated in FIG. 23, the coefficient presence/absence flag decoder 124 includes a frequency classifying unit 124a, a position context deriving unit 124b, a neighbor reference context deriving unit 124c, a coefficient presence/absence flag memory 124d, and a coefficient presence/absence flag setting unit 124e.

(Frequency Classifying Unit 124a)

In a case where the size of a target frequency region is a certain size or smaller (for example, in the case of 4×4 components or 8×8 components), the frequency classifying unit 124a classifies each of the frequency components in the frequency region of the certain size or smaller to any of a plurality of partial regions in accordance with the position of the frequency component, and also assigns a context index ctxIdx derived by the position context deriving unit 124b.

On the other hand, in a case where the size of the target frequency region is larger than the certain size (for example, in the case of 16×16 components or 32×32 components), the frequency classifying unit 124a classifies each of the target frequency components to be decoded to any of a plurality of partial regions in accordance with the position of the frequency component in the frequency region, and also assigns the context index ctxIdx derived by either of the position context deriving unit 124b and the neighbor reference context deriving unit 124c to the target frequency component to be decoded.

The frequency classifying unit 124a classifies each of the frequency components included in the frequency region to any of a plurality of partial regions R0 to R2 by using the position (xC, yC) of the frequency component in the frequency region. Here, it is assumed that xC=0, 1, . . . , and sz−1, and yC=0, 1, . . . , and sz−1 (sz represents the number of pixels along one side of a target TU to be processed, that is, the number of frequency components along one side of a target frequency region, for example, sz=16, 32, etc.).

On the other hand, in a case where a frequency region made up of sz×sz blocks is divided into 4×4 sub-blocks, the position (xCG, yCG) of the sub-block to which the frequency component (xC, yC) belongs is derived by using the following equations (eq. A1) and (eq. A2).

$$xCG = xC \gg 2 \qquad (eq.\ A1)$$

$$yCG = yC \gg 2 \qquad (eq.\ A2)$$

Here, it is assumed that xCG=0, 1, . . . , (sz−1)≫2, and yCG=0, 1, . . . , (sz−1)≫2.

The frequency classifying unit 124a performs, for example, the following classification processes.

(1) Classify the frequency component that satisfies xCG+yCG<THA and xC+yC<THZ to the partial region R0.

(2) Classify the frequency component that satisfies xCG+yCG<THA and THZ≤xC+yC to the partial region R1.

(3) Classify the frequency component that satisfies THA≤xCG+yCG to the partial region R2.

The pseudo code corresponding to the above-described classification processes are as follows.

```
************************************************************
    if(xCG+yCG<THA){
        if(xC+yC<THZ){
            classify to R0
        }
        else{// if(xC+yC≥THZ)
            classify to R1
        }
    }
    else{//if(xCG+yCG≥THA){
        classify to R2
    }
************************************************************
```

Here, 2 is used as the threshold THZ. THA represents a threshold that satisfies THA≥THZ/4. A specific value may be, for example, THA=1 regardless of the size of the frequency region (the size of the target TU to be processed). Alternatively, THA=1<<(log 2TrafoSize−2), by using the size log 2trafoSize of the frequency region. That is, in a case where the size of the frequency region is 16×16, THA=1 may be satisfied, and in a case where the size of the frequency region is 32×32, THA=2 may be satisfied. In this way, different thresholds may be used in accordance with the size of the frequency region. The threshold THZ may be 1.

Figures 24, 25:
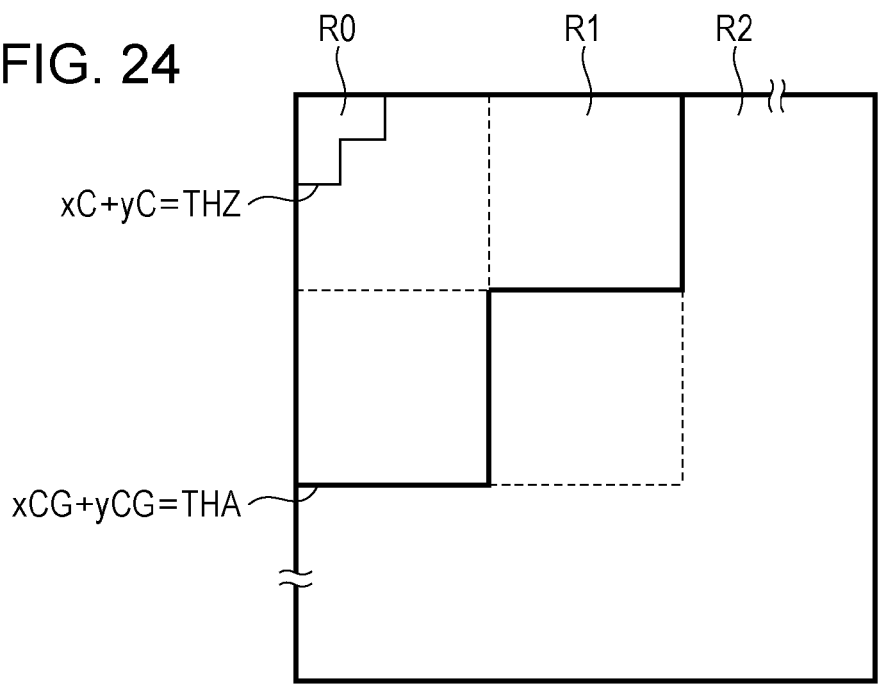
FIG. 24 is a diagram illustrating an example of a frequency region that has been divided into partial regions R0, R1, and R2 through a classification process performed by a frequency classifying unit included in the coefficient presence/absence flag decoder according to the embodiment.
FIG. 25 includes diagrams describing reference frequency components that are referred to by a neighbor reference context deriving unit included in the coefficient presence/absence flag decoder according to the embodiment in a case where a decoding process is performed in reverse scan order, in which part (a) illustrates the relative positions between a target frequency component x and reference frequency components c1, c2, c3, c4, and c5, and part (b) illustrates the relative positions between the target frequency component x and reference frequency components c1, c2, c4, and c5.

FIG. 24 illustrates an example of a frequency region that has been divided into partial regions R0, R1, and R2 through a classification process performed by the frequency classifying unit 124a.

The frequency classifying unit 124a assigns the context indices derived by the position context deriving unit 124b to the individual frequency components that belong to the partial region R0, and assigns the context indices derived by the neighbor reference context deriving unit 124c to the individual frequency components that belong to the partial regions R1 and R2. A description has been given under the assumption that the size of sub-blocks is 4×4, but the size is not limited thereto, and sub-blocks of (sz>>n)×(sz>>n) may be used. Note that, regarding n, n=1, . . . , log 2TrafoSize>>1 is satisfied.

The frequency classifying unit 124a supplies the context indices assigned to the individual frequency components to the context recording/updating unit 131. These context indices are used to determine the context that is to be used by the arithmetic code decoder 130 to decode the syntax element significant_coeff_flag.

(Position Context Deriving Unit 124b)

The position context deriving unit 124b derives a context index ctxIdx for a target frequency component on the basis of the position of the target frequency component in a frequency region.

In a case where the target frequency region to be processed is larger than the certain size, the position context deriving unit 124b derives, for example, context indices ctxIdx for the frequency components that belong to the partial region R0 illustrated in FIG. 24 by using the following equation (eq. A3), and supplies the derivation result ctxIdx to the frequency classifying unit 124a.

$$\text{ctxIdx}=NX+2\times xC+yC \qquad \text{(eq. A3)}$$

NX is a constant that represents the start point of a context index. In a case where the numbers of contexts used for a size of 4×4 and 8×8 of the frequency region are N4 and N8, respectively, the start point is NX=N4+N8 in a case where the size of the frequency region is 16×16 and 32×32.

A specific example of the context index derivation process performed by the position context deriving unit 124b in a case where the target frequency region to be processed has a certain size or smaller will be described below.

(Neighbor Reference Context Deriving Unit 124c)

The neighbor reference context deriving unit 124c derives the context index ctxIdx for the target frequency component to be decoded, on the basis of the number cnt of decoded non-zero transform coefficients regarding frequency components around the target frequency component.

The neighbor reference context deriving unit 124c derives, for example, context indices ctxIdx for the frequency components that belong to the partial region R1 illustrated in FIG. 24 by using the following equation (eq. A4), and supplies the derivation result ctxIdx to the frequency classifying unit 124a.

$$\text{ctxIdx}=NX+3+\min(2,\text{temp}) \qquad \text{(eq. A4)}$$

Here, temp is defined by temp=(cnt+1)>>1.

Also, the neighbor reference context deriving unit 124c derives, for example, context indices ctxIdx for the frequency components that belong to the partial region R2 illustrated in FIG. 24 by using the following equation (eq. A5), and supplies the derivation result ctxIdx to the frequency classifying unit 124a.

$$\text{ctxIdx}=NX+6+\min(2,\text{temp}) \qquad \text{(eq. A5)}$$

Here, temp is defined by temp=(cnt+1)>>1, as in the above-described case.

In equations (eq. A4) and (eq. A5), the count number cnt of non-zero transform coefficients may be shifted to the right by 1 bit, and thereby the number of contexts can be reduced.

Further, the neighbor reference context deriving unit 124c derives the count number cnt of non-zero transform coefficients in the partial region R1 illustrated in FIG. 24, in accordance with the following equation (eq. A6) by using the reference frequency components c1 to c5 illustrated in part (a) of FIG. 25.

$$\text{cnt}=(c1!=0)+(c2!=0)+(c3!=0)+(c4!=0)+(c5!=0) \qquad \text{(eq. A6)}$$

Here, each term in (eq. A6) takes 1 in a case where the comparison in ( ) is true, and takes 0 in a case where the comparison in ( ) is false.

The number cnt of non-zero transform coefficients may be calculated using equation (eq. A7) instead of equation (eq. A6). In equation (eq. A7), reference frequency components (c1, c2, c4, and c5) illustrated in part (b) of FIG. 25 are used, and the transform coefficient at the coordinate (c3) located immediately before the position of the target transform coefficient in processing order (in a case where the processing order is reverse scan order, located below the position of the target transform coefficient) is not referred to. In such a process, the context to be used for decoding a coefficient presence/absence flag at a certain position can be derived without referring to the value of the preceding coefficient presence/absence flag, and thus a context derivation process and a decoding process can be performed in parallel.

$$\text{cnt}=(c1!=0)+(c2!=0)+(c4!=0)+(c5!=0) \qquad \text{(eq. A7)}$$

Alternatively, a transform coefficient may be derived by using either of equation (eq. A6) and equation (eq. A7) in accordance with the position of the target transform coefficient in a sub-block. That is, reference components to be used for deriving a transform coefficient may be changed in accordance with the position of the target transform coefficient in a sub-block.

More specifically, in either of a case where the target transform coefficient is located at the upper left in a sub-block and a case where the target transform coefficient is located at the lower right in the sub-block, the reference frequency components of equation (eq. A7) may be used so as not to depend on the value of the transform coefficient at the position (lower side) immediately before the target transform coefficient in a sub-block in processing order, and the reference frequency components of equation (eq. A6) may be used in the other case.

(Coefficient Presence/Absence Flag Setting Unit 124e)

The coefficient presence/absence flag setting unit 124e interprets each Bin supplied from the bit decoder 132, and decodes or sets a syntax element significant_coeff_flag[xC][yC]. The decoded or set syntax element significant_coeff_flag[xC][yC] is supplied to the decoded coefficient memory 126.

In a case where a target frequency region is divided into sub-blocks, the coefficient presence/absence flag setting unit 124e refers to the syntax element significant_coeffgroup_flag[xCG][yCG] assigned to a target sub-block, and in a case where the value of significant_coeffgroup_flag[xCG][yCG] is equal to 0, sets significant_coeff_flag[xC][yC] for all the frequency components included in the target sub-block to 0. With this configuration, a decoding process for significant_coeff_flag[xC][yC] in the target sub-block can be omitted, and thus the processing speed increases.

(Coefficient Presence/Absence Flag Memory 124d)

The coefficient presence/absence flag memory 124d stores the individual values of syntax elements significant_coeff_flag[xC][yC]. The individual values of syntax elements significant_coeff_flag[xC][yC] stored in the coefficient presence/absence flag memory 124d are referred to by the neighbor reference context deriving unit 124c.

(Another Example of Process Performed by Coefficient Presence/Absence Flag Decoder 124)

Hereinafter, another example of the process performed by the coefficient presence/absence flag decoder 124 will be described with reference to FIGS. 26 to 28.

Parts (a) and (b) of FIG. 26 are diagrams illustrating partial regions that are obtained through division performed by the frequency classifying unit 124a in this example process. Part (a) of FIG. 26 is preferably applied in the case of decoding a transform coefficient related to a luminance value, whereas part (b) of FIG. 26 is preferably applied in the base of decoding a transform coefficient related to chrominance. In parts (a) and (b) of FIG. 26, a threshold TH is defined by $$TH=\text{Max}(width,height)>>2.$$

Here, "width" represents the width of a target frequency region expressed using a frequency component as a unit, and "height" represents the height of the target frequency region expressed using a frequency component as a unit. For example, in a case where the width of the target frequency region corresponds to 16 components (16 pixels) and the height corresponds to 4 components (4 pixels), width=16 and height=4.

FIG. 27 illustrates pseudo code showing a derivation process of deriving context indices ctxIdx that are to be assigned to the frequency regions included in the partial regions R0 to R2 illustrated in part (a) of FIG. 26 and that are related to luminance. In FIG. 27, context derivation in the region R0 is performed by the position context deriving unit 124b, and context derivation in the region R1 and context derivation in the region R2 are performed by the neighbor reference context deriving unit 124c.

FIG. 28 illustrates pseudo code showing a derivation process of deriving context indices ctxIdx that are to be assigned to the frequency regions included in the partial regions R0 and R1 illustrated in part (b) of FIG. 26 and that are related to chrominance. In FIG. 28, context derivation in the region R0 is performed by the position context deriving unit 124b, and context derivation in the region R1 is performed by the neighbor reference context deriving unit 124c.

(Specific Example 1 of Frequency Classification Process Performed by Frequency Classifying Unit 124a and Context Index Derivation Process Performed by Position Context Deriving Unit 124b in a Case where Frequency Region has Certain Size or Smaller)

First, in a case where the target frequency region to be processed has a certain size or smaller, the frequency classifying unit 124a classifies the target frequency components to be processed to sub-groups (sub-regions) R0 to R6 in the case of 4×4 components, and to sub-groups R0 to R9 in the case of 8×8 components, on the basis of the positions (xC, yC) of the target frequency components to be processed.

(in the Case of 4×4 Components)

(1) In a case where xC=0 and yC=0, the frequency component is classified to the sub-group R0.

(2) In a case where xC=1 and yC=0, the frequency component is classified to the sub-group R1.

(3) In a case where xC=0 and yC=1, the frequency component is classified to the sub-group R2.

(4) In a case where xC=1 and yC=1, the frequency component is classified to the sub-group R3.

(5) In a case where 1<xC<4 and yC<2, the frequency component is classified to the sub-group R4.

(6) In a case where xC<2 and 1<yC<4, the frequency component is classified to the sub-group R5.

(7) In a case where 2 xC<4 and 2≤yC<4, the frequency component is classified to the sub-group R6.

(in the Case of 8×8 Components)

(1) In a case where xC=0 and yC=0, the frequency component is classified to the sub-group R0.

(2) In a case where xC=1 and yC=0, the frequency component is classified to the sub-group R1.

(3) In a case where xC=0 and yC=1, the frequency component is classified to the sub-group R2.

(4) In a case where xC=1 and yC=1, the frequency component is classified to the sub-group R3.

(5) In a case where 1<xC<4 and yC<2, the frequency component is classified to the sub-group R4.

(6) In a case where xC<2 and 1<yC<4, the frequency component is classified to the sub-group R5.

(7) In a case where 2≤xC<4 and 2≤yC<4, the frequency component is classified to the sub-group R6.

(8) In a case where xC≥4 and yC<4, the frequency component is classified to the sub-group R7.

(9) In a case where xC<4 and yC≥4, the frequency component is classified to the sub-group R8.

(10) In a case where xC≥4 and yC≥4, the frequency component is classified to the sub-group R9.

An example in which the above-described classification process is applied to 4×4 components and 8×8 components is illustrated in parts (a) and (b) of FIG. 29. Part (a) of FIG. 29 is a diagram illustrating the regions (sub-groups) R0 to R6 that form a frequency region having a size of 4×4 components, and part (b) of FIG. 29 is a diagram illustrating the regions (sub-groups) R0 to R9 that form a frequency component having a size of 8×8 components.

In a case where the target frequency region to be processed has a certain size or smaller, the position context deriving unit 124b performs the following process on the sub-groups classified by the frequency classifying unit 124a.

That is, the position context deriving unit 124b derives common context indices for one or plural frequency components that belong to a frequency region having a certain size or smaller (for example, 4×4 components or 8×8 components) and having a first size (for example, 4×4 components), and for one or plural frequency components that belong to a frequency region having the certain size or smaller and having a second size larger than the first size (for example, 8×8 components), and assigns the common context indices to the one or plural frequency components.

For example, the position context deriving unit 124b derives and assigns common context indices ctxIdx (i) to the regions Ri (i=0, 1, 2, 3, 4, 5, and 6) illustrated in part (a) of FIG. 29 and the regions Ri (i=0, 1, 2, 3, 4, 5, and 6) illustrated in part (b) of FIG. 29.

For example, it is assumed that ctxIdx=0, 1, 2, 3, 4, 5, and 6 are derived for the regions R0, R1, R2, R3, R4, R5, and R6 illustrated in part (a) of FIG. 29, respectively. In this case, ctxIdx=0, 1, 2, 3, 4, 5, and 6 are assigned to the regions R0, R1, R2, R3, R4, R5, and R6 illustrated in part (b) of FIG. 29. Also, ctxIdx=7, 8, and 9 are assigned to the regions R7, R8, and R9 illustrated in part (b) of FIG. 29, respectively.

Preferably, the position context deriving unit 124b sets common context indices for the context indices that are referred to in the case of decoding individual transform coefficients related to chrominance U and for the context indices that are referred to in the case of decoding individual transform coefficients related to chrominance V.

Specifically, the context indices ctxIdx_U(i) that are assigned to the regions Ri (i=0, 1, 2, 3, 4, 5, and 6) illustrated in part (a) of FIG. 29 and that are referred to in the case of decoding significant_coeff_flag related to chrominance U are common to the context indices ctxIdx_V(i) that are assigned to the regions Ri (i=0, 1, 2, 3, 4, 5, and 6) illustrated in part (b) of FIG. 29 and that are referred to in the case of decoding significant_coeff_flag related to chrominance V.

The position context deriving unit 124b may be configured to perform setting so that all the context indices that are referred to in the case of decoding individual transform coefficients related to luminance Y are different from the context indices that are referred to in the case of decoding individual transform coefficients related to chrominance V and U, or so that some of the context indices are common to each other.

An effect obtained by the position context deriving unit 124b deriving context indices in the above-described manner will be described below with reference to parts (a) to (c) of FIG. 30 according to a comparative example.

Part (a) of FIG. 30 is a diagram illustrating the context indices that have been derived through a context index derivation process according to the comparative example for the individual frequency components included in a frequency region having a size of 4×4 components and that are referred to in the case of decoding significant_coeff_flag related to luminance Y. In the example illustrated in part (a) of FIG. 30, nine context indices are derived. In the example illustrated in part (a) of FIG. 30, a context index is not derived for the frequency component located on the highest-frequency component side (the shaded frequency component in part (a) of FIG. 30). The same applies to parts (b) and (c) of FIG. 30.

Part (b) of FIG. 30 is a diagram illustrating the context indices that have been derived through a context index derivation process according to the comparative example for the individual frequency components included in a frequency region having a size of 4×4 components and that are referred to in the case of decoding significant_coeff_flag related to chrominance U and V. In the example illustrated in part (b) of FIG. 30, six common context indices are derived for chrominance U and V.

Part (c) of FIG. 30 is a diagram illustrating the context indices that have been derived through a context index derivation process according to the comparative example for the individual frequency components included in a frequency region having a size of 8×8 components and that are referred to in the case of decoding significant_coeff_flag related to luminance Y and chrominance U and V. In the example illustrated in part (c) of FIG. 30, eleven context indices for luminance and eleven common context indices for chrominance U and V are derived, that is, twenty-two context indices in total.

In the context index derivation process according to the comparative example, 9+6+22=37 context indices are derived in total.

On the other hand, according to the position context deriving unit 124b, in the example illustrated in part (a) of FIG. 29, seven context indices for luminance and seven context indices for chrominance, that is, fourteen context indices in total, are derived. In the regions R7, R8, and R9 illustrated in part (b) of FIG. 29, three context indices for luminance and three context indices for chrominance, that is, six context indices in total, are derived.

Therefore, in the context index derivation process performed by the position context deriving unit 124b, it is sufficient to derive 14+6=20 context indices.

As described above, in the examples illustrated in FIGS. 29 and 30, the position context deriving unit 124b may omit derivation of 37−20=17 context indices.

FIG. 31 illustrates pseudo code showing the context index derivation process performed by the position context deriving unit 124b. Part (a) of FIG. 32 is a diagram illustrating an example of CTX_IND_MAP_4×4to8×8[index] in the pseudo code illustrated in FIG. 31, whereas part (b) of FIG. 32 illustrates the values of individual context indices that are obtained in the case of using CTX_IND_MAP_4×4to8×8 [index] illustrated in part (a) of FIG. 32 for the pseudo code illustrated in FIG. 31.

The context index derivation process performed by the position context deriving unit 124b is not limited to the above-described example. As illustrated in parts (a) and (b) of FIG. 33, a process of deriving common context indices for only the frequency components R0 to R3 may be performed.

FIG. 34 illustrates pseudo code showing such a context index derivation process performed by the position context deriving unit 124b. Part (a) of FIG. 35 is a diagram illustrating an example of CTX_IND_MAP_4×4to8×8[index] in the pseudo code illustrated in FIG. 34, whereas part (b) of FIG. 35 illustrates the values of individual context indices that are obtained in the case of using CTX_IND_MAP_4× 4to8×8[index] illustrated in part (a) of FIG. 35 for the pseudo code illustrated in FIG. 34 and that relate to the size of 4×4 components. Part (c) of FIG. 35 illustrates the values of individual context indices that are obtained in the case of using CTX_IND_MAP_4×4to8×8[index] illustrated in part (a) of FIG. 35 for the pseudo code illustrated in FIG. 34 and that relate to the size of 8×8 components.

FIG. 36 illustrates pseudo code showing another example of the context index derivation process performed by the position context deriving unit 124b. Part (a) of FIG. 37 is a diagram illustrating an example of CTX_IND_MAP_4× 4to8×8_L[index] in the pseudo code illustrated in FIG. 36, whereas part (b) of FIG. 37 illustrates the values of individual context indices that are obtained in the case of using CTX_IND_MAP_4×4to8×8_L[index] illustrated in part (a) of FIG. 37 for the pseudo code illustrated in FIG. 36 and that relate to luminance.

Figure 37:
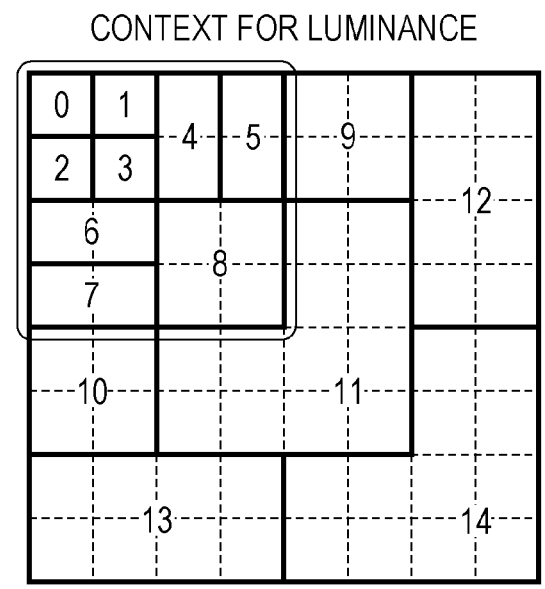
FIG. 37 includes diagrams describing another example of the context index derivation process performed by the position context deriving unit included in the coefficient presence/absence flag decoder according to the embodiment, in which part (a) illustrates an example of CTX_IND_MAP_4×4to8×8[index] in the pseudo code illustrated in FIG. 36, and part (b) illustrates the values of individual context indices that are obtained in the case of using CTX_IND_MAP_4×4to8×8[index] in part (a) for the pseudo code illustrated in FIG. 36.

In the frequency region of 8×8 components illustrated in part (b) of FIG. 37, the context indices derived for the frequency components that belong to the region of 4×4 components on the low-frequency side are also used as context indices related to luminance in a case where the size of a target frequency region corresponds to 4×4 components.

Figure 38:
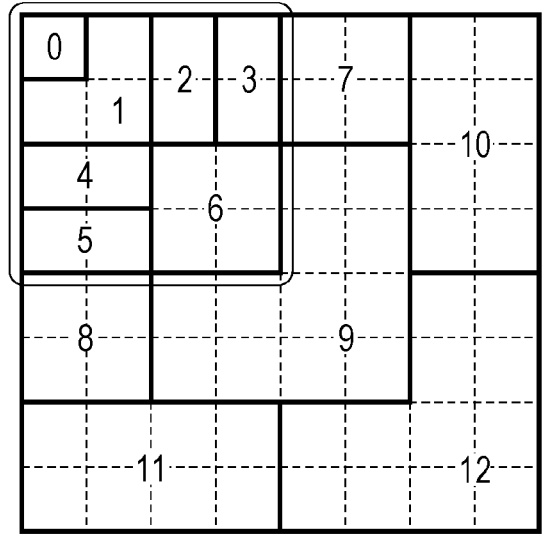
FIG. 38 includes diagrams describing another example of the context index derivation process performed by the position context deriving unit included in the coefficient presence/absence flag decoder according to the embodiment, in which part (a) illustrates an example of CTX_IND_MAP_4×4to8×8[index] in the pseudo code illustrated in FIG. 36, and part (b) illustrates the values of individual context indices that are obtained in the case of using CTX_IND_MAP_4×4to8×8[index] in part (a) for the pseudo code illustrated in FIG. 36.

Part (a) of FIG. 38 is a diagram illustrating an example of CTX_IND_MAP_4×4to8×8_C[index] in the pseudo code illustrated in FIG. 36, whereas part (b) of FIG. 38 illustrates the values of individual context indices that are obtained in the case of using CTX_IND_MAP_4×4to8×8_C[index] illustrated in part (a) of FIG. 38 for the pseudo code illustrated in FIG. 37 and that relate to chrominance.

In the frequency region of 8×8 components illustrated in part (b) of FIG. 38, the context indices derived for the frequency components that belong to the region of 4×4 components on the low-frequency side are also used as context indices related to chrominance in a case where the size of a target frequency region corresponds to 4×4 components.

In the example illustrated in part (b) of FIG. 37, fifteen context indices are derived for luminance. In the example illustrated in part (b) of FIG. 38, thirteen context indices are derived for chrominance. Thus, in the example illustrated in part (b) of FIG. 37 and part (b) of FIG. 38, 15+13=28 context indices are derived.

The number of these context indices is smaller by nine than the thirty-seven context indices that are derived in the comparative example illustrated in parts (a) to (c) of FIG. 30.

As described above, according to the position context deriving unit 124b, the number of context indices to be derived can be reduced. Accordingly, a context index derivation process can be simplified, and the memory size for holding context indices can be reduced.

(Specific Example 2 of Frequency Classification Process Performed by Frequency Classifying Unit 124a and Context Index Derivation Process Performed by Position Context Deriving Unit 124b in a Case where Frequency Region has Certain Size or Smaller)

A description has been given above of the case of deriving common context indices among different transform blocks in a case where the frequency region has a certain size or smaller, but a context index derivation process is not limited thereto. Hereinafter, a description will be given of the case of not deriving common context indices among different transform blocks.

A description will be given of specific example 2 of the frequency classification process performed by the frequency classifying unit 124a and the context index derivation process performed by position context deriving unit 124b in a case where the frequency region has a certain size or smaller, with reference to FIGS. 60 to 63.

First, in a case where the target frequency region to be processed has a certain size or smaller, the frequency classifying unit 124a classifies the target frequency components to be processed to sub-groups R0 to R6 on the basis of the positions (xC, yC) of the frequency components.

(In the Case of 4×4 Components)

(1) In a case where xC=0 and yC=0, the frequency component is classified to the sub-group R0.

(2) In a case where (xC=0 and yC=0) is not satisfied, xC<2, and yC<2, the frequency component is classified to the sub-group R1.

(3) In a case where xC=2 and yC<2, the frequency component is classified to the sub-group R2.

(4) In a case where xC=3 and yC<2, the frequency component is classified to the sub-group R3.

(5) In a case where xC<2 and yC=2, the frequency component is classified to the sub-group R4.

(6) In a case where xC<2 and yC=3, the frequency component is classified to the sub-group R5.

(7) In a case where xC≥2 and yC≥2, the frequency component is classified to the sub-group R6.

The foregoing (1) and (2) may be replaced by the following (1') and (2').

(1') In a case where xC<1 and yC<1, the frequency component is classified to the sub-group R0.

(2') In a case where (xC<1 and yC<1) is not satisfied, xC<2, and yC<2, the frequency component is classified to the sub-group R1.

(In the Case of 8×8 Components)

(1) In a case where xC<2 and yC<2, the frequency component is classified to the sub-group R0.

(2) In a case where (xC<2 and yC<2) is not satisfied, xC<4, and yC<4, the frequency component is classified to the sub-group R1.

(3) In a case where xC≥4, xC<6, and yC<4, the frequency component is classified to the sub-group R2.

(4) In a case where xC≥6 and yC<4, the frequency component is classified to the sub-group R3.

(5) In a case where xC<4, yC≥4, and yC<6, the frequency component is classified to the sub-group R4.

(6) In a case where xC<4 and yC≥6, the frequency component is classified to the sub-group R5.

(7) In a case where xC≥4 and yC≥4, the frequency component is classified to the sub-group R6.

An example in which the above-described classification process is applied to 4×4 components and 8×8 components is illustrated in parts (a) and (b) of FIG. 60. Part (a) of FIG. 60 is a diagram illustrating the regions (sub-groups) R0 to R6 that form a frequency region having a size of 4×4 components, and part (b) of FIG. 60 is a diagram illustrating the regions (sub-groups) R0 to R6 that form a frequency component having a size of 8×8 components. As illustrated in part (a) of FIG. 60, three AC components that are adjacent to a DC and that have the lowest order are assigned to one sub-region, for both luminance and chrominance. Since tree AC regions are assigned to one sub-region, contexts can be reduced by two at this portion. The inventors have verified through experiments that degradation of coding efficiency caused by such assignment is negligible. Such assignment can also be applied to a configuration other than the present configuration.

Alternatively, the following process may be performed by using a common sub-group classification process for 4×4 components and 8×8 components. First, the frequency classifying unit 124a calculates variables X and Y on the basis of the position (xC, yC) of the target frequency component to be processed and log 2TrafoSize representing the size of a transform block, by using the following equations.

$$X = \log 2TrafoSize == 2?xC: xC >> 1$$

$$Y = \log 2TrafoSize == 2?yC: yC >> 1$$

Subsequently, on the basis of the derived variables X and Y, the target frequency components (xC, yC) to be processed are classified to the sub-groups R0 to R6.

(1) In a case where X=0 and Y=0, the frequency component is classified to the sub-group R0.

(2) In a case where (X=0 and Y=0) is not satisfied, X<2, and Y<2, the frequency component is classified to the sub-group R1.

(3) In a case where X=2 and Y<2, the frequency component is classified to the sub-group R2.

(4) In a case where X=3 and Y<2, the frequency component is classified to the sub-group R3.

(5) In a case where X<2 and Y=2, the frequency component is classified to the sub-group R4.

(6) In a case where X<2 and Y=3, the frequency component is classified to the sub-group R5.

(7) In a case where X≥2 and Y≥2, the frequency component is classified to the sub-group R6.

In this way, the split pattern of a frequency region that has a size of 4×4 components (first size) and that is divided by the frequency classifying unit 124a, and the split pattern of a frequency region that has a size of 8×8 components (second size) and that is divided by the frequency classifying unit 124a, are similar to each other.

Alternatively, a common process of classifying the 4×4 components and 8×8 components to sub-groups can be performed in the following manner.

(1) In a case where xC<width/4 and yC<width/4, the frequency component is classified to the sub-group R0.

(2) In a case where xC<width/2 and yC<width/2, the frequency component is classified to the sub-group R1.

(3) In a case where xC≥width/2, xC<width×¾, and yC<width/2, the frequency component is classified to the sub-group R2.

(4) In a case where xC≥width×¾ and yC<width/2, the frequency component is classified to the sub-group R3.

(5) In a case where xC<width/2, yC≥width/2, and yC<width×¾, the frequency component is classified to the sub-group R4.

(6) In a case where xC<width/2 and yC≥width×¾, the frequency component is classified to the sub-group R5.

(7) In a case where xC≥width/2 and yC≥width/2, the frequency component is classified to the sub-group R6.

Here, "width" is the width of the target frequency region (4 for 4×4 components, and 8 for 8×8 components).

Subsequently, in a case where the target frequency region to be processed has a certain size or smaller, the position context deriving unit 124b assigns individual context indices to the individual sub-groups classified by the frequency classifying unit 124a.

Specifically, a context index ctxIdx(i) for luminance is derived using the following equation.

offsetBlk=log 2TrafoWidth==2 ?0:7 ctxIdx($i$)=$i$+offsetBlk

Note that i represents a number identifying a sub-group Ri, and offsetBlk represents an offset for identifying context indices of 4×4 components and 8×8 components. A certain value is set to offsetBlk in accordance with log 2TrafoWidth that represents a logarithm value of a horizontal width size of a transform block. Thus, the context indices ctxIdx(i) of individual sub-groups Ri of 4×4 components for luminance are set in the manner illustrated in part (b) of FIG. 62, and the context indices ctxIdx(i) of individual sub-groups Ri of 8×8 components for luminance are set in the manner illustrated in part (c) of FIG. 62.

That is, when it is assumed that the position context deriving unit 124b derives context indices ctxIdx=0, 1, 2, 3, 4, 5, and 6 for the regions Ri (i=0, 1, 2, 3, 4, 5, and 6) illustrated in part (a) of FIG. 60 for luminance in the case of 4×4 components, the position context deriving unit 124b derives context indices ctxIdx=7, 8, 9, 10, 11, 12, and 13 for the regions Ri (i=0, 1, 2, 3, 4, 5, and 6) illustrated in part (b) of FIG. 60 in the case of 8×8 components.

A context index ctxIdx(i) for chrominance is derived using the following equations.

offsetBlk=log 2TrafoWidth==2 ?0:7 ctxIdx($i$)=$i$+offsetClr+offsetBlk

Note that i represents a number identifying a sub-group Ri, and offsetBlk represents an offset for identifying context indices of 4×4 components and 8×8 components. A certain value is set to offsetBlk in accordance with log 2TrafoWidth that represents a logarithm value of a horizontal width size of a transform block. offsetClr is a certain offset for identifying context indices for luminance and chrominance. For example, in a case where offsetClr=14, the context indices ctxIdx(i) of individual sub-groups Ri of 4×4 components for chrominance are set in the manner illustrated in part (a) of FIG. 63, and the context indices ctxIdx(i) of individual sub-groups Ri of 8×8 components for chrominance are set in the manner illustrated in part (b) of FIG. 63.

That is, when it is assumed that the position context deriving unit 124b derives context indices ctxIdx=14, 15, 16, 17, 18, 19, and 20 for the regions Ri (i=0, 1, 2, 3, 4, 5, and 6) illustrated in part (a) of FIG. 60 for chrominance in the case of 4×4 components, the position context deriving unit 124b derives context indices ctxIdx=21, 22, 23, 24, 25, 26, 27, and 28 for the regions Ri (i=0, 1, 2, 3, 4, 5, and 6) illustrated in part (b) of FIG. 60 for chrominance of 8×8 components. For the convenience of description, context indices for chrominance are illustrated in parts (a) and (b) of FIG. 63, with the offset offsetClr for identifying the context indices for luminance and chrominance being offsetClr=14, but the embodiment is not limited thereto. Preferably, offsetClr is the total number of context indices for luminance of a 4×4 transform block to a 32×32 transform block.

The above-described frequency classification process performed by the frequency classifying unit 124a and the above-described context derivation process performed by the position context deriving unit 124b may be expressed by the pseudo code illustrated in FIG. 61.

That is, in the pseudo code illustrate in FIG. 61, a certain offset value is added to the reference value of a look-up table CTX_IND_MAP[index] corresponding to an index value index that is determined by a sub-block position (X, Y), and thereby the context index ctxIdx of the target frequency component (xC, yC) to be processed is calculated. In the case of a 4×4 transform block and an 8×8 transform block, the index value index that is determined by the position (X, Y) of each sub-block (1×1 sub-block in the case of 4×4, and 2×2 sub-block in the case of 8×8) represents the scan order (start value is 0) of the sub-block in the horizontal direction, and is calculated by using the following equation.

Index=($Y$>>2)+$X$

The context index ctxIdx for luminance of each transform block is derived by using the following equation.

(In the Case of 4×4 Components)

ctxIdx=CTX_IND_MAP[index]

(In the Case of 8×8 Components)

ctxIdx=CTX_IND_MAP[index]+sigCtxOffset

Here, sigCtxOffset is a certain offset for identifying a context index of 4×4 components and a context index of 8×8 components.

The context index ctxIdx for chrominance of each transform block is derived by using the following equation.

(In the Case of 4×4 Components)

ctxIdx=CTX_IND_MAP[index]+SigCtxOffsetLuma (In the Case of 8×8 Components)

ctxIdx=CTX_IND_MAP[index]+sigCtxOffset+
SigCtxOffsetLuma

Here, sigCtxOffset is a certain offset for identifying a context index of 4×4 components and a context index of 8×8 components, 16×4 components, and 4×16 components, whereas SigCtxOffsetLuma is a certain offset for identifying context indices for luminance and chrominance.

In this case, the value of offset in "sigCtx=log 2TrafoSize==2 ? 0: offset" in FIG. 61 is set to 7.

Part (a) of FIG. 62 is a diagram illustrating an example of CTX_IND_MAP[index] in the pseudo code illustrated in FIG. 61. Part (b) of FIG. 62 illustrates the values of individual context indices for luminance of 4×4 components, which are obtained in the case of using CTX_IND_MAP[index] in part (a) of FIG. 62 for the pseudo code illustrated in FIG. 61. Part (c) of FIG. 62 illustrates the values of individual context indices for luminance of 8×8 components, which are obtained in the case of using CTX_IND_MAP[index] in part (a) of FIG. 62 for the pseudo code illustrated in FIG. 61. Part (a) of FIG. 63 illustrates the values of individual context indices for chrominance of 4×4 components, which are obtained in the case of using CTX_IND_MAP[index] in part (a) of FIG. 62 for the pseudo code illustrated in FIG. 61. Part (b) of FIG. 63 illustrates the values of individual context indices for chrominance of 8×8 components, which are obtained in the case of using CTX_IND_MAP[index] in part (a) of FIG. 62 for the pseudo code illustrated in FIG. 61. In the example illustrated in part (b) of FIG. 62, a context index is not derived for the frequency component located on the highest-frequency component side (the shaded frequency component in part (b) of FIG. 62). The same applies to part (c) of FIG. 62 and parts (a) and (b) of FIG. 63. For the convenience of description, context indices for chrominance are illustrated in parts (a) and (b) of FIG. 63, with the offset SigCtxOffsetLuma for identifying the context indices for luminance and chrominance being SigCtxOffsetLuma=14, but the embodiment is not limited thereto. Preferably, offsetClr is the total number of context indices for luminance of a 4×4 transform block to a 32×32 transform block.

The context indices assigned to the individual coefficient positions illustrated in parts (a) and (b) of FIG. 60 and parts (a) and (b) of FIG. 68 described below can also be derived through bit calculation as illustrated in FIGS. 100, 101, and 102, as described below.

In the example illustrated in parts (b) and (c) of FIG. 62, fourteen context indices are derived for luminance. In the example illustrated in parts (a) and (b) of FIG. 63, fourteen context indices are derived for chrominance. Thus, in the examples illustrated in parts (b) and (c) of FIG. 62 and parts (a) and (b) of FIG. 63, 14+14=28 context indices are derived. This number of context indices is smaller by nine than thirty-seven context indices that are derived in the comparative example illustrated in parts (a) to (c) of FIG. 30.

As described above, in this process, the context index derivation method illustrated in FIG. 60 is used to perform a common classification process for classifying 4×4 components and 8×8 components for luminance and chrominance to sub-groups. Accordingly, a context index derivation process can be simplified while coding efficiency being maintained. Further, according to this process, the number of context indices to be derived can be reduced, and thus a context index derivation process can be simplified, and the memory size for holding context indices can be reduced.

(Specific Example 3 of Frequency Classification Process Performed by Frequency Classifying Unit 124a and Context Index Derivation Process Performed by Position Context Deriving Unit 124b in a Case where Frequency Region has Certain Size or Smaller)

Figure 65:
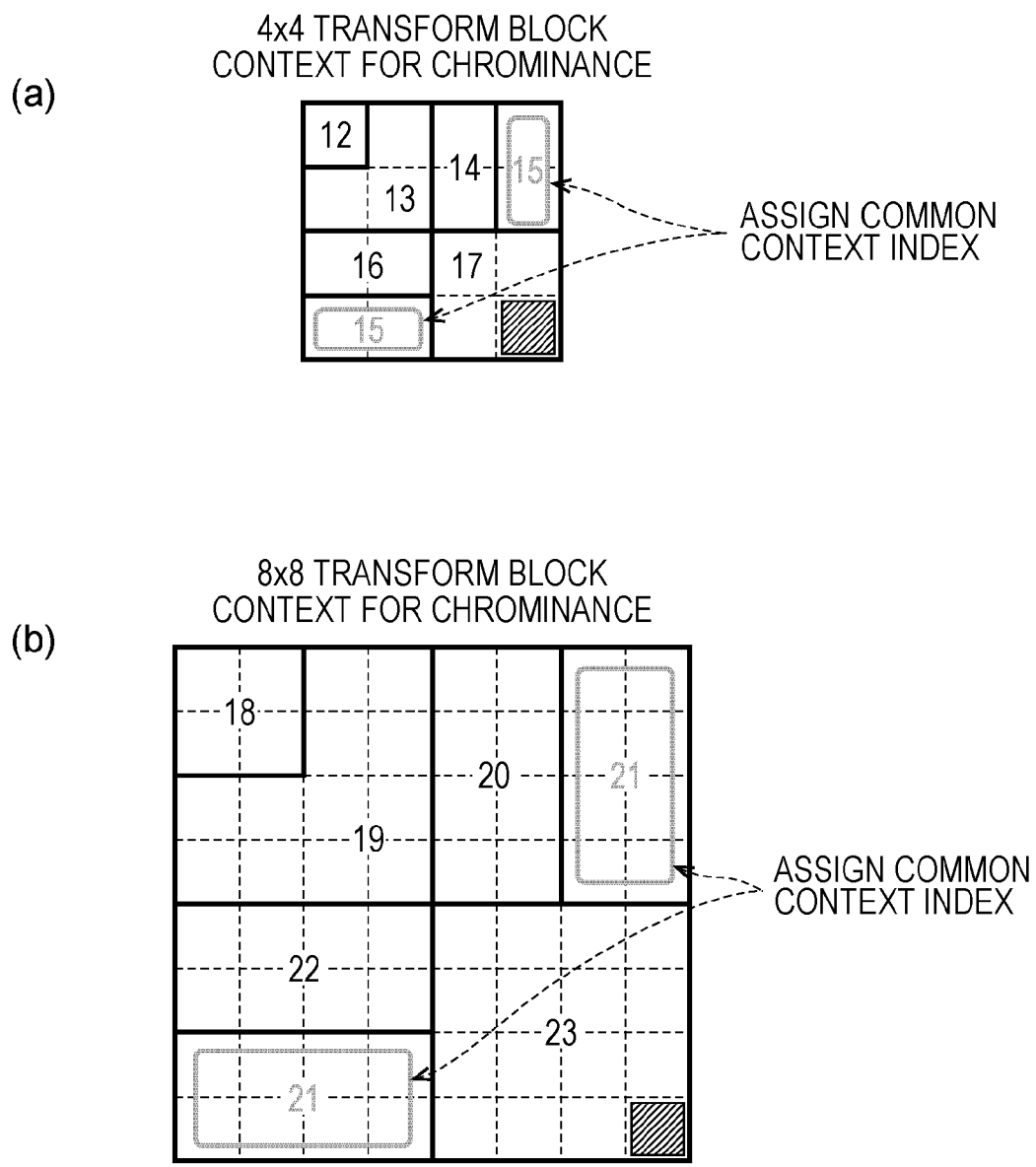
FIG. 65 includes diagrams describing another example of the context index derivation process performed by the position context deriving unit included in the coefficient presence/absence flag decoder according to the embodiment, in which part (a) illustrates the values of individual context indices related to chrominance of 4×4 components, which are obtained in the case of using CTX_IND_MAP[index] in part (a) of FIG. 64 for the pseudo code illustrated in FIG. 61, and part (b) illustrates the values of individual context indices related to chrominance of 8×8 components, which are obtained in the case of using CTX_IND_MAP[index] in part (a) of FIG. 64 for the pseudo code illustrated in FIG. 61.

A description will be given of specific example 3 of the frequency classification process performed by the frequency classifying unit 124a and the context index derivation process performed by position context deriving unit 124b in a case where the frequency region has a certain size or smaller, with further reference to FIGS. 64 and 65.

First, in a case where the target frequency region to be processed has the certain size or smaller, the frequency classifying unit 124a performs a process similar to that performed by the frequency classifying unit 124a in the above-described specific example 2 on the basis of the positions (xC, yC) of the target frequency components to be processed, so as to classify the frequency components to the sub-groups R0 to R6.

Subsequently, in a case where the target frequency region to be processed has the certain size or smaller, the position context deriving unit 124b may assign context indices to the individual sub-groups classified by the frequency classifying unit 124a by using a characteristic that the occurrence frequency of non-zero coefficients is symmetrical with respect to a boundary at which u=v is satisfied, u representing horizontal-direction frequency components (FIG. 60) and v representing vertical-direction frequency components.

In part (a) of FIG. 60, regarding 4×4 components, the position context deriving unit 124b derives and assigns a common context index ctxIdx(i) to the region R3 on the high-frequency side among horizontal-direction frequency components and the region R5 on the high-frequency side among vertical-direction frequency components. In part (b) of FIG. 60, regarding 8×8 components, the position context deriving unit 124b derives and assigns a common context index ctxIdx(i) to the region R3 on the high-frequency side among horizontal-direction frequency components and the region R5 on the high-frequency side among vertical-direction frequency components.

For example, it is assumed that, regarding luminance, context indices ctxIdx=0, 1, 2, 3, 4, 3, and 5 are respectively derived for the regions R0, R1, R2, R3, R4, R5, and R6 illustrated in part (a) of FIG. 60 in the case of 4×4 components. In this case, context indices ctxIdx=6, 7, 8, 9, 10, 9, and 11 are respectively derived for the regions R0, R1, R2, R3, R4, R5, and R6 illustrated in part (b) of FIG. 60 in the case of 8×8 components.

Likewise, it is assumed that, regarding chrominance, context indices ctxIdx=12, 13, 14, 15, 16, 15, and 17 are respectively derived for the regions R0, R1, R2, R3, R4, R5, and R6 illustrated in part (a) of FIG. 60 in the case of 4×4 components. In this case, context indices ctxIdx=18, 19, 20, 21, 22, 21, and 23 are respectively derived for the regions R0, R1, R2, R3, R4, R5, and R6 illustrated in part (b) of FIG. 60 in the case of 8×8 components.

The above-described frequency classification process performed by the frequency classifying unit 124a and the above-described context derivation process performed by the position context deriving unit 124b may be expressed by the pseudo code illustrated in FIG. 61.

That is, in the pseudo code illustrate in FIG. 61, a certain offset value is added to the reference value of a look-up table CTX_IND_MAP[index] corresponding to an index value index that is determined by a sub-block position (X, Y), and thereby the context index ctxIdx of the target frequency component (xC, yC) to be processed is calculated. In the case of a 4×4 transform block and an 8×8 transform block, the index value index that is determined by the position (X, Y) of each sub-block (1×1 sub-block in the case of 4×4, and 2×2 sub-block in the case of 8×8) represents the scan order (start value is 0) of the sub-block in the horizontal direction. The index value index is calculated by using the following equation, on the basis of the sub-block position (X, Y).

index=($Y$>>2)+$X$

The context index ctxIdx for luminance of each transform block is derived by using the following equation.
(In the Case of 4×4 Components)

ctxIdx=CTX_IND_MAP[index]

(In the Case of 8×8 Components)

ctxIdx=CTX_IND_MAP[index]+sigCtxOffset

Here, sigCtxOffset is a certain offset for identifying a context index of 4×4 components and a context index of 8×8 components.

The context index ctxIdx for chrominance of each transform block is derived by using the following equation.
(In the Case of 4×4 Components)

ctxIdx=CTX_IND_MAP[index]+SigCtxOffsetLuma (In the Case of 8×8 Components)

ctxIdx=CTX_IND_MAP[index]+sigCtxOffset+ SigCtxOffsetLuma

Here, sigCtxOffset is a certain offset for identifying a context index of 4×4 components and a context index of 8×8 components, 16×4 components, and 4×16 components, whereas SigCtxOffsetLuma is a certain offset for identifying context indices for luminance and chrominance.

In this case, the value of offset in "sigCtx=log 2TrafoSize==2 ? 0: offset" in FIG. 61 is set to 6.

Part (a) of FIG. 64 is a diagram illustrating an example of CTX_IND_MAP[index] in the pseudo code illustrated in FIG. 61. Part (b) of FIG. 64 illustrates the values of individual context indices for luminance of 4×4 components, which are obtained in the case of using CTX_IND_MAP[index] in part (a) of FIG. 64 for the pseudo code illustrated in FIG. 61. Part (c) of FIG. 64 illustrates the values of individual context indices for luminance of 8×8 components, which are obtained in the case of using CTX_IND_MAP[index] in part (a) of FIG. 64 for the pseudo code illustrated in FIG. 61. Part (a) of FIG. 65 illustrates the values of individual context indices for chrominance of 4×4 components, which are obtained in the case of using CTX_IND_MAP[index] in part (a) of FIG. 64 for the pseudo code illustrated in FIG. 61. Part (b) of FIG. 65 illustrates the values of individual context indices for chrominance of 8×8 components, which are obtained in the case of using CTX_IND_MAP[index] in part (a) of FIG. 62 for the pseudo code illustrated in FIG. 61. In the example illustrated in part (b) of FIG. 64, a context index is not derived for the frequency component located on the highest-frequency component side (the shaded frequency component in part (a) of FIG. 64). The same applies to part (c) of FIG. 64 and parts (a) and (b) of FIG. 65. For the convenience of description, context indices for chrominance are illustrated in parts (a) and (b) of FIG. 65, with the offset SigCtxOffsetLuma for identifying the context indices for luminance and chrominance being SigCtxOffsetLuma=12, but the embodiment is not limited thereto. Preferably, SigCtxOffsetLuma is the total number of context indices for luminance of a 4×4 transform block to a 32×32 transform block.

In the example illustrated in parts (b) and (c) of FIG. 64, twelve context indices are derived for luminance. In the example illustrated in parts (a) and (b) of FIG. 65, twelve context indices are derived for chrominance. Thus, in the examples illustrated in parts (b) and (c) of FIG. 64 and parts (a) and (b) of FIG. 65, 12+12=24 context indices are derived.

This number of context indices is smaller by thirteen than thirty-seven context indices that are derived in the comparative example illustrated in parts (a) to (c) of FIG. 30.

As described above, in this process, the context index derivation method illustrated in FIG. 60 is used to perform a common classification process for classifying 4×4 components and 8×8 components for luminance and chrominance to sub-groups. Accordingly, a context index derivation process can be simplified while coding efficiency being maintained. Further, according to this process, the number of context indices to be derived can be reduced, and thus a context index derivation process can be simplified, and the memory size for holding context indices can be reduced.

(Specific example 4 of frequency classification process performed by frequency classifying unit 124a and context index derivation process performed by position context deriving unit 124b in a case where frequency region has certain size or smaller)

In specific example 3 of the frequency classification process performed by the frequency classifying unit 124a and the context index derivation process performed by position context deriving unit 124b in a case where the frequency region has a certain size or smaller, a description has been given of an example of assigning context indices to the individual sub-groups classified by the frequency classifying unit 124a by using a characteristic that the occurrence frequency of non-zero coefficients is symmetrical with respect to a boundary at which u=v is satisfied, u representing horizontal-direction frequency components and v representing vertical-direction frequency components, for both luminance and chrominance.

Hereinafter, a description will be given of specific example 4 of the frequency classification process performed by the frequency classifying unit 124a and the context index derivation process performed by position context deriving unit 124b in a case where the frequency region has a certain size or smaller, with further reference to FIGS. 66 to 69. In specific example 4 described here, the above-described specific example 2 is applied for luminance, and the context index derivation process according to the above-described specific example 3 is applied for chrominance.

First, in a case where the target frequency region to be processed has the certain size or smaller, the frequency classifying unit 124a performs a process similar to that performed by the frequency classifying unit 124a in the above-described specific example 2 on the basis of the positions (xC, yC) of the target frequency components to be processed, so as to classify the frequency components to the sub-groups R0 to R6.

Subsequently, in a case where the target frequency region to be processed has the certain size or smaller, the position context deriving unit 124b assigns, for luminance, individual context indices to the individual sub-groups classified by the frequency classifying unit 124a. For chrominance, the position context deriving unit 124b may assign context indices to the individual sub-groups classified by the frequency classifying unit 124a, by using a characteristic that the occurrence frequency of non-zero coefficients is symmetrical with respect to a boundary at which u=v is satisfied, u representing horizontal-direction frequency components and v representing vertical-direction frequency components. That is, in the case of chrominance, the position context deriving unit 124b derives and assigns a common context index ctxIdx(i) to the region R3 on the high-frequency side of horizontal-direction frequency components and the region R5 on the high-frequency side of vertical-direction frequency components regarding 4×4 components in part (a) of FIG. 60.

For example, it is assumed that, regarding luminance, context indices ctxIdx=0, 1, 2, 3, 4, 5, and 6 are respectively derived for the regions R0, R1, R2, R3, R4, R5, and R6 illustrated in part (a) of FIG. 60 in the case of 4×4 components. In this case, context indices ctxIdx=7, 8, 9, 10, 11, 12, and 13 are respectively derived for the regions R0, R1, R2, R3, R4, R5, and R6 illustrated in part (b) of FIG. 60 in the case of 8×8 components.

It is assumed that, regarding chrominance, context indices ctxIdx=14, 15, 16, 17, 18, 17, and 19 are respectively derived for the regions R0, R1, R2, R3, R4, R5, and R6 illustrated in part (a) of FIG. 60 in the case of 4×4 components. In this case, context indices ctxIdx=20, 21, 22, 23, 24, 23, and 25 are respectively derived for the regions R0, R1, R2, R3, R4, R5, and R6 illustrated in part (b) of FIG. 60 in the case of 8×8 components.

The above-described frequency classification process performed by the frequency classifying unit 124a and the above-described context derivation process performed by the position context deriving unit 124b may be expressed by the pseudo code illustrated in FIG. 66.

That is, in the pseudo code illustrate in FIG. 66, a certain offset value is added to the reference value of a look-up table CTX_IND_MAP_L[index] or CTX_IND_MAP_C[index] corresponding to an index value index that is determined by a sub-block position (X, Y), and thereby the context index ctxIdx of the target frequency component (xC, yC) to be processed is calculated. In the case of a 4×4 transform block and an 8×8 transform block, the index value index that is determined by the position (X, Y) of each sub-block (1×1 sub-block in the case of 4×4, and 2×2 sub-block in the case of 8×8) represents the scan order (start value is 0) of the sub-block in the horizontal direction. The index value index is calculated by using the following equation, on the basis of the sub-block position (X, Y).

Index=(Y>>2)+X

The context index ctxIdx for luminance of each transform block is derived by using the following equation.
(In the Case of 4×4 Components)

ctxIdx=CTX_IND_MAP_L[index]

(In the Case of 8×8 Components)

ctxIdx=CTX_IND_MAP_L[index]+sigCtxOffset

Here, sigCtxOffset is a certain offset for identifying a context index of 4×4 components and a context index of 8×8 components.

The context index ctxIdx for chrominance of each transform block is derived by using the following equation.
(In the Case of 4×4 Components)

ctxIdx=CTX_IND_MAP_C[index]+SigCtxOffset-Luma (In the Case of 8×8 Components)

ctxIdx=CTX_IND_MAP_C[index]+sigCtxOffset+SigCtxOffsetLuma

Here, sigCtxOffset is a certain offset for identifying a context index of 4×4 components and a context index of 8×8 components, whereas SigCtxOffsetLuma is a certain offset for identifying context indices for luminance and chrominance.

Part (a) of FIG. 67 is a diagram illustrating an example of CTX_IND_MAP_L[index] in the pseudo code illustrated in FIG. 66. Part (a) of FIG. 68 illustrates the values of individual context indices for luminance of 4×4 components, which are obtained in the case of using CTX_IND_MAP_L[index] in part (a) of FIG. 67 for the pseudo code illustrated in FIG. 66. Part (b) of FIG. 68 illustrates the values of individual context indices for luminance of 8×8 components, which are obtained in the case of using CTX_IND_MAP_L[index] in part (a) of FIG. 67 for the pseudo code illustrated in FIG. 66.

Part (a) of FIG. 69 illustrates the values of individual context indices for chrominance of 4×4 components, which are obtained in the case of using CTX_IND_MAP_C[index] in part (b) of FIG. 67 for the pseudo code illustrated in FIG. 66. Part (b) of FIG. 69 illustrates the values of individual context indices for chrominance of 8×8 components, which are obtained in the case of using CTX_IND_MAP_C[index] in part (b) of FIG. 67 for the pseudo code illustrated in FIG. 66. In the example illustrated in part (a) of FIG. 68, a context index is not derived for the frequency component located on the highest-frequency component side (the shaded frequency component in part (a) of FIG. 68). The same applies to part (b) of FIG. 68 and parts (a) and (b) of FIG. 69. For the convenience of description, context indices for chrominance are illustrated in parts (a) and (b) of FIG. 69, with the offset SigCtxOffsetLuma for identifying the context indices for luminance and chrominance being SigCtxOffsetLuma=14, but the embodiment is not limited thereto. Preferably, SigCtxOffsetLuma is the total number of context indices for luminance of a 4×4 transform block to a 32×32 transform block.

In the example illustrated in parts (a) and (b) of FIG. 68, fourteen context indices are derived for luminance. In the example illustrated in parts (a) and (b) of FIG. 69, twelve context indices are derived for chrominance. Thus, in the examples illustrated in parts (b) and (c) of FIG. 68 and parts (a) and (b) of FIG. 69, 14+12=26 context indices are derived.

This number of context indices is smaller by eleven than thirty-seven context indices that are derived in the comparative example illustrated in parts (a) to (c) of FIG. 30.

As described above, in this process, the context index derivation process illustrated in FIGS. 68 and 69 is used to perform a common classification process for classifying 4×4 components and 8×8 components for luminance and chrominance to sub-groups. Accordingly, a context index derivation process can be collectively performed, and a context index derivation process can be simplified. Further, according to this process, the number of context indices to be derived can be reduced, and thus a context index derivation process can be simplified, and the memory size for holding context indices can be reduced.

(Specific Example 5 of Frequency Classification Process Performed by Frequency Classifying Unit 124a and Context Index Derivation Process Performed by Position Context Deriving Unit 124b in a Case where Frequency Region has Certain Size or Smaller)

In specific examples 2 to 4, a description has been given of the case of performing a common classification process on frequency components in a 4×4 transform block and an 8×8 transform block. However, the classification process is not limited thereto. For example, in the region R0 of the 8×8 transform block illustrated in part (b) of FIG. 60, a DC component may be classified as another sub-group R7. That is, a frequency region may be divided into sub-regions (sub-groups) so that the split pattern of a frequency region having a size of 4×4 components and the split pattern of a frequency region having a size of 8×8 components are similar to each other in the frequency region except a DC component.

Specifically, in a case where the target frequency region to be processed has the certain size or smaller, the target frequency components to be processed are classified to the sub-groups R0 to R6 in the case of 4×4 components, and to the sub-groups R0 to R7 in the case of 8×8 components, on the basis of the positions (xC, yC) of the target frequency components.

(In the Case of 4×4 Components)

(1) In a case where xC=0 and yC=0, the frequency component is classified to the sub-group R0.

(2) In a case where (xC=0 and yC=0) is not satisfied, xC<2, and yC<2, the frequency component is classified to the sub-group R1.

(3) In a case where xC=2 and yC<2, the frequency component is classified to the sub-group R2.

(4) In a case where xC=3 and yC<2, the frequency component is classified to the sub-group R3.

(5) In a case where xC<2 and yC=2, the frequency component is classified to the sub-group R4.

(6) In a case where xC<2 and yC=3, the frequency component is classified to the sub-group R5.

(7) In a case where xC≥2 and yC≥2, the frequency component is classified to the sub-group R6.

The foregoing (1) and (2) may be replaced by the following (1') and (2').

(1') In a case where xC<1 and yC<1, the frequency component is classified to the sub-group R0.

(2') In a case where (xC<1 and yC<1) is not satisfied, xC<2, and yC<2, the frequency component is classified to the sub-group R1.

(In the Case of 8×8 Components)

(1) In a case where xC=0 and yC=0, the frequency component is classified to the sub-group R7.

(2) In a case where (xC=0 and yC=0) is not satisfied, xC<2, and yC<2, the frequency component is classified to the sub-group R0.

(3) In a case where (xC<2 and yC<2) is not satisfied, xC<4, and yC<4, the frequency component is classified to the sub-group R1.

(4) In a case where xC≥4, xC<6, and yC<4, the frequency component is classified to the sub-group R2.

(5) In a case where xC≥6 and yC<4, the frequency component is classified to the sub-group R3.

(6) In a case where xC<4, yC≥4, and yC<6, the frequency component is classified to the sub-group R4.

(7) In a case where xC<4 and yC≥6, the frequency component is classified to the sub-group R5.

(8) In a case where xC≥4 and yC≥4, the frequency component is classified to the sub-group R6.

Alternatively, the following process may be performed by using a common process for part of sub-group classification process for 4×4 components and 8×8 components. First, the frequency classifying unit 124*a* calculates variables X and Y on the basis of the position (xC, yC) of the target frequency component to be processed and log 2TrafoSize representing the size of a transform block, by using the following equations.

$$X = \log 2\text{TrafoSize} == 2 ? xC : xC >> 1$$

$$Y = \log 2\text{TrafoSize} == 2 ? yC : yC >> 1$$

Subsequently, on the basis of the derived variables X and Y, the target frequency components (xC, yC) to be processed are classified to the sub-groups R0 to R6.

(1) In a case where X=0 and Y=0, the frequency component is classified to the sub-group R0.

(2) In a case where (X=0 and Y=0) is not satisfied, X<2, and Y<2, the frequency component is classified to the sub-group R1.

(3) In a case where X=2 and Y<2, the frequency component is classified to the sub-group R2.

(4) In a case where X=3 and Y<2, the frequency component is classified to the sub-group R3.

(5) In a case where X<2 and Y=2, the frequency component is classified to the sub-group R4.

(6) In a case where X<2 and Y=3, the frequency component is classified to the sub-group R5.

(7) In a case where X≥2 and Y≥2, the frequency component is classified to the sub-group R6.

After the above-described common process, a DC component (xC=0 and yC=0) included in the sub-group R0 located at a low-frequency of 8×8 components is further classified as a sub-group R7.

Alternatively, a common process of classifying the 4×4 components and 8×8 components to sub-groups can be performed in the following manner.

(1) In a case where xC<width/4 and yC<width/4, the frequency component is classified to the sub-group R0.

(2) In a case where xC<width/2 and yC<width/2, the frequency component is classified to the sub-group R1.

(3) In a case where xC>width/2, xC<width×¾, and yC<width/2, the frequency component is classified to the sub-group R2.

(4) In a case where xC≥width×¾ and yC<width2, the frequency component is classified to the sub-group R3.

(5) In a case where xC<width/2, yC≥width/2, and yC<width×¾, the frequency component is classified to the sub-group R4.

(6) In a case where xC<width/2 and yC≥width×¾, the frequency component is classified to the sub-group R5.

(7) In a case where xC≥width/2 and yC≥width/2, the frequency component is classified to the sub-group R6.

Here, "width" is the width of the target frequency region (4 for 4×4 components, and 8 for 8×8 components).

After the above-described common process, a DC component (xC=0 and yC=0) included in the sub-group R0 located at a low-frequency of 8×8 components is further classified as a sub-group R7.

An example in which the above-described classification process is applied to 4×4 components and 8×8 components is illustrated in parts (a) and (b) of FIG. 70. Part (a) of FIG. 70 is a diagram illustrating the regions (sub-groups) R0 to R6 that form a frequency region having a size of 4×4 components, and part (b) of FIG. 70 is a diagram illustrating the regions (sub-groups) R0 to R7 that form a frequency component having a size of 8×8 components.

Subsequently, the position context deriving unit 124*b* may assign the corresponding context indices ctxIdx(i) to the individual sub-groups Ri (i=0, 1, 2, 3, 4, 5, 6, and 7) illustrated in parts (a) and (b) of FIG. 70, which have been classified by the frequency classifying unit 124*a*. Specifically, a context index ctxIdx(i) for luminance is derived using the following equations.

$$\text{offsetBlk}=\log 2\text{TrafoWidth}==2\ ?0:7$$

$$\text{ctxIdx}(i)=i+\text{offsetBlk}$$

Note that i represents a number identifying a sub-group Ri, and offsetBlk represents an offset for identifying context indices of 4×4 components and 8×8 components. A certain value is set to offsetBlk in accordance with log 2TrafoWidth that represents a logarithm value of a horizontal width size of a transform block.

Regarding luminance, the context indices ctxIdx(i) corresponding to the individual sub-groups Ri of 4×4 components derived using the foregoing equations are illustrated in part (a) of FIG. 88, and the context indices ctxIdx(i) corresponding to the individual sub-groups Ri of 8×8 components are illustrated in part (b) of FIG. 88.

A context index ctxIdx(i) for chrominance is derived using the following equations.

$$\text{offsetBlk}=\log 2\text{TrafoWidth}==2\ ?0:7$$

$$\text{ctxIdx}(i)=i+\text{offsetClr}+\text{offsetBlk}$$

Note that i represents a number identifying a sub-group Ri, and offsetBlk represents an offset for identifying context indices of 4×4 components and 8×8 components. A certain value is set to offsetBlk in accordance with log 2TrafoWidth that represents a logarithm value of a horizontal width size of a transform block. offsetClr is a certain offset for identifying context indices for luminance and chrominance. Here, in a case where offsetClr=20, regarding chrominance, the context indices ctxIdx(i) corresponding to individual sub-regions Ri of 4×4 components derived using the foregoing equations are illustrated in part (c) of FIG. 88, and the context indices ctxIdx(i) corresponding to individual sub-regions Ri of 8×8 components are illustrated in part (d) of FIG. 88. For the convenience of description, context indices for chrominance are illustrated in parts (c) and (d) of FIG. 88, with the offset offsetClr for identifying the context indices for luminance and chrominance being offsetClr=20, but the embodiment is not limited thereto. Preferably, offsetClr is the total number of context indices for luminance of a 4×4 transform block to a 32×32 transform block.

The above-described frequency classification process performed by the frequency classifying unit 124a and the above-described context derivation process performed by the position context deriving unit 124b may be expressed by the pseudo code illustrated in part (a) of FIG. 89. That is, in the pseudo code illustrated in part (a) of FIG. 89, a certain index value index is assigned to a DC component of a 8×8 transform block, an index value index determined by the sub-block position (X, Y) is assigned to a frequency component other than the DC of the 8×8 transform block, and the context indices ctxIdx of the target frequency components to be processed (xC, yC) are calculated by using the index value index and the look-up table CTX_IND_MAP[index].

(In the Case of 4×4 Components)

The index value index corresponding to the position (X, Y) of the sub-block (1×1 sub-block in the case of 4×4) to which the target frequency component (xC, yC) to be processed belongs is calculated by using the following equation.

$$\text{index}=(Y<<2)+X$$

Note that X=xC and Y=yC. Subsequently, on the basis of the calculated index value index and the look-up table CTX_IND_MAP[index], a context index ctxIdx is derived by using the following equation.

$$\text{ctxIdx}=\text{CTX\_IND\_MAP}[\text{index}]$$

In the case of chrominance, by using the context index ctxIdx calculated by using the foregoing equation and a certain offset offsetClr, a context index is derived by using the following equation.

$$\text{ctxIdx}=\text{ctxIdx}+\text{offsetClr}$$

Note that offsetClr is a certain offset for identifying context indices for luminance and chrominance.

(In the Case of 8×8 Components)

The index value index corresponding to the position (X, Y) of the sub-block (2×2 sub-block in the case of 8×8) to which the target frequency component (xC, yC) to be processed belongs, and a DC component is calculated by using the following equation.

$$\text{index}=(xC+yC==0)?16:(Y<<2)+X$$

Note that X=xC>>1 and Y=yC>>1. Subsequently, by using the calculated index value index, the look-up table CTX_IND_MAP[index], and a certain offset offsetBlk for identifying context indices for 4×4 components and 8×8 components, a context index ctxIdx is derived by using the following equation.

$$\text{ctxIdx}=\text{CTX\_IND\_MAP}[\text{index}]+\text{offsetBlk}$$

Here, the total number of context indices for luminance of 4×4 components is 7, and thus offsetBlk=7. In the case of chrominance, by using the context index ctxIdx calculated by using the foregoing equation and a certain offset offsetClr, a context index is derived by using the following equation.

$$\text{ctxIdx}=\text{ctxIdx}+\text{offsetClr}$$

Note that offsetClr is a certain offset for identifying context indices for luminance and chrominance.

Part (b) of FIG. 89 is a diagram illustrating an example of CTX_IND_MAP[index] in the pseudo code illustrated in part (a) of FIG. 89. Part (a) of FIG. 88 illustrates the values of individual context indices for luminance of 4×4 components, which are obtained in the case of using CTX_IND_MAP[index] in part (b) of FIG. 89 for the pseudo code illustrated in part (a) of FIG. 89. Part (b) of FIG. 88 illustrates the values of individual context indices for luminance of 8×8 components, which are obtained in the case of using CTX_IND_MAP[index] in part (b) of FIG. 89 for the pseudo code illustrated in part (a) of FIG. 89. Part (c) of FIG. 88 illustrates the values of individual context indices for chrominance of 4×4 components, which are obtained in the case of using CTX_IND_MAP[index] in part (b) of FIG. 89 for the pseudo code illustrated in part (a) of FIG. 89. Part (d) of FIG. 88 illustrates the values of individual context indices for chrominance of 8×8 components, which are obtained in the case of using CTX_IND_MAP[index] in part (b) of FIG. 89 for the pseudo code illustrated in part (a) of FIG. 89. In the example illustrated in part (a) of FIG. 88, a context index is not derived for the frequency component located on the highest-frequency component side (the shaded frequency component in part (a) of FIG. 88). The same applies to parts (b), (c), and (d) of FIG. 88. For the convenience of description, context indices for chrominance are illustrated in parts (c) and (d) of FIG. 88, with the offset offsetClr for identifying the context indices for luminance and chrominance being offsetClr=20, but the embodiment is not limited thereto. Preferably, offsetClr is the total number of context indices for luminance of a 4×4 transform block to a 32×32 transform block.

Thus, in the example illustrated in parts (a) and (b) of FIG. 70, fifteen context indices are derived for luminance, fifteen context indices are derived for chrominance, that is, 15+15=30 context indices are derived. This number of context indices is smaller by seven than thirty-seven context indices that are derived in the comparative example illustrated in parts (a) to (c) of FIG. 30.

Alternatively, context indices may be assigned to the sub-groups illustrated in parts (a) and (b) of FIG. 70 and classified by the frequency classifying unit 124a, by using a characteristic that the occurrence frequency of non-zero coefficients is symmetrical with respect to a boundary at which u=v is satisfied, u representing horizontal-direction frequency components and v representing vertical-direction frequency components. For example, referring to part (a) of FIG. 71, regarding 4×4 components, the position context deriving unit 124b derives and assigns a common context index ctxIdx to the region R3 on the high-frequency side among horizontal-direction frequency components and the region R5 on the high-frequency side among vertical-direction frequency components, and derives and assigns individual context indices to the residual R0, R1, R2, R4, and R6. Referring to part (b) of FIG. 71, regarding 8×8 components, the position context deriving unit 124b derives and assigns a common context index ctxIdx to the region R3 on the high-frequency side among horizontal-direction frequency components and the region R5 on the high-frequency side among vertical-direction frequency components, and derives and assigns individual context indices to the residual R0, R1, R2, R4, R6, and R7.

Thus, in the example illustrated in parts (a) and (b) of FIG. 71, thirteen context indices are derived for luminance, thirteen context indices are derived for chrominance, that is, 13+13=26 context indices are derived. This number of context indices is smaller by eleven than thirty-seven context indices that are derived in the comparative example illustrated in parts (a) to (c) of FIG. 30.

Alternatively, for the sub-groups illustrated in parts (a) and (b) of FIG. 70 that have been classified by the frequency classifying unit 124a, individual context indices may be assigned for luminance. For chrominance, context indices may be assigned by using a characteristic that the occurrence frequency of non-zero coefficients is symmetrical with respect to the boundary at which u=v is satisfied, u representing horizontal-direction frequency components and v representing vertical-direction frequency components. For example, in the case of luminance, the position context deriving unit 124b assigns individual context indices to R0 to R6 of 4×4 components and R0 to R7 of 8×8 components. In the case of chrominance, regarding 4×4 components, in part (a) of FIG. 71, the position context deriving unit 124b derives and assigns a common context index ctxIdx to the region R3 on the high-frequency side among horizontal-direction frequency components and the region R5 on the high-frequency side among vertical-direction frequency components, and derives and assigns individual context indices to the residual R0, R1, R2, R4, and R6. Regarding 8×8 components, in part (b) of FIG. 71, the position context deriving unit 124b derives and assigns a common context index ctxIdx to the region R3 on the high-frequency side among horizontal-direction frequency components and the region R5 on the high-frequency side among vertical-direction frequency components, and derives and assigns individual context indices to the residual R0, R1, R2, R4, R6, and R7. That is, fifteen context indices are derived for luminance, and thirteen context indices are derived for chrominance, that is, 15+13=28 context indices are derived. This number of context indices is smaller by nine than thirty-seven context indices that are derived in the comparative example illustrated in parts (a) to (c) of FIG. 30.

Alternatively, for the sub-groups illustrated in parts (a) and (b) of FIG. 70 that have been classified by the frequency classifying unit 124a, the position context deriving unit 124b may assign a common context index to low-frequency regions of different transform blocks. For example, the position context deriving unit 124b derives and assigns a common context index to the region R0 (DC component) in 4×4 components and the region R7 (DC component) in 8×8 components, and derives and assigns individual context indices to R1, R2, R3, R4, R5, and R6 in 4×4 components and R0, R1, R2, R3, R4, R5, and R6 in 8×8 components. Thus, in the example illustrated in parts (a) and (b) of FIG. 72, fourteen context indices are derived for luminance, and fourteen context indices are derived for chrominance, that is, 14+14=28 context indices are derived. This number of context indices is smaller by nine than thirty-seven context indices that are derived in the comparative example illustrated in parts (a) to (c) of FIG. 30.

The position context deriving unit 124b may be configured to derive a common context index for DC components of all transform blocks (4×4, 8×8, 16×4, 4×16, 16×16, 32×8, 8×32, and 32×32), in addition to 4×4 components and 8×8 components. With this configuration, the number of context indices can be further reduced.

Alternatively, for the sub-groups illustrated in parts (a) and (b) of FIG. 70 that have been classified by the frequency classifying unit 124a, the position context deriving unit 124b may assign a common context index to low-frequency regions of different transform blocks. Furthermore, to high-frequency regions of individual transform blocks, the position context deriving unit 124b may assign context indices by using a characteristic that the occurrence frequency of non-zero coefficients is symmetrical with respect to the boundary at which u=v is satisfied, u representing horizontal-direction frequency components and v representing vertical-direction frequency components.

For example, the position context deriving unit 124b derives and assigns a common context index to the region R0 (DC component) in the 4×4 components illustrated in part (a) of FIG. 73 and the region R7 (DC component) in the 8×8 components illustrated in part (b) of FIG. 73. Subsequently, regarding the 4×4 components illustrated in part (a) of FIG. 73, the position context deriving unit 124b derives and assigns a common context index ctxIdx to the region R3 on the high-frequency side among horizontal-direction frequency components and the region R5 on the high-frequency side among vertical-direction frequency components, and derives and assigns individual context indices to the residual R1, R2, R4, and R6. Also, regarding the 8×8 components illustrated in part (b) of FIG. 73, the position context deriving unit 124b derives and assigns a common context index ctxIdx to the region R3 on the high-frequency side among horizontal-direction frequency components and the region R5 on the high-frequency side among vertical-direction frequency components, and derives and assigns individual context indices to the residual R0, R1, R2, R4, and R6.

Thus, in the example illustrated in parts (a) and (b) of FIG. 73, twelve context indices are derived for luminance, and twelve context indices are derived for chrominance, that is, 12+12=24 context indices are derived. This number of context indices is smaller by thirteen than thirty-seven context indices that are derived in the comparative example illustrated in parts (a) to (c) of FIG. 30.

If the position context deriving unit 124b is configured to derive a common context index for the DC components of all the transform blocks (4×4, 8×8, 16×4, 4×16, 16×16, 32×8, 8×32, and 32×32), the number of context indices can be further reduced.

As described above, according to this process, the number of context indices to be derived can be reduced. Thus, a context index derivation process can be simplified, and the memory size for holding context indices can be reduced.

(Specific Example 6 of Frequency Classification Process Performed by Frequency Classifying Unit 124a and Context Index Derivation Process Performed by Position Context Deriving Unit 124b in a Case where Frequency Region has Certain Size or Smaller)

In specific example 2, a description has been given of the case of, regarding transform block sizes of 4×4 blocks (4×4 components) and 8×8 blocks (8×8 components), using a common process of classifying target frequency components to be processed to sub-groups, and simplifying a context index derivation process. Here, a description will be further given of the case of applying 16×4 blocks (16×4 components) with a horizontal width of 16 and a vertical width of 4, and 4×16 blocks (4×16 components) with a horizontal width of 4 and a vertical width of 16.

First, in a case where the target frequency to be processed has a certain size or smaller, the frequency classifying unit 124a classifies, on the basis of the positions (xC, yC) of the target frequency components to be processed, the target frequency components to be processed to sub-groups (sub-regions) R0 to R6 in the case of 4×4 components and 8×8 components, and to sub-groups A0 to A6 in the case of 4×16 components and 16×4 components. The process of classifying frequencies of 4×4 components and 8×8 components to the sub-groups R0 to R6 is similar to that of specific example 2, and thus the description thereof is omitted.

(In the Case of 16×4 Components)

(1) In a case where 0≤xC<4 and yC=0, the frequency component is classified to the sub-group A0.

(2) In a case where (0≤xC<4 and yC=0) is not satisfied, 0≤xC<8, and 0≤yC<2, the frequency component is classified to the sub-group A1.

(3) In a case where 8≤xC<12 and 0≤yC<2, the frequency component is classified to the sub-group A2.

(4) In a case where 12≤xC<16 and 0≤yC<2, the frequency component is classified to the sub-group A3.

(5) In a case where 0≤xC<8 and yC=2, the frequency component is classified to the sub-group A4.

(6) In a case where 0≤xC<8 and yC=3, the frequency component is classified to the sub-group A5.

(7) In a case where 8≤xC<16 and 2≤yC<4, the frequency component is classified to the sub-group A6.

(In the Case of 4×16 Components)

(1) In a case where xC=0 and 0≤yC<4, the frequency component is classified to the sub-group A0.

(2) In a case where (xC=0 and 0≤yC<4) is not satisfied, 0≤xC<2, and 0≤yC<8, the frequency component is classified to the sub-group A1.

(3) In a case where xC=2 and 0≤yC<8, the frequency component is classified to the sub-group A2.

(4) In a case where xC=3 and 0≤yC<8, the frequency component is classified to the sub-group A3.

(5) In a case where 0≤xC<2 and 8≤yC<12, the frequency component is classified to the sub-group A4.

(6) In a case where 0≤xC<2 and 12≤yC<16, the frequency component is classified to the sub-group A5.

(7) In a case where 2≤xC<4 and 8≤yC<16, the frequency component is classified to the sub-group A6.

An example in which the above-described classification process is applied to 16×4 components and 4×16 components is illustrated in parts (a) and (b) of FIG. 78. Part (a) of FIG. 78 is a diagram illustrating the regions (sub-groups) A0 to A6 that form a frequency region having a size of 16×4 components, whereas part (b) of FIG. 78 is a diagram illustrating the regions (sub-groups) A0 to A6 that form a frequency region having a size of 4×16 components.

A common process may be used to classify the 16×4 components and 4×16 components to sub-groups, so as to perform a process in the following manner.

First, the frequency classifying unit 124a divides the target N×M blocks to be processed to sub-blocks of a certain size, and classifies the sub-blocks to the sub-groups A0 to A6 on the basis of the positions (X, Y) of the sub-blocks to which the target frequency components to be processed (xC, yC) belong. For example, in the case of 16×4 components, 16×4 blocks are divided to 4×1 sub-blocks having a horizontal width of 4 and a vertical width of 1. In the case of 4×16 components, 4×16 blocks are divided to 1×4 sub-blocks having a horizontal width of 1 and a vertical width of 4.

First, the frequency classifying unit 124a calculates, on the basis of the position (xC, yC) of the target frequency component to be processed, log 2TrafoWidth representing the logarithm value of the horizontal width size of a transform block (2 in the 4×16 block and 4 in the 16×4 block), and log 2TrafoHeight representing the logarithm value of the vertical width size (4 in the 4×16 block and 2 in the 16×4 block), the sub-bock position (X, Y) to which the frequency component belongs, by using the following equations.

$$X = \log 2\text{TrafoWidth} == 2 ? xC : xC >> 2$$

$$Y = \log 2\text{TrafoHeight} == 2 ? yC : yC >> 2$$

Subsequently, the frequency classifying unit 124a classifies the target frequency components to be processed (xC, yC) to the sub-groups A0 to A6 on the basis of the derived sub-block position (X, Y).

(1) In a case where X=0 and Y=0, the frequency component is classified to the sub-group A0.

(2) In a case where (X=0 and Y=0) is not satisfied, X<2, and Y<2, the frequency component is classified to the sub-group A1.

(3) In a case where X=2 and Y<2, the frequency component is classified to the sub-group A2.

(4) In a case where X=3 and Y<2, the frequency component is classified to the sub-group A3.

(5) In a case where X<2 and Y=2, the frequency component is classified to the sub-group A4.

(6) In a case where X<2 and Y=3, the frequency component is classified to the sub-group A5.

(7) In a case where X≥2 and Y≥2, the frequency component is classified to the sub-group A6.

Alternatively, the common process of classifying 4×4 components, 8×8 components, 16×4 components, and 4×16 components to sub-groups can be performed in the following manner.

(1) In a case where xC<width/4 and yC<height/4, the frequency component is classified to the sub-group A0.

(2) In a case where xC<width/2 and yC<height/2, the frequency component is classified to the sub-group A1.

(3) In a case where xC≥width/2, xC<width×¾, and yC<height/2, the frequency component is classified to the sub-group A2.

(4) In a case where xC≥width×¾ and yC<height/2, the frequency component is classified to the sub-group A3.

(5) In a case where xC<width/2, yC≥height/2, and yC<height×¾, the frequency component is classified to the sub-group A4.

(6) In a case where xC<width/2 and yC≥height×¾, the frequency component is classified to the sub-group A5.

(7) In a case where xC≥width/2 and yC≥height/2, the frequency component is classified to the sub-group A6.

Here, "width" is the horizontal width of a target frequency region (4 for 4×4 components, 8 for 8×8 components, 16 for 16×4 components, and 4 for 4×16 components). "Height" is the vertical width of the target frequency region (4 for 4×4 components, 8 for 8×8 components, 4 for 16×4 components, and 16 for 4×16 components).

Figure 79:
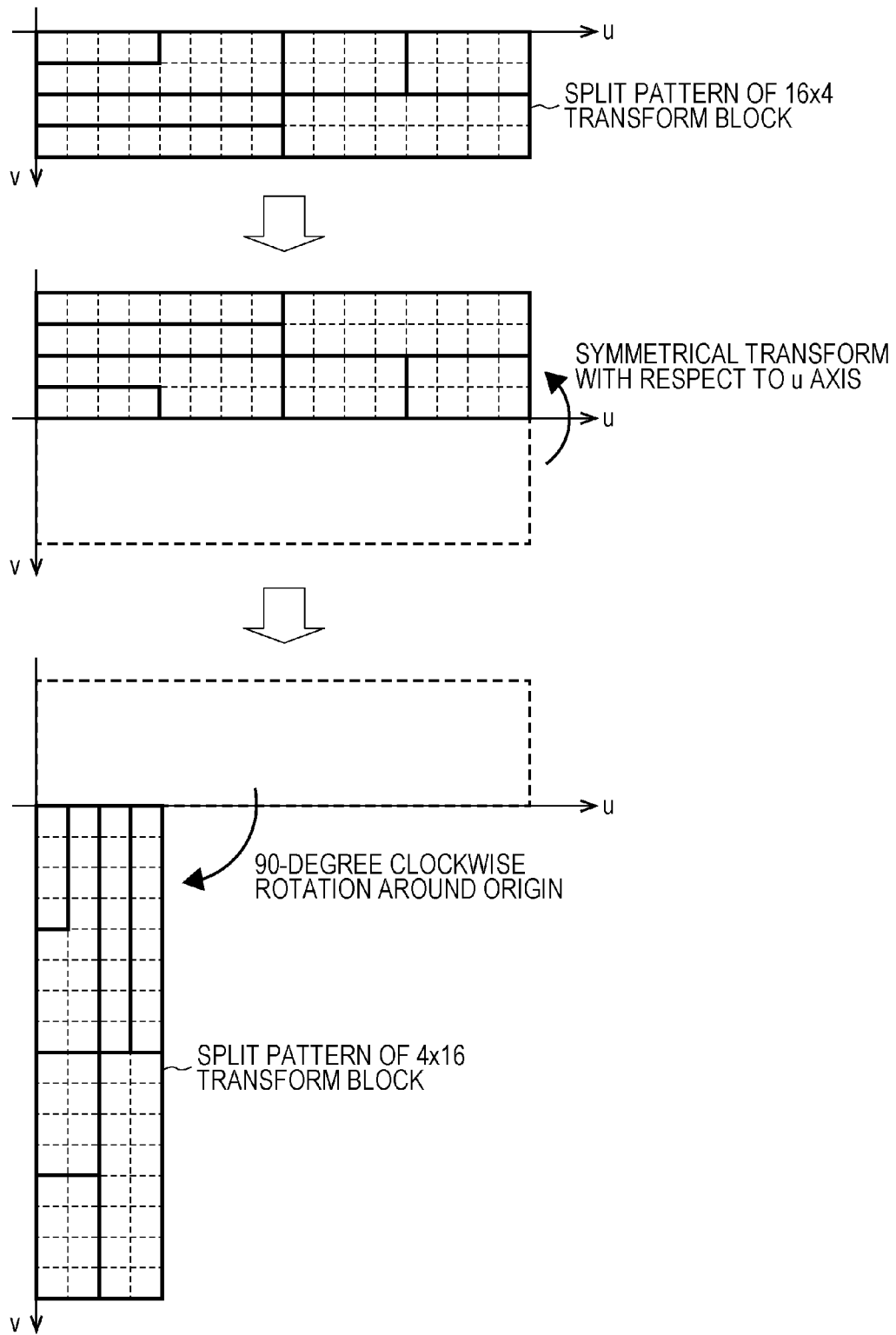
FIG. 79 is a diagram describing that a split pattern of a 16×4 transform block (16×4 components) and a split pattern of a 4×16 transform block (4×16 components) are similar to each other.

As illustrated in FIG. 79, the split pattern of 4×16 components matches the split pattern of 16×4 components that is symmetrically transformed by using u axis of horizontal-direction frequency components u as a symmetric axis and is then rotated 90 degrees clockwise around the origin. That is, the split pattern of a frequency region that is divided by the frequency classifying unit 124a and that has a size of 16×4 components (first size), and the split pattern of a frequency region that is divided by the frequency classifying unit 124a and that has a size of 4×16 components (second size) match each other via rotation and axis-symmetric transform.

In general, a distribution form of the probability of occurrence of non-zero coefficients of N×M components (N!=M, that is, N≠M) is similar to a distribution form of the probability of occurrence of non-zero coefficients of M×N components that is symmetrically transformed by using u axis of horizontal-direction frequency components u as a symmetric axis and is then rotated 90 degrees clockwise around the origin.

Subsequently, the position context deriving unit 124b assigns common context indices to sub-groups corresponding to each other, among the sub-groups illustrated in parts (a) and (b) of FIG. 78 classified by the frequency classifying unit 124a, by using a characteristic that the above-described split patterns and distribution forms of non-zero coefficients are similar to each other or match each other via rotation and axis-symmetric transform. That is, the position context deriving unit 124b derives and assigns common context indices ctxIdx (i) to the regions Ai (i=0, 1, 2, 3, 4, 5, and 6) illustrated in part (a) of FIG. 78 and the region Ai (i=0, 1, 4, 5, 2, 3, and 6) illustrated in part (b) of FIG. 78. For example, it is assumed that, regarding luminance, in the case of 16×4 components, the position context deriving unit 124b derives ctxIdx=7, 8, 9, 10, 11, 12, and 13 for the regions Ai (i=0, 1, 2, 3, 4, 5, and 6) illustrated in part (a) of FIG. 78, respectively. In this case, in the case of 4×16 components, the position context deriving unit 124b derives ctxIdx=7, 8, 9, 10, 11, 12, and 13 for Ai (i=0, 1, 4, 5, 2, 3, and 6) illustrated in part (b) of FIG. 78, respectively. Likewise, it is assumed that, regarding chrominance, in the case of 16×4 components, the position context deriving unit 124b derives ctxIdx=21, 22, 23, 24, 25, 26, and 27 for the regions Ai (i=0, 1, 2, 3, 4, 5, and 6) illustrated in part (a) of FIG. 78, respectively. In the case of 4×16 components, the position context deriving unit 124b derives ctxIdx=21, 22, 23, 24, 25, 26, and 27 for Ai (i=0, 1, 4, 5, 2, 3, and 6) illustrated in part (b) of FIG. 78, respectively.

The frequency classification process performed by the frequency classifying unit 124a and the context derivation process performed by the position context deriving unit 124b can be expressed by the pseudo code illustrated in FIG. 80. Specifically, in the pseudo code illustrated in FIG. 80, a certain offset value is added to the reference value of the look-up table CTX_IND_MAP[index] corresponding to the index value index determined by the sub-block position (X, Y), and thereby the context index ctxIdx of the target frequency component to be processed (xC, yC) is calculated. In the case of a 4×4 transform block, an 8×8 transform block, and a 16×4 transform block, the index value index determined by the position (X, Y) of each sub-block (1×1 sub-block in the case of 4×4, 2×2 sub-block in the case of 8×8, and 4×1 sub-block in the case of 16×4) represents the scan order (start value is 0) of the sub-block in the horizontal direction, and is calculated by using the following equation.

Index=(Y<<2)+X

In the case of a 4×16 transform block, the index value index determined by the position (X, Y) of a sub-block (4×1 sub-block) represents the scan order (start value is 0) of the sub-block in the vertical direction, and is calculated by using the following equation.

Index=(X<<2)+Y

The context index ctxIdx for luminance of each transform block is derived by using the following equation.

(In the Case of 4×4 Components)

ctxIdx=CTX_IND_MAP[index]

(In the Case of 8×8 Components, 16×4 Components, and 4×16 components)

ctxIdx=CTX_IND_MAP[index]+sigCtxOffset

Here, sigCtxOffset is a certain offset for identifying a context index of 4×4 components, and a context index of 8×8 components, 16×4 components, and 4×16 components.

The context index ctxIdx for chrominance of each transform block is derived by using the following equation.

(In the Case of 4×4 Components)

ctxIdx=CTX_IND_MAP[index]+SigCtxOffsetLuma (In the Case of 8×8 Components, 16×4 Components, and 4×16 components)

ctxIdx=CTX_IND_MAP[index]+sigCtxOffset+ SigCtxOffsetLuma

Here, sigCtxOffset is a certain offset for identifying a context index of 4×4 components, and a context index of 8×8 components, 16×4 components, and 4×16 components, and SigCtxOffsetLuma is a certain offset for identifying context indices for luminance and chrominance.

Part (a) of FIG. 62 is a diagram illustrating an example of a look-up table CTX_IND_MAP[index] in the pseudo code illustrated in FIG. 80. Part (a) of FIG. 81 illustrates the values of individual context indices for luminance of 16×4 components, which are obtained in the case of using CTX_IND_MAP[index] in part (a) of FIG. 62 for the pseudo code illustrated in FIG. 80. Also, part (b) of FIG. 81 illustrates the values of individual context indices for luminance of 4×16 components. Part (a) of FIG. 82 illustrates the values of individual context indices for chrominance of 16×4 components, which are obtained in the case of using CTX_IND_MAP[index] in part (a) of FIG. 62 for the pseudo code illustrated in FIG. 80. Also, part (b) of FIG. 82 illustrates the values of individual context indices for chrominance of 4×16 components. In the example illustrated in part (a) of FIG. 81, a context index is not derived for the frequency component located on the highest-frequency component side (the shaded frequency component in part (a) of FIG. 81). The same applies to part (b) of FIG. 81, and parts (a) and (b) of FIG. 82. For the convenience of description, the context indices for chrominance are illustrated in parts (a) and (b) of FIG. 82, with the offset SigCtxOffsetLuma for identifying the context indices for luminance and chrominance being SigCtxOffsetLuma=14, but the embodiment is not limited thereto. Preferably, SigCtxOffsetLuma is the total number of context indices for luminance of a 4×4 transform block to a 32×32 transform block.

Preferably, the position context deriving unit 124b sets common context indices as the context indices that are derived in the case of decoding individual transform coefficients of a 16×4 transform block, the context indices that are derived in the case of decoding individual transform coefficients of a 4×16 transform block, and the context indices that are derived in the case of decoding individual transform coefficients of an 8×8 transform block or a 4×4 transform block. Specifically, the context indices assigned to the regions Ai (i=0, 1, 2, 3, 4, 5, and 6) of the 16×4 transform block illustrated in part (a) of FIG. 78 and the context indices assigned to the regions Ai (i=0, 1, 4, 5, 2, 3, and 6) of the 4×16 transform block illustrated in part (b) of FIG. 78 are preferably common to the context indices assigned to the regions Ri (i=0, 1, 2, 3, 4, 5, and 6) of the 4×4 transform block illustrated in part (a) of FIG. 60 or the 8×8 transform block illustrated in part (b) of FIG. 60.

As described above, in this process, the processes of classifying 16×4 components and 4×16 components to sub-groups are common to each other. Accordingly, a context index derivation process can be collectively performed, and the context index derivation process can be simplified. Also, according to this process, common context indices are derived for individual sub-groups of 16×4 components and the corresponding sub-groups of 4×16 components, and thus the number of context indices to be derived can be reduced. Furthermore, common context indices are derived for the individual sub-groups of 16×4 components, 4×16 components, and 8×8 components, and thus the number of context indices to be derived can be reduced. Accordingly, a context index derivation process can be simplified, and the memory size for holding context indices can be reduced.

Furthermore, the position context deriving unit 124b may assign, for chrominance, a common context index to the regions A3 and A5 of the 16×4 transform block illustrated in part (a) of FIG. 78, the regions A3 and A5 of the 4×16 transform block illustrated in part (b) of FIG. 78, and the regions R3 and R5 of the 8×8 transform block illustrated in part (b) of FIG. 60. For example, it is assumed that the position context deriving unit 124b derives context indices ctxIdx=20, 21, 22, 23, 24, 23, and 25 for the regions Ai (i=0, 1, 2, 3, 4, 5, and 6) of the 16×4 transform block illustrated in part (a) of FIG. 78, respectively. In this case, the position context deriving unit 124b derives ctxIdx=20, 21, 22, 23, 24, 23, and 24 for the regions Ai (i=0, 1, 4, 5, 2, 3, and 6) of the 4×16 transform block illustrated in part (b) of FIG. 78, respectively, and derives ctxIdx=20, 21, 22, 23, 24, 23, and 25 for the regions Ri (i=0, 1, 2, 3, 4, 5, and 6) of the 8×8 transform block illustrated in part (b) of FIG. 60, respectively. In this case, the frequency classification process performed by the frequency classifying unit 124a and the context derivation process performed by the position context deriving unit 124b can be expressed by the pseudo code illustrated in FIG. 83. That is, in the pseudo code illustrated in FIG. 83, a certain offset value is added to the reference value of the look-up table CTX_IND_MAP_L[index] or CTX_IND_MAP_C[index] corresponding to the index value index determined by the sub-block position (X, Y), and thereby the context index ctxIdx of the target frequency component to be processed (xC, yC) for luminance or chrominance is calculated. In the case of a 4×4 transform block, an 8×8 transform block, and a 16×4 transform block, the index value index determined by the position (X, Y) of each sub-block (1×1 sub-block in the case of 4×4, 2×2 sub-block in the case of 8×8, and 4×1 sub-block in the case of 16×4) represents the scan order (start value is 0) of the sub-block in the horizontal direction, and is calculated by using the following equation.

$$\text{Index}=(Y<<2)+X$$

In the case of a 4×16 transform block, the index value index determined by the position (X, Y) of a sub-block (4×1 sub-block) represents the scan order (start value is 0) of the sub-block in the vertical direction, and is calculated by using the following equation.

$$\text{Index}=(X<<2)+Y$$

The context index ctxIdx for luminance of each transform block is derived by using the following equation.
(In the Case of 4×4 Components)

$$\text{ctxIdx}=\text{CTX\_IND\_MAP\_}L[\text{index}]$$

(In the Case of 8×8 Components, 16×4 Components, and 4×16 components)

$$\text{ctxIdx}=\text{CTX\_IND\_MAP\_}L[\text{index}]+\text{sigCtxOffset}$$

Here, sigCtxOffset is a certain offset for identifying a context index of 4×4 components, and a context index of 8×8 components, 16×4 components, and 4×16 components.

The context index ctxIdx for chrominance of each transform block is derived by using the following equation.
(In the Case of 4×4 Components)

$$\text{ctxIdx}=\text{CTX\_IND\_MAP\_}C[\text{index}]+\text{SigCtxOffsetLuma}$$

(In the Case of 8×8 Components, 16×4 Components, and 4×16 components)

$$\text{ctxIdx}=\text{CTX\_IND\_MAP\_}C[\text{index}]+\text{sigCtxOffset}+\text{SigCtxOffsetLuma}$$

Here, sigCtxOffset is a certain offset for identifying a context index of 4×4 components, and a context index of 8×8 components, 16×4 components, and 4×16 components, and SigCtxOffsetLuma is a certain offset for identifying context indices for luminance and chrominance.

Part (a) of FIG. 67 is a diagram illustrating an example of a look-up table CTX_IND_MAP_L[index] in the pseudo code illustrated in FIG. 83. Part (a) of FIG. 81 illustrates the values of individual context indices for luminance of 16×4 components, which are obtained in the case of using CTX_IND_MAP_L[index] in part (a) of FIG. 62 for the pseudo code illustrated in FIG. 83. Part (b) of FIG. 81 illustrates the values of individual context indices for luminance of 4×16 components. Part (b) of FIG. 62 illustrates the values of individual context indices for luminance of 4×4 components, and part (c) of FIG. 62 illustrates the values of individual context indices for luminance of 8×8 components. Part (a) of FIG. 84 illustrates the values of individual context indices for chrominance of 16×4 components, which are obtained in the case of using CTX_IND_MAP_C[index] in part (b) of FIG. 67 for the pseudo code illustrated in FIG. 83. Part (b) of FIG. 84 illustrates the values of individual context indices for chrominance of 4×16 components. Part (c) of FIG. 84 illustrates individual context indices for chrominance of 8×8 components, and part (a) of FIG. 69 illustrates individual context indices for chrominance of 4×4 components. In the example illustrated in part (a) of FIG. 84, a context index is not derived for the frequency component located on the highest-frequency component side (the shaded frequency component in part (a) of FIG. 84). The same applies to part (b) of FIG. 84, part (c) of FIG. 84, and part (a) of FIG. 69. For the convenience of description, the context indices for chrominance are illustrated in parts (a) and (b) of FIG. 84, with the offset SigCtxOffsetLuma for identifying the context indices for luminance and chrominance being SigCtxOffsetLuma=14, but the embodiment is not limited thereto. Preferably, SigCtxOffsetLuma is the total number of context indices for luminance of a 4×4 transform block to a 32×32 transform block.

As described above, the position context deriving unit 124*b* derives, for chrominance, a common context index for the regions A3 and A5 of the 16×4 transform block illustrated in part (a) of FIG. 78, the regions A3 and A5 of the 4×16 transform block illustrated in part (b) of FIG. 78, and the regions R3 and R5 of the 8×8 transform block illustrated in part (b) of FIG. 60. Thus, the number of context indices to be derived can be reduced.

According to the related art, in the context index derivation process related to non-zero coefficient presence/absence flags of individual transform coefficients in 4×16 components and 16×4 components, it is necessary to count the number of adjacent non-zero coefficients except a DC component. On the other hand, according to the above-described configuration, context indices related to non-zero coefficient presence/absence flags of individual transform coefficients in 4×16 components and 16×4 components are calculated in accordance with the positions of the non-zero coefficient presence/absence flags, and thus the amount of process for deriving context indices can be reduced compared to the configuration according to the related art.

(Specific Example 7 of Frequency Classification Process Performed by Frequency Classifying Unit 124*a* and Context Index Derivation Process Performed by Position Context Deriving Unit 124*b* in a Case where Frequency Region has Certain Size or Smaller)

In specific example 7 of the frequency classification process performed by the frequency classifying unit 124*a* and the context index derivation process performed by the position context deriving unit 124*b* in a case where the frequency region has a certain size or smaller, a description will be given of the case of dividing a frequency region to sub-regions (sub-groups) so that the split pattern of a frequency region having a size of 4×4 components and the split pattern of a frequency region having a size of 8×8 components are similar to each other, and deriving individual context indices for the individual sub-regions, with reference to FIGS. 85 to 87.

First, in a case where the target frequency region to be processed has the certain size or smaller, the frequency classifying unit 124*a* classifies the target frequency components to be processed to sub-regions R0 to R8 on the basis of the positions (xC, yC) of the target frequency components.

(In the Case of 4×4 Components)

(1) In a case where xC<2 and yC<2 are satisfied, the frequency component is classified to any of the sub-regions R0 to R3 under the following conditions (1-a) to (1-d).

(1-a) In a case where xC<1 and yC<1, the frequency component is classified to the sub-region R0.

(1-b) In a case where xC≥1 and yC<1, the frequency component is classified to the sub-region R1.

(1-c) In a case where xC<1 and yC≥1, the frequency component is classified to the sub-region R2.

(1-d) In a case where xC≥1 and yC≥1, the frequency component is classified to the sub-region R3.

(2) In a case where xC≥2 and yC<2, the frequency component is classified to the sub-region R4 or R5 under the following conditions (2-a) and (2-b).

(2-a) In a case where xC<3, the frequency component is classified to the sub-region R4.

(2-b) In a case where xC≥3, the frequency component is classified to the sub-region R5.

(3) In a case where xC<2 and yC≥2, the frequency component is classified to the sub-region R6 or R7 under the following conditions (3-a) and (3-b).

(3-a) In a case where yC<3, the frequency component is classified to the sub-region R6.

(3-b) In a case where yC≥3, the frequency component is classified to the sub-region R7.

(4) In a case where xC≥2 and yC≥2, the frequency component is classified to the sub-region R8.

(In the Case of 8×8 Components)

(1) In a case where xC<4 and yC<4 are satisfied, the frequency component is classified to any of the sub-regions R0 to R3 under the following conditions (1-a) to (1-d).

(1-a) In a case where xC<2 and yC<2, the frequency component is classified to the sub-region R0.

(1-b) In a case where xC≥2 and yC<2, the frequency component is classified to the sub-region R1.

(1-c) In a case where xC<2 and yC≥2, the frequency component is classified to the sub-region R2.

(1-d) In a case where xC≥2 and yC≥2, the frequency component is classified to the sub-region R3.

(2) In a case where xC≥4 and yC<4, the frequency component is classified to the sub-region R4 or R5 under the following conditions (2-a) and (2-b).

(2-a) In a case where xC<6, the frequency component is classified to the sub-region R4.

(2-b) In a case where xC≥6, the frequency component is classified to the sub-region R5.

(3) In a case where xC<4 and yC≥4, the frequency component is classified to the sub-region R6 or R6 under the following conditions (3-a) and (3-b).

(3-a) In a case where yC<6, the frequency component is classified to the sub-region R6.

(3-b) In a case where yC≥6, the frequency component is classified to the sub-region R7.

(4) In a case where xC≥4 and yC≥4, the frequency component is classified to the sub-region R8.

An example in which the above-described classification process is applied to 4×4 components and 8×8 components is illustrated in parts (a) and (b) of FIG. 85. Part (a) of FIG. 85 is a diagram illustrating the regions (also referred to as sub-regions or sub-groups) R0 to R8 that form a frequency region having a size of 4×4 components, and part (b) of FIG. 85 is a diagram illustrating the regions (sub-regions) R0 to R8 that form a frequency component having a size of 8×8 components.

A common process may be used for the above-described processes of classifying 4×4 components and 8×8 components to sub-regions, as described below.

First, the frequency classifying unit 124*a* calculates, on the basis of the position (xC, yC) of the target frequency component to be processed, log 2TrafoWidth representing the logarithm value of the horizontal width size of a transform block (2 in the 4×4 block and 3 in the 8×8 block), and log 2TrafoHeight representing the logarithm value of the vertical width size (2 in the 4×4 block and 3 in the 8×8 block), the sub-bock position (X, Y) to which the frequency component to be processed belongs, by using the following equations.

$$X = \log 2\text{TrafoWidth} == 2\,?\,xC\!:\!xC >> 1$$

$$Y = \log 2\text{TrafoHeight} == 2\,?\,yC\!:\!yC >> 1$$

Subsequently, the frequency classifying unit 124a classifies the target frequency components to be processed (xC, yC) to the sub-regions R0 to R8 on the basis of the derived sub-block position (X, Y).

(1) In a case where X<2 and Y<2 are satisfied, the frequency component is classified to any of the sub-regions R0 to R3 under the following conditions (1-a) to (1-d).

(1-a) In a case where X<1 and Y<1, the frequency component is classified to the sub-region R0.

(1-b) In a case where X≥1 and Y<1, the frequency component is classified to the sub-region R1.

(1-c) In a case where X<1 and Y≥1, the frequency component is classified to the sub-region R2.

(1-d) In a case where X≥1 and Y≥1, the frequency component is classified to the sub-region R3.

(2) In a case where X≥2 and Y<2, the frequency component is classified to the sub-region R4 or R5 under the following conditions (2-a) and (2-b).

(2-a) In a case where X<3, the frequency component is classified to the sub-region R4.

(2-b) In a case where X≥3, the frequency component is classified to the sub-region R5.

(3) In a case where X<2 and Y≥2, the frequency component is classified to the sub-region R6 or R7 under the following conditions (3-a) and (3-b).

(3-a) In a case where Y<3, the frequency component is classified to the sub-region R6.

(3-b) In a case where Y≥3, the frequency component is classified to the sub-region R7.

(4) In a case where X≥2 and Y≥2, the frequency component is classified to the sub-region R8.

A common process may be used for the above-described processes of classifying 4×4 components and 8×8 components to sub-regions, as described below.

(1) In a case where xC<width/2 and yC<height/2 are satisfied, the frequency component is classified to any of the sub-regions R0 to R3 under the following conditions (1-a) to (1-d).

(1-a) In a case where xC<width/4 and yC<height/4, the frequency component is classified to the sub-region R0.

(1-b) In a case where xC≥width/4 and yC<height/4, the frequency component is classified to the sub-region R1.

(1-c) In a case where xC<width/4 and yC≥height/4, the frequency component is classified to the sub-region R2.

(1-d) In a case where xC≥width/4 and yC≥height/4, the frequency component is classified to the sub-region R3.

(2) In a case where xC≥width/2 and yC<height/2, the frequency component is classified to the sub-region R4 or R5 under the following conditions (2-a) and (2-b).

(2-a) In a case where xC<width×¾, the frequency component is classified to the sub-region R4.

(2-b) In a case where xC≥width×¾, the frequency component is classified to the sub-region R5.

(3) In a case where xC<width/2 and yC≥height/2, the frequency component is classified to the sub-region R6 or R7 under the following conditions (3-a) and (3-b).

(3-a) In a case where yC<height×¾, the frequency component is classified to the sub-region R6.

(3-b) In a case where yC≥height×¾, the frequency component is classified to the sub-region R7.

(4) In a case where xC≥width/2 and yC≥height/2, the frequency component is classified to the sub-region R8.

Here, "width" is a horizontal width of the target frequency region (4 for 4×4, and 8 for 8×8). "Height" is a vertical width of the target frequency region (4 for 4×4, and 8 for 8×8).

Subsequently, in a case where the target frequency region to be processed has the certain size or smaller, the position context deriving unit 124b derives the corresponding context indices ctxIdx(i) to the individual sub-regions Ri (i=0, 1, 2, 3, 4, 5, 6, 7, and 8) classified by the frequency classifying unit 124a. Specifically, a context index ctxIdx(i) for luminance is derived using the following equations.

$$\text{offsetBlk} = \log 2\text{TrafoWidth} == 2\,?\,0\!:\!9$$

$$\text{ctxIdx}(i) = i + \text{offsetBlk}$$

Note that i represents a number identifying a sub-group Ri, and offsetBlk represents an offset for identifying a context index of 4×4 components and a context index of 8×8 components. A certain value is set to offsetBlk in accordance with log 2TrafoWidth that represents a logarithm value of a horizontal width size of a transform block.

The context indices of 4×4 components and 8×8 components derived for luminance by using the foregoing equations are illustrated in parts (a) and (b) of FIG. 86. Part (a) of FIG. 86 illustrates the context indices ctxIdx(i) corresponding to the individual sub-regions Ri of 4×4 components for luminance, and part (b) of FIG. 86 illustrates the context indices ctxIdx(i) corresponding to the individual sub-regions Ri of 8×8 components for luminance.

A context index ctxIdx(i) for chrominance is derived by using the following equations.

$$\text{offsetBlk} = \log 2\text{TrafoWidth} == 2\,?\,0\!:\!9$$

$$\text{ctxIdx}(i) = i + \text{offsetClr} + \text{offsetBlk}$$

Note that i represents a number identifying a sub-group Ri, and offsetBlk represents an offset for identifying a context index of 4×4 components and a context index of 8×8 components. A certain value is set to offsetBlk in accordance with log 2TrafoWidth that represents a logarithm value of a horizontal width size of a transform block. offsetClr is a certain offset for identifying context indices for luminance and chrominance. Here, in a case where offsetClr=20, the context indices of 4×4 components and 8×8 components derived by using the foregoing equations regarding chrominance are illustrated in parts (c) and (d) of FIG. 86. Part (c) of FIG. 86 illustrates the context indices ctxIdx(i) corresponding to the individual sub-regions Ri of 4×4 components for chrominance, and part (d) of FIG. 86 illustrates the context indices ctxIdx(i) corresponding to the individual sub-regions Ri of 8×8 components for chrominance. For the convenience of description, the context indices for chrominance are illustrated in parts (c) and (d) of FIG. 86, with the offset offsetClr for identifying the context indices for luminance and chrominance being offsetClr=20, but the embodiment is not limited thereto. Preferably, offsetClr is the total number of context indices for luminance of a 4×4 transform block to a 32×32 transform block.

The frequency classification process performed by the frequency classifying unit 124a and the context derivation process performed by the position context deriving unit 124b can be expressed by the pseudo code illustrated in part (a) of FIG. 87. That is, in the pseudo code illustrated in part (a) of FIG. 87, the context index ctxIdx of the target frequency component to be processed (xC, yC) is calculated by using the index value index determined by the sub-block position (X, Y) and the look-up table CTX_IND_MAP [index].

First, the position (X, Y) of the sub-block to which the target frequency component to be processed (xC, yC) belongs is derived by using the following equations.

$$X=\log 2\text{TrafoWidth}==2?xC:xC>>1$$

$$Y=\log 2\text{TrafoHeight}==2?yC:yC>>1$$

In the case of 4×4 components and 8×8 components, the index value index that is determined by the position (X, Y) of each sub-block (1×1 sub-block in the case of 4×4, and 2×2 sub-block in the case of 8×8) is derived by using the following equation. The index value index represents the scan order (start value is 0) of the sub-block in the horizontal direction.

$$\text{index}=(Y<<2)+X$$

The context index ctxIdx for luminance corresponding to each sub-block is derived by using the following equation.

$$\text{offsetBlk}=\log 2\text{TrafoWidth}==2 ?0:9$$

$$\text{ctxIdx}=\text{CTX\_IND\_MAP[index]}+\text{offsetBlk}$$

Here, offsetBlk is an offset for identifying the context indices of 4×4 components and 8×8 components, and a certain value is set in accordance with log 2TrafoWidth that represents the logarithm value of the horizontal width size of a transform block.

The context index ctxIdx for chrominance corresponding to each sub-block is derived by using the following equation.

$$\text{offsetBlk}=\log 2\text{TrafoWidth}==2 ?0:9$$

$$\text{ctxIdx}=\text{CTX\_IND\_MAP[index]}+\text{offsetBlk}$$

$$\text{ctxIdx}=\text{ctxIdx}+\text{offsetClr}$$

Here, offsetBlk is an offset for identifying the context indices of 4×4 components and 8×8 components, and a certain value is set in accordance with log 2TrafoWidth that represents the logarithm value of the horizontal width size of a transform block. offsetClr is a certain offset for identifying context indices for luminance and chrominance.

Part (b) of FIG. 87 is a diagram illustrating an example of CTX_IND_MAP[index] in the pseudo code illustrated in part (a) of FIG. 87. Part (a) of FIG. 86 illustrates the values of individual context indices for luminance of 4×4 components, which are obtained in the case of using CTX_IND_ MAP[index] in part (b) of FIG. 87 for the pseudo code illustrated in part (a) of FIG. 87. Part (b) of FIG. 86 illustrates the values of individual context indices for luminance of 8×8 components, which are obtained in the case of using CTX_IND_MAP[index] in part (b) of FIG. 87 for the pseudo code illustrated in part (a) of FIG. 87. Part (c) of FIG. 86 illustrates the values of individual context indices for chrominance of 4×4 components, which are obtained in the case of using CTX_IND_MAP[index] in part (b) of FIG. 87 for the pseudo code illustrated in part (a) of FIG. 87. Part (d) of FIG. 86 illustrates the values of individual context indices for chrominance of 8×8 components, which are obtained in the case of using CTX_IND_MAP[index] in part (b) of FIG. 87 for the pseudo code illustrated in part (a) of FIG. 87. In the example illustrated in part (a) of FIG. 86, a context index is not derived for the frequency component located on the highest-frequency component side (the shaded frequency component in part (a) of FIG. 86). The same applies to parts (b), (c), and (d) of FIG. 86. For the convenience of description, the context indices for chrominance are illustrated in parts (c) and (d) of FIG. 86, with the offset offsetClr for identifying the context indices for luminance and chrominance being offsetClr=20, but the embodiment is not limited thereto. Preferably, offsetClr is the total number of context indices for luminance of a 4×4 transform block to a 32×32 transform block.

The context indices that are assigned to the individual coefficient positions illustrated in FIG. 85 can also be derived through bit calculation described below.

In the example illustrated in parts (a) and (b) of FIG. 86, eighteen context indices are derived for luminance. In the example illustrated in parts (c) and (d) of FIG. 86, eighteen context indices are derived for chrominance. Thus, in the examples illustrated in parts (a) and (b) of FIG. 86 and parts (c) and (d) of FIG. 86, 18+18=36 context indices are derived. This number of context indices is smaller by one than thirty-seven context indices that are derived in the comparative example illustrated in parts (a) to (c) of FIG. 30.

As described above, in this process, a common process is used for the processes of classifying 4×4 components and 8×8 components for luminance and chrominance to sub-regions by using the context index derivation method illustrated in FIG. 85. Accordingly, a context index derivation process can be simplified while coding efficiency being maintained. Also, according to this process, the number of context indices to be derived can be reduced, and thus the context index derivation process can be simplified, and the memory size for holding context indices can be reduced.

(Specific Example 8 of Frequency Classification Process Performed by Frequency Classifying Unit 124*a* and Context Index Derivation Process Performed by Position Context Deriving Unit 124*b* in a Case where Frequency Region has Certain Size or Smaller)

In specific example 8 of the frequency classification process performed by the frequency classifying unit 124*a* and the context index derivation process performed by the position context deriving unit 124*b* in a case where the frequency region has a certain size or smaller, a description will be given of the case of dividing the frequency region to sub-groups so that the split pattern of a frequency region having a size of M×M (for example, 4×4) components, which is the smallest transform block size, is common to luminance and chrominance, and deriving context indices corresponding to the individual sub-groups, with reference to FIGS. 90, 91, 30, 60, 62, and 63.

First, in a case where the target frequency region to be processed has the certain size or smaller, the frequency classifying unit 124*a* classifies the target frequency components to be processed to sub-groups R0 to R6 on the basis of the positions (xC, yC) of the target frequency components.

(1) In a case where xC<width/2 and yC<height/2 are satisfied, the frequency component is classified to sub-group R0 or R1 under the following conditions (1-a) and (1-b).

(1-a) In a case where xC<width/4 and yC<height/4, the frequency component is classified to the sub-group R0.

(1-b) In a case where xC≥width/4 or yC≥height/4, the frequency component is classified to the sub-group R1.

(2) In a case where xC≥width/2 and yC<height/2, the frequency component is classified to the sub-group R2 or R3 under the following conditions (2-a) and (2-b).

(2-a) In a case where xC<width×¾, the frequency component is classified to the sub-group R2.

(2-b) In a case where xC≥width×¾, the frequency component is classified to the sub-group R3.

(3) In a case where xC<width/2 and yC≥height/2, the frequency component is classified to the sub-group R4 or R5 under the following conditions (3-a) and (3-b).

(3-a) In a case where yC<height×¾, the frequency component is classified to the sub-group R4.

(3-b) In a case where yC≥height×¾, the frequency component is classified to the sub-group R5.

(4) In a case where xC≥width/2 and yC≥height/2, the frequency component is classified to the sub-group R6.

Here, "width" is a horizontal width of the target frequency region (4 for 4×4). "Height" is a vertical width of the target frequency region (4 for 4×4). An example in which the above-described classification process is applied to 4×4 components is illustrated in part (a) of FIG. 60.

Subsequently, in a case where the target frequency region to be processed has the certain size or smaller, the position context deriving unit 124b assigns the corresponding context indices to the sub-groups classified by the frequency classifying unit 124a.

Specifically, a context index ctxIdx(i) for luminance and chrominance is derived by using the following equations.

$$\text{ctxIdx}(i) = (\text{cIdx}==0)?i:i+\text{offsetClr}$$

Note that i represents the number identifying a sub-group Ri, and offsetClr is an offset for identifying context indices for luminance and chrominance. Preferably, offsetClr is the total number of context indices for luminance of a 4×4 transform block to a 32×32 transform block. cIdx is a variable for identifying luminance and chrominance. In the case of luminance, cIdx=0. In the case of chrominance, cIdx=1.

The context indices ctxIdx(i) corresponding to the individual sub-groups Ri of 4×4 components, which are derived for luminance by using the foregoing equation, are illustrated in part (b) of FIG. 62. Part (a) of FIG. 63 illustrates the context indices ctxIdx(i) corresponding to the individual sub-groups Ri of 4×4 components, which are derived for chrominance by using the foregoing equation, in a case where offsetClr=14.

Regarding 4×4 components, the frequency classification process performed by the frequency classifying unit 124a and the context derivation process performed by the position context deriving unit 124b can be expressed by the pseudo code illustrated in part (a) of FIG. 90. That is, in the pseudo code illustrated in part (a) of FIG. 90, the context index ctxIdx of the target frequency component to be processed (xC, yC) is calculated by using the index value index determined by the target frequency component to be processed (xC, yC) and the look-up table CTX_IND_MAP [index].

First, the index value index determined by the target frequency component to be processed (xC, yC) represents the scan order (start value is 0) of the frequency component in the horizontal direction, and is calculated by using the following equation.

$$\text{index} = (yC<<2) + x$$

Subsequently, the context index ctxIdx is derived by using the following equation.

$$\text{ctxIdx} = \text{CTX\_IND\_MAP[index]}$$

In the case of chrominance, a certain offset offsetClr is added to the context index ctxIdx derived by using the foregoing equation, and thereby a context index is derived. That is, $$\text{ctxIdx} = \text{ctxIdx} + \text{offsetClr}.$$

Part (b) of FIG. 90 is a diagram illustrating an example of CTX_IND_MAP[index] in the pseudo code illustrated in part (a) of FIG. 90. Part (b) of FIG. 62 illustrates the values of individual context indices for luminance of 4×4 components, which are obtained in the case of using CTX_IND_MAP[index] in part (b) of FIG. 90 for the pseudo code illustrated in part (a) of FIG. 90. Part (a) of FIG. 63 illustrates the individual context indices for chrominance of 4×4 components, which are obtained in the case of using CTX_IND_MAP[index] in part (b) of FIG. 90 for the pseudo code illustrated in part (a) of FIG. 90. In the example illustrated in part (b) of FIG. 62, a context index is not derived for the frequency component located on the highest-frequency component side (the shaded frequency component in part (b) of FIG. 62). The same applies to part (a) of FIG. 63. For the convenience of description, the context indices for chrominance are illustrated in part (a) of FIG. 63, with the offset offsetClr for identifying the context indices for luminance and chrominance being offsetClr=14, but the embodiment is not limited thereto. Preferably, offsetClr is the total number of context indices for luminance of a 4×4 transform block to a 32×32 transform block.

An effect obtained through derivation of context indices performed in the above-described manner by the position context deriving unit 124b will be described with reference to parts (a) and (b) of FIG. 91 according to a comparative example.

Part (a) of FIG. 91 illustrates the pseudo code that expresses the context index derivation process related to 4×4 components according to the comparative example, whereas part (b) of FIG. 91 illustrates a specific example of the look-up table CTX_IND_MAP4×4[index] in the pseudo code illustrated in part (a) of FIG. 91. In a case where the range of index is 0 index 14 in the look-up table CTX_IND_MAP4×4[index] illustrated in part (b) of FIG. 91, the look-up table is used to derive a context index for luminance, and in a case where the range of index is 15 index 30, the look-up table is used to derive a context index for chrominance. Part (a) of FIG. 30 illustrates the values of individual context indices related to luminance of 4×4 components, which are obtained in a case where the look-up table CTX_IND_MAP4×4[index], (0 index 14) illustrated in part (b) of FIG. 91 is used for the pseudo code illustrated in part (a) of FIG. 91. Part (b) of FIG. 30 illustrates the values of individual context indices (before an offset offsetClr is added) related to chrominance of 4×4 components, which are obtained in a case where the look-up table CTX_IND-_MAP4×4[index], (15 index 30) illustrated in part (b) of FIG. 91 is used for the pseudo code illustrated in part (a) of FIG. 91. In the comparative example, in 4×4 components, split patterns of a frequency region for luminance and chrominance are different. Thus, in the case of deriving a context index by using the position (xC, yC) of the target frequency component to be processed and a look-up table, it is necessary to refer to different look-up tables for luminance and chrominance. Thus, the number of elements included in the look-up table CTX_IND_MAP4×4[index] that is necessary to derive a context index is fifteen for luminance and fifteen for chrominance, that is, thirty in total.

On the other hand, in this process, the split pattern of a frequency region having a size of M×M components (for example, 4×4), which is the smallest transform block size, is common to luminance and chrominance. Thus, in the case of calculating a context index ctxIdx of the target frequency component to be processed (xC, yC) by using the target frequency component to be processed (xC, yC) and the look-up table CTX_IND_MAP[index], a look-up table common to luminance and chrominance can be used. Thus, compared to thirty elements in the comparative example, the number of elements included in the look-up table CTX_IND_MAP[index] is fifteen, and the memory size that is necessary for the look-up table can be reduced.

(Specific Example 9 of Frequency Classification Process Performed by Frequency Classifying Unit 124a and Context Index Derivation Process Performed by Position Context Deriving Unit 124b in a Case where Frequency Region has Certain Size or Smaller)

In specific example 9 of the frequency classification process performed by the frequency classifying unit 124a and the context index derivation process performed by the position context deriving unit 124b in a case where the frequency region has a certain size or smaller, a description will be given of the case of dividing the frequency region to sub-groups so that the split pattern of a frequency region having a size of M×M (for example, 4×4) components, which is the smallest transform block size, is common to luminance and chrominance, and deriving context indices corresponding to the individual sub-groups, with reference to FIGS. 90, 91, 85, and 86.

First, in a case where the target frequency region to be processed has the certain size or smaller, the frequency classifying unit 124a classifies the target frequency components to be processed to sub-groups R0 to R8 on the basis of the positions (xC, yC) of the target frequency components.

(1) In a case where xC<width/2 and yC<height/2 are satisfied, the frequency component is classified to any of the sub-groups R0 to R3 under the following conditions (1-a) to (1-d).

(1-a) In a case where xC<width/4 and yC<height/4, the frequency component is classified to the sub-group R0.

(1-b) In a case where xC≥width/4 and yC<height/4, the frequency component is classified to the sub-group R1.

(1-c) In a case where xC<width/4 and yC≥height/4, the frequency component is classified to the sub-group R2.

(1-d) In a case where xC≥width/4 and yC≥height/4, the frequency component is classified to the sub-group R3.

(2) In a case where xC≥width/2 and yC<height/2, the frequency component is classified to the sub-group R4 or R5 under the following conditions (2-a) and (2-b).

(2-a) In a case where xC<width×¾, the frequency component is classified to the sub-group R4.

(2-b) In a case where xC≥width×¾, the frequency component is classified to the sub-group R5.

(3) In a case where xC<width/2 and yC≥height/2, the frequency component is classified to the sub-group R6 or R7 under the following conditions (3-a) and (3-b).

(3-a) In a case where yC<height×¾, the frequency component is classified to the sub-group R6.

(3-b) In a case where yC≥height×¾, the frequency component is classified to the sub-group R7.

(4) In a case where xC≥width/2 and yC≥height/2, the frequency component is classified to the sub-group R8.

Here, "width" is a horizontal width of the target frequency region (4 for 4×4). "Height" is a vertical width of the target frequency region (4 for 4×4).

An example in which the above-described classification process is applied to 4×4 components is illustrated in part (a) of FIG. 85. Part (a) of FIG. 85 is a diagram illustrating the regions (also referred to as sub-regions or sub-groups) R0 to R8 that form a frequency region having a size of 4×4 components.

Subsequently, in a case where the target frequency region to be processed has the certain size or smaller, the position context deriving unit 124b assigns the corresponding context indices to the sub-groups classified by the frequency classifying unit 124a.

Specifically, a context index ctxIdx(i) for luminance and chrominance is derived by using the following equation.

$$\text{ctxIdx}(i) = (\text{cIdx}==0)?i:i+\text{offsetClr}$$

Note that i represents the number identifying a sub-group Ri, and offsetClr is an offset for identifying context indices for luminance and chrominance. Preferably, offsetClr is the total number of context indices for luminance of a 4×4 transform block to a 32×32 transform block. cIdx is a variable for identifying luminance and chrominance. In the case of luminance, cIdx=0. In the case of chrominance, cIdx=1.

The context indices ctxIdx(i) corresponding to the individual sub-groups Ri of 4×4 components, which are derived for luminance by using the foregoing equation, are illustrated in part (a) of FIG. 86. Part (c) of FIG. 86 illustrates the context indices ctxIdx(i) corresponding to the individual sub-groups Ri of 4×4 components, which are derived for chrominance by using the foregoing equation, in a case where offsetClr=20.

Regarding 4×4 components, the frequency classification process performed by the frequency classifying unit 124a and the context derivation process performed by the position context deriving unit 124b can be expressed by the pseudo code illustrated in part (a) of FIG. 90. That is, in the pseudo code illustrated in part (a) of FIG. 90, the context index ctxIdx of the target frequency component to be processed (xC, yC) is calculated by using the index value index determined by the target frequency component to be processed (xC, yC) and the look-up table CTX_IND_MAP[index].

First, the index value index determined by the target frequency component to be processed (xC, yC) represents the scan order (start value is 0) of the frequency component in the horizontal direction, and is calculated by using the following equation.

$$\text{index} = (yC << 2) + x$$

Subsequently, the context index ctxIdx is derived by using the following equation.

$$\text{ctxIdx} = \text{CTX\_IND\_MAP}[\text{index}]$$

In the case of chrominance, a certain offset offsetClr is added to the context index ctxIdx derived by using the foregoing equation, and thereby a context index is derived. That is, $$\text{ctxIdx} = \text{ctxIdx} + \text{offsetClr}.$$

Part (c) of FIG. 90 is a diagram illustrating an example of CTX_IND_MAP[index] in the pseudo code illustrated in part (a) of FIG. 90. Part (a) of FIG. 86 illustrates the values of individual context indices for luminance of 4×4 components, which are obtained in the case of using CTX_IND_MAP[index] in part (c) of FIG. 90 for the pseudo code illustrated in part (a) of FIG. 90. Part (c) of FIG. 86 illustrates the individual context indices for chrominance of 4×4 components, which are obtained in the case of using CTX_IND_MAP[index] in part (c) of FIG. 90 for the pseudo code illustrated in part (a) of FIG. 90. In the example illustrated in part (a) of FIG. 86, a context index is not derived for the frequency component located on the highest-frequency component side (the shaded frequency component in part (a) of FIG. 86). The same applies to part (c) of FIG. 86. For the convenience of description, the context indices for chrominance are illustrated in part (c) of FIG. 86, with the offset offsetClr for identifying the context indices for luminance and chrominance being offsetClr=20, but the embodiment is not limited thereto. Preferably, offsetClr is the total number of context indices for luminance of a 4×4 transform block to a 32×32 transform block.

As described above, in this process, the split pattern of a frequency region having a size of M×M components (for example, 4×4), which is the smallest transform block size, is common to luminance and chrominance. Thus, in the case of calculating a context index ctxIdx of the target frequency component to be processed (xC, yC) by using the position (xC, yC) of the target frequency component to be processed and the look-up table CTX_IND_MAP[index], a look-up table common to luminance and chrominance can be used. Thus, compared to thirty elements in the comparative example, the number of elements included in the look-up table CTX_IND_MAP[index] is fifteen, and the memory size that is necessary for the look-up table can be reduced.

(Specific Example 10 of Frequency Classification Process Performed by Frequency Classifying Unit 124a and Context Index Derivation Process Performed by Position Context Deriving Unit 124b in a Case where Frequency Region has Certain Size or Smaller)

In specific examples 9 and 10 of the frequency classification process performed by the frequency classifying unit 124a and the context index derivation process performed by the position context deriving unit 124b in a case where the frequency region has a certain size or smaller, a description has been given of an example of dividing the frequency region to sub-groups so that the split pattern of a frequency region having a size of M×M (for example, 4×4) components, which is the smallest transform block size, is common to luminance and chrominance, and deriving individual context indices corresponding to the individual sub-groups, or an example of deriving a context index ctxIdx of the target frequency component to be processed (xC, yC) by using the position (xC, yC) of the target frequency component to be processed and a look-up table. Hereinafter, a description will be given of an example of deriving a context index by using an equation using the position (xC, yC) of the target frequency component to be processed, without using a look-up table.

In a case where the target frequency region to be processed has the certain size or smaller, the position context deriving unit 124b derives the context index ctxIdx of the target frequency component to be processed (xC, yC) by using the following equation (eq. e1), and supplies the derivation result ctxIdx to the frequency classifying unit 124a.

$$\text{ctxIdx}=xC+yC \leq \qquad \text{(eq. e1)}$$

In the case of chrominance, a certain offset offsetClr for identifying context indices for luminance and chrominance is added to ctxIdx derived by using equation (eq. e1). That is, $$\text{ctxIdx}=\text{ctxIdx}+\text{offsetClr}.$$

Preferably, offsetClr is the total number of context indices for luminance of a 4×4 transform block to a 32×32 transform block.

Regarding luminance, an example of context indices of 4×4 components that are derived in the case of applying equation (eq. e1) is illustrated in part (a) of FIG. 92. As illustrated in part (a) of FIG. 92, the frequency region is divided into wave-shaped (band-shaped) sub-regions from DC toward a high-frequency component, and the context indices ctxIdx corresponding to the individual sub-regions are derived. In this way, the pattern of dividing the frequency region in a wave shape from DC toward a high-frequency component is approximation of a favorable distribution form of the occurrence frequency of non-zero coefficients, and a common context index can be assigned to frequency components in which the occurrence frequency of non-zero coefficients is equivalent. In the example illustrated in part (a) of FIG. 92, a context index is not derived for the frequency component located on the highest-frequency component side (the shaded frequency component in part (a) of FIG. 92). The same applies to parts (b) to (d) of FIG. 92, parts (a) to (f) of FIG. 93, parts (a) to (d) of FIG. 94, and parts (a) to (d) of FIG. 95.

Subsequently, the frequency classifying unit 124a assigns the context indices ctxIdx derived by the position context deriving unit 124b to the target frequency components to be processed (xC, yC).

As described above, in this process, an equation using xC and yC representing the position of the target frequency component to be processed is used, and thereby a frequency region can be divided into a plurality of sub-regions and context indices corresponding to the individual sub-regions can be derived. Accordingly, a context index derivation process can be simplified.

In the position context deriving unit 124b, the equation used to derive a context index ctxIdx of the target frequency component to be processed (xC, yC) is not limited to equation (eq. e1). For example, a context index may be derived by using the following equation (eq. e2).

$$\text{ctxIdx}=(xC+yC+a)>>b \qquad \text{(eq. e2)}$$

Here, in equation (eq. e2), in a case where a=1 and b=1, context indices for luminance illustrated in part (b) of FIG. 92 are derived for 4×4 components.

In equation (eq. e2), in a case where a=0 and b=1, context indices for luminance illustrated in part (c) of FIG. 92 are derived for 4×4 components.

Alternatively, context indices may be derived by using equation (eq. e3), instead of equation (eq. e1).

$$\text{ctxIdx}=(xC+yC>th)?d:xC+yC \qquad \text{(eq. e3)}$$

Here, in equation (eq. e3), in a case where th=3 and d=4, context indices for luminance illustrated in part (d) of FIG. 92 are derived for 4×4 components.

Alternatively, context indices may be derived by using the following equation (eq. f1), instead of equation (eq. e1).

$$\text{ctxIdx}=\max(xC,yC) \qquad \text{(eq. f1)}$$

An example of context indices for luminance that are derived in the case of applying equation (eq. f1) to 4×4 components is illustrated in part (a) of FIG. 93. As illustrated in part (a) of FIG. 93, the frequency region is divided into inverse L-shaped sub-regions from DC toward a high-frequency component, and the context indices ctxIdx corresponding to the individual sub-regions are derived. In this way, the pattern of dividing a frequency region in an inverse L-shape from DC toward a high-frequency component is approximation of a favorable distribution form of the occurrence frequency of non-zero coefficients, and a common context index can be assigned to frequency components in which the occurrence frequency of non-zero coefficients is equivalent.

Alternatively, context indices may be derived by using equation (eq. f2), instead of equation (eq. f1).

$$\text{ctxIdx}=(xC+yC>th)?a:\max(xC,yC) \qquad \text{(eq. f2)}$$

Here, in equation (eq. f2), in a case where th=3 and a=4, context indices for luminance illustrated in part (b) of FIG. 93 are derived for 4×4 components.

In equation (eq. f2), in a case where th=4 and a=4, context indices for luminance illustrated in part (c) of FIG. 93 are derived for 4×4 components.

Alternatively, context indices may be derived by using equation (eq. f3) instead of equation (eq. e1).

$$\text{ctxIdx}=((xC\!>\!>\!1)+(yC\!>\!>\!1)\!>\!th)?a:\max(xC,yC) \quad \text{(eq. f3)}$$

Here, in equation (eq. f3), in a case where th=1 and a=4, context indices for luminance illustrated in part (d) of FIG. 93 are derived for 4×4 components.

Alternatively, context indices may be derived by using equation (eq. f4), instead of equation (eq. e1).

$$\text{ctxIdx}=((xC\!>\!>\!1)+(yC\!>\!>\!1)\!>\!th)?a\!:\!yC\!<\!(\text{height}/2)?\max(xC,yC):\max(xC,yC)+b \quad \text{(eq. f4)}$$

Here, in equation (eq. f4), in a case where th=1, a=6, b=2, and height=4, context indices for luminance illustrated in part (e) of FIG. 93 are derived for 4×4 components. The split pattern of 4×4 components illustrated in part (e) of FIG. 93 can express the split pattern of frequency components of 4×4 components illustrated in part (a) of FIG. 60.

The context indices for luminance of 4×4 components illustrated in part (e) of FIG. 93 can also be expressed by using equation (eq. f5).

$$X=xC\!>\!>\!(\log 2\text{TrafoWidth}-2)$$

$$Y=yC\!>\!>\!(\log 2\text{TrafoHeight}-2)$$

$$\text{ctxIdx}=((X\!>\!>\!1)+(Y\!>\!>\!1)\!>\!th)?a\!:\!(Y\!<\!(1\!<\!<\!(\log 2\text{Trafo-Height}-2)))?\max(X,Y):\max(X,Y)+b \quad \text{(eq. f5)}$$

In equation (eq. f5), log 2TrafoWidth represents the logarithm value of the horizontal width of the transform block (2 in the case of 4×4), and log 2TrafoHeight represents the logarithm value of the vertical width of the transform block (2 in the case of 4×4). In the case of deriving context indices for luminance illustrated in part (e) of FIG. 93 regarding 4×4 components, th=1, a=6, and b=2 in equation (eq. f5). In the case of 8×8 components, a certain offset offsetBlk for identifying context indices of 4×4 components and 8×8 components is added to the context index ctxIdx derived by using equation (eq. f5). That is, ctxIdx=ctxIdx+offsetBlk.

Here, in a case where offsetBlk=7, the split pattern and context indices of the frequency components of 8×8 components illustrated in part (b) of FIG. 62 can be expressed for luminance.

Alternatively, context indices may be derived by using equation (eq. f6) instead of equation (eq. f4).

$$\text{ctxIdx}=((xC\!>\!>\!1)+(yC\!>\!>\!1)\!>\!th)?a\!:\!(xC\!<\!\text{width}/2)?\max(xC,yC):\max(xC,yC)+b \quad \text{(eq. f6)}$$

Here, in equation (eq. f6), in a case where th=1, a=6, b=2, and width=4, the context indices illustrated in part (f) of FIG. 93 are derived. The split pattern of 4×4 components illustrated in part (f) of FIG. 93 can express the split pattern of frequency components of 4×4 components illustrated in part (a) of FIG. 60.

The context indices for luminance of 4×4 components illustrated in part (f) of FIG. 93 can also be expressed by using equation (eq. f7).

$$X=xC\!>\!>\!(\log 2\text{TrafoWidth}-2)$$

$$Y=yC\!>\!>\!(\log 2\text{TrafoHeight}-2)$$

$$\text{ctxIdx}=((X\!>\!>\!1)+(Y\!>\!>\!1)\!>\!th)?a\!:\!(X\!<\!(1\!>\!>\!(\log 2\text{Trafo-foWidth}-1)))?\max(X,Y):\max(X,Y)+b \quad \text{(eq. f7)}$$

In equation (eq. f7), log 2TrafoWidth represents the logarithm value of the horizontal width of the transform block (2 in the case of 4×4), and log 2TrafoHeight represents the logarithm value of the vertical width of the transform block (2 in the case of 4×4). In the case of deriving context indices illustrated in part (f) of FIG. 93 regarding 4×4 components, th=1, a=6, and b=2 in equation (eq. f7). In the case of 8×8 components, a certain offset offsetBlk for identifying context indices of 4×4 components and 8×8 components is added to the context index ctxIdx derived by using equation (eq. f7).

ctxIdx=ctxIdx+offsetBlk

Here, in a case where offsetBlk=7, the split pattern of the frequency components of 8×8 components illustrated in part (b) of FIG. 60 can be expressed.

In a case where the occurrence frequency of non-zero coefficients is biased to horizontal-direction frequency components, context indices may be derived by using the following equation (eq. g1), instead of equation (eq. e1).

$$\text{ctxIdx}=((xC+yC+a)\!>\!>\!b)+((yC\!>\!xC)^*c) \quad \text{(eq. g1)}$$

Here, in equation (eq. g1), in a case where a=1, b=1, and c=3, the context indices for luminance illustrated in part (a) of FIG. 94 are derived for 4×4 components. In equation (eq. g1), (A>B) indicates that 1 is returned in a case where A is larger than B, and 0 is returned in the other cases.

Alternatively, context indices may be derived by using equation (eq. g2), instead of equation (eq. e1).

$$\text{ctxIdx}=(xC+yC\!>\!th)?d\!:\!((xC+yC\!\le\!+a)\!>\!>\!b)+((yC\!>\!xC)^*c) \quad \text{(eq. g2)}$$

Here, in equation (eq. g2), in a case where th=3, a=1, b=1, c=3, and d=3, the context indices for luminance illustrated in part (b) of FIG. 94 are derived for 4×4 components.

In equation (eq. g2), in a case where th=4, a=1, b=1, c=3, and d=3, the context indices for luminance illustrated in part (c) of FIG. 94 are derived for 4×4 components.

Alternatively, context indices may be derived by using equation (eq. g3), instead of equation (eq. g2).

$$\text{ctxIdx}=(xC+2^*yC+1)\!>\!>\!1 \quad \text{(eq. g3)}$$

Regarding 4×4 components, in the case of applying equation (eq. g3), the context indices illustrated in part (d) of FIG. 94 are derived.

In a case where the occurrence frequency of non-zero coefficients is biased to vertical-direction frequency components, context indices may be derived by using the following equation (eq. h1), instead of equation (eq. e1).

$$\text{ctxIdx}=((xC+yC+a)\!>\!>\!b)+((xC\!>\!yC)^*c) \quad \text{(eq. h1)}$$

Here, in equation (eq. h1), in a case where a=1, b=1, and c=3, the context indices for luminance illustrated in part (a) of FIG. 95 are derived for 4×4 components.

Alternatively, context indices may be derived by using equation (eq. h2), instead of equation (eq. h1).

$$\text{ctxIdx}=(xC+yC\!>\!th)?d\!:\!((xC+yC\!\le\!+a)\!>\!>\!b)+((xC\!>\!yC)^*c) \quad \text{(eq. h2)}$$

Here, in equation (eq. h2), in a case where th=3, a=1, b=1, c=3, and d=3, the context indices for luminance illustrated in part (b) of FIG. 95 are derived for 4×4 components.

In equation (eq. h2), in a case where th=4, a=1, b=1, c=3, and d=3, the context indices for luminance illustrated in part (c) of FIG. 95 are derived for 4×4 components.

Alternatively, context indices may be derived by using equation (eq. h3), instead of equation (eq. h1).

$$\text{ctxIdx} = (2*xC + yC + 1) >> 1 \quad \text{(eq. h3)}$$

Regarding 4×4 components, in the case of applying equation (eq. h3), the context indices illustrated in part (d) of FIG. 95 are derived.

As described above, in this process, a frequency region can be divided into a plurality of sub-regions, and context indices corresponding to the individual sub-regions can be derived by using an equation using xC and yC representing the position of the target frequency component to be processed. Accordingly, a context index derivation process, and the memory size for deriving context indices can be reduced.

(Modification Example 1 of Coefficient Presence/Absence Flag Decoder)

The coefficient presence/absence flag decoder according to this embodiment is not limited to the above-described configuration. Hereinafter, a coefficient presence/absence flag decoder 124' according to a first modification example will be described with reference to FIGS. 39 to 42.

Figure 39:
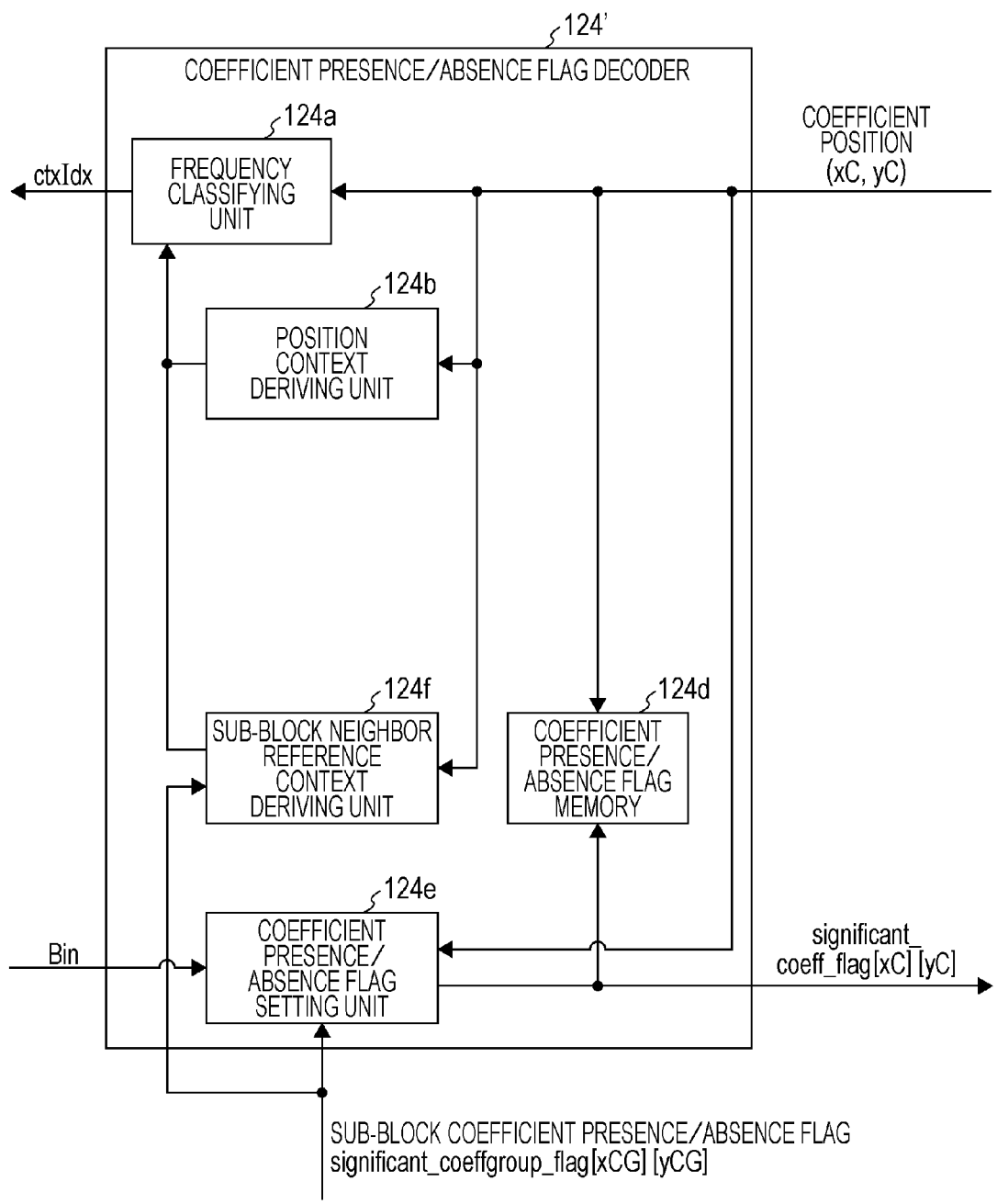
FIG. 39 is a block diagram illustrating the configuration of a first modification example of the coefficient presence/absence flag according to the embodiment.

FIG. 39 is a diagram illustrating the configuration of the coefficient presence/absence flag decoder 124' according to this modification example. As illustrated in FIG. 39, the coefficient presence/absence flag decoder 124' has almost the same configuration as the transform coefficient presence/absence flag decoder 124 illustrated in FIG. 23, but is different in the following points.

The coefficient presence/absence flag decoder 124' does not include the neighbor reference context deriving unit 124c.

The coefficient presence/absence flag decoder 124' includes a sub-block neighbor reference context deriving unit 124f.

The other part of the configuration of the coefficient presence/absence flag decoder 124' is the same as the coefficient presence/absence flag decoder 124, and thus the description thereof is omitted. Hereinafter, the sub-block neighbor reference context deriving unit 124f will be described.

(Sub-Block Neighbor Reference Context Deriving Unit 124f)

The sub-block neighbor reference context deriving unit 124f derives the context indices to be assigned to individual frequency components included in the target sub-block to be processed, by referring to a sub-block which is adjacent to the target sub-block and in which the sub-block coefficient presence/absence flag significant_coeffgroup_flag has been decoded. Also, the sub-block neighbor reference context deriving unit 124f assigns a common context index to the individual frequency components included in the target sub-block to be processed.

More specifically, under the assumption that the processing order of sub-blocks is reverse scan order, the sub-block neighbor reference context deriving unit 124f derives a context index that is to be used for referring to significant_coeff_flag[xC][yC] included in the sub-block (xCG, yCG) by using the following equation (eq. B1), on the basis of the total sum ctxCnt of the values of sub-block coefficient presence/absence flags assigned to an adjacent sub-block (xCG+1, yCG) and an adjacent sub-block (xCG, yCG+1).

$$\text{ctxCnt} = (\text{significant\_coeffgroup\_flag}[xCG+1][yCG] \mathrel{!=} 0) + \quad \text{(eq. B1)}$$
$$(\text{significant\_coeffgroup\_flag}[xCG][yCG+1] \mathrel{!=} 0)$$

ctxIdx=offset+ctxCnt

Here, it is assumed that each term in (eq. B1) takes 1 in a case where the comparison in ( ) is true, and takes 0 in a case where the comparison in ( ) is false. In a case where either of the adjacent sub-block (xCG+1, yCG) and the adjacent sub-block (xCG, yCG+1) to be referred to is located outside the transform block, the value of the sub-block coefficient presence/absence flag at the corresponding position is dealt as 0.

Under the assumption that the value of the variable offset in equation (eq. B1) is zero, ctxIdx derived in this manner takes the following value.

ctxIdx=0 . . . A non-zero transform coefficient does not exist in either of the sub-block (xCG+1, yCG) and the sub-block (xCG, yCG+1).

ctxIdx=1 . . . A non-zero transform coefficient exists in either of the sub-block (xCG+1, yCG) and the sub-block (xCG, yCG+1).

ctxIdx=2 . . . A non-zero transform coefficient exists in both of the sub-block (xCG+1, yCG) and the sub-block (xCG, yCG+1).

ctxIdX derived in this manner is used in common to decode all significant_coeff_flag included in the target sub-block (xCG, yCG).

Figure 40:
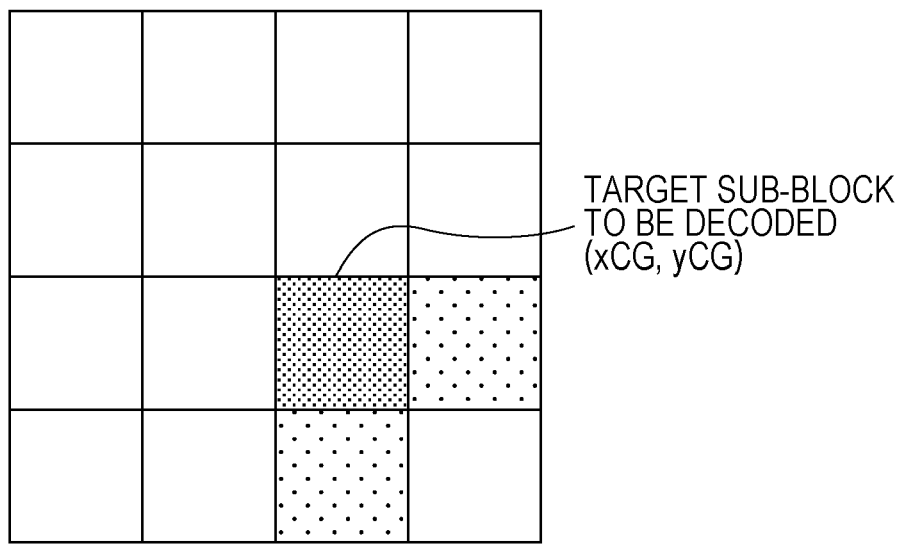
FIG. 40 illustrates an adjacent sub-block (xCG+1, yCG) and an adjacent block (xCG, yCG+1) that are referred to by the sub-block neighbor reference context deriving unit included in the coefficient presence/absence flag decoder according to the first modification example.

FIG. 40 illustrates the adjacent sub-block (xCG+1, yCG) and the adjacent sub-block (xCG, yCG+1) that are referred to by the sub-block neighbor reference context deriving unit 124f according to this modification example.

FIG. 41 illustrates pseudo code showing the context index derivation process performed by the sub-block neighbor reference context deriving unit 124f. R0, R1, and R2 illustrated in FIG. 41 correspond to those illustrated in part (a) of FIG. 26, for example. The pseudo code illustrated in FIG. 41 can be preferably applied to the process of deriving the context indices that are referred to in the case of decoding significant_coeff_flag for luminance Y.

FIG. 42 illustrates pseudo code showing another example of the context index derivation process performed by the sub-block neighbor reference context deriving unit 124f. R0 and R1 illustrated in FIG. 42 correspond to those illustrated in part (b) of FIG. 26, for example. The pseudo code illustrated in FIG. 42 can be preferably applied to the process of deriving the context indices that are referred to in the case of decoding significant_coeff_flag for chrominance U and V.

FIG. 74 illustrates pseudo code showing the context index derivation process performed by the sub-block neighbor reference context deriving unit 124f. R0, R1, and R2 illustrated in FIG. 74 correspond to those illustrated in FIG. 24, for example. The pseudo code illustrated in FIG. 74 can be preferably applied to the process of deriving the context indices that are referred to in the case of decoding significant_coeff_flag for luminance Y.

The sub-block neighbor reference context deriving unit 124f according to this modification example does not perform a neighbor reference context derivation process in units of frequency components, and assigns a common context index to individual frequency components included in a sub-block, and thus the amount of processing is reduced. Further, a context index derivation process in units of sub-blocks is performed with reference to the values of significant_coeffgroup_flag in adjacent sub-blocks, and accordingly a context index can be derived in accordance with the number of non-zero transform coefficients that exist around the target sub-block.

Therefore, with the sub-block neighbor reference context deriving unit 124f according to this modification example, the amount of processing for a context index derivation process can be reduced, while high coding efficiency being maintained.

(Modification Example 2 of Coefficient Presence/Absence Flag Decoder)

Hereinafter, a second modification example of the coefficient presence/absence flag decoder will be described with reference to FIG. 43.

Figure 43:
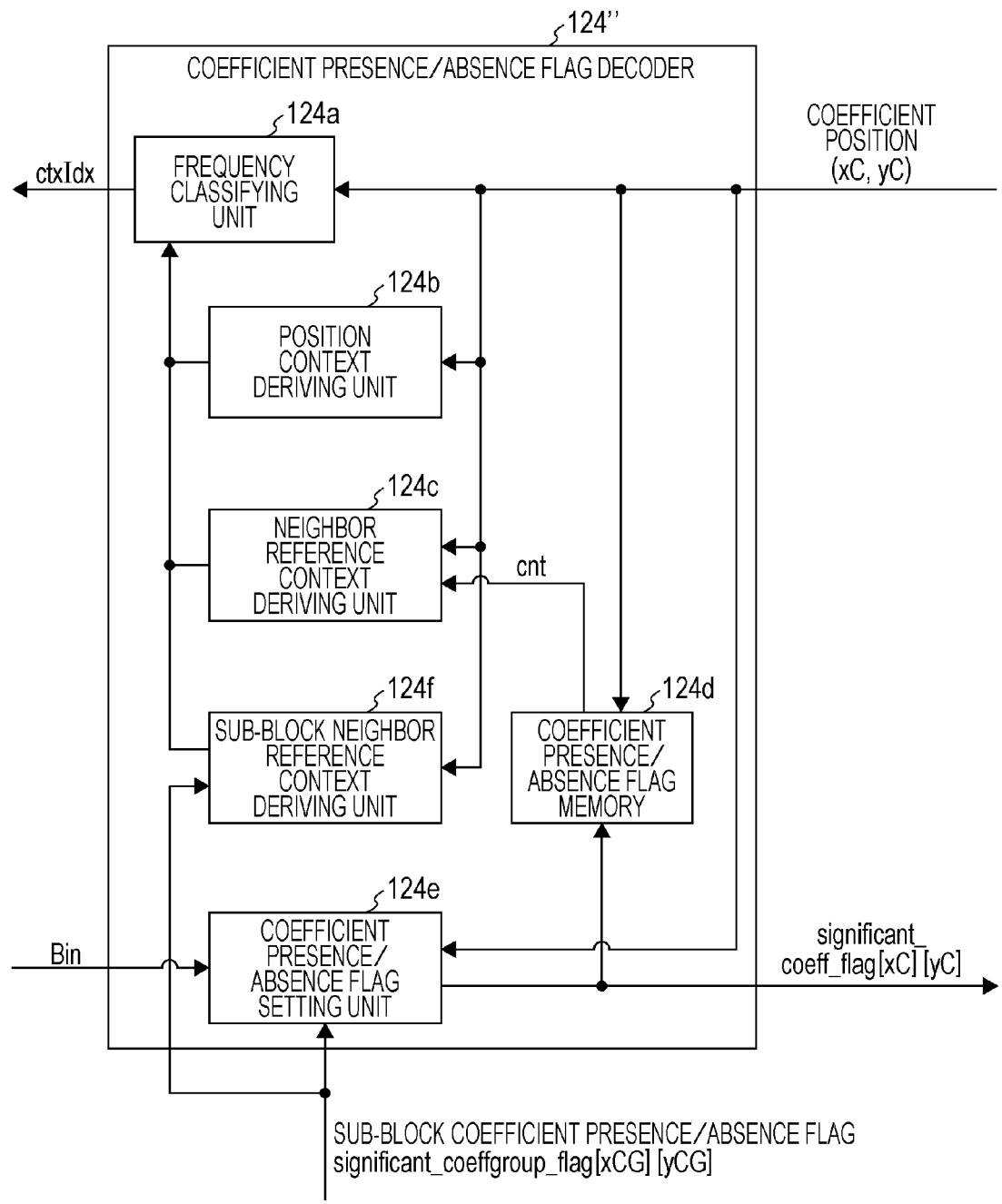
FIG. 43 is a block diagram illustrating the configuration of a second modification example of the coefficient presence/absence flag according to the embodiment.

FIG. 43 is a block diagram illustrating the configuration of a coefficient presence/absence flag decoder 124" according to this modification example. As illustrated in FIG. 43, the coefficient presence/absence flag decoder 124" includes the sub-block neighbor reference context deriving unit 124f in addition to the individual units of the transform coefficient presence/absence flag decoder 124 illustrated in FIG. 23.

The sub-block neighbor reference context deriving unit 124f has been described above, and thus the description thereof is omitted here.

The sub-block neighbor reference context deriving unit 124f according to this modification example performs the process expressed by the pseudo code illustrated in FIG. 42 in the case of deriving context indices that are referred to when significant_coeff_flag regarding chrominance U and V is decoded, and performs the process expressed by the pseudo code illustrated in FIG. 27 in the case of deriving context indices that are referred to when significant_coeff_flag regarding luminance Y is decoded.

With this configuration, the amount of processing for a context index derivation process can be reduced, while high coding efficiency being maintained.

(Modification Example 3 of Coefficient Presence/Absence Flag Decoder 124)

Hereinafter, a third modification example of the coefficient presence/absence flag decoder 124 will be described with reference to FIG. 96. The third modification example of the coefficient presence/absence flag decoder 124 which will be described below has, regarding derivation of context indices of coefficient presence/absence flags, the following characteristics:

(1) in a case where the target TU size to be processed is a certain size or smaller, a frequency region is divided to a plurality of sub-regions by suing an equation using xC and yC that represent the position of the target frequency component to be processed, and context indices for luminance and chrominance corresponding to the individual sub-regions are derived; and (2) in a case where the target TU size to be processed is larger than the certain size, when the position of the target frequency component to be processed belongs to a low-frequency component and an intermediate-frequency component, a context index is derived on the basis of the number of non-zero coefficients positioned around the target to be processed, and when the position of the target frequency component to be processed belongs to a high-frequency component, a fixed context index is assigned.

Figure 96:
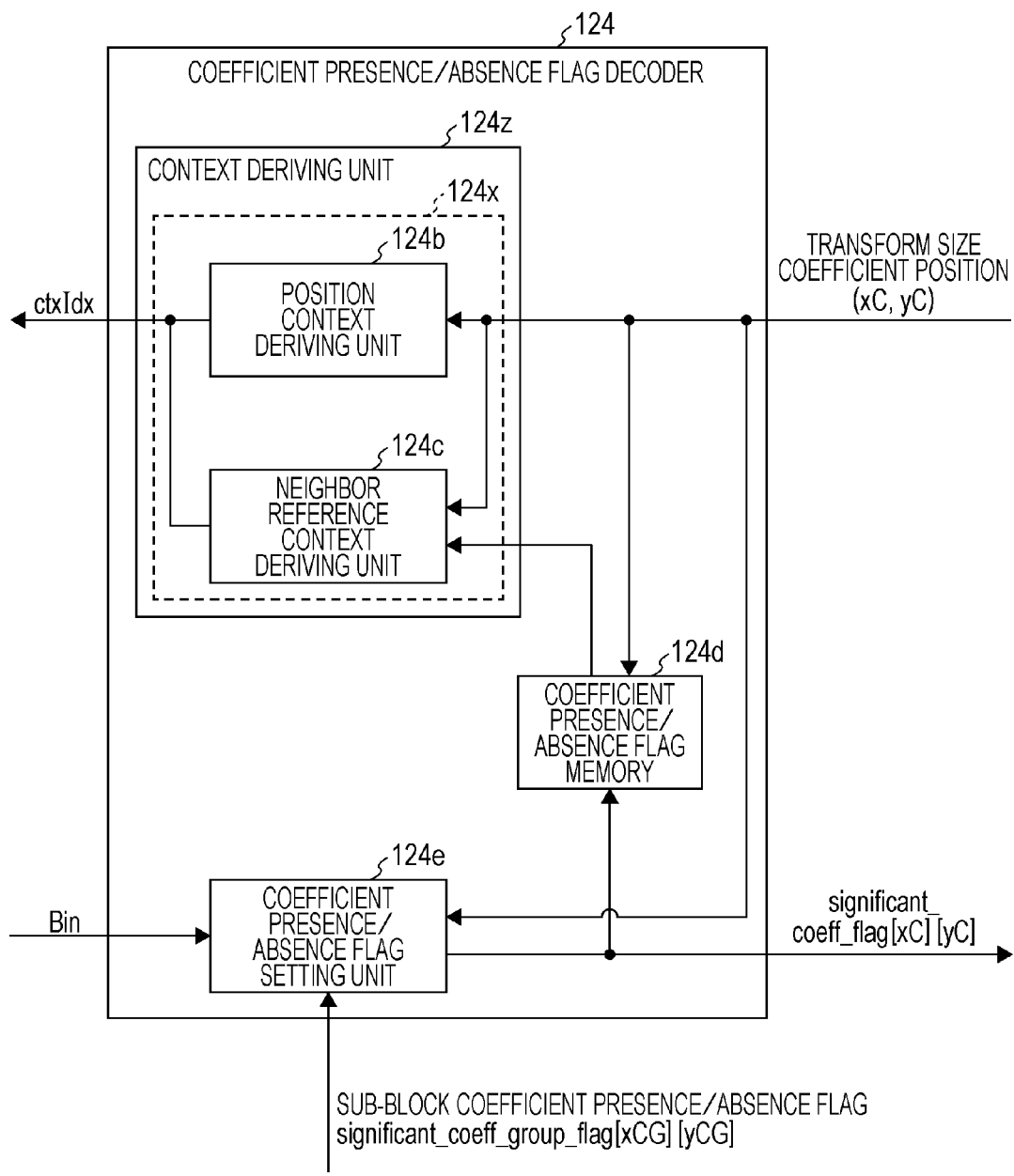
FIG. 96 is a block diagram illustrating an example configuration of a third modification example of the coefficient presence/absence flag decoder according to the embodiment.

FIG. 96 is a block diagram illustrating an example configuration of the third modification example of the coefficient presence/absence flag decoder 124. As illustrated in FIG. 96, the coefficient presence/absence flag decoder 124 includes a context deriving unit 124z, the coefficient presence/absence flag memory 124d, and the coefficient presence/absence flag setting unit 124e. Further, the context deriving unit 124z includes a derivation method controller 124x, the position context deriving unit 124b, and the neighbor reference context deriving unit 124c. In FIG. 96, in the context deriving unit 124z, the derivation method controller 124x includes the position context deriving unit 124b and the neighbor reference context deriving unit 124c, but this is merely an example. The configuration of the context deriving unit 124z is not limited to such a configuration.

(Context Deriving Unit 124z)
(Derivation Method Controller 124x)

The derivation method controller 124x receives the position (xC, yC) of the target frequency component to be processed and the logarithm value of a transform block (log 2TrafoWidth, log 2TrafoHeight). With the size of the logarithm value, the width "width" and the height "height" of the frequency region is calculated by using (1<<log 2TrafoWidth) and (1<<log 2TraforHeight). Instead of the size of the logarithm value, the width and height of the frequency region may be directly input.

The derivation method controller 124x selects the position context deriving unit 124b or the neighbor reference context deriving unit 124c in accordance with the target TU size and the position of the frequency component. In the selected context deriving unit, context indices ctxIdx are derived.

For example in a case where the TU size is a certain size or smaller (for example, 4×4 TU or 8×8 TU), the derivation method controller 124x selects the position context deriving unit 124b, and assigns the context indices ctxIdx derived by the selected position context deriving unit 124b to the target frequency components to be decoded.

On the other hand, in a case where the target TU size is larger than the certain size (for example, 16×16 TU or 32×32 TU), the derivation method controller 124x classifies each of the frequency components to any of a plurality of partial regions in accordance with the position of the target frequency component to be decoded in the frequency region, selects either of the position context deriving unit 124b and the neighbor reference context deriving unit 124c in accordance with the classified partial regions, and assigns the context indices ctxIdx derived by the selected context deriving means to the target frequency components to be decoded.

Part (a) of FIG. 98 is a diagram illustrating partial regions R0 to R2 that are obtained through division performed by the derivation method controller 124x in this processing example. Part (a) of FIG. 98 is preferably applied in the case of decoding transform coefficients related to luminance and chrominance.

The derivation method controller 124x classifies the frequency components included in a frequency region to a plurality of partial regions R0 to R2 under the following conditions, for example, by using the positions (xC, yC) of the frequency components in the frequency region. xCG and yCG represent a sub-block position.

(1) Classify a frequency component that satisfies xC+yC<THLo to the partial region R0.

(2) Classify a frequency component that satisfies xC+yC≥THLo and xCG+yCG<THHi to the partial region R1.

(3) Classify a frequency component that satisfies xCG+yCG≥THHi to the partial region R2.

Here, the threshold THlo is preferably set by using, for example, the following equation (eq. A2-1). The threshold THhi is preferably set by using, for example, the following equation (eq. A2-2).

$$THlo=2 \quad \text{(eq. A2-1)}$$

$$THhi=(3*max(width,height))>>4 \quad \text{(eq. A2-2)}$$

The inventors have verified that, as a result of experiments, in the case of dividing a frequency region to partial regions R0 to R2 and deriving context indices for the partial regions R0 to R1 by neighbor reference, it is preferable to set the above-described threshold (eq. A2-1) from the viewpoint of coding efficiency.

The classification conditions for partial regions are not limited to those described above, and the following conditions (part (b) of FIG. 98) may be used.

(1) Classify a frequency component that satisfies xCG+yCG<THLo to the partial region R0.

(2) Classify a frequency component that satisfies xCG+yCG≥THLo and xCG+yCG<THHi to the partial region R1.

(3) Classify a frequency component that satisfies xCG+yCG≥THHi to the partial region R2.

Here, the threshold THlo is preferably 1. The threshold THhi is the same as equation (eq. A2-2).

Hereinafter, as an example, a frequency component that belongs to the region R0 illustrated in parts (a) and (b) of FIG. 98 is referred to as a low-frequency component, a component that belongs to the region R1 is referred to as an intermediate-frequency component, and a component that belongs to the region R2 is referred to as a high-frequency component.

The above-described context index derivation process is compared with the derivation process illustrated in part (a) of FIG. 26. In part (a) of FIG. 26, in the low-frequency component, there are two branches including a branch for separating a partial region of a position context and a partial region of neighbor reference (a branch for separating R0 and R1 in part (a) of FIG. 26), and a branch for separating partial regions of neighbor reference (a branch for separating R1 and R2 in part (a) of FIG. 26). On the other hand, in FIG. 98, there is only one branch, that is, a branch for separating partial regions of neighbor reference (a branch for separating R0 and R1 of FIG. 98), and a context derivation process is simplified advantageously. In particular, by applying neighbor reference to the context index of a DC component, it can be advantageously prevented that a process different from the process for another component is performed on the DC component. In particular, if the position of the branch for separating partial regions of neighbor reference in the low-frequency component (the branch for separating R0 and R1 in FIG. 98) is set to the threshold (eq. A2-1) and if this process is applied, simplification can be realized while coding efficiency being maintained. Further, there is an effect that the coding efficiency is higher than in part (b) of FIG. 26, which is simpler.

Furthermore, a method for dividing a frequency region and selecting context index deriving means which is common to luminance and chrominance is used, and thus it is not necessary to provide different branch settings for luminance and chrominance. Accordingly, a context index derivation process related to coefficient presence/absence flags can be simplified.

Alternatively, the derivation method controller 124x may be configured to execute a context index ctxIdx derivation process that is common to TU sizes of 4×4 TU to 32×32 TU. That is, the derivation method controller 124x may be configured to select either of the position context deriving unit 124b and the neighbor reference context deriving unit 124c in a fixed manner regardless of the size of TU.

(Position Context Deriving Unit 124b)

The position context deriving unit 124b derives context indices ctxIdx for target frequency components on the basis of the positions of the target frequency components in a frequency region. Even in the case of deriving context indices ctxIdx having fixed values regardless of the positions of frequency components, the process is performed by the position context deriving unit 124b.

In a case where the TU size of the target to be processed is larger than a certain size, and where xCG+yCG represented by the position (xCG, yCG) of the sub-block to which the target frequency component (xC, yC) belongs is equal to or larger than a certain threshold THhi, the position context deriving unit 124b derives a context index ctxIdx for a frequency component that belongs to the partial region R2 illustrated in part (a) of FIG. 98 by using the following equation (eq. A2-3), and supplies the derivation result ctxIdx to the derivation method controller 124x.

ctxIdx=sigCtxOffsetR2    (eq. A2-3)

In the foregoing equation (eq. A2-3), sigCtxOffsetR2 is a certain constant that represents the start point of the context index related to a frequency component that belongs to the partial region R2.

In a case where the TU size of the target to be processed is the certain size or smaller, the position context deriving unit 124b uses the context index assignment method illustrated in FIG. 60 on the basis of the position (xC, yC) of a target frequency component. Hereinafter, the context index assignment method illustrated in FIG. 60 will be described in detail with reference to FIG. 100.

Part (a) of FIG. 100 illustrates a correspondence table CTX_GRP_TBL[X][Y] of individual coefficient positions and relative context indices (identification numbers of sub-regions) of 4×4 TU and 8×8 TU.

(Context Index Derivation Using Table)

The position context deriving unit 124b derives a context index ctxIdx by using the value of an assigned relative context index ctxGrpIdx and a certain offset value baseCtx of each TU size. In the case of 8×8 TU, interpretation is performed by using the position (xC>>1, yC>>1) of a 2×2 sub-block to which the position (xC, yC) of the target frequency component belongs. That is, X=log 2TrafoWidth==2?xC: xC>>1

Y=log 2TrafoHeight==2?yC: yC>>1 ctxGrpIdx=CTX_GRP_TBL[X][Y]    (eq. A2-4)

ctxIdx=ctxGrpIdx+baseCtx    (eq. A2-5)

Here, the variable baseCtx represents the start point of a context index of each TU.

(Logical Context Index Derivation)

Derivation of the value of a relative context index ctxGrpIdx is not limited to equation (eq. A2-4) for deriving the value by using the correspondence table (look-up table CTX_GRP_TBL[X][Y]) of coefficient positions (X, Y) and relative context indices illustrated in part (a) of FIG. 100. Alternatively, the following logical derivation method may be used. In this case, the position context deriving unit 124b performs derivation by using the following values of individual bits x0, x1, y0, and y1 of the coefficient position (X, Y).

x0=(X & 1) . . . one low-order bit of X (first low-order bit)

x1=(X & 2)>>1 . . . one high-order bit of X (second low-order bit)

y0=(Y & 1) . . . one low-order bit of Y (first low-order bit)

$y1 = (Y \& 2) >> 1$ ... one high-order bit of $Y$ (second low-order bit)

Hereinafter, a description will be given of a method for deriving relative context indices ctxGrpIdx using x0, x1, y0, and y1.

Part (b) of FIG. 100 illustrates the individual values of the correspondence table CTX_GRP_TBL[X][Y] of coefficient positions and relative context indices illustrated in part (a) of FIG. 100, by using bits. The coefficient position (X, Y) is expressed by 2 bits, and the value of a relative context index is expressed by 3 bits. Here, the first low-order bit (third high-order bit) of the value of a relative context index ctxGrpIdx is ctxGrpIdx0, the second low-order bit (second high-order bit) is ctxGrpIdx1, and the third low-order bit (first high-order bit) is ctxGrpIdx2.

Referring to part (b) of FIG. 100, the following are apparent regarding the two high-order bits of the value of a relative context index ctxGrpIdx.

The value of the first high-order bit (the third low-order bit: ctxGrpIdx2) of the value of a relative context index ctxGrpIdx is equal to the value of the first high-order bit of Y (y1). That is, $$\text{ctxGrpIdx2} = y1 \qquad \text{(eq. A2-6)}$$

The value of the second high-order bit (the second low-order bit: ctxGrpIdx1) of the value of a relative context index ctxGrpIdx is equal to the value of the first high-order bit of X (x1). That is, $$\text{ctxGrpIdx1} = x1 \qquad \text{(eq. A2-7)}$$

Part (c) of FIG. 100 illustrates only one low-order bit of each value of the correspondence table CTX_GRP_TBL[X][Y] of coefficient positions and relative context indices illustrated in part (b) of FIG. 100. Referring to part (c) of FIG. 100, the first low-order bit (ctxGrpIdx0) of the value of a relative context index ctxGrpIdx can be expressed by the logical OR of the value of the logical AND of NOT of x1 and y0, and the value of the logical AND of x0 and NOT of y1, by using the individual bits x0, x1, y0, and y1 of the coefficient position (X, Y). That is, $$\text{ctxGrpIdx0} = (!x1 \& y0) | (x0 \& !y1) \qquad \text{(eq. A2-8)}$$

Here, an operator "!" represents NOT, and an operator "&" represents the logical AND in units of bits, and an operator "|" represents the logical OR in units of bits (the same applies to the following description).

Thus, the individual values of relative context indices ctxGrpIdx corresponding to coefficient positions illustrated in part (a) of FIG. 100 can be derived through the following bit calculation using the foregoing equations (eq. A2-6), (eq. A2-7), and (eq. A2-8).

$$\text{ctxGrpIdx} = (\text{ctxGrpIdx2} << 2) | (\text{ctxGrpIdx1} << 1) \\ \text{ctxGrpIdx0} \qquad \text{(eq. A2-9)}$$

Setting of the values of individual relative context indices shown in the correspondence table of coefficient positions and relative context indices illustrated in part (a) of FIG. 100 is not limited to that illustrated in part (a) of FIG. 100. For example, as illustrated in FIG. 101, six patterns can be set in which the bit positions for setting the values of x1, y1, and z vary. In a case where z in FIG. 101 is expressed as follows $$z = (!x1 \& y0) | (x0 \& !y1) \qquad \text{(eq. A2-10),}$$

the individual values of relative context indices corresponding to the coefficient positions illustrated in part (a) of FIG. 100 are derived by using pattern 0 illustrated in FIG. 101.

Instead of z in equation (eq. A2-10), z that is calculated through logical calculation expressed by equation (eq. A2-10) may be used. In this case, the individual values of relative context indices corresponding to the coefficient positions (X, Y) corresponding to pattern 0 in FIG. 101 are those illustrated in part (a) of FIG. 102.

$$z = ((x0 \char`\^ x1) \& !y1) | ((y0 \char`\^ y1) \& !x1) \qquad \text{(eq. A2-11)}$$

Here, an operator "^" represents the exclusive logical OR in units of bit units (the same applies to the following description).

Instead of z in equation (eq. A2-10), z that is calculated through logical calculation expressed by equation (eq. A2-11) may be used. In this case, the individual values of relative context indices corresponding to the coefficient (X, Y) corresponding to pattern 0 in FIG. 101 are those illustrated in part (b) of FIG. 102.

$$z = (!(x0|x1|y0|y1)) | ((y0 \& y1) \& !x1) | ((x0 \& x1) \& !y1) \qquad \text{(eq. A2-12)}$$

Instead of z in equation (eq. A2-10), z that is calculated through logical calculation expressed by equation (eq. A2-1) may be used. In this case, the individual values of relative context groups corresponding to the coefficient (X, Y) corresponding to pattern 0 in FIG. 101 are those illustrated in part (c) of FIG. 102.

$$z = (!(x0|x1|y0|y1)) | ((!y0 \& y1) \& !x1) | ((!x0 \& x1) \& !y1) \qquad \text{(eq. A2-13)}$$

As described above, in this process, with the context index derivation method illustrated in FIGS. 60 and 100, a sub-group classification method that is common to 4×4 components and 8×8 components, and to luminance and chrominance is used. Accordingly, a context index derivation process can be simplified, while coding efficiency being maintained.

In the context index derivation method illustrated in FIGS. 60 and 100, with bit calculation using the values of individual bits of xC and yC representing the position of the target frequency component to be processed, a frequency region can be easily divided to a plurality of sub-regions (relative context indices), and the context indices corresponding to the individual sub-regions can be derived. Accordingly, a context index derivation process can be simplified. The context index derivation method illustrated in FIGS. 60 and 100 has characteristics that the number of steps of bit calculation is smaller than that of the derivation method illustrated in FIG. 85 described below, because expression can be performed using three bits of bit0, bit1, and bit2 (the value ranges from 0 to 6), and three AC components of the lowest order adjacent to DC are assigned to one context index. Because expression can be performed using a small number of bits, that is, three bits, installation can be easily performed when hardware is used.

Instead of the context index derivation method illustrated in FIG. 60, the context index derivation method illustrated in parts (a) and (b) of FIG. 70 may be used. In this case, regarding a DC component of 8×8 TU, individual relative context indices are assigned regardless of the above-described procedure. For example, a context index may be derived in the following manner instead of using equation (eq. A2-9).

$$\text{ctxGrpIdx} = (xC + yC == 0 \&\& \log 2\text{TrafoWIdth} == 3 \&\& \\ \log 2\text{TrafoHeight} == 3)?7:((\text{ctxGrpIdx2} << 2) | \\ (\text{ctxGrpIdx1} << 1) | \text{ctxGrpIdx0}) \qquad \text{(eq. A2-14)}$$

$$\text{ctxIdx} = \text{ctxGrpIdx} + \text{baseCtx} \qquad \text{(eq. A2-154)}$$

This process has characteristics that the number of steps is larger than in the context index derivation method illustrated in FIGS. 60 and 100, but has higher coding efficiency. Also, this process can be performed within three bits of 0 to 7 except DC, and thus installation can be easily performed when hardware is used.

As described above, in this process, the context index derivation method illustrated in FIG. 70 is used, so as to use a sub-group classification process that is common to 4×4 components and 8×8 components and to luminance and chrominance, except a DC component. Accordingly, a context index derivation process can be simplified, while coding efficiency being maintained.

In the above-described manner, a frequency region can be divided into a plurality of sub-regions as illustrated in parts (a) and (b) of FIGS. 60 and 70, and context indices corresponding to the individual sub-regions can be derived.

In the case of the context index derivation process illustrated in FIG. 85, context indices can be derived by using the following equations.

$$ctxGrpIdx=(bit3<<2)|(bit2<<2)|(bit1<<1)|bit0$$

$$bit3=(x1\ \&\ y1)$$

$$bit2=(x1\ \&\ !y1)|(!x1\ \&\ y1)$$

$$bit1=(!x1\ \&\ y1)|(!x1\ \&\ !y1\ \&\ y0)$$

$$bit0=(x0\ \&\ !y1)|(y0\ \&\ y1\ \&\ !x1)$$

As described above, in this process, the context index derivation method illustrated in FIG. 70 is used, so as to use a sub-group classification process that common to 4×4 components and 8×8 components and to luminance and chrominance. Accordingly, a context index derivation process can be simplified, while coding efficiency being maintained.

This derivation method uses four bits of bit0, bit1, bit2, and bit3 for expression (the value ranges from 0 to 8), and has characteristics that coding efficiency is higher than in the context index derivation method illustrated in FIGS. 60 and 100, although the number of steps is larger due to the necessity of confirming a larger number of bits by one bit. The context index derivation method according to the comparative example illustrated in part (c) of FIG. 30 is very complicated because the positions of 2 and 3 are not symmetric, the positions of 6 and 8 are not symmetric, and the positions of 10 (DC) and 7 are special, and thus a larger number of steps than in the derivation method illustrated in FIG. 85 is necessary in logical calculation, although the range of bits is the same (4 bits).

(Neighbor Reference Context Deriving Unit 124c)

The neighbor reference context deriving unit 124c derives a context index ctxIdx for the target frequency component to be decoded, on the basis of the number cnt of non-zero transform coefficients that have been decoded regarding frequency components around the target frequency component. More specifically, in a case where the position (xC, yC) of the target frequency component or the position (xCG, yCG) of the sub-block to which the target frequency component belongs satisfies the following conditions, the neighbor reference context deriving unit 124c derives the number cnt of decoded non-zero transform coefficients by using a reference position (template) that varies in accordance with the position of a transform coefficient.

(1) In a case where xC+yC<THLo is satisfied . . . partial region R0 illustrated in part (a) of FIG. 98

(2) In a case where xC+yC≥THlo and xCG+yCG<THhi are satisfied . . . partial region R1 illustrated in part (a) of FIG. 98

Here, the threshold THlo may be set by using the foregoing equation (eq. A2-1) and the threshold THhi may be set by using the foregoing equation (eq. A2-2), but the embodiment is not limited thereto.

Under the above-described conditions, the neighbor reference context deriving unit 124c derives the number cnt of decoded non-zero transform coefficients by using a reference position (template) that varies in accordance with the position of a transform coefficient. Also, the neighbor reference context deriving unit 124c derives context indices ctxIdx on the basis of the number cnt of decoded non-zero transform coefficients that have been derived in this manner.

Hereinafter, a description will be given of a case where scan in a sub-block is "diagonal-direction scan".

Figure 99:
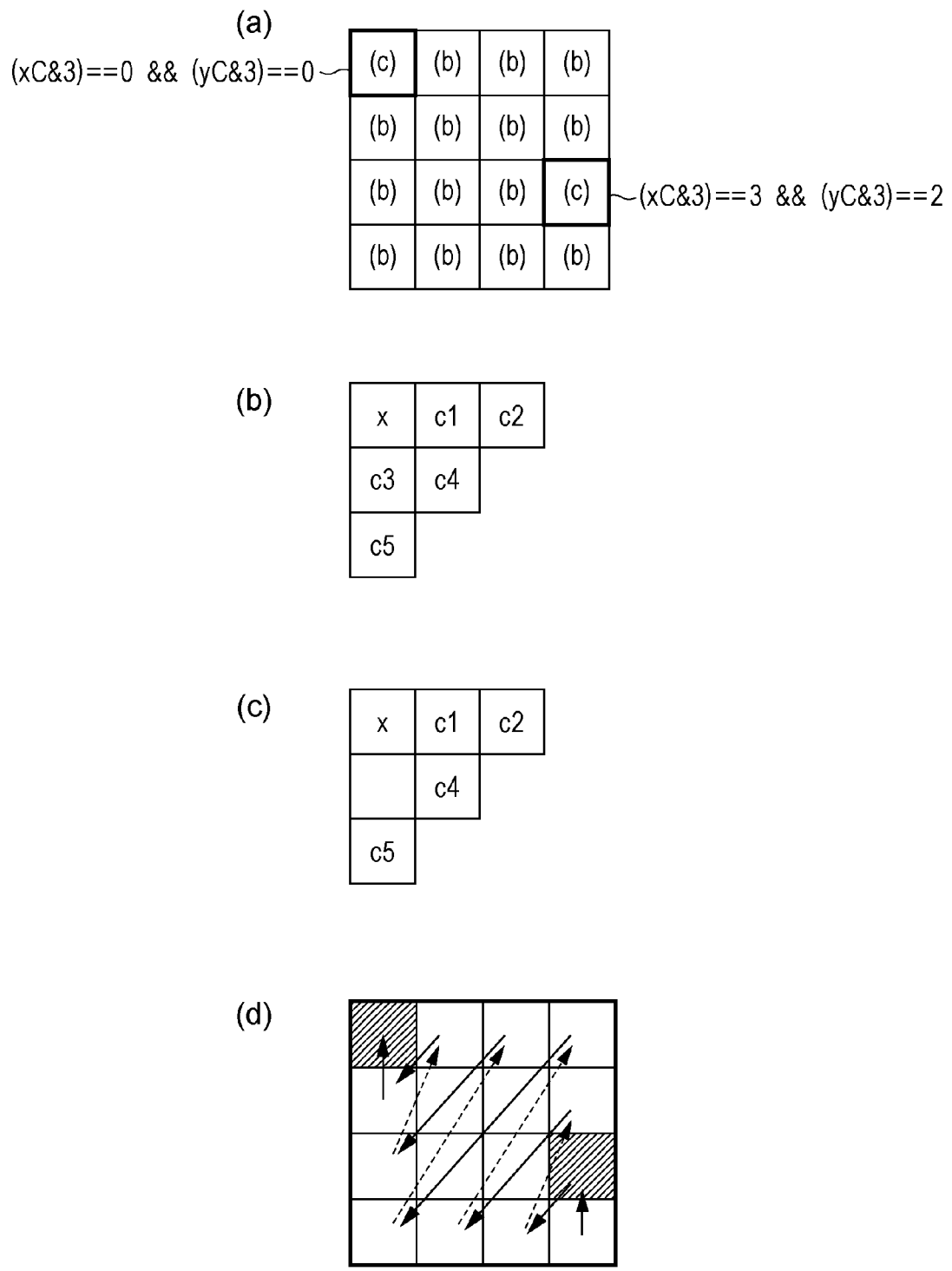
FIG. 99 includes diagrams describing reference frequency components that are referred to in a case where a decoding process is performed in reverse scan order by the neighbor reference context deriving unit included in the third modification example of the coefficient presence/absence flag decoder according to the embodiment, in which part (a) illustrates the relationship between a position in a frequency component and a template to be selected, part (b) illustrates relative positions between a target frequency component x and reference frequency components c1, c2, c3, c4, and c5, part (c) illustrates relative positions between the target frequency component x and reference frequency components c1, c2, c4, and c5, part and part (d) illustrates scan order (reverse scan order) in a diagonal direction in 4×4 sub-blocks.

[In a case where scan in sub-block is diagonal-direction scan (part (d) of FIG. 99)]

In a case where scan in a sub-block is "diagonal-direction scan", the neighbor reference context deriving unit 124c derives the number cnt of decoded non-zero transform coefficients by using a reference position (template) that varies in accordance with the position of a transform coefficient in the following manner. Part (a) of FIG. 99 is a diagram illustrating the relationship between the positions of frequency components in a sub-block and the template to be selected in a case where scan in the sub-block is diagonal-direction scan. In a sub-block of 4×4 components, the template illustrated in part (b) of FIG. 99 is used in a case where the symbol given at the position is (b), whereas the template illustrated in part (c) of FIG. 99 is used in a case where the symbol given at the position is (c). Parts (b) and (c) of FIG. 99 illustrate the forms of the templates, that is, illustrate the relative positions of reference frequency components (for example, c1, c2, c3, c4, and c5) and the target frequency component x. Part (d) of FIG. 99 is a diagram illustrating the scan order (reverse scan order) of diagonal-direction scan in a 4×4 sub-block.

The process that is performed in a case where the position (xC, yC) of a transform coefficient satisfies the following equation (eq. A3), that is, in a case where the position of a transform coefficient is the upper left position of the sub-block or is immediately above the lower right position of the sub-block, is different from the process that is performed in the other cases.

$$((xC\ \&3)==0\ \&\&\ (yC\ \&3)==0)\|((xC\ \&3)==3\ \&\&\ (yC\ \&3)==2) \qquad \text{(eq. A3)}$$

In the foregoing equation (eq. A3), an operator "&" is an operator that takes the logical OR in units of bits, "&&" is an operator representing logical AND, and "|" is an operator representing logical OR (the same applies to the following description).

Equation (eq. A3) can also be expressed by equation (eq. A3').

$$((xC\ \%4)==0\ \&\&\ (yC\ \%4)==0)\|((xC\ \%4)==3\ \&\&\ (yC\ \%4)==2) \qquad \text{(eq. A3')}$$

In the foregoing equation (eq. A3'), "%" is an operator for obtaining a remainder (the same applies to the following description).

(Derivation of the Number Cnt of Non-Zero Transform Coefficients)

(In a Case where Equation (Eq. A3) is Satisfied)

In a case where the position (xC, yC) of a transform coefficient satisfies equation (eq. A3), the count number cnt of non-zero transform coefficients is derived by using the following equation (eq. A4) by using the reference frequency components (c1, c2, c4, and c5) illustrated in part (c) of FIG. 99.

$$cnt=(c1!=0)+(c2!=0)+(c4!=0)+(c5!=0) \qquad \text{(eq. A4)}$$

Here, it is assumed that each term in equation (eq. A4) takes 1 in a case where the comparison in ( ) is true, and takes 0 in a case where the comparison in ( ) is false.

(In a Case where Equation (Ep. A3) is not Satisfied)

In a case where the position (xC, yC) of a transform coefficient does not satisfy equation (eq. A3), the number cnt of non-zero transform coefficients is calculated by using the following equation (eq. A5) by using the reference frequency components c1 to c5 illustrated in part (b) of FIG. 99.

$$cnt=(c1!=0)+(c2!=0)+(c3!=0)+(c4!=0)+(c5!=0) \quad \text{(eq. A5)}$$

(Derivation of Context Index ctxIdx)

Subsequently, the neighbor reference context deriving unit 124c changes the start point of a context index in accordance with a partial region R0 or R1 to which the transform coefficient belongs, derives a context index ctxIdx by using the following equation (eq. A6), and supplies the derivation result ctxIdx to the derivation method controller 124x.

$$ctxIdx=sigCtxOffsetRX+Min(2,ctxCnt) \quad \text{(eq. A6)}$$

Here, ctxCnt is determined by ctxCnt=(cnt+1)>>1.

In equation (eq. A6), the variable sigCtxOffsetRX represents the start point of a certain context index that is determined in accordance with the partial region R0 or R1 to which the transform coefficient belongs. In the case of the partial region R0, the variable sigCtxOffsetRX=sigCtxOffsetR0. In the case of the partial region R1, the variable sigCtxOffsetRX=sigCtxOffsetR1. Preferably, the values of sigCtxOffsetR0 and sigCtxOffsetR1 are different from each other.

In equation (eq. A4), the transform coefficient at the coordinate (c3) located immediately before the position of the target transform coefficient in the processing order (in a case where the processing order is reverse scan order, the lower side of the position of the target transform coefficient) is not referred to. In such a process, derivation of a context to be used for decoding a coefficient presence/absence flag at a certain position can be performed without referring to the value of the preceding coefficient presence/absence flag, and thus a context derivation process and a decoding process can be performed in parallel.

(Coefficient Presence/Absence Flag Setting Unit 124e)

The coefficient presence/absence flag setting unit 124e interprets each Bin supplied from the bit decoder 132, and sets a syntax element significant_coeff_flag[xC][yC]. The set syntax element significant_coeff_flag[xC][yC] is supplied to the decoding coefficient memory 126.

In a case where the target frequency region is divided into sub-blocks, the coefficient presence/absence flag setting unit 124e refers to the syntax element significant_coeff_group_flag[xCG][yCG] assigned to the target sub-block. In a case where the value of significant_coeff_group_flag[xCG][yCG] is 0, the coefficient presence/absence flag setting unit 124e sets significant_coeff_flag[xC][yC] for all the frequency components included in the target sub-block to 0.

(Coefficient Presence/Absence Flag Memory 124d)

The coefficient presence/absence flag memory 124d stores individual values of syntax elements significant_coeff_flag[xC][yC]. The individual values of syntax elements significant_coeff_flag[xC][yC] stored in the coefficient presence/absence flag memory 124d are referred to by the neighbor reference context deriving unit 124c. Whether or not a non-zero transform coefficient exists at the position (xC, yC) of each frequency component can be determined by referring to a decoded transform coefficient value without using the memory dedicated to coefficient presence/absence flags. Thus, the decoding coefficient memory 126 may be used without providing the coefficient presence/absence flag memory 124d, <Operation of Context Deriving Unit 124z>

Figure 103:
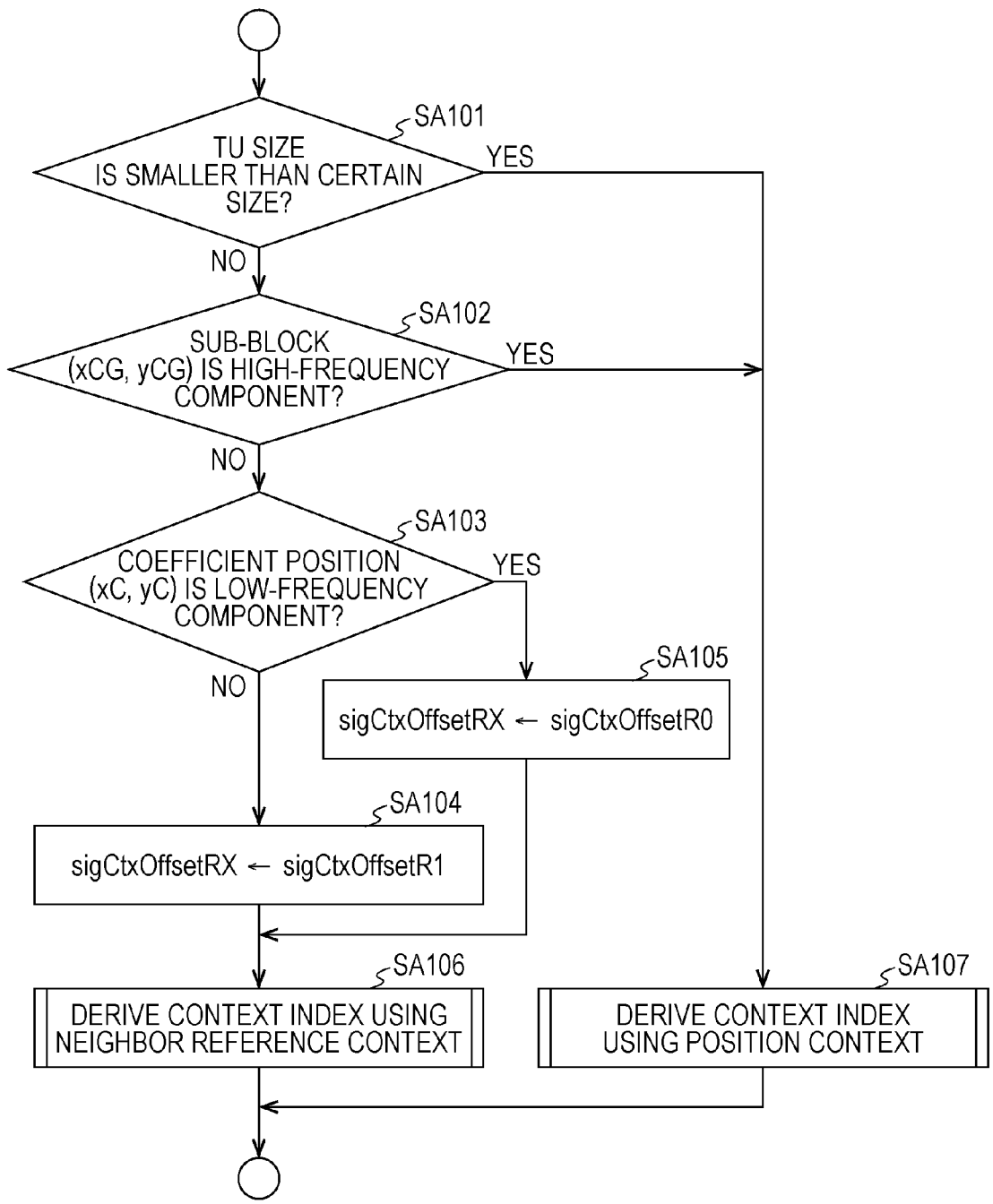
FIG. 103 is a flowchart illustrating the operation of a context deriving unit 124z included in the third modification example of the coefficient presence/absence flag decoder according to the embodiment.

FIG. 103 is a flowchart illustrating the operations of the derivation method controller 124x, the position context deriving unit 124b, and the neighbor reference context deriving unit 124c included in the context deriving unit 124z.

(Step SA101)

The derivation method controller 124x determines whether or not a TU size is smaller than a certain size. The following expression is used for determination, for example.

$$width+height<THSize$$

For example, 20 is used as the threshold THSize. In a case where 20 is used as the threshold THsize, it is determined that 4×4 TU and 8×8 TU are smaller than the certain size. It is determined that 16×4 TU, 4×16 TU, 16×16 TU, 32×4 TU, 4×32 TU, and 32×32 TU are equal to or larger than the certain size. The threshold THSize may be 0. In this case, it is determined that 4×4 TU to 32×32 TU are equal to or larger than the certain size.

(Step SA102)

In a case where the TU size of the target to be processed is equal to or larger than the certain size (No in step SA101), the derivation method controller 124x determines whether or not the sub-block position (xCG, yCG) including the target transform coefficient corresponds to a high-frequency component (for example, whether or not the partial region R2 illustrated in part (a) of FIG. 98).

(Step SA103)

In a case where the sub-block position (xCG, yCG) including the target transform coefficient does not correspond to a high-frequency component (No in step SA102), the derivation method controller 124x determines whether or not the position (xC, yC) of the target transform coefficient correspond to a low-frequency component (for example, whether or not the partial region R0 illustrated in part (a) of FIG. 98).

(Step SA104)

In a case where the position (xC, yC) of the target transform coefficient does not correspond to a low-frequency component (No in step SA103), the derivation method controller 124x determines that the position (xC, yC) of the target transform coefficient corresponds to an intermediate frequency component, and sets the variable sigCtxOffsetRx to sigCtxOffsetR1. Subsequently, the process proceeds to step SA106.

(Step SA105)

In a case where the position (xC, yC) of the target transform coefficient corresponds to a low-frequency component (Yes in step SA103), the derivation method controller 124x sets sifCtxOffsetR0 to the variable sigCtxOffsetRX. Subsequently, the process proceeds to step SA106.

(Step SA106)

The derivation method controller 124x selects the neighbor reference context deriving unit 124c as context deriving means, and the selected neighbor reference context deriving unit 124c derives the context index of the target transform coefficient.

(Step SA107)

In a case where the TU size of the target to be processed is smaller than the certain size (Yes in step SA101), or in a case where the sub-block including the target transform coefficient corresponds to a high-frequency component (YES in step SB103), the derivation method controller 124x selects the position context deriving unit 124b as context deriving means, and the selected position context deriving unit 124b derives the context index of the target transform coefficient.

According to the third modification example of the coefficient presence/absence flag decoder 124, in a case where the TU size of the target to be processed is a certain size or smaller, a frequency region can be divided into a plurality of sub-regions (relative context indices) through bit calculation using the values of individual bits of xC and yC representing the position of the target frequency component to be processed, and the context indices corresponding to the individual sub-regions can be derived. Accordingly, a context index derivation process can be simplified, and the memory size related to derivation of context indices can be reduced.

In a case where the TU size of the target to be processed is larger than the certain size, if the target coefficient presence/absence flag to be processed is positioned in a high-frequency region, the position context deriving unit derives a context index related to the target coefficient presence/absence flag to be processed. If the target coefficient presence/absence flag to be processed is positioned in a low-frequency region and an intermediate-frequency region, the neighbor reference context deriving unit derives a context index related to the target coefficient presence/absence flag to be processed. Thus, compared to the related art, context indices can be derived for the frequency components included in a low-frequency region in consideration of bias of the occurrence frequency of non-zero coefficients, the amount of codes of coefficient presence/absence flags can be reduced, and the amount processing related to decoding can be reduced.

On the basis of a coefficient position, for the position of the target transform coefficient, a template is selected so as not to refer to the transform coefficient at the coordinate positioned immediately before in the processing order (reverse scan order). In such a process, derivation of a context to be used for decoding the coefficient presence/absence flag at a certain position can be performed without referring to the value of the preceding coefficient presence/absence flag, and thus a context derivation process and a decoding process can be performed in parallel.

<Flow of Process Performed by Transform Coefficient Decoder 120>

Hereinafter, the flow of the transform coefficient decoding process performed by the transform coefficient decoder 120 will be described with reference to FIGS. 44 to 51.

(In a Case where Size of Frequency Region is Certain Size or Smaller)

FIG. 44 illustrates the pseudo code showing the transform coefficient decoding process performed by the transform coefficient decoder 120 in a case where the size of the frequency region is a certain size or smaller (for example, 4×4 components or 8×8 components).

FIG. 45 is a flowchart illustrating a flow of the transform coefficient decoding process performed by the transform coefficient decoder 120 in a case where the size of the frequency region is the certain size or smaller.

(Step S11)

First, the coefficient decoding controller 123 included in the transform coefficient decoder 120 selects a scan type ScanType.

(Step S12)

Subsequently, the last coefficient position decoder 121 included in the transform coefficient decoder 120 decodes the syntax elements last_significant_coeff_x and last_significant_coeff_y that indicate the position of the last transform coefficient along the forward scan.

(Step S13)

Subsequently, the coefficient decoding controller 123 starts a loop in units of sub-groups. Here, a sub-group corresponds to one or plural regions obtained by dividing a target frequency region. Each sub-group is made up of, for example, sixteen frequency components.

(Step S14)

Subsequently, the coefficient presence/absence flag decoder 124 included in the transform coefficient decoder 120 decodes the individual non-zero transform coefficient presence/absence flags significant_coeff_flag in the target sub-group.

(Step S15)

Subsequently, the coefficient value decoder 125 included in the transform coefficient decoder 120 decodes the signs and levels of the non-zero transform coefficients in the target sub-group. This is performed by decoding the individual syntax elements coeff_abs_level_greateer1_flag, coeff_abs_level_greateer2_flag, coeff_sign_flag, and coeff_abs_level_minus3.

(Step S16)

This step is the end of the loop performed in units of sub-blocks.

Figure 46:
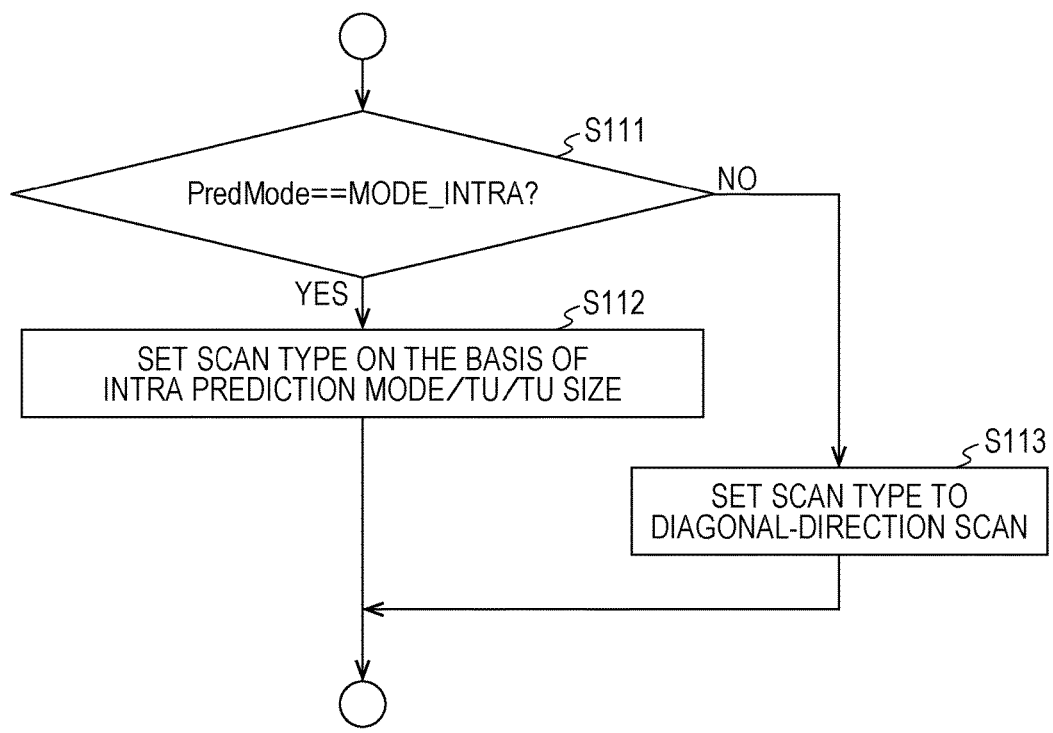
FIG. 46 is a flowchart illustrating a flow of a process of selecting a scan type performed by the transform coefficient decoder according to the embodiment.

FIG. 46 is a flowchart describing the process of selecting a scan type (step S11) more specifically.

(Step S111)

First, the coefficient decoding controller 123 included in the transform coefficient decoder 120 determines whether or not prediction scheme information PredMode represents the intra prediction scheme MODE_INTRA.

(Step S112)

In a case where the prediction scheme is an intra prediction scheme (Yes in step S111), the coefficient decoding controller 123 included in the transform coefficient decoder 120 sets a scan type on the basis of the intra prediction mode (prediction direction) and the TU size of a target (size of a frequency region). The details of the scan type setting process have been described above, and thus the description thereof is omitted here.

On the other hand, in a case where the prediction scheme is not an intra prediction scheme (No in step S111), the coefficient decoding controller 123 included in the transform coefficient decoder 120 sets the scan type to diagonal-direction scan.

Figure 47:
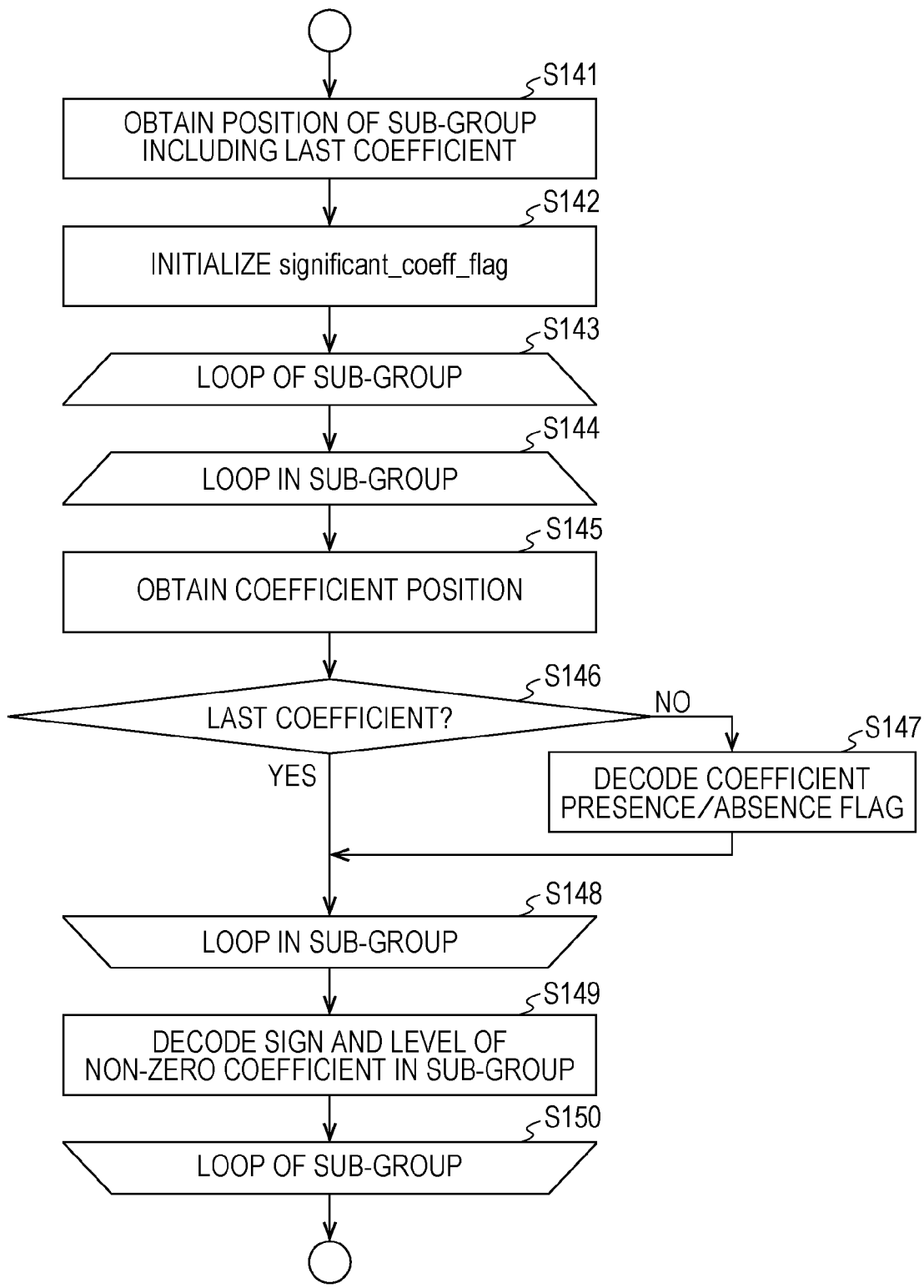
FIG. 47 is a flowchart illustrating a flow of a process of decoding non-zero transform coefficient presence/absence flags significant_coeff_flag performed by the transform coefficient decoder according to the embodiment.

FIG. 47 is a flowchart describing the process of decoding a non-zero transform coefficient presence/absence flag significant_coeff_flag (step S14) more specifically.

(Step S141)

First, the coefficient presence/absence flag decoder 124 included in the transform coefficient decoder 120 obtains the position of the sub-group including the last coefficient.

(Step S142)

Subsequently, the coefficient presence/absence flag decoder 124 initializes the value of significant_coeff_flag included in the target frequency region to 0.

(Step S143)

Subsequently, the coefficient presence/absence flag decoder 124 starts a loop in units of sub-groups. Here, the loop is a loop that starts from the sub-group including the last coefficient, in which the sub-groups are scanned in reverse scan order.

(Step S144)

Subsequently, the coefficient presence/absence flag decoder 124 starts the loop in the target sub-group. The loop is a loop performed in units of frequency components.

(Step S145)

Subsequently, the coefficient presence/absence flag decoder 124 obtains the position of a transform coefficient.

(Step S146)

Subsequently, the coefficient presence/absence flag decoder 124 determines whether or not the obtained position of the transform coefficient is the last position.

(Step S147)

In a case where the obtained position of the transform coefficient is not the last position (No in step S146), the coefficient presence/absence flag decoder 124 decodes the transform coefficient presence/absence flag significant_coeff_flag.

(Step S148)

This step is the end of the loop in the sub-group.

(Step S149)

Subsequently, the coefficient presence/absence flag decoder 124 decodes the signs and levels of the individual non-zero transform coefficients in the sub-group.

(Step S150)

This step is the end of the loop of the sub-group.

(In a Case where Size of Frequency Region is Larger than Certain Size)

FIG. 48 illustrates pseudo code showing the transform coefficient decoding process performed by the transform coefficient decoder 120 in a case where the size of the frequency region is larger than the certain size (for example, 16×16 components or 32×32 components).

Figure 49:
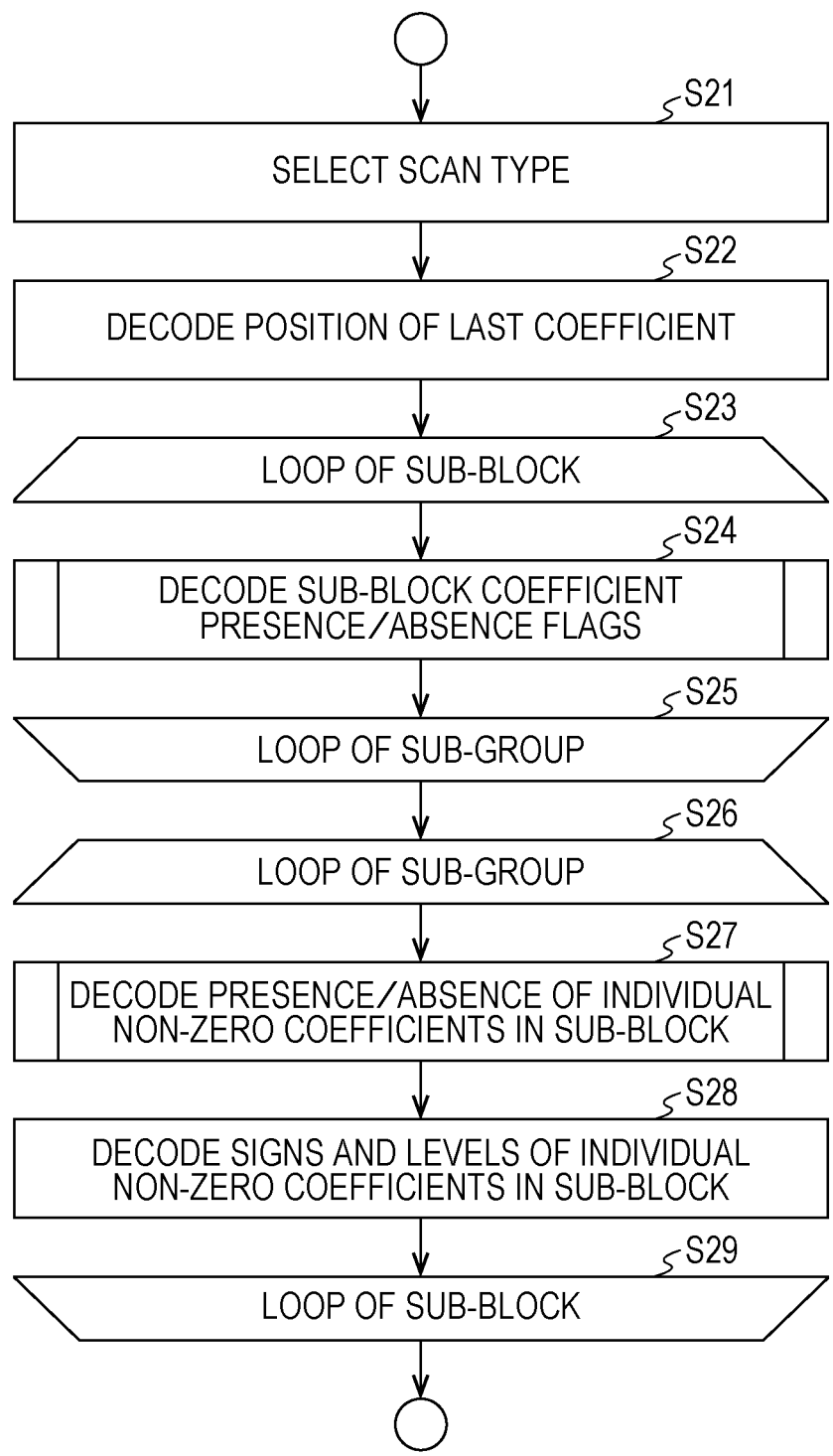
FIG. 49 is a flowchart illustrating a flow of a transform coefficient decoding process performed by the transform coefficient decoder according to the embodiment in a case where the size of a frequency region is larger than the certain size.

FIG. 49 is a flowchart illustrating the flow of the transform coefficient decoding process performed by the transform coefficient decoder 120 in a case where the size of the frequency region is larger than the certain size.

(Step S21)

First, the coefficient decoding controller 123 included in the transform coefficient decoder 120 selects a scan type ScanType. This is the same as the above-described step S11.

(Step S22)

Subsequently, the last coefficient position decoder 121 included in the transform coefficient decoder 120 decodes the syntax elements last_significant_coeff_x and last_significant_coeff_y that indicate the position of the last transform coefficient along forward scan.

(Step S23)

Subsequently, the coefficient decoding controller 123 starts a loop in units of sub-blocks.

(Step S24)

Subsequently, the sub-block coefficient presence/absence flag decoder 127 included in the transform coefficient decoder 120 decodes sub-block coefficient presence/absence flags significant_coeffgroup_flag.

(Step S25)

The loop is the end of a loop performed in units of sub-blocks.

(Step S26)

Subsequently, the coefficient decoding controller 123 starts a loop in units of sub-blocks.

(Step S27)

Subsequently, the coefficient presence/absence flag decoder 124 included in the transform coefficient decoder 120 decodes the individual non-zero transform coefficient presence/absence flags significant_coeff_flag in the target sub-block.

(Step S28)

Subsequently, the coefficient value decoder 125 included in the transform coefficient decoder 120 decodes the signs and levels of the non-zero transform coefficients in the target sub-group. This is performed by decoding the individual syntax elements coeff_abs_level_greateer1_flag, coeff_abs_level_greateer2_flag, coeff_sign_flag, and coeff_abs_level_minus3.

(Step S29)

This step is the end of the loop performed in units of sub-blocks (the end of the loop performed in units of sub-blocks in step S26).

Figure 50:
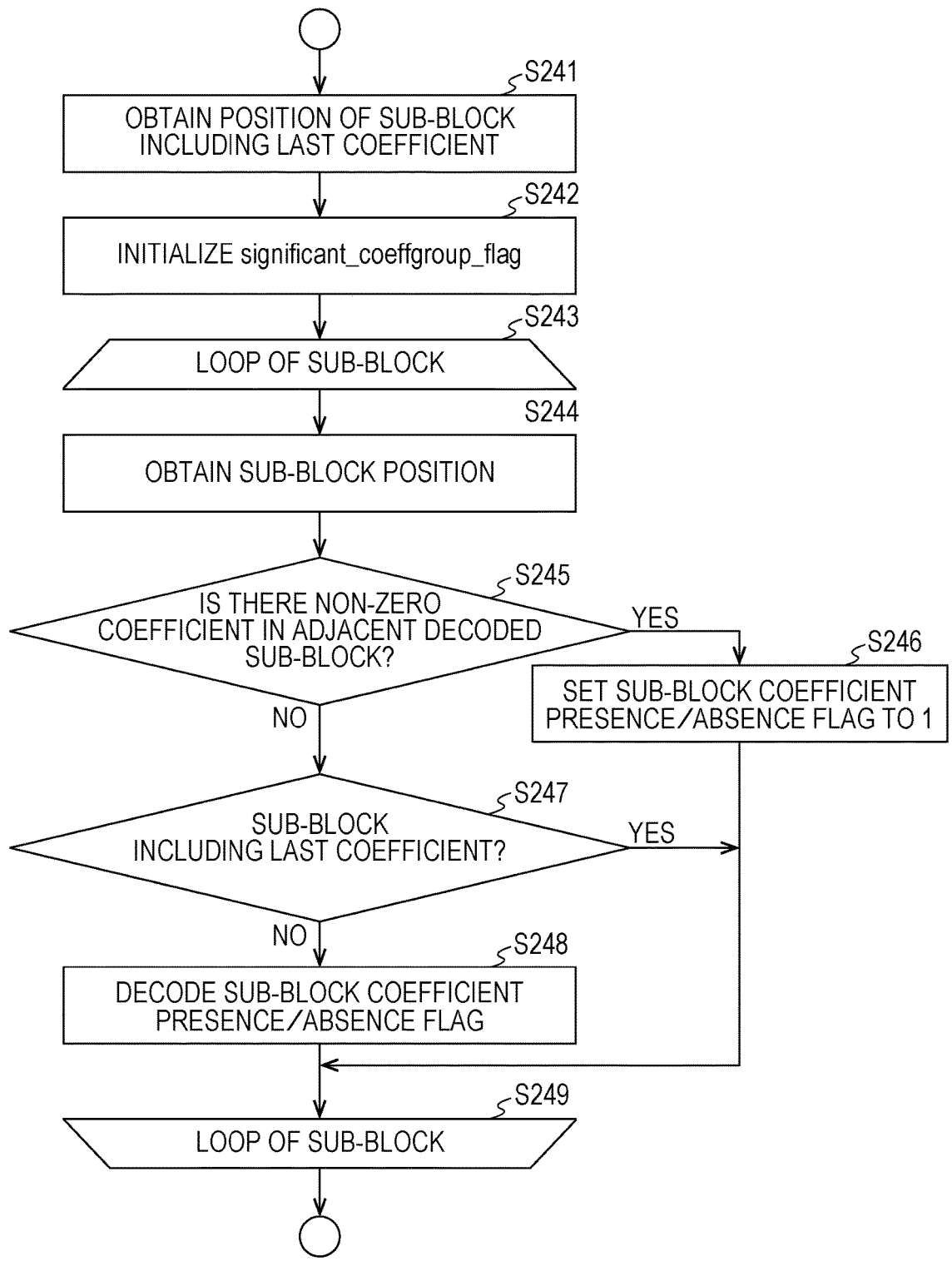
FIG. 50 is a flowchart illustrating a flow of a process of decoding sub-block coefficient presence/absence flags performed by the transform coefficient decoder according to the embodiment.

FIG. 50 is a flowchart describing the process of decoding sub-block coefficient presence/absence flags (step S24) more specifically.

(Step S241)

First, the coefficient presence/absence flag decoder 124 included in the transform coefficient decoder 120 obtains the position of the sub-block including the last coefficient.

(Step S242)

Subsequently, the coefficient presence/absence flag decoder 124 initializes the values of the sub-block coefficient presence/absence flags significant_coeffgroup_flag included in the target frequency region. This initialization process is performed by setting a sub-block coefficient presence/absence flag of the sub-block including a DC component and a sub-block coefficient presence/absence flag of the sub-block including the last coefficient to 1, and by setting the other sub-block coefficient presence/absence flags to 0.

(Step S243)

Subsequently, the coefficient presence/absence flag decoder 124 starts a loop in units of sub-blocks.

(Step S244)

Subsequently, the coefficient presence/absence flag decoder 124 obtains the position of a sub-block.

(Step S245)

Subsequently, the coefficient presence/absence flag decoder 124 determines whether or not there is a non-zero transform coefficient in a decoded sub-block adjacent to the target sub-block.

(Step S246)

In a case where the determination result is Yes in step S245, the sub-block coefficient presence/absence flag of the target sub-block is set to 1.

Here, the process in step S245 and step S246 depends on the sub-block scan direction, as described below.

In a case where sub-block scan is vertical-direction priority scan, as illustrated in part (a) of FIG. 20, in a case where a non-zero transform coefficient exists in the sub-block (xCG, yCG+1) and a non-zero transform coefficient does not exist in the sub-block (xCG+1, yCG), the sub-block coefficient presence/absence flag of the target sub-block (xCG, yCG) is set to 1.

In a case where sub-block scan is horizontal-direction priority scan, as illustrated in part (b) of FIG. 20, in a case where a non-zero transform coefficient exists in the sub-block (xCG+1, yCG) and a non-zero transform coefficient does not exist in the sub-block (xCG, yCG+1), the sub-block coefficient presence/absence flag of the target sub-block (xCG, yCG) is set to 1.

In a case where sub-block scan is diagonal-direction scan, as illustrated in part (c) of FIG. 20, in a case where a non-zero transform coefficient exists in both the sub-block (xCG+1, yCG) and the sub-block (xCG, yCG+1), the sub-block coefficient presence/absence flag of the target sub-block (xCG, yCG) is set to 1.

(Step S247)

Subsequently, the coefficient presence/absence flag decoder 124 determines whether or not the target sub-block is a sub-block including the last coefficient.

(Step S248)

In a case where the target sub-block is not a sub-block including the last coefficient (No in step S247), the coefficient presence/absence flag decoder 124 decodes the sub-block coefficient presence/absence flag significant_coeff-group_flag.

(Step S249)

This step is the end of the loop of sub-blocks.

Figure 51:
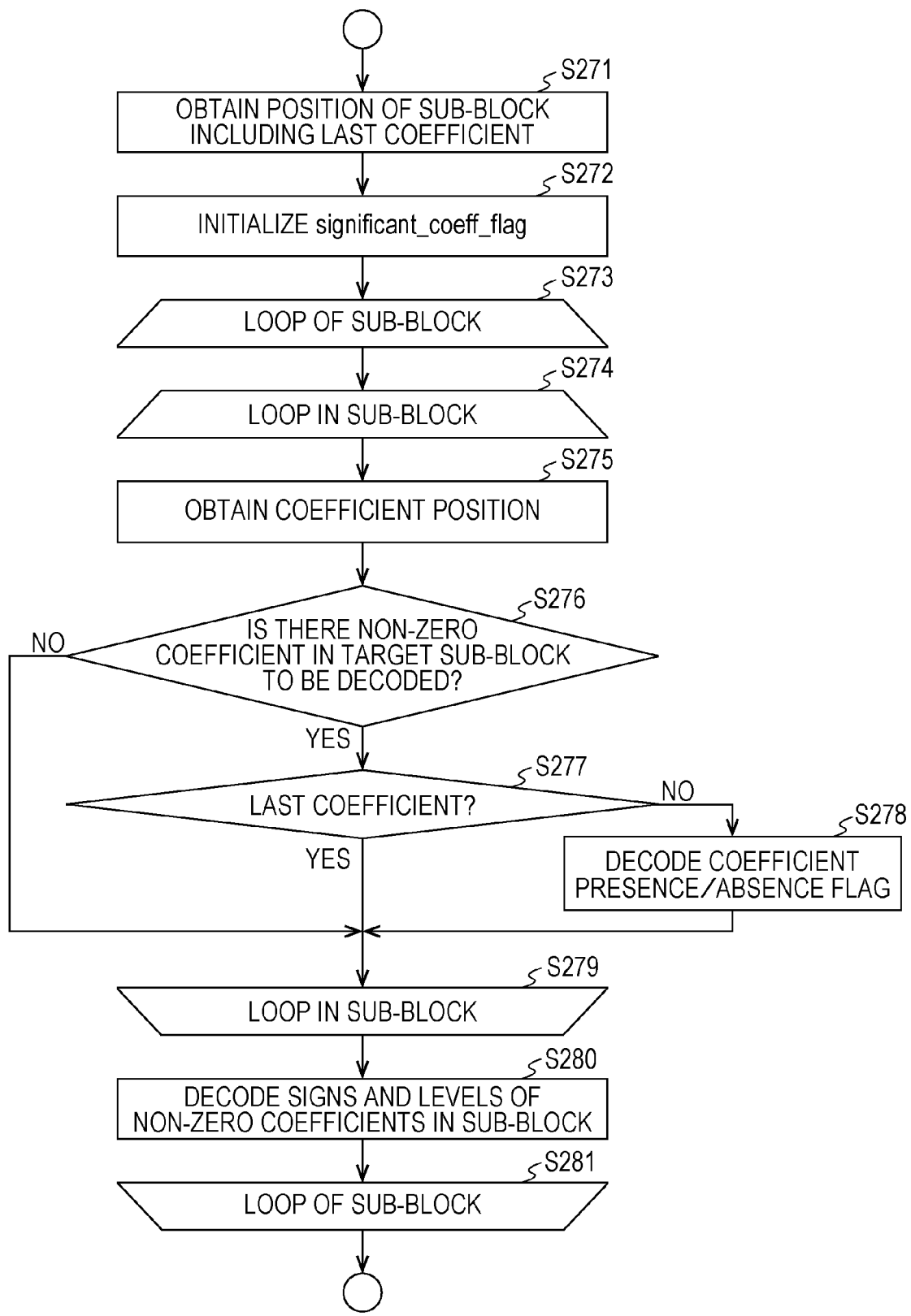
FIG. 51 is a flowchart illustrating a flow of a process of decoding individual non-zero transform coefficient presence/absence flags significant_coeff_flag in a sub-block performed by the transform coefficient decoder according to the embodiment.

FIG. 51 is a flowchart describing the process of decoding individual non-zero transform coefficient presence/absence flags significant_coeff_flag in a sub-block (step S27 in FIG. 49) more specifically.

(Step S271)

First, the coefficient presence/absence flag decoder 124 included in the transform coefficient decoder 120 obtains the position of the sub-block including the last coefficient.

(Step S272)

Subsequently, the coefficient presence/absence flag decoder 124 initializes the values of significant_coeff_flag included in the target frequency region to 0.

(Step S273)

Subsequently, the coefficient presence/absence flag decoder 124 starts a loop in units of sub-blocks. Here, the loop starts from the sub-block including the last coefficient. In this loop, the sub-blocks are scanned in sub-block reverse scan order.

(Step S274)

Subsequently, the coefficient presence/absence flag decoder 124 starts a loop in the target sub-block. The loop is performed in units of frequency components.

(Step S275)

Subsequently, the coefficient presence/absence flag decoder 124 obtains the position of a transform coefficient.

(Step S276)

Subsequently, the coefficient presence/absence flag decoder 124 determines whether or not a non-zero transform coefficient exists in the target sub-block.

(Step S277)

In a case where a non-zero transform coefficient exists in the target sub-block (Yes in step S276), the coefficient presence/absence flag decoder 124 determines whether or not the obtained position of the transform coefficient is the last position.

(Step S278)

In a case where the obtained position of the transform coefficient is not the last position (No in step S277), the coefficient presence/absence flag decoder 124 decodes the transform coefficient presence/absence flag significant_coeff_flag.

(Step S279)

This step is the end of the loop in the sub-block.

(Step S280)

Subsequently, the coefficient presence/absence flag decoder 124 decodes the signs and levels of the individual non-zero transform coefficients in the sub-block.

(Step S281)

This step is the end of the loop of sub-blocks.

With reference to FIGS. 48 to 50, a description has been given of an example in which decoding of sub-block coefficient presence/absence flags, and decoding of non-zero coefficient presence/absence flags and the signs and levels of individual non-zero coefficients are performed in different loops in units of sub-blocks. Alternatively, as in the flowchart illustrated in FIG. 75, these decoding processes may be performed in the same loop in units of sub-blocks.

Hereinafter, a description will be given of a flow of a transform coefficient decoding process performed by the transform coefficient decoder 120 in a case where the size of a frequency region is larger than the certain size, with reference to FIG. 75.

(Step S31)

First, coefficient decoding controller 123 included in the transform coefficient decoder 120 selects a scan type ScanType. This is the same as the above-described step S11.

(Step S32)

Subsequently, the last coefficient position decoder 121 included in the transform coefficient decoder 120 decodes the syntax elements last_significant_coeff_x and last_significant_coeff_y that indicate the position of the last transform coefficient along forward scan. Also, the coefficient presence/absence flag decoder 124 included in the transform coefficient decoder 120 obtains the position of the sub-block including the last coefficient.

(Step S33)

Subsequently, the coefficient decoding controller 123 starts a loop in units of sub-blocks. At the start of the loop, the coefficient presence/absence flag decoder 124 initializes the values of sub-block coefficient presence/absence flags significant_coeffgroup_flag included in the target frequency region. This initialization process is performed by setting a sub-block coefficient presence/absence flag of the sub-block including a DC component and a sub-block coefficient presence/absence flag of the sub-block including a last coefficient to 1, and by setting the other sub-block coefficient presence/absence flags to 0.

(Step S34)

Subsequently, the sub-block coefficient presence/absence flag decoder 127 included in the transform coefficient decoder 120 decodes sub-block coefficient presence/absence flags significant_coeffgroup_flag.

(Step S35)

Subsequently, the coefficient presence/absence flag decoder 124 included in the transform coefficient decoder 120 decodes the individual non-zero transform coefficient presence/absence flags significant_coeff_flag in the target sub-block.

(Step S36)

Subsequently, the coefficient value decoder 125 included in the transform coefficient decoder 120 decodes the signs and levels of the non-zero transform coefficients in the target sub-group. This is performed by decoding the individual syntax elements coeff_abs_level_greateer1_flag, coeff_obs_level_greateer2_flag, coeff_sign_flag, and coeff_abs_level_minus3.

(Step S37)

This step is the end of the loop performed in units of sub-blocks.

Figure 76:
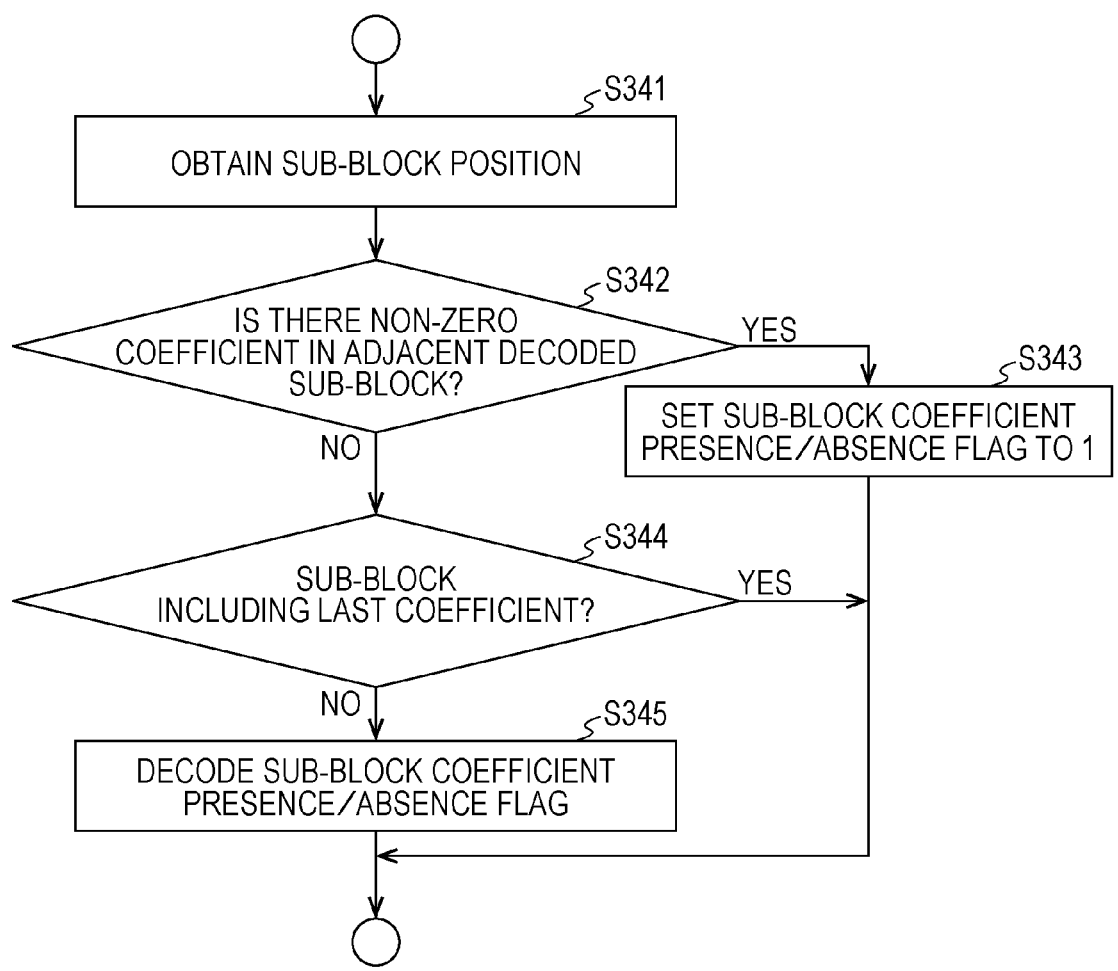
FIG. 76 is a flowchart illustrating a flow of a process of decoding sub-block coefficient presence/absence flags performed by the transform coefficient decoder according to the embodiment in FIG. 75.

FIG. 76 is a flowchart describing the process of decoding sub-block coefficient presence/absence flags (step S34) more specifically.

(Step S341)

Subsequently, the coefficient presence/absence flag decoder 124 obtains the position of a sub-block.

(Step S342)

Subsequently, the coefficient presence/absence flag decoder 124 determines whether or not a non-zero transform coefficient exists in a decoded sub-block adjacent to the target sub-block.

(Step S343)

In a case where the determination result in step S342 is Yes, the sub-block coefficient presence/absence flag of the target sub-block is set to 1.

Here, the process in step S342 and step S343 depends on the sub-block scan direction, as described below.

In a case where sub-block scan is vertical-direction priority scan, as illustrated in part (a) of FIG. 20, in a case where a non-zero transform coefficient exists in the sub-block (xCG, yCG+1) and a non-zero transform coefficient does not exist in the sub-block (xCG+1, yCG), the sub-block coefficient presence/absence flag of the target sub-block (xCG, yCG) is set to 1.

In a case where sub-block scan is horizontal-direction priority scan, as illustrated in part (b) of FIG. 20, in a case where a non-zero transform coefficient exists in the sub-block (xCG+1, yCG) and a non-zero transform coefficient does not exist in the sub-block (xCG, yCG+1), the sub-block coefficient presence/absence flag of the target sub-block (xCG, yCG) is set to 1.

In a case where sub-block scan is diagonal-direction scan, as illustrated in part (c) of FIG. 20, in a case where a non-zero transform coefficient exists in both the sub-block (xCG+1, yCG) and the sub-block (xCG, yCG+1), the sub-block coefficient presence/absence flag of the target sub-block (xCG, yCG) is set to 1.

(Step S344)

Subsequently, the coefficient presence/absence flag decoder 124 determines whether or not the target sub-block is a sub-block including the last coefficient.

(Step S345)

In a case where the target sub-block is not a sub-block including the last coefficient (No in step S344), the coefficient presence/absence flag decoder 124 decodes the sub-block coefficient presence/absence flag significant_coeff-group_flag.

Figure 77:
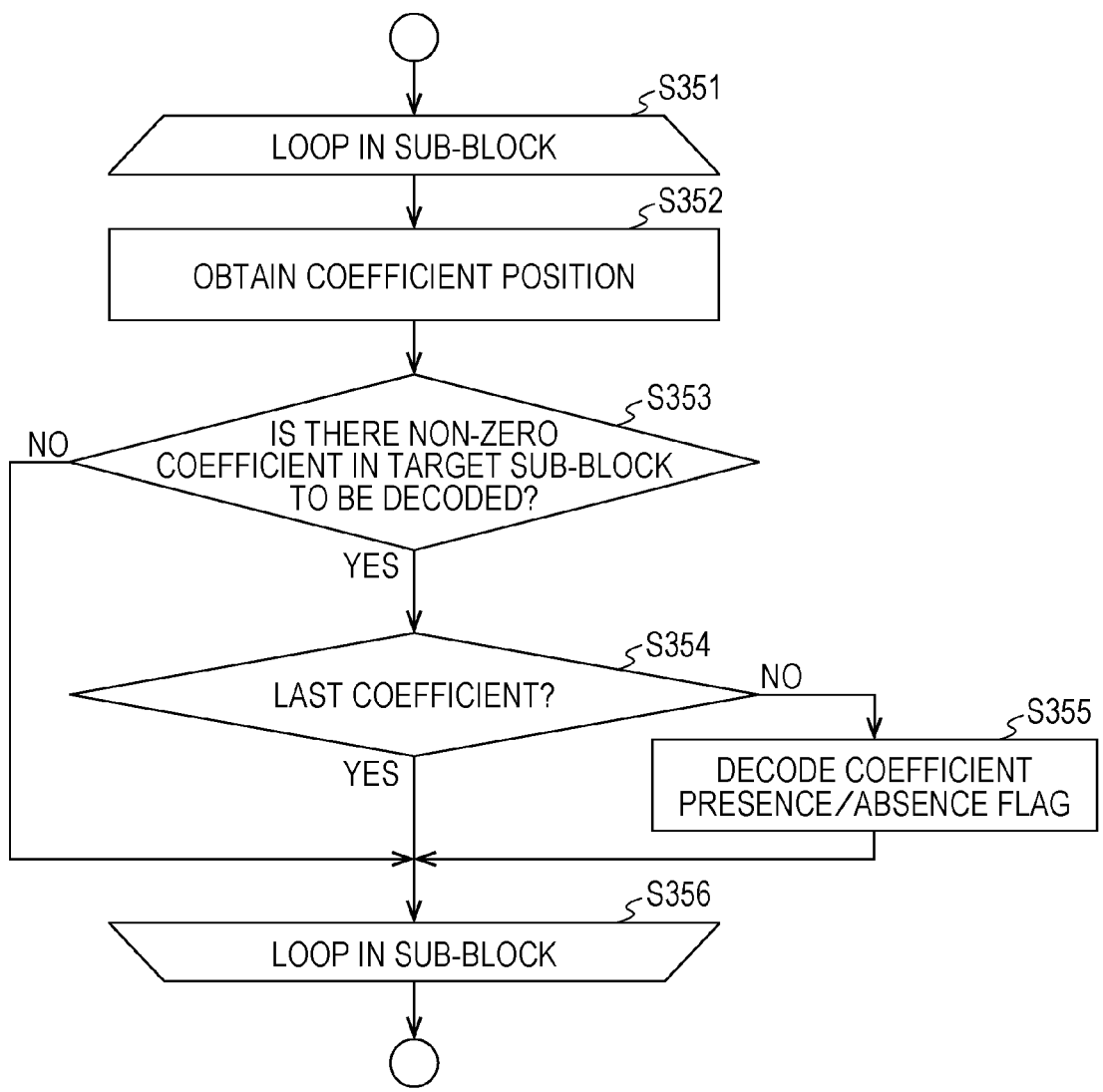
FIG. 77 is a flowchart illustrating a flow of a process of decoding individual non-zero transform coefficient presence/absence flags significant_coeff_flag in a sub-block performed by the transform coefficient decoder according to the embodiment in FIG. 75.

FIG. 77 is a flowchart describing the process of decoding individual non-zero transform coefficient presence/absence flags significant_coeff_flag in individual sub-blocks in sub-blocks more specifically (step S35 in FIG. 75).

(Step S351)

First, the coefficient presence/absence flag decoder 124 starts a loop in the target sub-block. The loop is performed in units of frequency components. At the start of the loop, the coefficient presence/absence flag decoder 124 initializes the values of significant_coeff_flag included in the target frequency region to 0.

(Step S352)

Subsequently, the coefficient presence/absence flag decoder 124 obtains the position of a transform coefficient.

(Step S353)

Subsequently, the coefficient presence/absence flag decoder 124 determines whether or not a non-zero transform coefficient exists in the target sub-block.

(Step S354)

In a case where a non-zero transform coefficient exists in the target sub-block (Yes in step S353), the coefficient presence/absence flag decoder 124 determines whether or not the obtained position of the transform coefficient is the last position.

(Step S355)

In a case where the obtained position of the transform coefficient is not the last position (No in step S354), the coefficient presence/absence flag decoder 124 decodes the transform coefficient presence/absence flag significant_coeff_flag.

(Step S356)

This step is the end of the loop in the sub-block.

(Video Coding Device 2)

The configuration of the video coding device 2 according to an embodiment will be described with reference to FIGS. 52 to 56. The video coding device 2 is a coding device that is compatible with a technology adopted for the standard of H.264/MPEG-4 AVC, a technology adopted for KTA software, which is a codec for joint development in VCEG (Video Coding Expert Group), a technology adopted for TMuC (Test Model under Consideration) software, and a technology suggested by HEVC (High-Efficiency Video Coding), which is a succeeding codec of the foregoing technologies.

Hereinafter, the same parts as those described above are denoted by the same reference numerals, and the description thereof is omitted.

Figure 52:
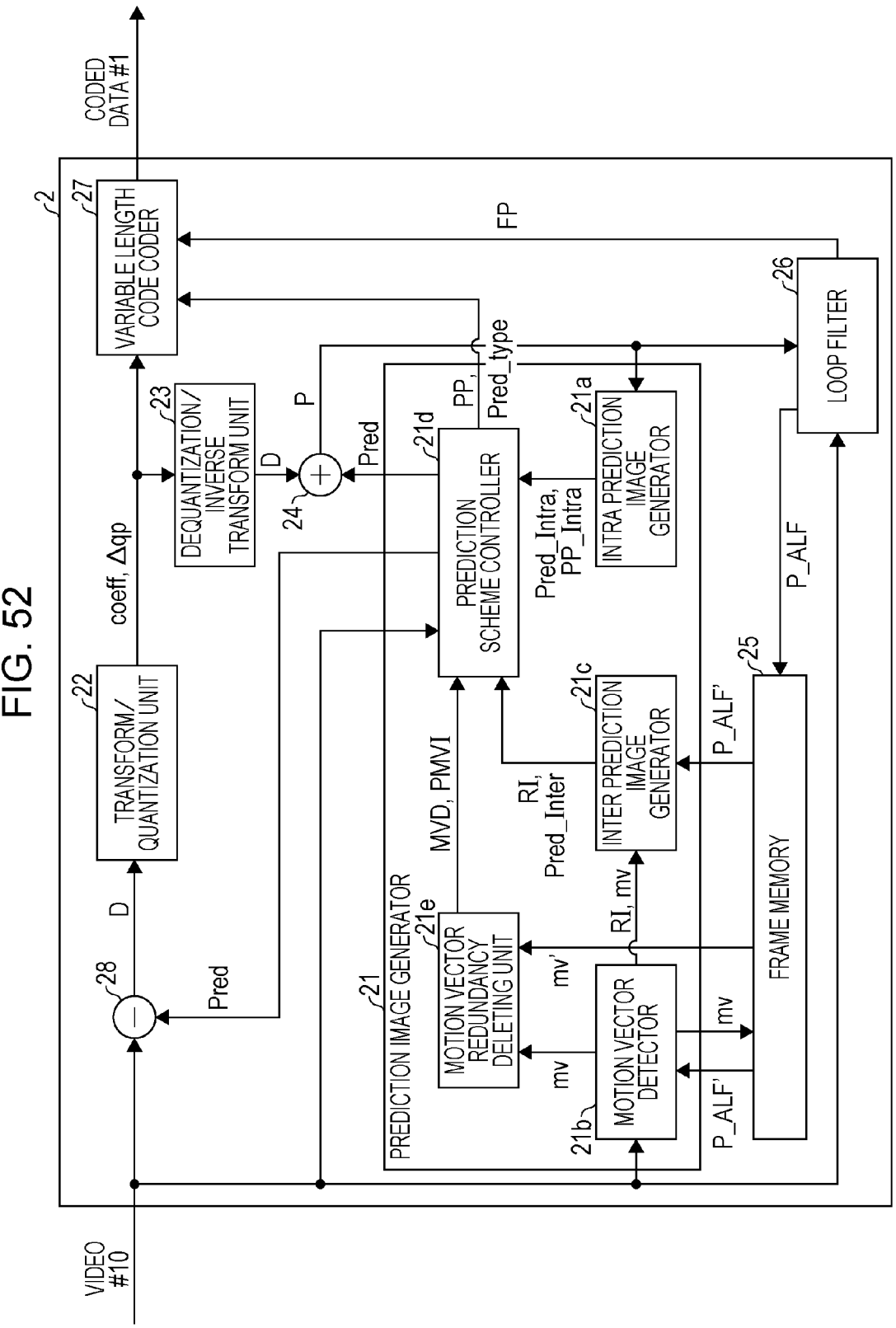
FIG. 52 is a block diagram illustrating the configuration of a video coding device according to the embodiment.

FIG. 52 is a block diagram illustrating the configuration of the video coding device 2. As illustrated in FIG. 52, the video coding device 2 includes a prediction image generator 21, a transform/quantization unit 22, a dequantization/inverse transform unit 23, an adder 24, a frame memory 25, a loop filter 26, a variable length code coder 27, and a subtracter 28. Also, as illustrated in FIG. 52, the prediction image generator 21 includes an intra prediction image generator 21a, a motion vector detector 21b, an inter prediction image generator 21c, a prediction scheme controller 21d, and a motion vector redundancy deleting unit 21e. The video coding device 2 is a device for generating coded data #1 by coding video #10 (an image to be decoded).

(Prediction Image Generator 21)

The prediction image generator 21 recursively divides the target LCU to be processed into one or plural low-order CUs, divides each leaf CU into one or plural partitions, and generates, for each partition, an inter prediction image Pred_Inter using inter prediction or an intra prediction image Pred_Intra using intra prediction. The generated inter prediction image Pred_Inter and intra prediction image Pred_Intra are supplied as a prediction image Pred to the adder 24 and the subtracter 28.

The prediction image generator 21 omits, for the PU to which a skip mode is applied, coding of other parameters that belong to the PU. Also, (1) the form of division of the target LCU into low-order CUs and partitions, (2) whether or not the skip mode is to be applied, and (3) which of an inter prediction image Pred_Inter and an intra prediction image Pred_Intra is to be generated for each partition, are determined so as to optimize coding efficiency.

(Intra Prediction Image Generator 21a)

The intra prediction image generator 21a generates a prediction image Pred_Intra related to each partition, by using intra prediction. Specifically, the intra prediction image generator 21a (1) selects a prediction mode to be used for intra prediction for each partition, and (2) generates a prediction image Pred_Intra from a decoded image P by using the selected prediction mode. The intra prediction image generator 21a supplies the generated intra prediction image Pred_Intra to the prediction scheme controller 21d.

Also, the intra prediction image generator 21a determines the estimated prediction mode for a target partition from the prediction modes assigned to the partitions around the target partition, and supplies an estimated prediction mode flag that indicates whether or not the estimated prediction mode is the same as the prediction mode that is actually selected for the target partition, which is a part of an intra prediction parameter PP_Intra, to the variable length code coder 27 via the prediction scheme controller 21d. The variable length code coder 27 includes the flag in the coded data #1.

In a case where the estimated prediction mode for the target partition is different from the prediction mode that is actually selected for the target partition, the intra prediction image generator 21a supplies a residual prediction mode index indicating the prediction mode for the target partition, which is a part of the intra prediction parameter PP_Intra, to the variable length code coder 27 via the prediction scheme controller 21d. The variable length code coder 27 includes the residual prediction mode index in the coded data #1.

The intra prediction image generator 21a selects, from among the prediction modes illustrated in FIG. 11, a prediction mode that enables a further increase in coding efficiency, when generating a prediction image Pred_Intra.

(Motion Vector Detector 21b)

The motion vector detector 21b detects a motion vector my regarding each partition. Specifically, the motion vector detector 21b (1) selects an adaptive filtered decoded image P_ALF' to be used as a reference image, and (2) searches the selected adaptive filtered decoded image P_ALF' for a region that best approximates the target partition, and thereby detects a motion vector my related to the target partition. Here, the adaptive filtered decoded image P_ALF' is an image that is obtained by performing adaptive filtering process by the loop filter 26 on the decoded image on which decoding has been performed on the entire frame, and the motion vector detector 21b is capable of reading the pixel values of individual pixels that form the adaptive filtered decoded image P_ALF' from the frame memory 25. The motion vector detector 21b supplies the detected motion vector my to the inter prediction image generator 21c and the motion vector redundancy deleting unit 21e, together with a reference image index RI that designates the adaptive filtered decoded image P_ALF' that is used as a reference image.

(Inter Prediction Image Generator 21c)

The inter prediction image generator 21c generates a motion compensation image mc related to each inter prediction partition, by using inter prediction. Specifically, the inter prediction image generator 21c generates a motion compensation image mc from an adaptive filtered decoded image P_ALF' indicated by a reference image index RI supplied from the motion vector detector 21b, by using the motion vector my supplied from the motion vector detector 21b. Like the motion vector detector 21b, the inter prediction image generator 21c is capable of reading the pixel values of individual pixels that form the adaptive filtered decoded image P_ALF' from the frame memory 25. The inter prediction image generator 21c supplies the generated motion compensation image mc (inter prediction image Pred_Inter) to the prediction scheme controller 21d, together with the reference image index RI supplied from the motion vector detector 21b.

(Prediction Scheme Controller 21d)

The prediction scheme controller 21d compares the intra prediction image Pred_Intra and the inter prediction image Pred_Inter with a target image to be coded, and selects whether intra prediction is to be performed or inter prediction is to be performed. In a case where intra prediction is selected, the prediction scheme controller 21d supplies the intra prediction image Pred_Intra, which is a prediction image Pred, to the adder 24 and the subtracter 28, and also supplies the intra prediction parameter PP_Intra supplied from the intra prediction image generator 21a to the variable length code coder 27. On the other hand, in a case where inter prediction is selected, the prediction scheme controller 21d supplies the inter prediction image Pred_Inter, which is a prediction image Pred, to the adder 24 and the subtracter 28, and also supplies the reference image index RI, and an estimated motion vector index PMVI and a motion vector residual MVD supplied from the motion vector redundancy deleting unit 21e described below, which are inter prediction parameters PP_Inter, to the variable length code coder 27. Also, the prediction scheme controller 21d supplies prediction type information Pred_type that indicates which of the intra prediction image Pred_Intra and the inter prediction image Pred_Inter has been selected, to the variable length code coder 27.

(Motion Vector Redundancy Deleting Unit 21e)

The motion vector redundancy deleting unit 21e deletes redundancy of the motion vector my that has been detected by the motion vector detector 21b. Specifically, the motion vector redundancy deleting unit 21e (1) selects the estimation method to be used for estimating a motion vector mv, (2) derives an estimated motion vector pmv in accordance with the selected estimation method, and (3) subtracts the estimated motion vector pmv from the motion vector mv, and thereby generates a motion vector residual MVD. The motion vector redundancy deleting unit 21e supplies the generated motion vector residual MVD to the prediction scheme controller 21d, together with the estimated motion vector index PMVI indicating the selected estimation method.

(Transform/Quantization Unit 22)

The transform/quantization unit 22 (1) performs frequency transform, such as DCT (Discrete Cosine Transform), on the prediction residual D obtained by subtracting the prediction image Pred from the target image to be coded in units of blocks (transform units), (2) quantizes a transform coefficient Coeff_IQ obtained through frequency transform, and (3) supplies the transform coefficient Coeff obtained through quantization to the variable length code coder 27 and the dequantization/inverse transform unit 23. The transform/quantization unit 22 (1) selects, for each TU, a quantization step QP that is used for quantization, (2) supplies a quantization parameter difference Δqp indicating the magnitude of the selected quantization step QP to the variable length code coder 27, and (3) supplies the selected quantization step QP to the dequantization/inverse transform unit 23. Here, the quantization parameter difference Δqp represents a difference value that is obtained by subtracting the value of the quantization parameter qp' related to a TU that has been frequency transformed and quantized immediately before, from the value of the quantization parameter qp (for example, QP=2qp/6) related to the TU to be frequency transformed and quantized.

The DCT performed by the transform/quantization unit 22 is given by, for example, the following equation (2), in a case where the size of the target block is 8×8 pixels and where the transform coefficient before quantization regarding the frequency u in the horizontal direction and the frequency v in the vertical direction is expressed as Coeff_IQ (u, v) (0≤u≤7, 0≤v≤7).

[Math. 2]

$$\text{Coeff\_IQ}(u, v) = \frac{1}{4} C(u)C(v) \sum_{i=0}^{7} \sum_{j=0}^{7} D(i, j) \cos\left\{\frac{(2i+1)u\pi}{16}\right\} \cos\left\{\frac{(2j+1)v\pi}{16}\right\} \quad (2)$$

Here, D(i, j) (0≤i≤7, 0≤j≤7) represents the prediction residual D at the position (i, j) in the target block. Also, C(u) and C(v) are given as follows.

$$C(u)=1/\sqrt{2}(u=0)$$

$$C(u)=1(u\neq 0)$$

$$C(v)=1/\sqrt{2}(v=0)$$

$$C(v)=1(v\neq 0)$$

(Dequantization/Inverse Transform Unit 23)

The dequantization/inverse transform unit 23 (1) dequantizes a quantized transform coefficient Coeff, (2) performs inverse frequency transform, such as inverse DCT (Discrete Cosine Transform), on the transform coefficient Coeff_IQ obtained through dequantization, and (3) supplies the prediction residual D obtained through inverse frequency transform to the adder 24. In the case of dequantizing the quantized transform coefficient Coeff, the quantization step QP supplied from the transform/quantization unit 22 is used. The prediction residual D output from the dequantization/inverse transform unit 23 corresponds to the prediction residual D input to the transform/quantization unit 22 to which a quantization error is added. Here, a common name is used for simplicity. A more specific operation of the dequantization/inverse transform unit 23 is almost the same as that of the dequantization/inverse transform unit 13 included in the video decoding device 1.

(Adder 24)

The adder 24 adds the prediction image Pred selected by the prediction scheme controller 21d to the prediction residual D generated by the dequantization/inverse transform unit 23, and thereby generates a (locally) decoded image P. The (locally) decoded image P generated by the adder 24 is supplied to the loop filter 26 and is also stored in the frame memory 25, and is used as a reference image in intra prediction.

(Variable Length Code Coder 27)

The variable length code coder 27 performs variable length coding on (1) the quantized transform coefficient Coeff and Δqp supplied from the transform/quantization unit 22, (2) the quantization parameters PP supplied from the prediction scheme controller 21d (inter prediction parameter PP_Inter and intra prediction parameter PP_Intra), (3) prediction type information Pred_type, and (4) the filter parameter FP supplied from the loop filter 26, and thereby generates coded data #1.

Figure 53:
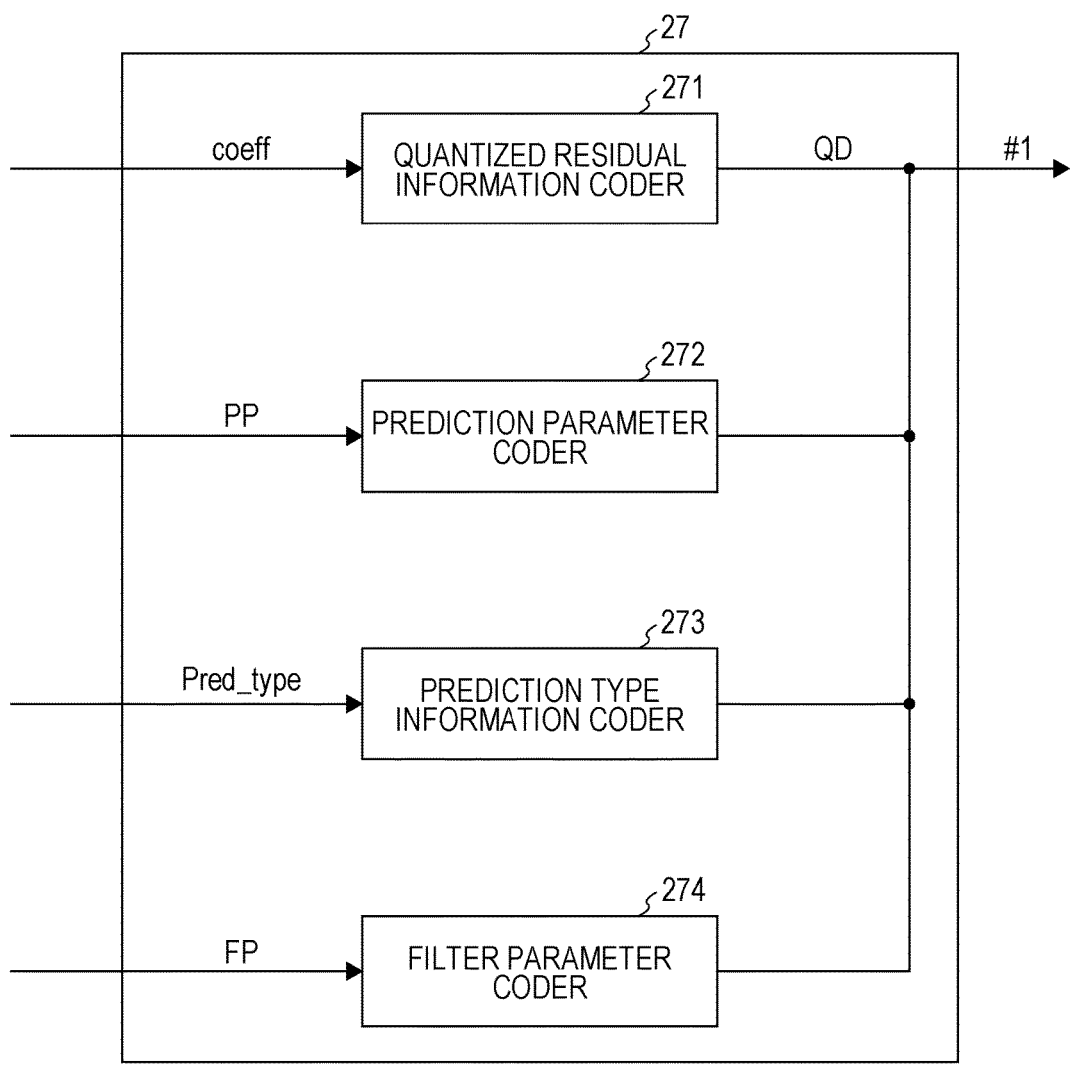
FIG. 53 is a block diagram illustrating the configuration of a variable length code coder included in the video coding device according to the embodiment.

FIG. 53 is a block diagram illustrating the configuration of the variable length code coder 27. As illustrated in FIG. 53, the variable length code coder 27 includes a quantized residual information coder 271 that codes a quantized transform coefficient Coeff, a prediction parameter coder 272 that codes a prediction parameter PP, a prediction type information coder 273 that codes prediction type information Pred_type, and a filter parameter coder 274 that codes a filter parameter FP. The specific configuration of the quantized residual information coder 271 will be described below, and is omitted here.

(Subtracter 28)

The subtracter 28 subtracts the prediction image Pred selected by the prediction scheme controller 21d from the target image to be coded, so as to generate a prediction residual D. The prediction residual D generated by the subtracter 28 is frequency-transformed and quantized by the transform/quantization unit 22.

(Loop Filter 26)

The loop filter 26 has (1) a function as a deblocking filter (DF) that performs smoothing (deblocking process) on an image near a block boundary or partition boundary in a decoded image P and (2) a function as an adaptive loop filter (ALF) that performs an adaptive filter process using a filter parameter FP on an image processed by using the deblocking filter.

(Quantized Residual Information Coder 271)

The quantized residual information coder 271 performs context-based adaptive binary arithmetic coding (CABAC) on a quantized transform coefficient Coeff(xC, yC), so as to generate quantized residual information QD. The syntax elements included in the generated quantized residual information QD are individual syntax elements illustrated in FIGS. 4 and 5, and significant_coeffgroup_flag.

xC and yC are indices indicating the position of each frequency component in a frequency region, as described above, and correspond to the above-described horizontal-direction frequency u and vertical-direction frequency v, respectively. Hereinafter, a quantized transform coefficient Coeff may be simply referred to as a transform coefficient Coeff.

(Quantized Residual Information Coder 271)

Figure 54:
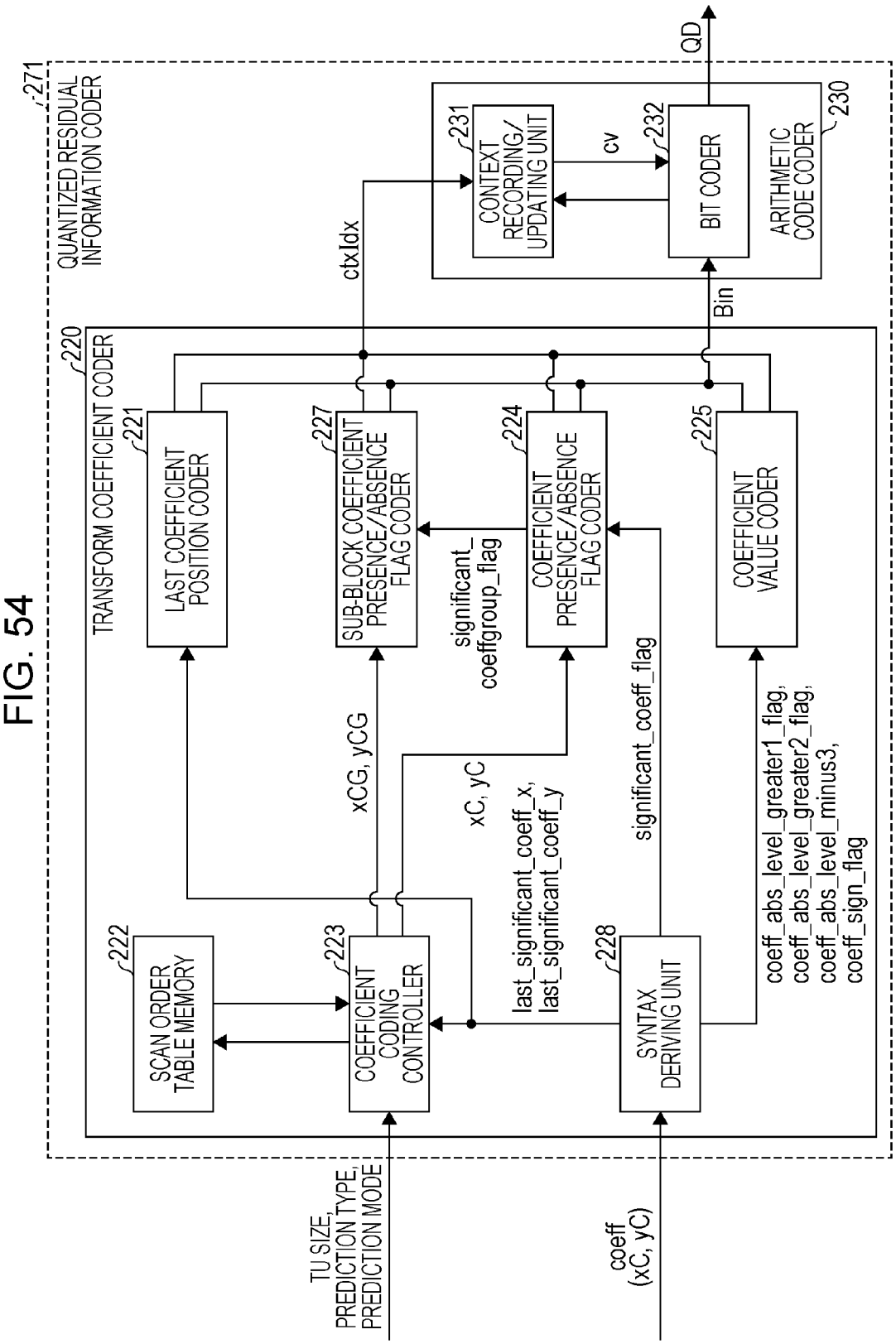
FIG. 54 is a block diagram illustrating the configuration of a quantized residual information coder included in the video coding device according to the embodiment of the present invention.

FIG. 54 is a block diagram illustrating the configuration of the quantized residual information coder 271. As illustrated in FIG. 54, the quantized residual information coder 271 includes a transform coefficient coder 220 and an arithmetic code coder 230.

(Arithmetic Code Coder 230)

The arithmetic code coder 230 is configured to code each Bin supplied from the transform coefficient coder 220 by referring to a context, so as to generate quantized residual information QD, and includes a context recording/updating unit 231 and a coder 232, as illustrated in FIG. 54.

(Context Recording/Updating Unit 231)

The context recording/updating unit 231 is configured to record and update a context variable CV managed by each context index ctxIdx. Here, the context variable CV includes (1) a most probable symbol (MPS) having a high probability of occurrence and (2) a probability state index pStateIdx indicating the probability of occurrence of the most probable symbol MPS.

The context recording/updating unit 231 updates the context variable CV by referring to the context index ctxIdx supplied from each unit of the transform coefficient coder 220 and the value of Bin coded by the bit coder 232, and records the updated context variable CV until it is updated next time. The most probable symbol MPS is 0 or 1. The most probable symbol MPS and the probability state index pStateIdx are updated every time the bit coder 232 codes one Bin.

The context index ctxIdx may directly indicate the context for each frequency component, or may be an incrementation value from an offset of the context index that is set for each target TU to be processed (the same applies to the following description).

(Bit Coder 232)

The bit coder 232 refers to the context variable CV recorded in the context recording/updating unit 231, and codes each Bin supplied from each unit included in the transform coefficient coder 220, so as to generate quantized residual information QD. The value of the coded Bin is also supplied to the context recording/updating unit 231, and is referred to for updating the context variable CV, (Transform Coefficient Coder 220)

As illustrated in FIG. 54, the transform coefficient coder 220 includes a last position coder 221, a scan order table memory 222, a coefficient coding controller 223, a coefficient presence/absence flag coder 224, a coefficient value coder 225, a coding coefficient memory 226, a sub-block coefficient presence/absence flag 227, and a syntax deriving unit 228.

(Syntax Deriving Unit 228)

The syntax deriving unit 228 refers to each value of the transform coefficient Coeff(xC, yC), and derives individual values of syntax elements last_significant_coeff_x, last_significant_coeff_y, significant_coeff_flag, coeff_abs_level_greater1_flag, coeff_abs_level_greater2_flag, coeff_sign_flag, and coeff_abs_level_minus3 for specifying these transform coefficients in the target frequency region. The derived syntax elements are supplied to the coding coefficient memory 226. Among the derived syntax elements, last_significant_coeff_x and last_significant_coeff_y are also supplied to the coefficient coding controller 223 and the last position coder 221. Also, among the derived syntax elements, significant_coeff_flag is also supplied to the coefficient presence/absence flag coder 224. The content represented by the individual syntax elements have been described above, and thus the description thereof is omitted here.

(Last Position Coder 221)

The last position coder 221 generates Bin that indicates the syntax elements last_significant_coeff_x and last_significant_coeff_y supplied from the syntax deriving unit 228. Also, the last position coder 221 supplies each Bin that has been generated to the bit coder 232. Also, the last position coder 221 supplies a context index ctxIdx that indicates the context that is referred to for coding Bin of the syntax elements last_significant_coeff_x and last_significant_coeff_y to the context recording/updating unit 231.

(Scan Order Table Memory 222)

The scan order table memory 222 stores a table that gives the position of the target frequency component to be processed in a frequency region, with the size of the target TU (block) to be processed, a scan index representing the type of scan direction, and a frequency component identification index given along scan order being arguments. An example of such a scan order table is ScanOrder illustrated in FIGS. 4 and 5.

Also, the scan order table memory 222 stores a sub-block scan order table for designating the scan order of sub-blocks. Here, the sub-block scan order table is designated by the scan index scanIndex associated with the size of the target TU (block) to be processed and the prediction mode index of the intra prediction mode.

The scan order table and the sub-block scan order table stored in the scan order table memory 222 are similar to those stored in the scan order table memory 122 included in the video decoding device 1, and thus the description thereof is omitted here.

(Coefficient Coding Controller 223)

The coefficient coding controller 223 is configured to control the order of a coding process in each unit included in the quantized residual information coder 271.

(In a Case where Block Size is Certain Size or Smaller)

In a case where the block size is a certain size or smaller (for example, 4×4 components or 8×8 components), the coefficient coding controller 223 refers to the syntax elements last_significant_coeff_x and last_significant_coeff_y supplied from the syntax deriving unit 228, specifies the position of the last non-zero transform coefficient along forward scan, and supplies the positions (xC, yC) of individual frequency components to the coefficient presence/absence flag coder in the reverse order of the scan order in which the specified position of the last non-zero transform coefficient is the origin and which is given by the scan order table stored in the scan order table memory 222.

Also, the coefficient coding controller 223 supplies sz, which is a parameter indicating the size of the target TU to be processed, that is, the size of a target frequency region, to each unit included in the transform coefficient coder 220 (not illustrated). Here, sz is specifically a parameter representing the number of pixels along one side of the target TU to be processed, that is, the number of frequency components along one side of the target frequency region.

The coefficient coding controller 223 may be configured to supply the positions (xC, yC) of individual frequency components to the coefficient presence/absence flag coder 224 in the forward scan order of the scan order given by the scan order table stored in the scan order table memory 222.

(In a Case where Block Size is Larger than Certain Size)

In a case where the block size is larger than the certain size, the coefficient coding controller 223 refers to the syntax elements last_significant_coeff_x and last_significant_coeff_y supplied from the syntax deriving unit 228, specifies the position of the last non-zero transform coefficient along forward scan, and supplies the positions (xCG, yCG) of individual sub-blocks to the sub-block coefficient presence/absence flag coder 227 in the reverse scan order of the scan order in which the position of the sub-block including the specified last non-zero transform coefficient is the origin and which is given by the sub-block scan order table stored in the scan order table memory 222.

Also, the coefficient coding controller 223 supplies, regarding the target sub-block to be processed, the positions (xC, yC) of individual frequency components included in the target sub-block to be processed to the coefficient presence/absence flag coder 224 in the reverse scan order of the scan order given by the scan order table stored in the scan order table memory 222. Here, as the scan order of the individual frequency components included in the target sub-block to be processed, diagonal-direction scan (Up-right diagonal scan) may be specifically used.

In this way, the coefficient coding controller 223 is configured to switch scan order for each intra prediction mode. In general, there is a correlation between an intra prediction mode and bias of transform coefficients. Thus, sub-block scan that is suitable for bias of sub-block coefficient presence/absence flags can be performed by switching the scan order in accordance with an intra prediction mode. Accordingly, the amount of codes of sub-block coefficient presence/absence flags to be coded and decoded can be reduced, and the coding efficiency is increased.

(Coefficient Value Coder 225)

The coefficient value coder 225 generates Bin that indicates the syntax elements coeff_abs_level_greater1_flag, coeff_abs_level_greater2_flag, coeff_sign_flag, and coeff_abs_level_minus3 supplied from the syntax deriving unit 228. Also, the coefficient value coder 225 supplies each Bin that has been generated to the bit coder 232. Also, the coefficient value coder 225 supplies a context index ctxIdx indicating the context that is referred to for coding Bin of these syntax elements to the context recording/updating unit 231.

(Coefficient Presence/Absence Flag Coder 224)

The coefficient presence/absence flag coder 224 according to this embodiment codes the syntax elements significant_coeff_flag[xC][yC] designated by each position (xC, yC). More specifically, the coefficient presence/absence flag coder 224 generates Bin indicating the syntax elements significant_coeff_flag[xC][yC] designated by each position (xC, yC). Each generated Bin is supplied to the bit coder 232. Also, the coefficient presence/absence flag coder 224 calculates a context index ctxIdx for determining the context that is used for coding Bin of the syntax elements significant_coeff_flag[xC][yC] by the arithmetic code coder 230. The calculated context index ctxIdx is supplied to the context recording/updating unit 231.

Figure 55:
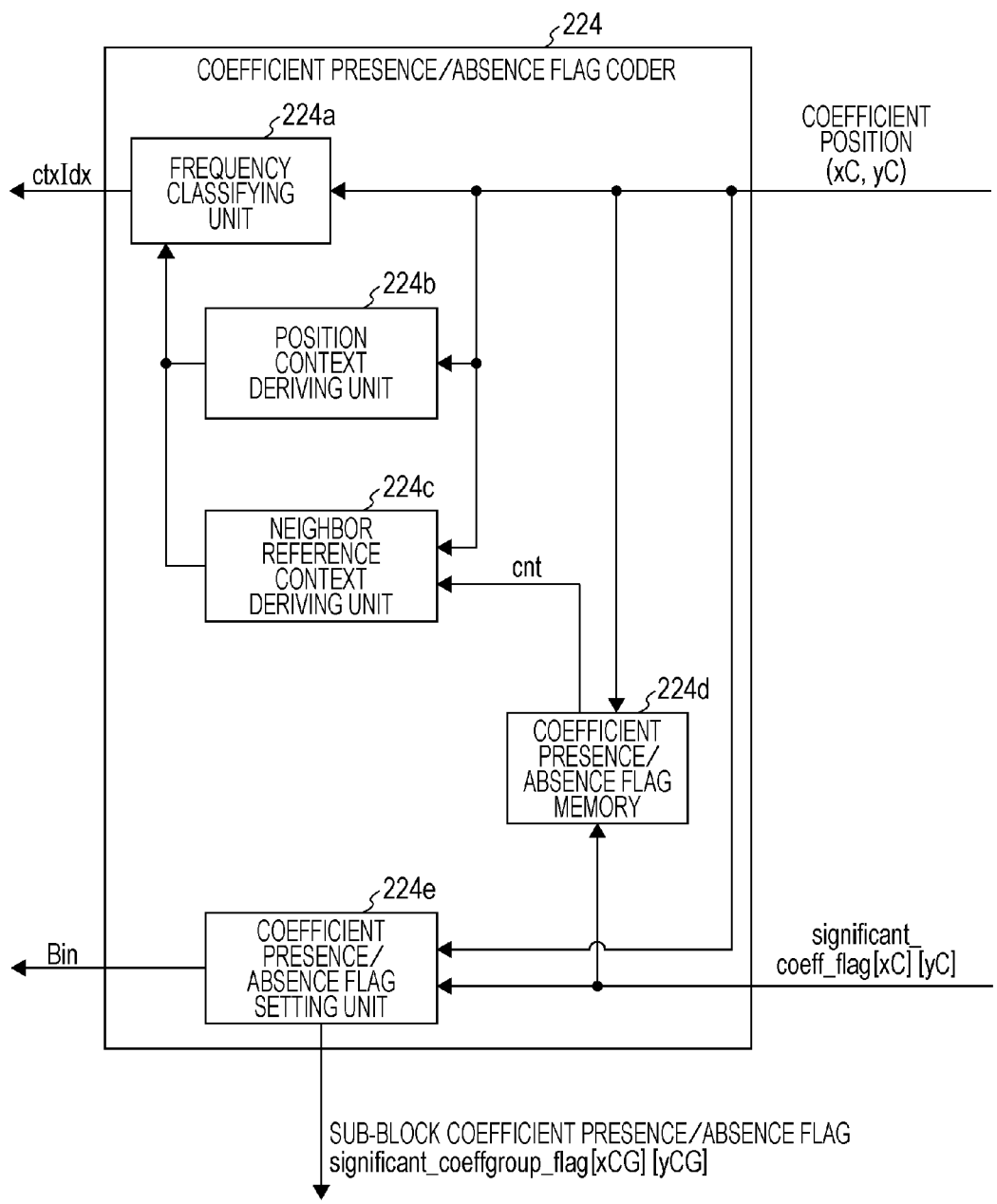
FIG. 55 is a block diagram illustrating the configuration of a coefficient presence/absence flag coder according to the embodiment.

FIG. 55 is a block diagram illustrating the configuration of the coefficient presence/absence flag coder 224. As illustrated in FIG. 55, the coefficient presence/absence flag coder 224 includes a frequency classifying unit 224a, a position context deriving unit 224b, a neighbor reference context deriving unit 224c, a coefficient presence/absence flag memory 224d, and a coefficient presence/absence flag setting unit 224e.

(Frequency Classifying Unit 224a)

In a case where the size of a target frequency region is a certain size or smaller (for example, in the case of 4×4 components or 8×8 components), the frequency classifying unit 224a classifies each of the frequency components in the frequency region of the certain size or smaller to any of a plurality of partial regions in accordance with the position of the frequency component, and also assigns a context index ctxIdx derived by the position context deriving unit 224b.

On the other hand, in a case where the size of the target frequency region is larger than the certain size (for example, in the case of 16×16 components or 32×32 components), the frequency classifying unit 224a classifies each of the target frequency components to be decoded in the frequency region to any of a plurality of partial regions in accordance with the position of the frequency component in the frequency region, and also assigns a context index ctxIdx derived by either of the position context deriving unit 224b and the neighbor reference context deriving unit 224c to the target frequency component to be decoded.

The specific process performed by the frequency classifying unit 224a is similar to that performed by the frequency classifying unit 124a included in the video decoding device 1, and thus the description thereof is omitted here.

(Position Context Deriving Unit 224b)

The position context deriving unit 224b derives a context index ctxIdx for a target frequency component on the basis of the position of the target frequency component in a frequency region.

The position context deriving unit 224b performs, for example, a process similar to the process performed by the position context deriving unit 124b described in (specific example 1 of frequency classification process performed by frequency classifying unit 124a and context index derivation process performed by position context deriving unit 124b in a case where frequency region has certain size or smaller).

That is, the position context deriding unit 224b derives a context index common to one or plural frequency components that belong to a frequency region having a certain size or smaller (for example, 4×4 components or 8×8 components) and having a first size (for example, 4×4 components), and one or plural frequency components that belong to a frequency region having the certain size or smaller and having a second size large than the first size (for example, 8×8 components), and assigns the context index to the one or plural frequency components.

According to the position context deriving unit 224b having the above-described configuration, the number of context indices to be derived can be reduced, and thus a derivation process can be reduced, and the memory size for holding context indices can be reduced.

Other specific processes performed by the position context deriving unit 224b are similar to those performed by the position context deriving unit 124b included in the video decoding device 1, and thus the description thereof is omitted here.

(Neighbor Reference Context Deriving Unit 224c)

The neighbor reference context deriving unit 224c derives the context index ctxIdx for the target frequency component to be coded, on the basis of the number cnt of coded non-zero transform coefficients regarding frequency components around the target frequency component.

A specific process performed by the neighbor reference context deriving unit 224c is similar to that performed by the neighbor reference context deriving unit 124c included in the video decoding device 1, and thus the description thereof is omitted here.

(Coefficient Presence/Absence Flag Setting Unit 224e)

The coefficient presence/absence flag setting unit 224e generates Bin that indicates the syntax element significant_coeff_flag[xC][yC] supplied from the syntax deriving unit 228. The generated Bin is supplied to the bit coder 232. Also, the coefficient presence/absence flag setting unit 224e refers to the values of significant_coeff_flag[xC][yC] included in the target sub-block. In a case where all the values of significant_coeff_flag[xC][yC] included in the target sub-block are 0, that is, in a case where a non-zero transform coefficient is not included in the target sub-block, the coefficient presence/absence flag setting unit 224e sets the value of significant_coeffgroup_flag[xCG][yCG] regarding the target sub-block to 0, and otherwise sets the value of significant_coeffgroup_flag[xCG][yCG] regarding the target sub-block to 1. The significant_coeffgroup_flag[xCG][yCG] having such a value is supplied to the sub-block coefficient presence/absence coder 227.

(Coefficient Presence/Absence Flag Memory 224d)

The coefficient presence/absence flag memory 224d stores the individual values of syntax elements significant_coeff_flag[xC][yC]. The individual values of syntax elements significant_coeff_flag[xC][yC] stored in the coefficient presence/absence flag memory 224d are referred to by the neighbor reference context deriving unit 224c.

(Sub-Block Coefficient Presence/Absence Flag Coder 227)

The sub-block coefficient presence/absence flag coder 227 codes the syntax elements significant_coeffgroup_flag[xCG][yCG] that are designated by individual sub-block positions (xCG, yCG). More specifically, the sub-block coefficient presence/absence flag coder 227 generates Bin representing the syntax elements significant_coeffgroup_flag[xCG][yCG] that are designated by individual sub-block positions (xCG, yCG). Each generated Bin is supplied to the bit coder 232. Also, the sub-block coefficient presence/absence flag coder 227 calculates the context index ctxIdx for determining the context that is used for coding Bin of the syntax element significant_coeff_flag[xC][yC] in the arithmetic code coder 230. The calculated context index ctxIdx is supplied to the context recording/updating unit 231.

Figure 56:
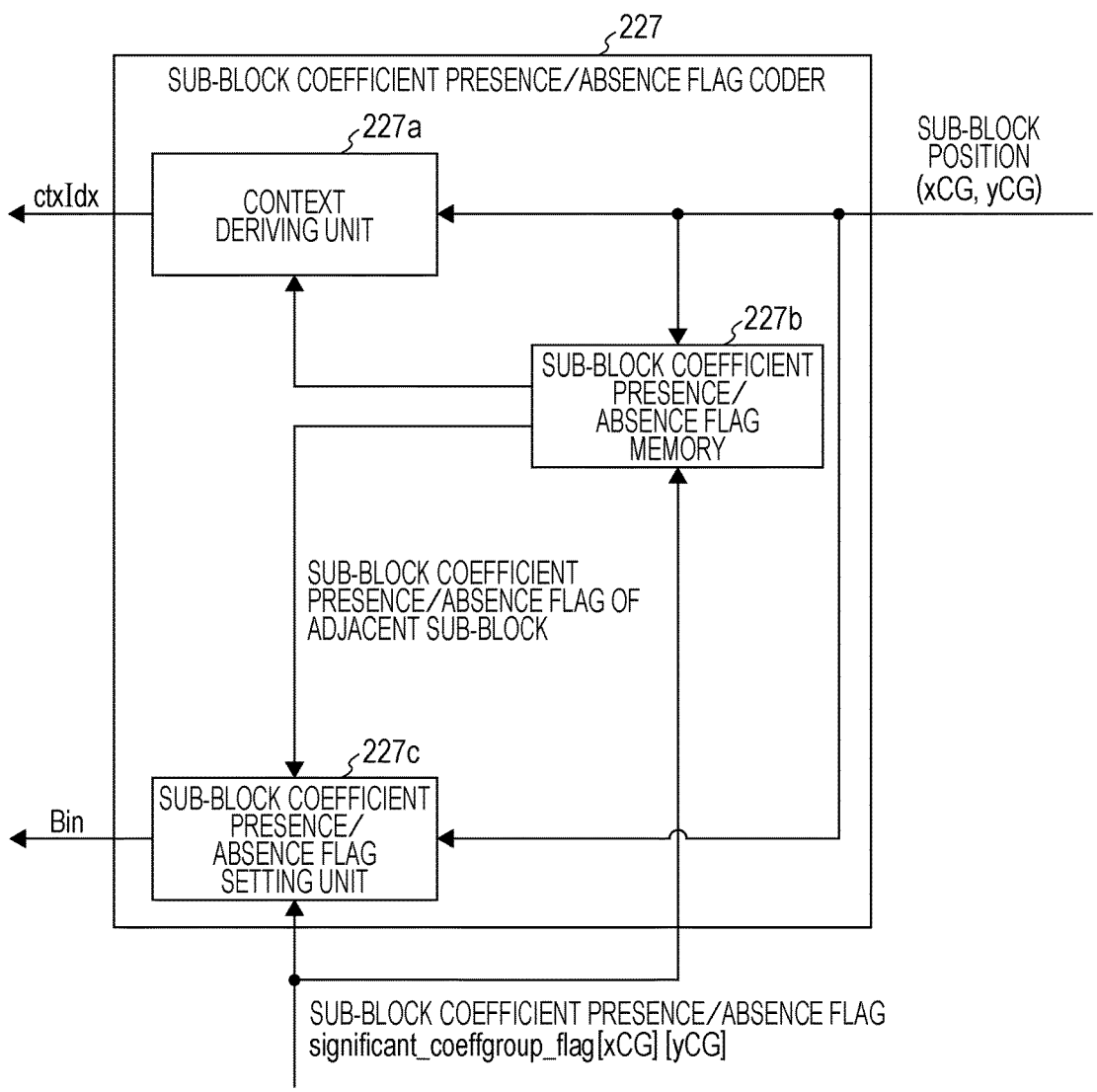
FIG. 56 is a block diagram illustrating the configuration of a sub-block coefficient presence/absence flag coder according to the embodiment.

FIG. 56 is a block diagram illustrating the configuration of the sub-block coefficient presence/absence flag coder 227. As illustrated in FIG. 56, the sub-block coefficient presence/absence flag coder 227 includes a context deriving unit 227a, a subOblock coefficient presence/absence flag memory 227b, and a sub-block coefficient presence/absence flag setting unit 227c.

Hereinafter, a description will be given of an example in which sub-block positions (xCG, yCG) are supplied from the coefficient coding controller 223 to the sub-block coefficient presence/absence flag coder 227 in the forward scan order. In this case, in the sub-block coefficient presence/absence flag decoder 127 included in the video decoding device 1, it is preferable that sub-block positions (xCG, yCG) be supplied in the reverse scan order.

(Context Deriving Unit 227*a*)

The context deriving unit 227*a* included in the sub-block coefficient presence/absence flag coder 227 derives context indices that are to be assigned to the sub-blocks designated by individual sub-block positions (xCG, yCG). A context index assigned to a sub-block is used to decode Bin that indicates the syntax element significant_coeffgroup_flag for the sub-block. In the case of deriving a context index, the value of a sub-block coefficient presence/absence flag stored in the sub-block coefficient presence/absence flag memory 227*b* is referred to. The context deriving unit 227*a* supplies the derived context indices to the context recording/updating unit 231.

(Sub-Block Coefficient Presence/Absence Flag Memory 227*b*)

The sub-block coefficient presence/absence flag memory 227*b* stores the individual values of syntax elements significant_coeffgroup_flag supplied from the coefficient presence/absence coder 224. The sub-block coefficient presence/absence flag setting unit 227*c* is capable of reading out a syntax element significant_coeffgroup_flag that has been assigned to an adjacent sub-block from the sub-block coefficient presence/absence flag memory 227*b*.

(Sub-Block Coefficient Presence/Absence Flag Setting Unit 227*c*)

The sub-block coefficient presence/absence flag setting unit 227*c* generates Bin that indicates a syntax element significant_coeffgroup_flag[xCG][yCG] supplied from the coefficient presence/absence flag coder 224. The generated Bin is supplied to the bit coder 232.

Here, the sub-block coefficient presence/absence flag setting unit 227*c* omits coding of the syntax element significant_coeffgroup_flag[xCG][yCG] in the following manner in accordance with a scan type designating sub-block scan order.

(In a Case where Scan Type is Vertical-Direction Priority Scan)

In a case where the scan type designating sub-block scan order is vertical-direction priority scan, the sub-block coefficient presence/absence flag setting unit 227*c* refers to the value of the sub-block coefficient presence/absence flag significant_coeffgroup_flag[xCG][yCG+1] assigned to the sub-block (xCG, yCG+1) adjacent to the sub-block (xCG, yCG), as illustrated in part (a) of FIG. 20. In a case where significant_coeffgroup_flag[xCG][yCG+1]=1, the sub-block coefficient presence/absence flag setting unit 227*c* estimates that significant_coeffgroup_flag[xCG][yCG]=1, and omits coding of significant_coeffgroup_flag[xCG][yCG].

(In a Case where Scan Type is Horizontal-Direction Priority Scan)

In a case where the scan type designating sub-block scan order is horizontal-direction priority scan, the sub-block coefficient presence/absence flag setting unit 227*c* refers to the value of the sub-block coefficient presence/absence flag significant_coeffgroup_flag[xCG+1][yCG] assigned to the sub-block (xCG+1, yCG) adjacent to the sub-block (xCG, yCG), as illustrated in part (b) of FIG. 20. In a case where significant_coeffgroup_flag[xCG+1][yCG]=1, the sub-block coefficient presence/absence flag setting unit 227*c* estimates that significant_coeffgroup_flag[xCG][yCG]=1, and omits coding of significant_coeffgroup_flag[xCG][yCG].

(In a Case where Scan Type is Diagonal-Direction Scan)

In a case where the scan type designating sub-block scan order is diagonal-direction scan, the sub-block coefficient presence/absence flag setting unit 227*c* refers to the value of the sub-block coefficient presence/absence flag significant_coeffgroup_flag[xCG+1][yCG] assigned to the sub-block (xCG+1, yCG) adjacent to the sub-block (xCG, yCG), and the value of the sub-block coefficient presence/absence flag significant_coeffgroup_flag[xCG][yCG+1] assigned to the sub-block (xCG, yCG+1), as illustrated in part (c) of FIG. 20.

In a case where significant_coeffgroup_flag[xCG+1][yCG]=1 and significant_coeffgroup_flag[xCG][yCG+1]=1, the sub-block coefficient presence/absence flag setting unit 227*c* estimates that significant_coeffgroup_flag[xCG][yCG]=1, and omits coding of significant_coeffgroup_flag[xCG][yCG].

The sub-block coefficient presence/absence flag setting unit 227*c* is configured to omit coding of significant_coeffgroup_flag[xCG][yCG] in accordance with bias of sub-block coefficient presence/absence flags, as described above. The amount of codes of sub-block coefficient presence/absence flags can be reduced, and thus coding efficiency increases.

(Modification Example 1 of Coefficient Presence/Absence Flag Coder)

The configuration of the coefficient presence/absence flag coder according to this embodiment is not limited to the above-described configuration. The coefficient presence/absence flag coder according to this embodiment may have a configuration corresponding to the coefficient presence/absence flag decoder 124' according to the first modification example.

That is, a coefficient presence/absence flag coder 224' according to this modification example may have almost the same configuration as the transform coefficient presence/absence flag coder 224, but may be different in the following points.

The coefficient presence/absence flag coder 224' does not include the neighbor reference context deriving unit 224*c*.

The coefficient presence/absence flag coder 224' includes a sub-block neighbor reference context deriving unit 224*f*.

Here, the sub-block neighbor reference context deriving unit 224*f* derives context indices to be assigned to individual frequency components included in the target sub-block to be processed, by referring to significant_coeffgroup_flag assigned to a sub-block adjacent to the target sub-block to be processed.

The specific process performed by the sub-block neighbor reference context deriving unit 224*f* is similar to that performed by the sub-block neighbor reference context deriving unit 124*f*, and thus the description thereof is omitted. However, note that "decoding" in the description of the sub-block neighbor reference context deriving unit 124*f* is replaced by "coding".

The sub-block neighbor reference context deriving unit 224*f* according to this modification example does not perform a neighbor reference context derivation process in units of frequency components, and assigns common context indices to individual frequency components included in a sub-block. Accordingly, the amount of processing is reduced. Also, a context index derivation process performed in units of sub-blocks is performed by referring to the value of significant_coeffgroup_flag in an adjacent sub-block, and thus context indices can be derived in accordance with the number of non-zero transform coefficients that exist around the target sub-block.

Accordingly, with the sub-block neighbor reference context deriving unit 224f according to this modification example, the amount of processing of a context index derivation process can be reduced, while high coding efficiency being maintained.

(Modification Example 2 of Coefficient Presence/Absence Flag Coder)

The coefficient presence/absence flag coder according to this embodiment may have a configuration corresponding to the coefficient presence/absence flag decoder 124″ according to the second modification example.

That is, the coefficient presence/absence flag decoder 124″ according to this modification example includes the sub-block neighbor reference context deriving unit 224f, in addition to the individual units of the transform coefficient presence/absence flag coder 224. Here, the specific process performed by the sub-block neighbor reference context deriving unit 224f according to this modification example is similar to that performed by the sub-block neighbor reference context deriving unit 124f according to the second modification example, and thus the description thereof is omitted. However, note that "decoding" in the description of the sub-block neighbor reference context deriving unit 124f according to the second modification example is replaced by "coding".

With this configuration, the amount of processing of a context index derivation process can be reduced, while high coding efficiency being maintained.

(Modification Example 3 of Coefficient Presence/Absence Flag Coder 224)

The coefficient presence/absence flag coder 224 according to this embodiment may have a configuration corresponding to the coefficient presence/absence flag decoder 124 according to the third modification example.

Figure 97:
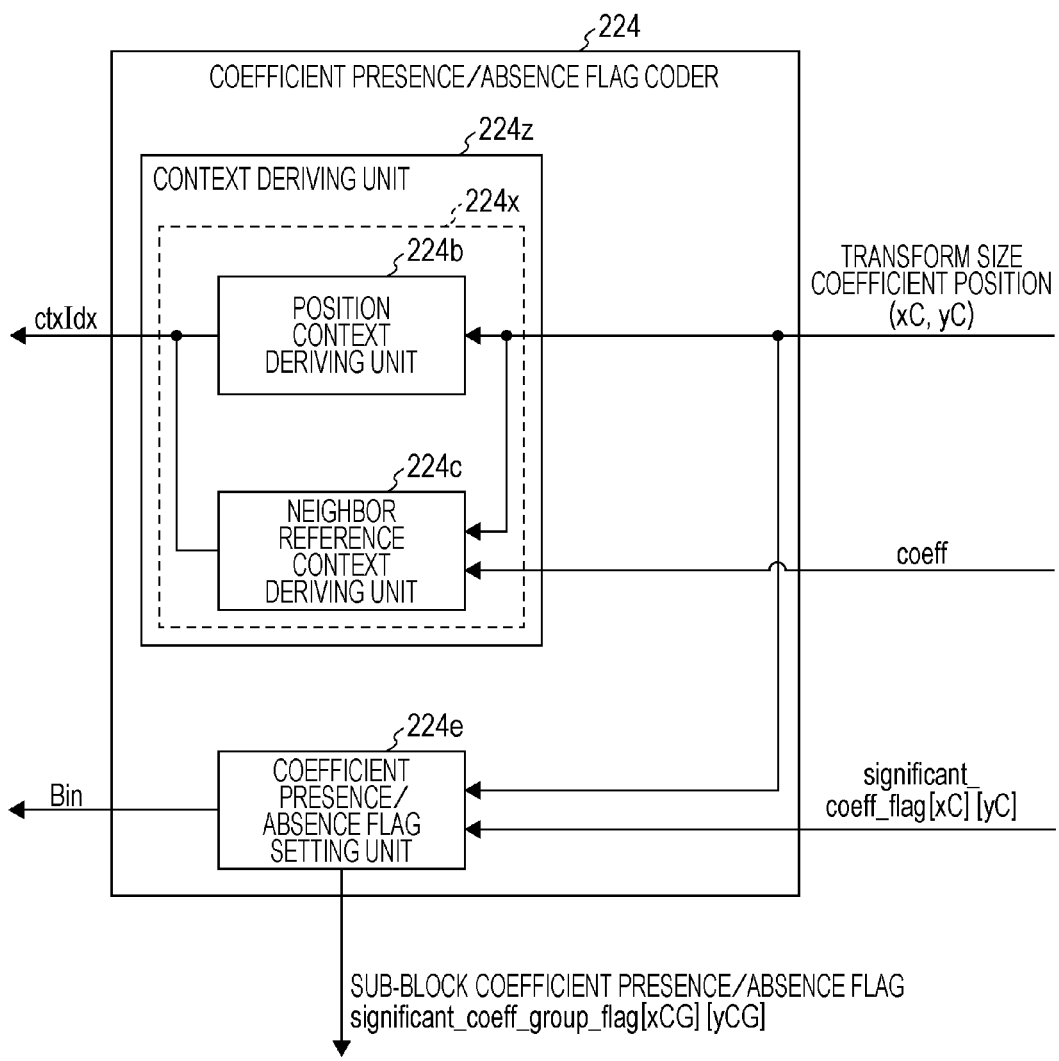
FIG. 97 is a block diagram illustrating an example configuration of a second modification example of the coefficient presence/absence flag coder according to the embodiment.

FIG. 97 is a block diagram illustrating an example configuration of the third modification example of the coefficient presence/absence flag coder 224 according to this embodiment. As illustrated in FIG. 97, the coefficient presence/absence flag coder 224 includes a context deriving unit 224z and the coefficient presence/absence flag setting unit 224e. Further, the context deriving unit 224z includes a derivation method controller 224x, the position context deriving unit 224b, and the neighbor reference context deriving unit 224c. In FIG. 97, in the context deriving unit 224z, the derivation method controller 224x includes the position context deriving unit 224b and the neighbor reference context deriving unit 224c, but this is merely an example. The configuration of the context deriving unit 224z is not limited to such a configuration.

(Derivation Method Controller 224x)

In a case where a target TU size is a certain size or smaller (for example, 4×4 TU or 8×8 TU), the derivation method controller 224x classifies each of the frequency components in the frequency region having the certain size or smaller to any of a plurality of partial regions in accordance with the position of the frequency component, and also assigns context indices ctxIdx derived by the position context deriving unit 224b.

On the other hand, in a case where the target TU size is larger than the certain size (for example, 16×16 TU or 32×32 TU), the derivation method controller 224x classifies the target frequency component to be decoded in the frequency region to any of the plurality of partial regions in accordance with the position of the frequency component, and also assigns the context index ctxIdx derived by either of the position context deriving unit 224b and the neighbor reference context deriving unit 224c to the target frequency component to be decoded.

The specific process performed by the derivation method controller 224x is similar to that performed by the derivation method controller 124x included in the video decoding device 1, and thus the description thereof is omitted here.

(Position Context Deriving Unit 224b)

The position context deriving unit 224b derives a context index ctxIdx for a target frequency component on the basis of the position of the target frequency component in a frequency region.

The specific process performed by the position context deriving unit 224b is similar to that performed by the position context deriving unit 124b included in the third modification example of the coefficient presence/absence flag decoder 124, and thus the description thereof is omitted here.

(Neighbor Reference Context Deriving Unit 224c)

The neighbor reference context deriving unit 224c derives a context index ctxIdx for the target frequency component to be coded, on the basis of the number cnt of coded non-zero transform coefficients for frequency components around the target frequency component. More specifically, in a case where the position (xC, yC) of the target frequency component or the position (xCG, yCG) of the sub-block to which the target frequency component belongs satisfies a certain condition, the neighbor reference context deriving unit 224b derives the number cnt of coded non-zero transform coefficients by using a reference position (template) that varies in accordance with the position of a transform coefficient.

The specific process performed by the neighbor reference context deriving unit 224c is similar to that performed by the neighbor reference context deriving unit 124c included in the third modification example of the coefficient presence/absence flag decoder 124, and thus the description thereof is omitted here.

(Coefficient Presence/Absence Flag Setting Unit 224e)

The coefficient presence/absence flag setting unit 224e generates Bin that indicates a syntax element significant_coeff_flag[xC][yC] supplied from the syntax deriving unit 228. The generated Bin is supplied to the bit coder 232. Also, the coefficient presence/absence flag setting unit 224e refers to the values of significant_coeff_flag[xC][yC] included in the target sub-block. In a case where all the values of significant_coeff_flag[xC][yC] included in the target sub-block are 0, that is, in a case where the target sub-block does not include a non-zero transform coefficient, the coefficient presence/absence flag setting unit 224e sets the value of significant_coeff_group_flag[xCG][yCG] related to the target sub-block to 0, and otherwise sets the value of significant_coeff_group_flag[xCG][yCG] related to the target sub-block to 1. significant_coeff_group_flag[xCG][yCG] to which a value has been given in this manner is supplied to the sub-block coefficient presence/absence flag coder 227.

According to the third modification example of the coefficient presence/absence flag coder 224, in a case where the TU size of the target to be processed is a certain size or smaller, a frequency region can be divided into a plurality of sub-regions (context groups) by using bit calculation using the values of individual bits of xC and yC indicating the position of the target frequency component to be processed, and context indices corresponding to the individual sub-regions can be derived. Accordingly, a context index derivation process can be simplified, and the memory size related to context index derivation can be reduced.

In a case where the TU size of the target to be processed is larger than the certain size and where the target coefficient presence/absence flag to be processed is located in a high-frequency region, the position context deriving unit derives a context index related to the target coefficient presence/absence flag to be processed. In a case where the target coefficient presence/absence flag to be processed is located in a low-frequency region and an intermediate-frequency region, the neighbor reference context deriving unit derives a context index related to the target coefficient presence/absence flag to be processed. Accordingly, compared to the related art, context indices can be derived for frequency components included in a low-frequency region in consideration of bias of the occurrence frequency of non-zero coefficients, and thus the amount of codes of coefficient presence/absence flags can be reduced and the amount of processing related to coding can be reduced advantageously.

A template is selected on the basis of a coefficient position so that the transform coefficient at the coordinate located immediately before the position of the target transform coefficient in processing order (reverse scan order) is not referred to. In such a process, a context to be used to decode the coefficient presence/absence flag at a certain position can be derived without referring to the value of the preceding coefficient presence/absence flag, and thus a context derivation process and a decoding process can be performed in parallel. Therefore, a context index derivation process can be performed at high speed, while high coding efficiency being maintained.

APPENDIX 1

The above-descried video coding device 2 and video decoding device 1 can be mounted in and used for various devices that perform transmission, reception, recording, and playback of video. The video may be natural video captured by a camera or the like, or may be artificial video (including CG and GUI) generated by a computer or the like.

First, a description will be given of a case where the above-descried video coding device 2 and video decoding device 1 can be used to transmit and receive video, with reference to FIG. 57.

Part (a) of FIG. 57 is a block diagram illustrating the configuration of a transmission device PROD_A in which the video coding device 2 is mounted. As illustrated in part (a) of FIG. 57, the transmission device PROD_A includes a coder PROD_A1 that codes video to obtain coded data, a modulator PROD_A2 that modulates a carrier wave by using the coded data obtained by the coder PROD_A1 so as to obtain a modulation signal, and a transmitter PROD_A3 that transmits the modulation signal obtained by the modulator PROD_A2. The above-described video coding device 2 is used as the coder PROD_A1.

The transmission device PROD_A may further include, as a source of video to be input to the coder PROD_A1, a camera PROD_A4 that captures video, a recording medium PROD_A5 on which video is recorded, an input terminal PROD_A6 that is used for inputting video from the outside, and an image processor A7 that generates or processes an image. In part (a) of FIG. 57, the transmission device PROD_A includes all the foregoing devices, but some of them may be omitted.

The recording medium PROD_A5 may be a recording medium on which non-coded video is recorded, or may be a recording medium on which video that has been coded using a coding scheme for recording different from the coding scheme for transmission is recorded. In the latter case, a decoder (not illustrated) that decodes coded data read from the recording medium PROD_A5 in accordance with the coding scheme for recording may be provided between the recording medium PROD_A5 and the coder PROD_A1.

Part (b) of FIG. 57 is a block diagram illustrating the configuration of a reception device PROD_B in which the video decoding device 1 is mounted. As illustrated in part (b) of FIG. 57, the reception device PROD_B includes a receiver PROD_B1 that receives a modulation signal, a demodulator PROD_B2 that demodulates the modulation signal received by the receiver PROD_B1 to obtain coded data, and a decoder PROD_B3 that decodes the coded data obtained by the demodulator PROD_B2 to obtain video. The above-described video decoding device 1 is used as the decoder PROD_B3.

The reception device PROD_B may further include, as a destination of video output from the decoder PROD_B3, a display PROD_B4 that displays video, a recording medium PROD_B5 for recording video, and an output terminal PROD_B6 for outputting video to the outside. In part (b) of FIG. 57, the reception device PROD_B includes all the foregoing devices, but some of them may be omitted.

The recording medium PROD_B5 may be used to record non-coded video, or may be used to record video that has been coded using a coding scheme for recording different from a coding scheme for transmission. In the latter case, a coder (not illustrated) that codes video obtained from the decoder PROD_B3 in accordance with the coding scheme for recording may be provided between the decoder PROD_B3 and the recording medium PROD_B5.

The transmission medium for transmitting a modulation signal may be a wireless link or a wired link. The transmission form for transmitting a modulation signal may be broadcasting (here, a transmission form in which a destination is not specified in advance), or may be communication (here, a transmission form in which a destination is specified in advance). That is, transmission of a modulation single may be implemented by any of wireless broadcasting, wired broadcasting, wireless communication, and wired communication.

For example, a broadcast station (broadcast facilities or the like) and a receiving station (a television receiver or the like) of digital terrestrial broadcasting correspond to an example of the transmission device PROD_A and the reception device PROD_B that transmit or receive a modulation signal via wireless broadcasting. A broadcast station (broadcast facilities or the like) and a receiving station (a television receiver or the like) of cable television broadcasting correspond to an example of the transmission device PROD_A and the reception device PROD_B that transmit or receive a modulation signal via wired broadcasting.

A server (work station or the like) for a VOD (Video On Demand) service and a video sharing service using the Internet, and a client (television receiver, personal computer, smart phone, or the like) correspond to an example of the transmission device PROD_A and the reception device PROD_B that transmit or receive a modulation signal via communication (normally, a wireless or wired link is used as a transmission medium in a LAN, and a wired link is used as a transmission medium in a WAN). Here, examples of the personal computer include a desktop PC, a laptop PC, and a tablet PC. Also, examples of the smart phone include a multifunction mobile phone terminal.

A client of a video sharing service has a function of coding video captured by a camera and uploading the video to a server, in addition to a function of decoding coded data downloaded from a server and displaying the coded data on a display. That is, the client of a video sharing service functions as both the transmission device PROD_A and the reception device PROD_B.

Next, a description will be given of a case where the above-described video coding device 2 and the video decoding device 1 can be used to record and play back video, with reference to FIG. 58.

Part (a) of FIG. 58 is a block diagram illustrating the configuration of a recording device PROD_C in which the above-described video coding device 2 is mounted. As illustrated in part (a) of FIG. 58, the recording device PROD_C includes a coder PROD_C1 that codes video to obtain coded data, and a writer PROD_C2 that writes the coded data obtained by the coder PROD_C1 on a recording medium PROD_M. The above-described video coding device 2 is used as the coder PROD_C1.

The recording medium PROD_M may be of (1) a type of being built in the recording device PROD_C, such as an HDD (Hard Disk Drive) or an SSD (Solid State Drive), (2) a type of being connected to the recording device PROD_C, such as an SD memory card or a USB (Universal Serial Bus) flash memory, or (3) a type of being loaded in a drive device (not illustrated) built in the recording device PROD_C, such as a DVD (Digital Versatile Disc) or a BD (Blu-ray Disc: registered trademark).

The recording device PROD_C may further include, as a source of video to be input to the coder PROD_C1, a camera PROD_C3 that captures video, an input terminal PROD_C4 that inputs video from the outside, a receiver PROD_C5 that receives video, and an image processor C6 that generates or processes an image. In part (a) of FIG. 58, the recording device PROD_C includes all of the foregoing devices, but some of them may be omitted.

The receiver PROD_C5 may receive non-coded video, or may receive coded data that has been coded using a coding scheme for transmission different from a coding scheme for recoding. In the latter case, a decoder for transmission (not illustrated) for decoding coded data that has been coded using the coding scheme for transmission may be provided between the receiver PROD_C5 and the coder PROD_C1.

Examples of the recording device PROD_C include a DVD recorder, a BD recorder, and an HDD (Hard Disk Drive) recorder (in this case, the input terminal PROD_C4 or the receiver PROD_C5 serves as a main source of video). Examples of the recording device PROD_C also include a camcorder (in this case, the camera PROD_C3 serves as a main source of video), a personal computer (in this case, the receiver PROD_C5 or the image processor PROD_C6 serves as a main source of video), and a smart phone (in this case, the camera PROD_C3 or the receiver PROD_C5 serves as a main source of video).

Part (b) of FIG. 58 is a block diagram illustrating the configuration of a playback device PROD_D in which the above-described video decoding device 1 is mounted. As illustrated in part (b) of FIG. 58, the playback device PROD_D includes a reader PROD_D1 that reads coded data written on the recording medium PROD_M and a decoder PROD_D2 that decodes the coded data read by the reader PROD_D1 to obtain video. The above-described video decoding device 1 is used as the decoder PROD_D2.

The recording medium PROD_M may be of (1) a type of being built in the playback device PROD_D, such as an HDD or an SSD, (2) a type of being connected to the playback device PROD_D, such as an SD memory card or a USB flash memory, or (3) a type of being loaded in a drive device (not illustrated) built in the playback device PROD_D, such as a DVD or a BD.

The playback device PROD_D may further include, as a destination of the video output from the decoder PROD_D2, a display PROD_D3 that displays video, an output terminal PROD_D4 that outputs video to the outside, and a transmitter PROD_D5 that transmits video. In part (b) of FIG. 58, the playback device PROD_D includes all of the foregoing devices, but some of them may be omitted.

The transmitter PROD_D5 may transmit non-coded video or may transmit coded data that has been coded using a coding scheme for transmission different from a coding scheme for recording. In the latter case, a coder (not illustrated) that codes video using the coding scheme for transmission may be provided between the decoder PROD_D2 and the transmitter PROD_D5.

Examples of the playback device PROD_D include a DVD player, a BD player, and an HDD player (in this case, the output terminal PROD_D4 connected to a television receiver or the like serves as a main destination of video). Examples of the playback device PROD_D also include a television receiver (in this case, the display PROD_D3 serves as a main destination of video), a digital signage (also referred to as an electronic signage or electronic board, and the display PROD_D3 or the transmitter PROD_D5 serves as a main destination of video), a desktop PC (in this case, the output terminal PROD_D4 or the transmitter PROD_D5 serves as a main destination of video), a laptop or tablet PC (in this case, the display PROD_D3 or the transmitter PROD_D5 serves as a main destination of video), and a smartphone (in this case, the display PROD_D3 or the transmitter PROD_D5 serves as a main destination of video).

APPENDIX 2

The individual blocks of the above-described video decoding device 1 and video coding device 2 may be constituted in a hardware manner by using a logical circuit formed on an integrated circuit (IC chip) or may be constituted in a software manner by using a CPU (Central Processing Unit).

In the latter case, each of the above-described devices includes a CPU that executes an instruction of a program that implements each function, a ROM (Read Only Memory) that stores the program, a RAM (Random Access Memory) to which the program is transferred, a storage device (recording medium) that stores the program and various data, such as a memory, and so forth. An object of the present invention can also be achieved by supplying each of the above-described devices with a recording medium that stores, in a computer-readable manner, program code of a control program (execution form program, intermediate code program, and source program) of the individual devices, which is software implementing the above-described functions, and by reading and executing the program code recorded on the recording medium by the computer (or CPU or MPU).

Examples of the recording medium include tapes such as a magnetic tape and a cassette tape; disks or discs such as a magnetic disc, for example, a floppy (registered trademark) disk or a hard disk, and an optical disc, for example, a CD-ROM, an MO, an MD, a DVD, or a CD-R; cards such as an IC card (including a memory card) and an optical card; semiconductor memories such as a mask ROM, an EPROM, an EEPROM, and a flash ROM; and logical circuits such as a PLD (Programmable logic device) and an FPGA (Field Programmable Gate Array).

Alternatively, each of the above-described devices may be configured to be connectable to a communication network, and the above-described program code may be supplied via the communication network. The communication network is not limited as long as it is capable of transmitting the program code. For example, the Internet, an intranet, an extranet, a LAN, an ISDN, a VAN, a CATV communication network, a virtual private network, a telephone line network, a mobile communication network, a satellite communication network, and the like may be used. The transmission medium that constitutes the communication network is not limited to that of a specific configuration or type, as long as it is capable of transmitting the program code. For example, wired links such as IEEE 1394, USB, power line carrier, cable TV line, telephone line, and ADSL (Asymmetric Digital Subscriber Line), and wireless links such as infrared including IrDA and remote control, Bluetooth (registered trademark), IEEE 802.11, HDR (High Data Rate), NFC (Near Field Communication), DLNA (Digital Living Network Alliance), mobile telephone network, satellite line, and digital terrestrial network, may be used.

The present invention is not limited to the above-described embodiments. Various changes can be made within the scope of the claims, and an embodiment obtained by appropriately combining technical means disclosed in different embodiments is also included in the technical scope of the present invention.

The present invention can also be described as follows. An image decoding device according to an embodiment of the present invention is an arithmetic decoding device that decodes coded data which is obtained by arithmetically coding various syntax elements representing transform coefficients, the transform coefficients being obtained for individual frequency components as a result of performing frequency transform on a target image for each of unit regions. The arithmetic decoding device includes: context index deriving means for deriving a context index to be assigned to a transform coefficient presence/absence flag which is a syntax element indicating whether or not the transform coefficient is 0; and syntax decoding means for arithmetically decoding the transform coefficient presence/absence flag on the basis of a probability state which is indicated by the context index assigned to the transform coefficient presence/absence flag. The context index deriving means derives variables X and Y by using $X = \log 2 \text{TrafoWidth} == 2 ? xC : xC >> 1$ $Y = \log 2 \text{TrafoHeight} == 2 ? yC : yC >> 1,$ on the basis of the position (xC, yC) of a target frequency component in a frequency region (xC is an integer of 0 or more, yC is an integer of 0 or more), log 2TrafoWidth (log 2TrafoWidth is a natural number) which is a variable representing a horizontal width of the frequency region, and log 2TrafoHeight (log 2TrafoHeight is a natural number) which is a variable representing a vertical width of the frequency region, adds a certain offset and an identification number (relative context index) of a sub-region to which the target frequency component belongs, the identification number being determined on the basis of the value of the first low-order bit (second high-order bit) of the variable X, the value of the second low-order bit (first high-order bit) of the variable X, the value of the first low-order bit (second high-order bit) of the variable Y, and the value of the second low-order bit (first high-order bit) of the variable Y, and derives a context index of the target frequency component.

According to the above-described configuration, a frequency region can be divided into a plurality of sub-regions (relative context indices) by performing bit calculation using the values of individual bits of xC and yC indicating the position of the target frequency component to be processed, and context indices corresponding to the individual sub-regions can be derived. Thus, a context index derivation process can be simplified, and the memory size related to context index derivation can be reduced.

In the arithmetic decoding device according to the present invention, the values of individual bits that form an identification number (relative context index) of the above-described sub-region may be determined by a combination of a first bit that is made up of the value of the second low-order bit of variable X, a second bit that is made up of the value of the second low-order bit of variable Y, and a third bit that is obtained through a certain logical calculation of the value of the first low-order bit of variable X, the value of the second low-order bit of variable X, the value of the first low-order bit of variable Y, and the value of the second low-order bit of variable Y.

According to the above-described configuration, a sub-region (relative context index) to which the target frequency component belongs can be identified through a simple bit calculation based on the position (xC, yC) of the target frequency component, and thus context index derivation related to a coefficient presence/absence flag can be simplified.

In the arithmetic decoding device according to the present invention, the logical calculation used to derive a certain bit of the relative context index may be the logical OR of the value of the logical AND of NOT of the second low-order bit of variable X and the first low-order bit of variable Y, and the value of the logical AND of the first low-order bit of variable X and NOT of the second low-order bit of variable Y.

According to the above-described configuration, a preferable value can be set to the sub-region (relative context index) to which the target frequency component belongs.

The arithmetic decoding device according to the present invention is an arithmetic decoding device that decodes, for individual transform coefficients obtained for individual frequency components by performing frequency transform on a target image for each of unit regions, coded data obtained by arithmetically coding various syntax elements representing the transform coefficients. The arithmetic decoding device includes: sub-block dividing means for dividing a target frequency region corresponding to a target unit region to be processed into sub-blocks having a certain size; sub-block coefficient presence/absence flag decoding means for decoding, for each of the sub-blocks generated by the sub-block dividing means, a sub-block coefficient presence/absence flag indicating whether or not the sub-block includes at least one non-zero transform coefficient; dividing means for dividing a target frequency region into a plurality of partial regions, with at least any of each frequency component and each sub-block being a unit of division; context index deriving means for deriving a context index to be assigned to each transform coefficient presence/absence flag, which is a syntax element indicating whether or not each transform coefficient belonging to each partial region is 0; and syntax decoding means for arithmetically decoding each transform coefficient presence/absence flag belonging to each partial region on the basis of a probability state indicated by context indices assigned to the transform coefficient presence/absence flags. In a case where a sub-block coefficient presence/absence flag decoded for a target sub-block indicates that the target sub-block includes at least one non-zero transform coefficient and where each transform coefficient belonging to the target sub-block belongs to a partial region of a low-frequency region or an intermediate-frequency region in the target frequency region, the context index deriving means may derive a context index to be assigned to each transform coefficient presence/absence flag on the basis of the number of decoded non-zero transform coefficients included in a reference region. In a case where a sub-block coefficient presence/absence flag decoded for a target sub-block indicates that the target sub-block does not include a non-zero transform coefficient, transform coefficient presence/absence flags related to all the transform coefficients belonging to the target sub-block may be decoded to indicate that the transform coefficient is 0.

According to the above-described configuration, compared to the related art, context indices can be derived for frequency components included in a low-frequency region in consideration of bias of the occurrence frequency of non-zero coefficients. Accordingly, the amount of codes of coefficient presence/absence flags can be reduced, and the amount of processing related to decoding can be reduced.

In the arithmetic decoding device according to the present invention, in a case where the sum of the x coordinate and y coordinate of the position of the target frequency component is smaller than a first threshold, the partial region may be regarded as a low-frequency region. In a case where the sum of the x coordinate and y coordinate of the position of the target frequency component is equal to or larger than the first threshold, and the sum of the x coordinate and y coordinate of the position of the sub-block to which the target frequency component belongs is smaller than a second threshold, the partial region may be regarded as an intermediate-frequency region. In a case where the sum of the x coordinate and y coordinate of the position of the target frequency component is equal to or larger than the first threshold, or the sum of the x coordinate and y coordinate of the position of the sub-block to which the target frequency component belongs is larger than the second threshold, the partial region may be regarded as a high-frequency region.

According to the above-described configuration, a partial-region determination process that is common to luminance and chrominance may be used, and thus a context index derivation process related to a coefficient presence/absence flag can be simplified.

In the arithmetic decoding device according to the present invention, the first threshold and the second threshold used for identifying the partial region may be common to luminance and chrominance.

According to the above-described configuration, a partial-region determination process that is common to luminance and chrominance may be used, and thus a context index derivation process related to a coefficient presence/absence flag can be simplified.

In the arithmetic decoding device according to the present invention, the value of the first threshold may be 2.

According to the above-described configuration, preferable thresholds are used to identify a low-frequency region and an intermediate-frequency region, and thus the amount of codes of coefficient presence/absence flags can be further reduced, and the amount of processing related to decoding can be further reduced.

To solve the above-described problem, an arithmetic decoding device according to the present invention is an arithmetic decoding device that decodes, for individual transform coefficients obtained for individual frequency components by performing frequency transform on a target image for each of unit regions, coded data obtained by arithmetically coding various syntax elements representing the transform coefficients. The arithmetic decoding device includes: context index deriving means for deriving a context index to be assigned to each transform coefficient presence/absence flag which is a syntax element indicating whether or not the transform coefficient is 0; and syntax decoding means for arithmetically decoding each transform coefficient presence/absence flag on the basis of a probability state which is indicated by the context index assigned to the transform coefficient presence/absence flag. The context index deriving means divides a frequency region having a first size and a frequency region having a second size larger than the first size into a plurality of sub-regions and then derives context indices for the individual sub-regions. The split pattern of the frequency region having the first size and the split pattern of the frequency region having the second size are similar to each other.

According to the arithmetic decoding device having the above-described configuration, the frequency region having the first size and the frequency region having the second size are divided into a plurality of sub-regions by using split patterns that are similar to each other. As a result of performing a division process by using split patterns similar to each other, the amount of processing of a classification process is reduced, and thus the amount of processing related to decoding of transform coefficients can be reduced.

In the above-described configuration, the context index deriving means derives variables X and Y by using $$X = \log 2 TrafoSize == 2 ? xC : xC >> 1$$

$$Y = \log 2 TrafoSize == 2 ? yC : yC >> 1,$$

on the basis of the position (xC, yC) of the target frequency component in a frequency region (xC is an integer of 0 or more, and yC is an integer of 0 or more) and log 2TrafoSize (log 2TrafoSize is a natural number), which is a variable representing the size of the frequency region.

Preferably, in a case where $X=0$ and $Y=0$, the target frequency component is classified to a sub-region R0, in a case where ($X=0$ and $Y=0$) is not satisfied, $X<2$, and $Y<2$, the target frequency component is classified to a sub-region R1, in a case where $X=2$ and $Y<2$, the target frequency component is classified to a sub-region R2, in a case where $X=3$ and $Y<2$, the target frequency component is classified to a sub-region R3, in a case where $X<2$ and $Y=2$, the target frequency component is classified to a sub-region R4, in a case where $X<2$ and $Y=3$, the target frequency component is classified to a sub-region R5, and in a case where $X \geq 2$ and $Y \geq 2$, the target frequency component is classified to a sub-region R6.

According to the above-described configuration, with a branch process using variables X and Y that are calculated on the basis of the position (xC, yC) of the target frequency component in a frequency region and log 2TrafoSize, which is a variable representing the size of the frequency region, the frequency region is divided to a plurality of sub-regions. Accordingly, the amount of processing of a classification process is reduced.

Preferably, in the above-described configuration, the context index deriving means derives a common context index for the sub-region R3 and the sub-region R5 among the sub-regions R0 to R6.

According to the above-described configuration, a common context index is derived for at least the sub-region R3 in which a horizontal frequency is a high frequency and the sub-region R5 in which a vertical frequency is a high frequency. Thus, high coding efficiency is realized while the amount of processing being reduced.

To solve the above-described problem, an arithmetic decoding device according to the present invention is an arithmetic decoding device that decodes, for individual transform coefficients obtained for individual frequency components by performing frequency transform on a target image for each of unit regions, coded data obtained by arithmetically coding various syntax elements representing the transform coefficients. The arithmetic decoding device includes: sub-block dividing means for dividing a target frequency region corresponding to a target unit region to be processed into sub-blocks having a certain size; sub-block coefficient presence/absence flag decoding means for decoding, for each of the sub-blocks generated by the sub-block dividing means, a sub-block coefficient presence/absence flag indicating whether or not the sub-block includes at least one non-zero transform coefficient; and sub-block scan order setting means for setting sub-block scan order for the sub-block coefficient presence/absence flag decoding means. In a case where the prediction scheme applied to the target unit region to be processed is intra prediction, the sub-block scan order setting means sets sub-block scan order in accordance with a prediction direction of the intra prediction.

According to the arithmetic decoding device having the above-described configuration, in a case where the prediction scheme applied to the target unit region to be processed is intra prediction, sub-block scan order is set in accordance with the prediction direction of the intra prediction. In general, there is a correlation between the prediction direction of intra prediction and bias of the positions of transform coefficients in a frequency region. Thus, according to the above-described configuration, sub-block scan suitable for bias of sub-block coefficient presence/absence flags can be performed by setting sub-block scan order in accordance with the prediction direction of intra prediction. Accordingly, the amount of codes of sub-block coefficient presence/absence flags to be decoded can be reduced, and the amount of processing related to decoding of transform coefficients is reduced.

In the above-described configuration, it is preferable that the sub-block scan order setting means set the sub-block scan order in accordance with the size of the target unit region to be processed.

According to the above-described configuration, the sub-block scan order is set in accordance with the size of the target unit region to be processed. Thus, the amount of codes of sub-block coefficient presence/absence flags can be reduced more effectively, and the amount of processing related to decoding of transform coefficients is reduced.

In the above-described configuration, it is preferable that the sub-block coefficient presence/absence flag decoding means estimate the sub-block coefficient presence/absence flag of the target sub-block on the basis of the value of the sub-block coefficient presence/absence flag of one or plural reference sub-blocks that are set in accordance with the sub-block scan order, among a plurality of adjacent sub-blocks that are adjacent to the target sub-block.

According to the above-described configuration, the sub-block coefficient presence/absence flag of the target sub-block is estimated on the basis of the value of the sub-block coefficient presence/absence flag of one or plural reference sub-blocks that are set in accordance with the sub-block scan order, among a plurality of adjacent sub-blocks that are adjacent to the target sub-block. Thus, the amount of codes of sub-block coefficient presence/absence flags can be reduced more effectively, and the amount of processing related to decoding of transform coefficients is reduced.

In the above-described configuration, it is preferable that, in a case where the sub-block coefficient presence/absence flag of each reference sub-block indicates that the reference sub-block includes at least one non-zero transform coefficient, the sub-block coefficient presence/absence flag decoding means set the sub-block coefficient presence/absence flag of the target sub-block to a value indicating that the target sub-block includes at least one non-zero transform coefficient.

According to the above-described configuration, in a case where the sub-block coefficient presence/absence flag of each reference sub-block indicates that the reference sub-block includes at least one non-zero transform coefficient, the sub-block coefficient presence/absence flag of the target sub-block is set to a value indicating that the target sub-block includes at least one non-zero transform coefficient. Thus, the amount of codes of sub-block coefficient presence/absence flags can be reduced more effectively, and the amount of processing related to decoding of transform coefficients is reduced.

To solve the above-described problem, an arithmetic decoding device according to the present invention is an arithmetic decoding device that decodes, for individual transform coefficients obtained for individual frequency components by performing frequency transform on a target image for each of unit regions, coded data obtained by arithmetically coding various syntax elements representing the transform coefficients. The arithmetic decoding device includes: context index deriving means for deriving a context index to be assigned to each transform coefficient presence/absence flag which is a syntax element indicating whether or not the transform coefficient is 0; and syntax decoding means for arithmetically decoding each transform coefficient presence/absence flag on the basis of a probability state which is indicated by the context index assigned to the transform coefficient presence/absence flag. The context index deriving means derives a common context index for one or plural transform coefficient presence/absence flags belonging to a frequency region having a first size and one or plural transform coefficient presence/absence flags belonging to a frequency region having a second size which is larger than the first size.

According to the arithmetic deciding device having the above-described configuration, a common context index is derived for one or plural transform coefficient presence/absence flags belonging to a frequency region having a first size and one or plural transform coefficient presence/absence flags belonging to a frequency region having a second size which is larger than the first size. Thus, the amount of processing related to context index derivation, and the memory size for holding context indices can be reduced.

In the above-described configuration, it is preferable that the context index deriving means derive a common context index for one or plural transform coefficient presence/absence flags belonging to a frequency region having the first size and one or plural transform coefficient presence/absence flags belonging to a low-frequency side of a frequency region having the second size.

According to the above-described configuration, a common context index is derived for one or plural transform coefficient presence/absence flags belonging to a frequency region having the first size and one or plural transform coefficient presence/absence flags belonging to a low frequency side of a frequency region having the second size. Thus, the amount of processing related to context index derivation, and the memory size for holding context indices can be reduced more effectively.

In the above-described configuration, it is preferable that each transform coefficient presence/absence flag be either of a transform coefficient presence/absence flag related to luminance and a transform coefficient presence/absence flag related to chrominance, and that the context index deriving means derive a context index independently for the transform coefficient presence/absence flag related to luminance and the transform coefficient presence/absence flag related to chrominance.

According to the above described configuration, a context index is derived independently for the transform coefficient presence/absence flag related to luminance and the transform coefficient presence/absence flag related to chrominance. Thus, the amount of processing related to context index derivation, and the memory size for holding context indices can be reduced, while high coding efficiency being maintained.

To solve the above-described problem, an arithmetic decoding device according to the present invention is an arithmetic decoding device that decodes, for individual transform coefficients obtained for individual frequency components by performing frequency transform on a target image for each of unit regions, coded data obtained by arithmetically coding various syntax elements representing the transform coefficients. The arithmetic decoding device includes: sub-block dividing means for dividing a target frequency region corresponding to a target unit region to be processed into sub-blocks having a certain size; sub-block coefficient presence/absence flag decoding means for decoding, for each of the sub-blocks generated by the sub-block dividing means, a sub-block coefficient presence/absence flag indicating whether or not the sub-block includes at least one non-zero transform coefficient; context index deriving means for deriving a context index to be assigned to each transform coefficient presence/absence flag which is a syntax element indicating whether or not the transform coefficient is 0; and syntax decoding means for arithmetically decoding each transform coefficient presence/absence flag on the basis of a probability state which is indicated by the context index assigned to the transform coefficient presence/absence flag. The context index deriving means derives a common context index for transform coefficient presence/absence flags belonging to the target sub-block.

According to the above described configuration, a common context index is derived for transform coefficient presence/absence flags belonging to the target sub-block. Thus, the amount of processing related to context index derivation is reduced.

In the above-described configuration, it is preferable that the context index deriving means derive a common context index for transform coefficient presence/absence flags belonging to the target sub-block on the basis of whether or not adjacent sub-blocks that are adjacent to the target sub-block include a non-zero transform coefficient.

According to the above described configuration, a common context index is derived for transform coefficient presence/absence flags belonging to the target sub-block on the basis of whether or not adjacent sub-blocks that are adjacent to the target sub-block include a non-zero transform coefficient. Thus, the amount of processing related to context index derivation can be reduced, while high coding efficiency being maintained.

In the above-described configuration, it is preferable that each transform coefficient presence/absence flag be either of a transform coefficient presence/absence flag related to luminance and a transform coefficient presence/absence flag related to chrominance, and that the context index deriving means derive a common context index for transform coefficient presence/absence flags related to chrominance belonging to the target sub-block on the basis of whether or not adjacent sub-blocks that are adjacent to the target sub-block include a non-zero transform coefficient.

According to the above described configuration, a common context index is derived for transform coefficient presence/absence flags related to chrominance belonging to the target sub-block on the basis of whether or not adjacent sub-blocks that are adjacent to the target sub-block include a non-zero transform coefficient. Thus, the amount of processing related to context index derivation can be reduced, while high coding efficiency being maintained.

To solve the above-described problem, an image decoding device according to the present invention includes the above-described arithmetic decoding device, inverse frequency transform means for performing inverse frequency transform on transform coefficients decoded by the arithmetic decoding device, so as to generate a residual image, and decoded image generating means for adding the residual image generated by the inverse frequency transform means and a prediction image predicted from a generated decoded image, so as to generate a decoded image.

According to the above-described configuration, as in the above-described arithmetic decoding device, the amount of codes of target sub-block coefficient presence/absence flags to be decoded can be reduced, and the amount of processing related to decoding of transform coefficients is reduced.

To solve the above-described problem, an arithmetic coding device according to the present invention is an arithmetic coding device that generates, for individual transform coefficients obtained for individual frequency components by performing frequency transform on a target image for each of unit regions, coded data by arithmetically coding various syntax elements representing the transform coefficients. The arithmetic coding device includes: sub-block dividing means for dividing a target frequency region corresponding to a target unit region to be processed into sub-blocks having a certain size; sub-block coefficient presence/absence flag coding means for coding, for each of the sub-blocks generated by the sub-block dividing means, a sub-block coefficient presence/absence flag indicating whether or not the sub-block includes at least one non-zero transform coefficient; and sub-block scan order setting means for setting sub-block scan order for the sub-block coefficient presence/absence flag coding means. In a case where the prediction scheme applied to the target unit region to be processed is intra prediction, the sub-block scan order setting means sets sub-block scan order in accordance with a prediction direction of the intra prediction.

According to the arithmetic coding device having the above-described configuration, in a case where the prediction scheme applied to the target unit region to be processed is intra prediction, sub-block scan order is set in accordance with the prediction direction of the intra prediction. In general, there is a correlation between the prediction direction of intra prediction and bias of the positions of transform coefficients in a frequency region. Thus, according to the above-described configuration, sub-block scan suitable for bias of sub-block coefficient presence/absence flags can be performed by setting sub-block scan order in accordance with the prediction direction of intra prediction. Accordingly, the amount of codes of sub-block coefficient presence/absence flags to be coded can be reduced, and the amount of processing related to coding of transform coefficients is reduced.

To solve the above-described problem, an image coding device according to the present invention includes transform coefficient generating means for performing frequency transform on a residual image between a target image to be coded and a prediction image in units of unit regions, so as to generate transform coefficients, and the above-described arithmetic coding device. The arithmetic coding device arithmetically codes various syntax elements representing the transform coefficients generated by the transform coefficient generating means, so as to generate coded data.

According to the above-described configuration, as in the above-described arithmetic coding device, the amount of codes of target sub-block coefficient presence/absence flags to be decoded can be reduced, and the amount of processing related to coding of transform coefficients is reduced.

An arithmetic decoding device according to the present invention is an arithmetic decoding device that decodes, for individual transform coefficients obtained for individual frequency components by performing frequency transform on a target image for each of unit regions, coded data obtained by arithmetically coding various syntax elements representing the transform coefficients. The arithmetic decoding device includes: context index deriving means for deriving a context index to be assigned to each transform coefficient presence/absence flag which is a syntax element indicating whether or not the transform coefficient is 0; and syntax decoding means for arithmetically decoding each transform coefficient presence/absence flag on the basis of a probability state which is indicated by the context index assigned to the transform coefficient presence/absence flag. The context index deriving means divides a frequency region having a first form and a frequency region having a second form different from the first form into a plurality of sub-regions and then derives context indices for the individual sub-regions. The split pattern of the frequency region having the first form and the split pattern of the frequency region having the second form match each other via rotation and axis-symmetric transform.

According to the arithmetic decoding device having the above-described configuration, the split pattern of the frequency region having the first form and the split pattern of the frequency region having the second form match each other via rotation and axis-symmetric transform. In this way, as a result of performing a division process using split patterns that match each other via rotation and axis-symmetric transform, the amount of processing of a classification process is reduced, and thus the amount of processing related to decoding of transform coefficients can be reduced.

In the above-described configuration, the context index deriving means derives variables X and Y by using $X = \log 2TrafoWidth == 2 \,?\, xC:\, xC >> 2$ $Y = \log 2TrafoHeight == 2 \,?\, yC:\, yC >> 2,$ on the basis of the position (xC, yC) of the target frequency component in a frequency region (xC is an integer of 0 or more, and yC is an integer of 0 or more) and log 2TrafoWidth (log 2TrafoWidth is a natural number), which is a variable representing the horizontal width of the frequency region and log 2TrafoHeight (log 2TrafoHeight is a natural number), which is a variable representing the vertical width of the frequency region.

Preferably, in a case where X=0 and Y=0, the target frequency component is classified to a sub-region A0, in a case where (X=0 and Y=0) is not satisfied, X<2, and Y<2, the target frequency component is classified to a sub-region A1, in a case where X=2 and Y<2, the target frequency component is classified to a sub-region A2, in a case where X=3 and Y<2, the target frequency component is classified to a sub-region A3, in a case where X<2 and Y=2, the target frequency component is classified to a sub-region A4, in a case where X<2 and Y=3, the target frequency component is classified to a sub-region A5, and in a case where X≥2 and Y≥2, the target frequency component is classified to a sub-region A6.

According to the above-described configuration, with a branch process using variables X and Y that are calculated on the basis of the position (xC, yC) of the target frequency component in a frequency region, and log 2TrafoWidth, which is a variable representing the horizontal width of the frequency region, and log 2TrafoHeight, which is a variable representing the vertical width of the frequency region, the frequency region is divided to a plurality of sub-regions. Accordingly, the amount of processing of a classification process is reduced.

In the above-described arithmetic decoding device, it is preferable that the split pattern of a frequency region having the first size be common to luminance components and chrominance components, and that the split pattern of a frequency region having the second size be common to luminance components and chrominance components.

According to the above-described configuration, the split pattern of a frequency component is the same in luminance components and chrominance components, and thus a context index derivation process is simplified. Accordingly, the amount of processing related to decoding of transform coefficients is reduced.

An arithmetic decoding device according to the present invention is an arithmetic decoding device that decodes, for individual transform coefficients obtained for individual frequency components by performing frequency transform on a target image for each of unit regions, coded data obtained by arithmetically coding various syntax elements representing the transform coefficients. The arithmetic decoding device includes: context index deriving means for deriving a context index to be assigned to each transform coefficient presence/absence flag which is a syntax element indicating whether or not the transform coefficient is 0; and syntax decoding means for arithmetically decoding each transform coefficient presence/absence flag on the basis of a probability state which is indicated by the context index assigned to the transform coefficient presence/absence flag. The context index deriving means divides a target frequency region into a plurality of sub-regions, and derives context indices for the individual sub-regions. The split pattern of the target frequency region is common to luminance components and chrominance components.

According to the above-described arithmetic decoding device, the split pattern of a frequency component is the same in luminance components and chrominance components, and thus a context index derivation process is simplified. Accordingly, the amount of processing related to decoding of transform coefficients is reduced.

Preferably, on the basis of the position (xC, yC) of the target frequency component in a frequency region (xC is an integer of 0 or more, and yC is an integer of 0 or more), width (width is a natural number), which is a variable representing the horizontal width of the frequency region, and height (height is a natural number), which is a variable representing the vertical width of the frequency region, the context index deriving means classifies the target frequency components to sub-regions R0 to R3 under the conditions (1-a) to (1-d) in a case where xC<width/2 and yC<height/2, (1-a) in a case where xC<width/4 and yC<height/4, the target frequency component is classified to the sub-region R0, (1-b) in a case where xC≥width/4 and yC<height/4, the target frequency component is classified to the sub-region R1, (1-c) in a case where xC<width/4 and yC≥height/4, the target frequency component is classified to the sub-region R2, and (1-d) in a case where xC≥width/4 and yC≥height/4, the target frequency component is classified to the sub-region R3, the context index deriving means classifies the target frequency components to a sub-region R4 or R5 under the conditions (2-a) and (2-b) in a case where xC≥width/2 and yC<height/2, (2-a) in a case where xC<width×¾, the target frequency component is classified to the sub-region R4, and (2-b) in a case where xC≥width×¾, the target frequency component is classified to the sub-region R5, the context index deriving means classifies the target frequency components to a sub-region R6 or R7 under the conditions (3-a) to (3-b) in a case where xC<width/2 and yC≥height/2, (3-a) in a case where yC<height×¾, the target frequency component is classified to the sub-region R6, and (3-b) in a case where yC≥height×¾, the target frequency component is classified to the sub-region R7, and the context index deriving means classifies the target frequency component to a sub-region R8 in a case where xC width/2 and yC≥height/2.

The above-described configuration can be used as a common classification process for frequency regions having different sizes, and thus a context index derivation process can be simplified. Also, according to the above-described configuration, compared to the configuration of the related art, the number of context indices to be derived can be reduced, and thus a context index derivation process can be reduced, and the memory size for holding context indices can be reduced.

Preferably, on the basis of the position (xC, yC) of the target frequency component in a frequency region (xC is an integer of 0 or more, and yC is an integer of 0 or more), width (width is a natural number), which is a variable representing the horizontal width of the frequency region, and height (height is a natural number), which is a variable representing the vertical width of the frequency region, the context index deriving means classifies the target frequency components to sub-regions R0 and R1 under the conditions (1-a) and (1-b) in a case where xC<width/2 and yC<height/2 are satisfied, (1-a) in a case where xC<width/4 and yC<height/4, the target frequency component is classified to the sub-region R0, and (1-b) in a case where xC≥width/4 or yC≥height/4, the target frequency component is classified to the sub-region R1, the context index deriving means classifies the target frequency components to a sub-region R2 or R3 under the conditions (2-a) and (2-b) in a case where xC>width/2 and yC<height/2, (2-a) in a case where xC<width×¾, the target frequency component is classified to the sub-region R2, and (2-b) in a case where xC≥width×¾, the target frequency component is classified to the sub-region R3, the context index deriving means classifies the target frequency components to a sub-region R4 or R5 under the conditions (3-a) and (3-b) in a case where xC<width/2 and yC>height/2, (3-a) in a case where yC<height×¾, the target frequency component is classified to the sub-region R4, and (3-b) in a case where yC≥height×¾, the target frequency component is classified to the sub-region R5, and the context index deriving means classifies the target frequency component to a sub-region R6 in a case where xC width/2 and yC≥height/2.

According to the above-described configuration, a common classification process can be used for frequency regions having different sizes, and thus a context index derivation process can be simplified. Also, according to the above-described configuration, compared to the configuration of the related art, the number of context indices to be derived can be reduced, and thus a context index derivation process can be reduced, and the memory size for holding context indices can be reduced.

INDUSTRIAL APPLICABILITY

The present invention can be preferably used for an arithmetic decoding device that decodes arithmetically coded data, and an arithmetic coding device that generates arithmetically coded data.

REFERENCE SIGNS LIST 1 video decoding device (image decoding device)
11 variable length code decoder
111 quantized residual information decoder (arithmetic decoding device)
120 transform coefficient decoder
123 coefficient decoding controller (sub-block dividing means, sub-block scan order setting means)
124 coefficient presence/absence flag decoder (context index deriving means)
124a frequency classifying unit
124b position context deriving unit
124c neighbor reference context deriving unit
124d coefficient presence/absence flag memory
124e coefficient presence/absence flag setting unit
124x derivation method controller
124z context deriving unit
127 sub-block coefficient presence/absence flag decoder (sub-block coefficient presence/absence flag decoding means)
127a context deriving unit
127b sub-block coefficient presence/absence flag memory
127c sub-block coefficient presence/absence flag setting unit
130 arithmetic code decoder
131 context recording/updating unit
132 bit decoder (syntax decoding means) video coding device (image coding device)
27 variable length code coder 271 quantized residual information coder (arithmetic coding device)
220 transform coefficient coder
223 coefficient coding controller (sub-block dividing means, sub-block scan order setting means)
224 coefficient presence/absence flag coder (context index deriving means)
224a frequency classifying unit
224b position context deriving unit
224c neighbor reference context deriving unit
224d coefficient presence/absence flag memory
224e coefficient presence/absence flag setting unit
224x derivation method controller
224z context deriving unit
227 sub-block coefficient presence/absence flag coder (sub-block coefficient presence/absence flag coding means)
227a context deriving unit
227b sub-block coefficient presence/absence flag memory
227c sub-block coefficient presence/absence flag setting unit
228 syntax deriving unit
230 arithmetic code coder
231 context recording/updating unit
232 bit coder (syntax coding means)

The invention claimed is:

1. An arithmetic decoding device that decodes coded data for each of unit regions of a target image, comprising:
context index deriving circuitry configured to:
(a) derive at least one context index of at least one transform coefficient presence/absence flags indicating whether a transform coefficient is 0 in the each of the unit regions, the at least one transform coefficient presence/absence flag including at least one of a transform coefficient presence/absence flags related to luminance and a transform coefficient presence/absence flags related to chrominance; and
(b) set (i) a first common context index for the transform coefficient presence/absence flag that is related to luminance and belongs to a DC coefficient of each of the unit regions, the first common context index being common to at least two unit regions having different sizes among the unit regions and (ii) a second common context index for the transform coefficient presence/absence flag that is related to chrominance and belongs to a DC coefficient of each of the unit regions, the second common context index being common to the at least two unit regions having different sizes among the unit regions; and
syntax decoding circuitry configured to perform arithmetic decoding of the at least one transform coefficient presence/absence flag based on at least one of a probability state designated by the first common context index and a probability state designated by the second common context index.

2. The arithmetic decoding device according to claim 1, wherein
the first common context index is derived based on a position of the transform coefficient and the second common context index is derived based on a position of the transform coefficient.

3. The arithmetic decoding device according to claim 1, wherein
the first common context index value is equal to 0.

4. An arithmetic decoding method for decoding coded data for each of unit regions of a target image, comprising the steps of:
(a) deriving at least one context index of at least one transform coefficient presence/absence flag indicating whether a transform coefficient is 0 in the each of the unit regions, the at least one transform coefficient presence/absence flag including at least one of a transform coefficient presence/absence flag related to luminance and a transform coefficient presence/absence flag related to chrominance;
(b) setting (i) a first common context index for the transform coefficient presence/absence flag that is related to luminance and belongs to a DC coefficient of each of the unit regions, the first common context index being common to at least two unit regions having different sizes among the unit regions and (ii) a second common context index for the transform coefficient presence/absence flag that is related to chrominance and belongs to a DC coefficient of each of the unit regions, the second common context index being common to the at least two unit regions having different sizes among the unit regions; and
(c) performing arithmetic decoding of the at least one transform coefficient presence/absence flag based on at least one of a probability state designated by the first common context index and a probability state designated by the second common context index.

5. An arithmetic coding device that generates coded data for each of unit regions of a target image, comprising:
context index deriving circuitry configured to:
(a) derive at least one context index of at least one transform coefficient presence/absence flag indicating whether a transform coefficient is 0 in the each of the unit regions, the at least one transform coefficient presence/absence flag including at least one of a transform coefficient presence/absence flag related to luminance and a transform coefficient presence/absence flag related to chrominance; and
(b) set (i) a first common context index for the transform coefficient presence/absence flag that is related to luminance and belongs to a DC coefficient of each of the unit regions, the first common context index being common to at least two unit regions having different sizes among the unit regions and (ii) a second common context index for the transform for a transform coefficient presence/absence flag that is related to chrominance and belongs to a DC coefficient of each of the unit regions, the second common context index being common to the at least two unit regions having different sizes among the unit regions; and
a syntax coding circuitry configured to perform arithmetic coding of the at least one transform coefficient presence/absence flag based on at least one of a probability state designated by the first common context index and a probability state designated by the second common context index.

* * * * *

UNITED STATES PATENT AND TRADEMARK OFFICE
CERTIFICATE OF CORRECTION

PATENT NO. : 10,129,548 B2
APPLICATION NO. : 14/368377
DATED : November 13, 2018
INVENTOR(S) : Takeshi Tsukuba et al.

It is certified that error appears in the above-identified patent and that said Letters Patent is hereby corrected as shown below:

In the Claims

Claim 1, Column 131, each instance of "transform coefficient presence/absence flags" at Line 32, at Line 36, and at Lines 37 and 38 should be --transform coefficient presence/absence flag--.

Signed and Sealed this
Twenty-eighth Day of April, 2020

Andrei Iancu
*Director of the United States Patent and Trademark Office*